US010635299B2

(12) United States Patent
Peterson et al.

(10) Patent No.: US 10,635,299 B2
(45) Date of Patent: Apr. 28, 2020

(54) DEVICE, METHOD, AND GRAPHICAL USER INTERFACE FOR MANIPULATING WINDOWS IN SPLIT SCREEN MODE

(71) Applicant: Apple Inc., Cupertino, CA (US)

(72) Inventors: Adele C. Peterson, Los Gatos, CA (US); Brian L. Gluth, Cupertino, CA (US); Charles Hugo Ying, San Mateo, CA (US); Dan Bernstein, San Francisco, CA (US); James Savage, Mountain View, CA (US); Reza Abbasian, Santa Clara, CA (US); Yongjun Zhang, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 138 days.

(21) Appl. No.: 15/609,616

(22) Filed: May 31, 2017

(65) Prior Publication Data

US 2017/0357437 A1 Dec. 14, 2017

Related U.S. Application Data

(60) Provisional application No. 62/348,789, filed on Jun. 10, 2016.

(51) Int. Cl.

| | |
|---|---|
| ***G06F 3/0486*** | (2013.01) |
| ***G06F 3/0482*** | (2013.01) |
| ***G06F 3/0488*** | (2013.01) |
| ***G06F 17/22*** | (2006.01) |

(52) U.S. Cl.

CPC ........ *G06F 3/04883* (2013.01); *G06F 3/0486* (2013.01); *G06F 17/2235* (2013.01); *G06F 2203/04803* (2013.01)

(58) Field of Classification Search

CPC ........................... G06F 3/0488; G06F 3/04883

See application file for complete search history.

(56) References Cited

U.S. PATENT DOCUMENTS

| | | | | |
|---|---|---|---|---|
| 2006/0085741 A1 | | 4/2006 | Weiner et al. | |
| 2006/0224951 A1* | | 10/2006 | Burke | G06F 16/957 715/234 |
| 2008/0313144 A1* | | 12/2008 | Huston | G06F 16/951 |
| 2011/0302532 A1* | | 12/2011 | Missig | G06F 3/0416 715/823 |

(Continued)

OTHER PUBLICATIONS

Extended European Search Report for EP Appl. No. 17175019.3 dated Oct. 17, 2017.

*Primary Examiner* — Rayeez R Chowdhury

(74) *Attorney, Agent, or Firm* — Fernando & Partners, LLP

(57) ABSTRACT

An electronic device detects a gesture input while displaying first content including a first hyperlink in a first window and a second window that includes second content. In response to detecting the gesture input, and in accordance with a determination that the gesture input corresponds to a first gesture type on the first hyperlink, the electronic device replaces display of the first content in the first window with display of third content that is associated with the first hyperlink. In response to detecting the gesture input, and in accordance with a determination that the gesture input corresponds to a second gesture type on the first hyperlink, the electronic device replaces display of the second content in the second window with display of the third content that is associated with the first hyperlink.

24 Claims, 99 Drawing Sheets

(56) References Cited

U.S. PATENT DOCUMENTS

| | | | | |
|---|---|---|---|---|
| 2012/0117451 | A1* | 5/2012 | You | G06F 3/04883 715/205 |
| 2012/0272128 | A1* | 10/2012 | Takaku | G06F 1/1624 715/205 |
| 2013/0225236 | A1* | 8/2013 | Lee | G06F 16/58 455/556.1 |
| 2014/0143683 | A1* | 5/2014 | Underwood, IV | H04L 51/38 715/752 |
| 2014/0289597 | A1* | 9/2014 | Kim | G06F 16/957 715/205 |
| 2015/0067605 | A1 | 3/2015 | Zambetti et al. | |
| 2015/0149958 | A1* | 5/2015 | Voorhees | G06F 3/0485 715/798 |
| 2015/0293676 | A1* | 10/2015 | Avrahami | G06F 3/0484 715/720 |
| 2016/0062515 | A1* | 3/2016 | Bae | G06F 3/0414 345/174 |

* cited by examiner

Figure 8B:
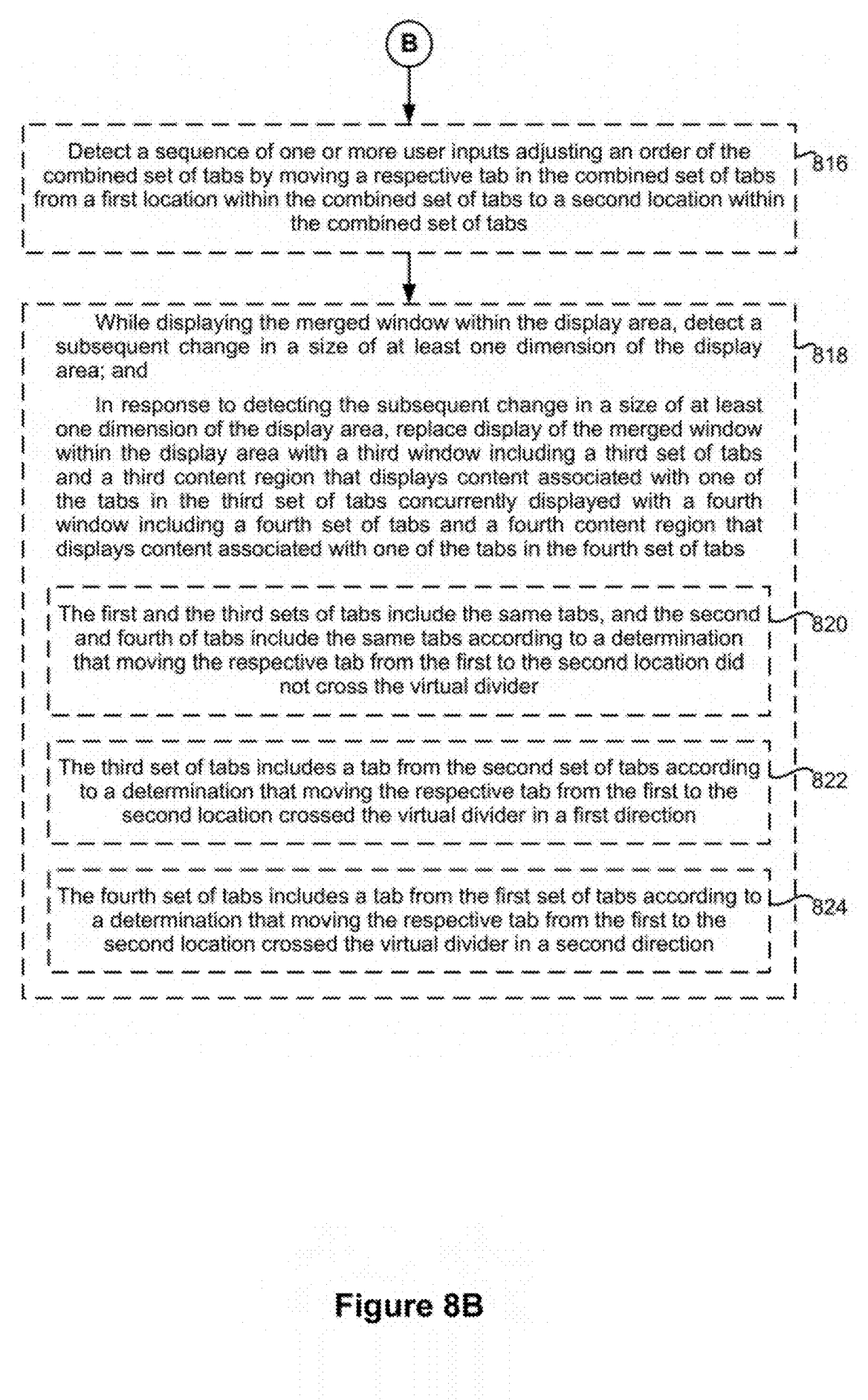

B

Detect a sequence of one or more user inputs adjusting an order of the combined set of tabs by moving a respective tab in the combined set of tabs from a first location within the combined set of tabs to a second location within the combined set of tabs 816

While displaying the merged window within the display area, detect a subsequent change in a size of at least one dimension of the display area; and 818

In response to detecting the subsequent change in a size of at least one dimension of the display area, replace display of the merged window within the display area with a third window including a third set of tabs and a third content region that displays content associated with one of the tabs in the third set of tabs concurrently displayed with a fourth window including a fourth set of tabs and a fourth content region that displays content associated with one of the tabs in the fourth set of tabs The first and the third sets of tabs include the same tabs, and the second and fourth of tabs include the same tabs according to a determination that moving the respective tab from the first to the second location did not cross the virtual divider 820

The third set of tabs includes a tab from the second set of tabs according to a determination that moving the respective tab from the first to the second location crossed the virtual divider in a first direction 822

The fourth set of tabs includes a tab from the first set of tabs according to a determination that moving the respective tab from the first to the second location crossed the virtual divider in a second direction 824

Figure 8C:
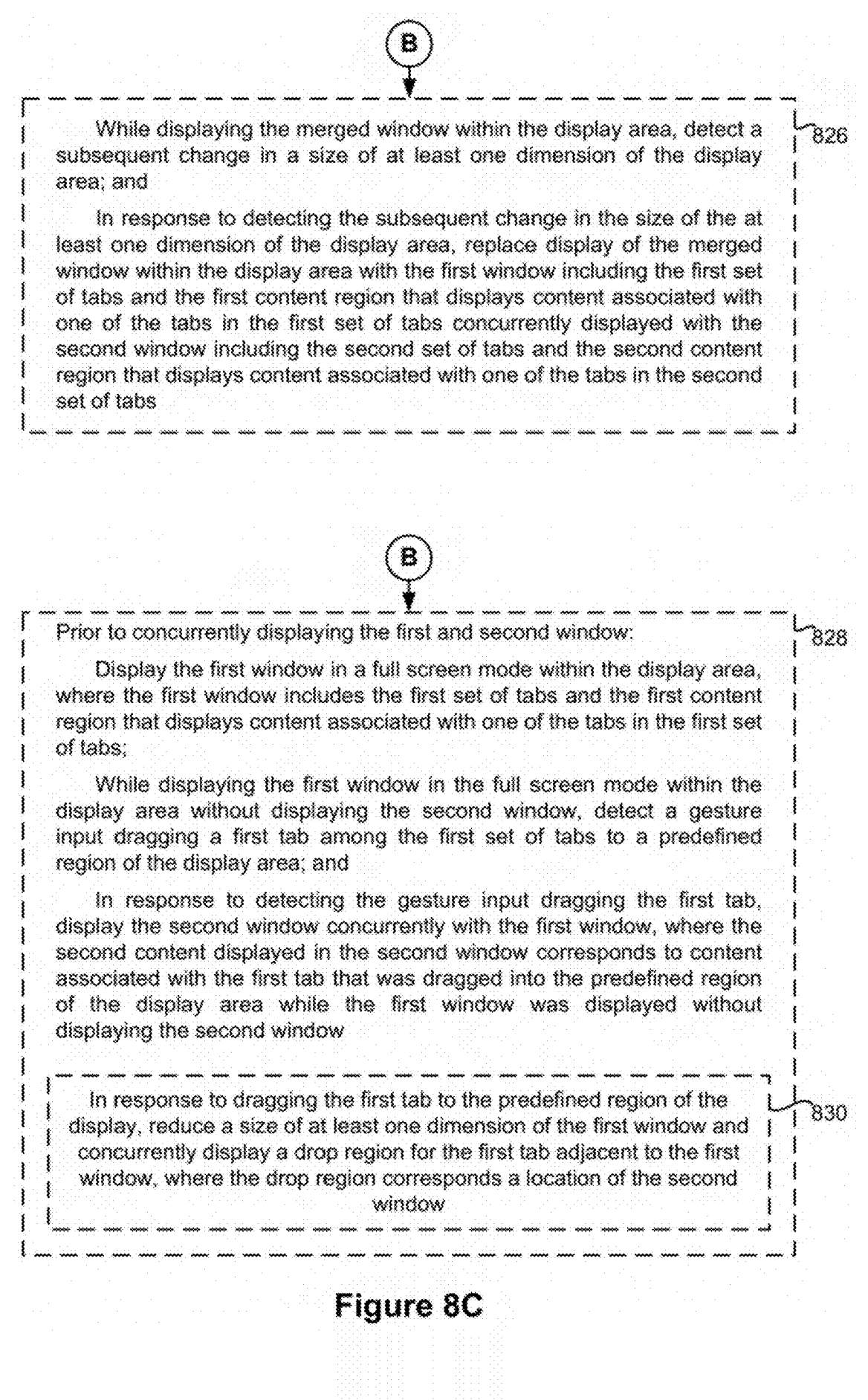

While displaying the merged window within the display area, detect a subsequent change in a size of at least one dimension of the display area; and In response to detecting the subsequent change in the size of the at least one dimension of the display area, replace display of the merged window within the display area with the first window including the first set of tabs and the first content region that displays content associated with one of the tabs in the first set of tabs concurrently displayed with the second window including the second set of tabs and the second content region that displays content associated with one of the tabs in the second set of tabs

B

828

Prior to concurrently displaying the first and second window:

Display the first window in a full screen mode within the display area, where the first window includes the first set of tabs and the first content region that displays content associated with one of the tabs in the first set of tabs;

While displaying the first window in the full screen mode within the display area without displaying the second window, detect a gesture input dragging a first tab among the first set of tabs to a predefined region of the display area; and In response to detecting the gesture input dragging the first tab, display the second window concurrently with the first window, where the second content displayed in the second window corresponds to content associated with the first tab that was dragged into the predefined region of the display area while the first window was displayed without displaying the second window

830

In response to dragging the first tab to the predefined region of the display, reduce a size of at least one dimension of the first window and concurrently display a drop region for the first tab adjacent to the first window, where the drop region corresponds a location of the second window

Figure 9A:
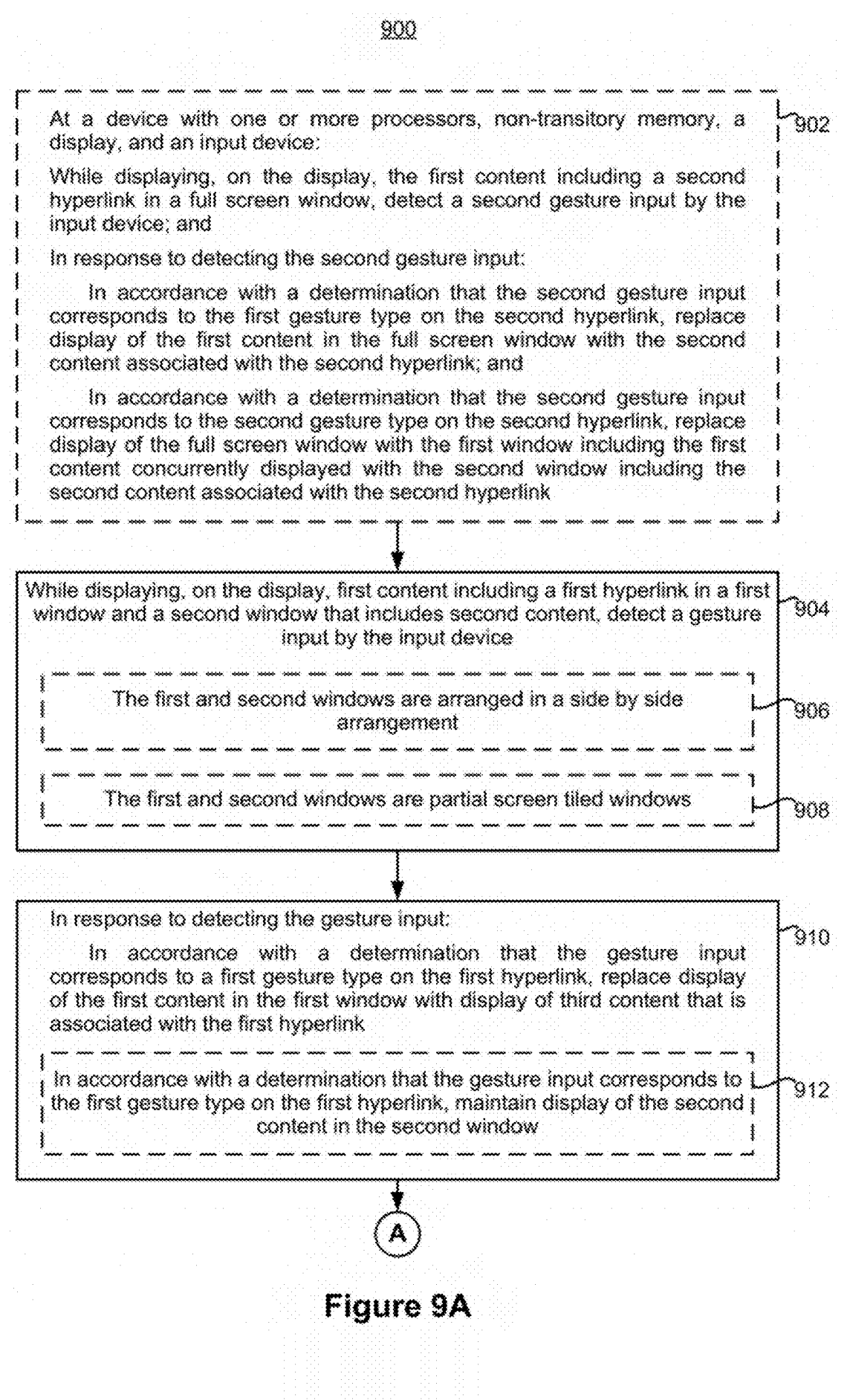

902: At a device with one or more processors, non-transitory memory, a display, and an input device:

While displaying, on the display, the first content including a second hyperlink in a full screen window, detect a second gesture input by the input device; and In response to detecting the second gesture input:

In accordance with a determination that the second gesture input corresponds to the first gesture type on the second hyperlink, replace display of the first content in the full screen window with the second content associated with the second hyperlink; and In accordance with a determination that the second gesture input corresponds to the second gesture type on the second hyperlink, replace display of the full screen window with the first window including the first content concurrently displayed with the second window including the second content associated with the second hyperlink

↓

904: While displaying, on the display, first content including a first hyperlink in a first window and a second window that includes second content, detect a gesture input by the input device 906: The first and second windows are arranged in a side by side arrangement 908: The first and second windows are partial screen tiled windows

↓

910: In response to detecting the gesture input:

In accordance with a determination that the gesture input corresponds to a first gesture type on the first hyperlink, replace display of the first content in the first window with display of third content that is associated with the first hyperlink 912: In accordance with a determination that the gesture input corresponds to the first gesture type on the first hyperlink, maintain display of the second content in the second window

The second content includes a second hyperlink, and in response to the gesture input: 932

In accordance with a determination that the gesture input corresponds to the first gesture type on the second hyperlink, replace display of the second content in the second window with display of the fourth content that is associated with the second hyperlink while maintaining display of the first content in the first window The second content includes a second hyperlink, and in response to the gesture input: 934

In accordance with a determination that the gesture input corresponds to the second gesture type on the second hyperlink, replace display of the first content in the first window with display of the fourth content that is associated with the second hyperlink while maintaining display of the second content in the second window In response to the gesture input: 936

In accordance with a determination that the gesture input corresponds to a third gesture type on the first hyperlink, display, on the display, a preview of the third content that is associated with the first hyperlink, where the preview is overlaid on the second window The third gesture type includes a press gesture on the first hyperlink with an intensity that breaches a first predefined intensity threshold associated with displaying the preview of the third content, and 938

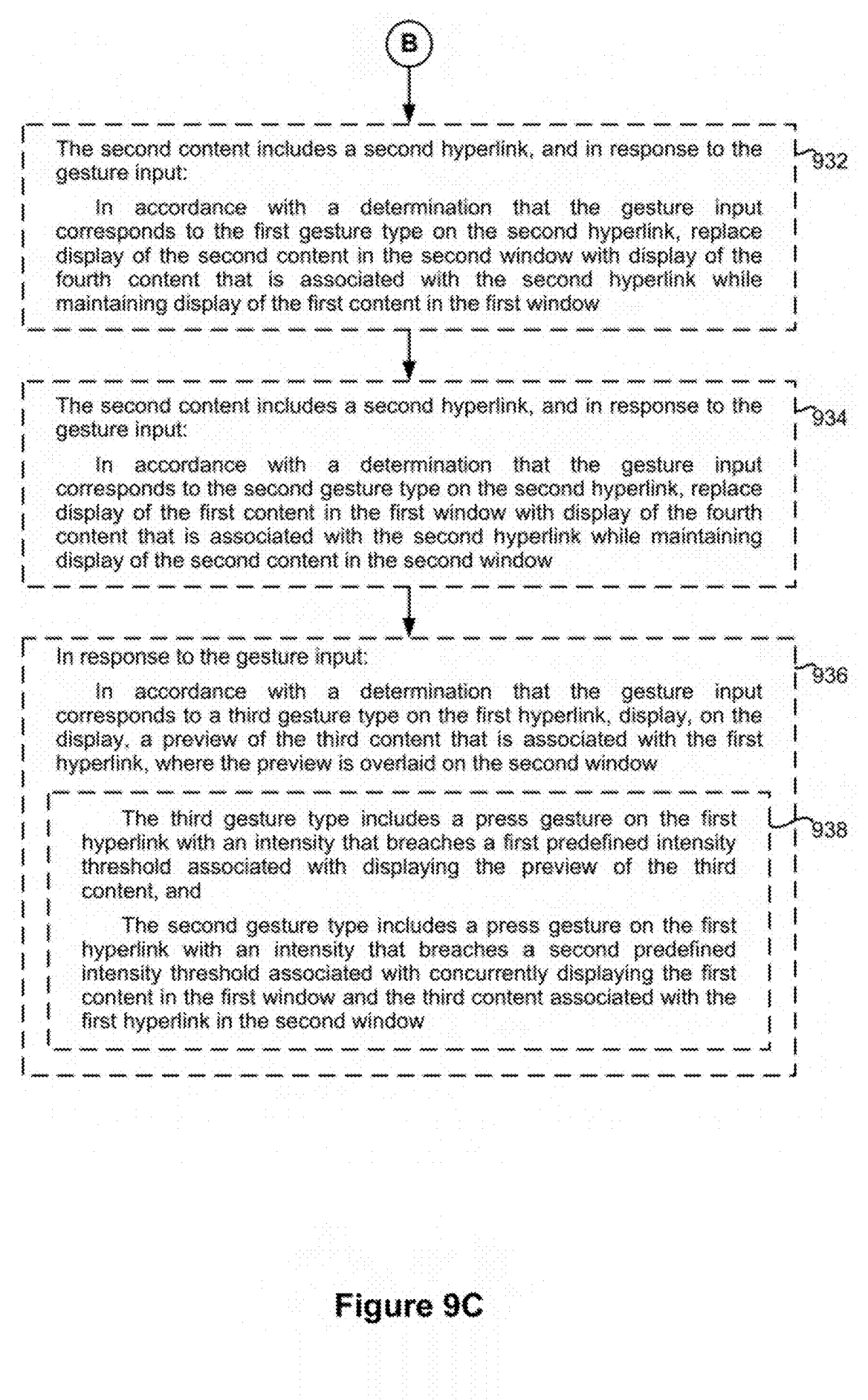

The second gesture type includes a press gesture on the first hyperlink with an intensity that breaches a second predefined intensity threshold associated with concurrently displaying the first content in the first window and the third content associated with the first hyperlink in the second window

Figure 9C

DEVICE, METHOD, AND GRAPHICAL USER INTERFACE FOR MANIPULATING WINDOWS IN SPLIT SCREEN MODE

CROSS-REFERENCE TO RELATED-APPLICATIONS

This application claims the benefit of U.S. Provisional Patent App. No. 62/348,789, filed on Jun. 10, 2016, which is incorporated by reference in its entirety.

TECHNICAL FIELD

This relates generally to electronic devices with touch-sensitive surfaces, including but not limited to electronic devices with touch-sensitive surfaces that manipulate windows in split screen mode.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for manipulating windows in split screen mode. Such methods and interfaces optionally complement or replace conventional methods for manipulating windows in split screen mode. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes concurrently displaying in a display area, on the display, a first window and a first content region displaying content associated with one of the tabs in the first set of tabs, and a second window with a second set of tabs and a second content region displaying content associated with one of the tabs in the second set of tabs. The method also includes detecting a change in a size of at least one dimension of the display area while concurrently displaying the first window and the second window within the display area. The method further includes displaying a merged window within the display area that includes a combined set of selectable tabs and a content region in response to detecting the change in the size of the at least one dimension of the display area, where the combined set of tabs includes the first and second sets of tabs, and the content region of the merged window includes content that corresponds to one of the tabs in the first set of tabs and the second set of tabs.

In accordance with some embodiments, a method is performed at a device with one or more processors, non-transitory memory, a display, and an input device. The method includes detecting a gesture input by the input device while displaying, on the display, first content including a first hyperlink in a first window and a second window that includes second content. In response to detecting the gesture input, and in accordance with a determination that the gesture input corresponds to a first gesture type on the first hyperlink, the method also includes replacing display of the first content in the first window with display of third content that is associated with the first hyperlink. In response to detecting the gesture input, and in accordance with a determination that the gesture input corresponds to a second gesture type on the first hyperlink, the method also includes replacing display of the second content in the second window with display of the third content that is associated with the first hyperlink.

In accordance with some embodiments, an electronic device includes a display unit configured to display a user interface, one or more input units configured to received user inputs, and a processing unit coupled with the display unit and the one or more input units. The processing unit is configured to enable concurrent display of, in a display area on the display unit, a first window and a first content region displaying content associated with one of the tabs in the first set of tabs, and a second window with a second set of tabs and a second content region displaying content associated with one of the tabs in the second set of tabs. The processing unit is also configured to detect a change in a size of at least one dimension of the display area while concurrently displaying the first window and the second window within the display area. The processing unit is further configured to enable display of a merged window within the display area that includes a combined set of selectable tabs and a content region in response to detecting the change in the size of the at least one dimension of the display area, where the combined set of tabs includes the first and second sets of tabs, and the content region of the merged window includes content that corresponds to one of the tabs in the first set of tabs and the second set of tabs.

In accordance with some embodiments, an electronic device includes a display unit configured to display a user interface, one or more inputs configured to receive user inputs, one or more sensor units to detect intensity of contacts, and a processing unit coupled with the display unit, the one or more inputs, and the one or more sensor units. The processing unit is configured to detect a gesture input by the input device while displaying, on the display unit, first content including a first hyperlink in a first window and a second window that includes second content. In response to detecting the gesture input, and in accordance with a determination that the gesture input corresponds to a first gesture type on the first hyperlink, the processing unit is also configured to replace display of the first content in the first window with display of third content that is associated with the first hyperlink. In response to detecting the gesture input, and in accordance with a determination that the gesture input corresponds to a second gesture type on the first hyperlink, the processing unit is also configured to replace display of the second content in the second window with display of the third content that is associated with the first hyperlink.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays and input devices are provided with faster, more efficient methods and interfaces for manipulating windows in split screen mode, thereby increasing the effectiveness, efficiency, and user satisfaction with such devices. Such methods and interfaces may complement or replace conventional methods for manipulating windows in split screen mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8D illustrate a flow diagram of a method of switching between full screen mode and split screen mode in accordance with some embodiments.

FIGS. 9A-9C illustrate a flow diagram of a method of opening hyperlinks in split view mode in accordance with some embodiments.

DESCRIPTION OF EMBODIMENTS

The use of electronic devices with touch-based user interfaces (e.g., devices such as the iPhone®, iPod Touch®, iPad®, MacBook®, and iMac® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. These devices may also have contact intensity sensor for determining a force or pressure of contacts with the touch-sensitive surfaces.

Described below are devices and methods that maintain tab ordering and continuity of tab sets when switching between split screen mode to full screen mode. For example, the device switches from split screen mode to full screen mode due to rotation of the device as changing from landscape to portrait orientation. For example, the device switches from split screen mode to full screen mode due to a gesture that causes windows in split screen mode to transition into a merged window in full screen mode.

Described below are devices and methods that enable a user to perform a gesture on a hyperlink in a first window in split screen mode to view content associated with the hyperlink in an adjacent window in split screen mode. For example, the content associated with the hyperlink overwrites the content display in the current foreground tab in the adjacent window. In another example, the content associated with the hyperlink is displayed in a new foreground tab in the adjacent window. In yet another example, the content associated with the hyperlink is launched in a new background tab in the adjacent window. In some embodiments, the devices and methods described below also enable a user to perform a gesture on a hyperlink in a first window in full screen mode to launch a web page or other electronic document associated with the hyperlink in a new window in split screen mode.

Figure 9B:
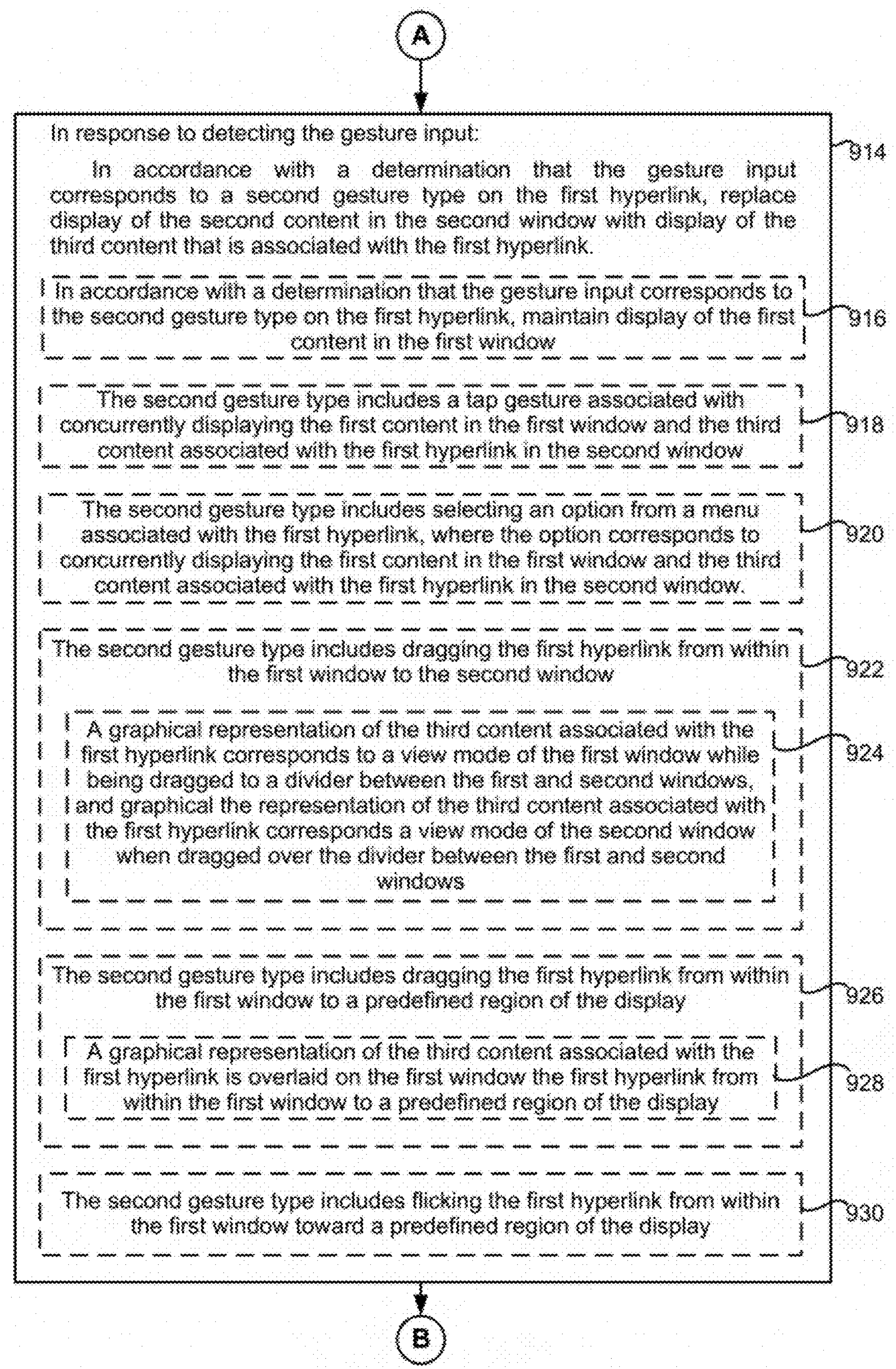

Below, FIGS. 1A-1B, 2-3, and 4A-4B provide a description of example devices. FIGS. 5A-5KK, 6A-6J, and 7A-7KK illustrate example user interfaces for performing operations in split view mode. FIGS. 8A-8D illustrate a flow diagram of a method of switching between full screen mode and split screen mode. FIGS. 9A-9C illustrate a flow diagram of a method of opening hyperlinks in split view mode. The user interfaces in 5A-5KK, 6A-6J, and 7A-7KK are used to illustrate the processes in FIGS. 8A-8D and 9A-9C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
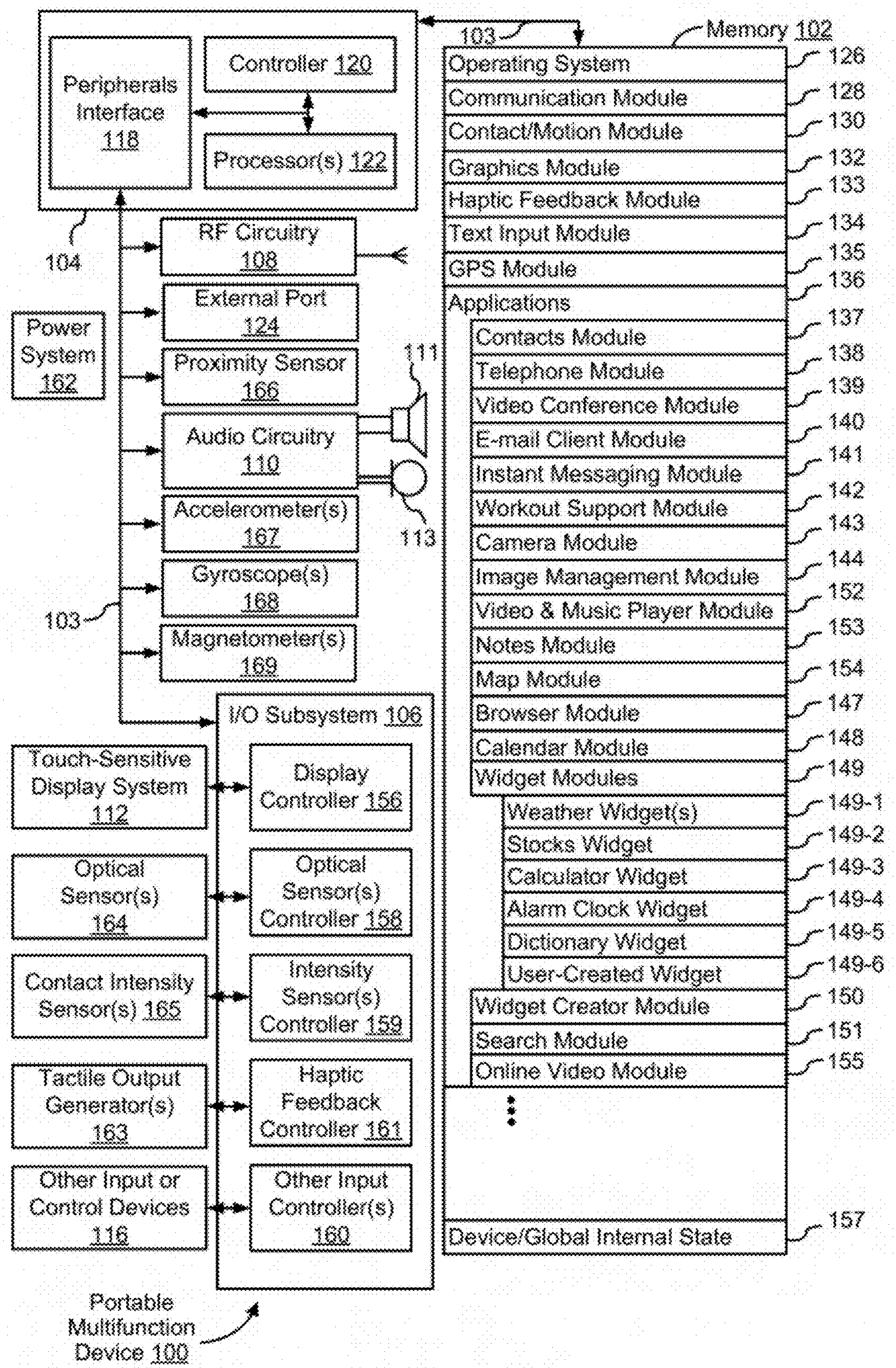
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
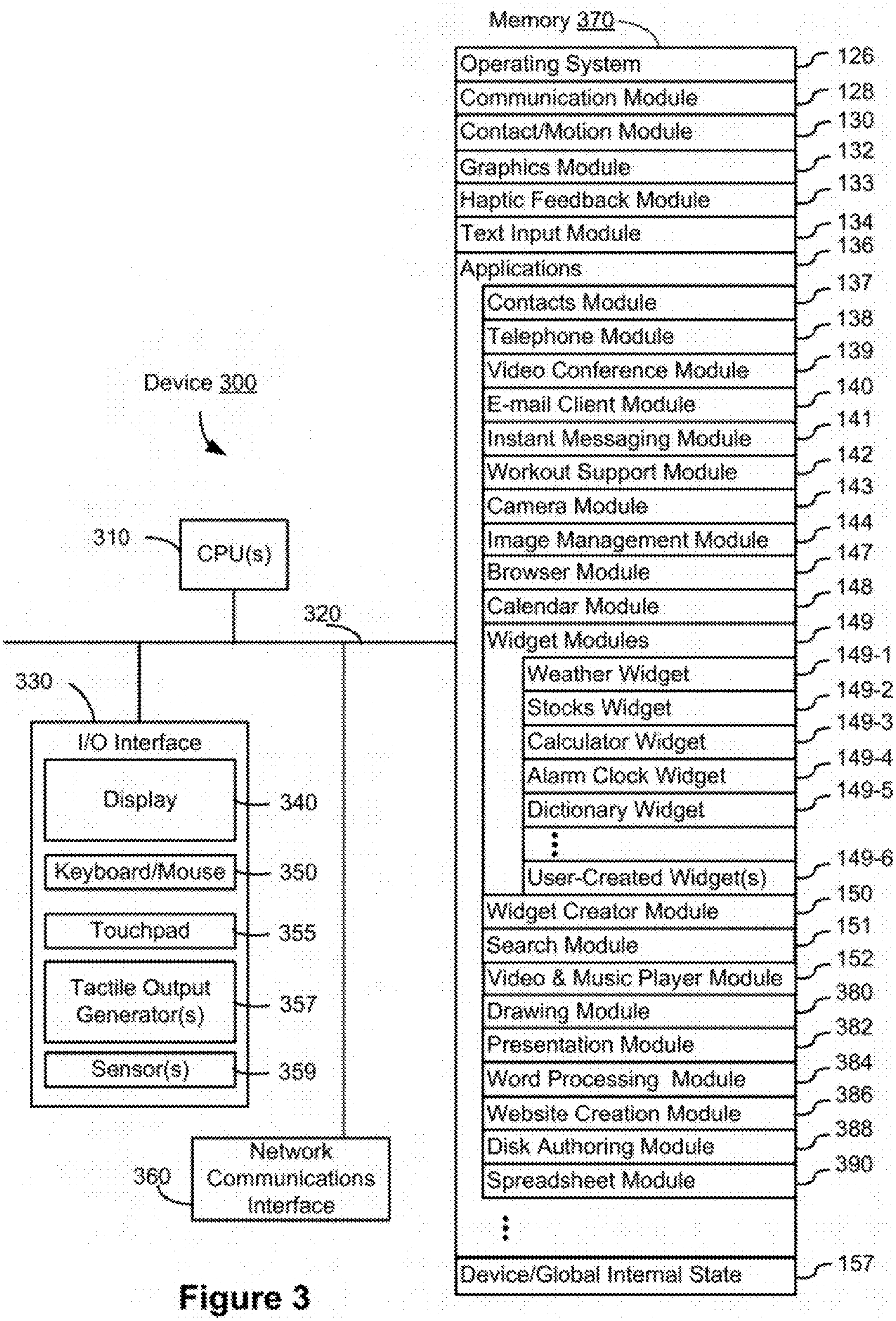
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS)

and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
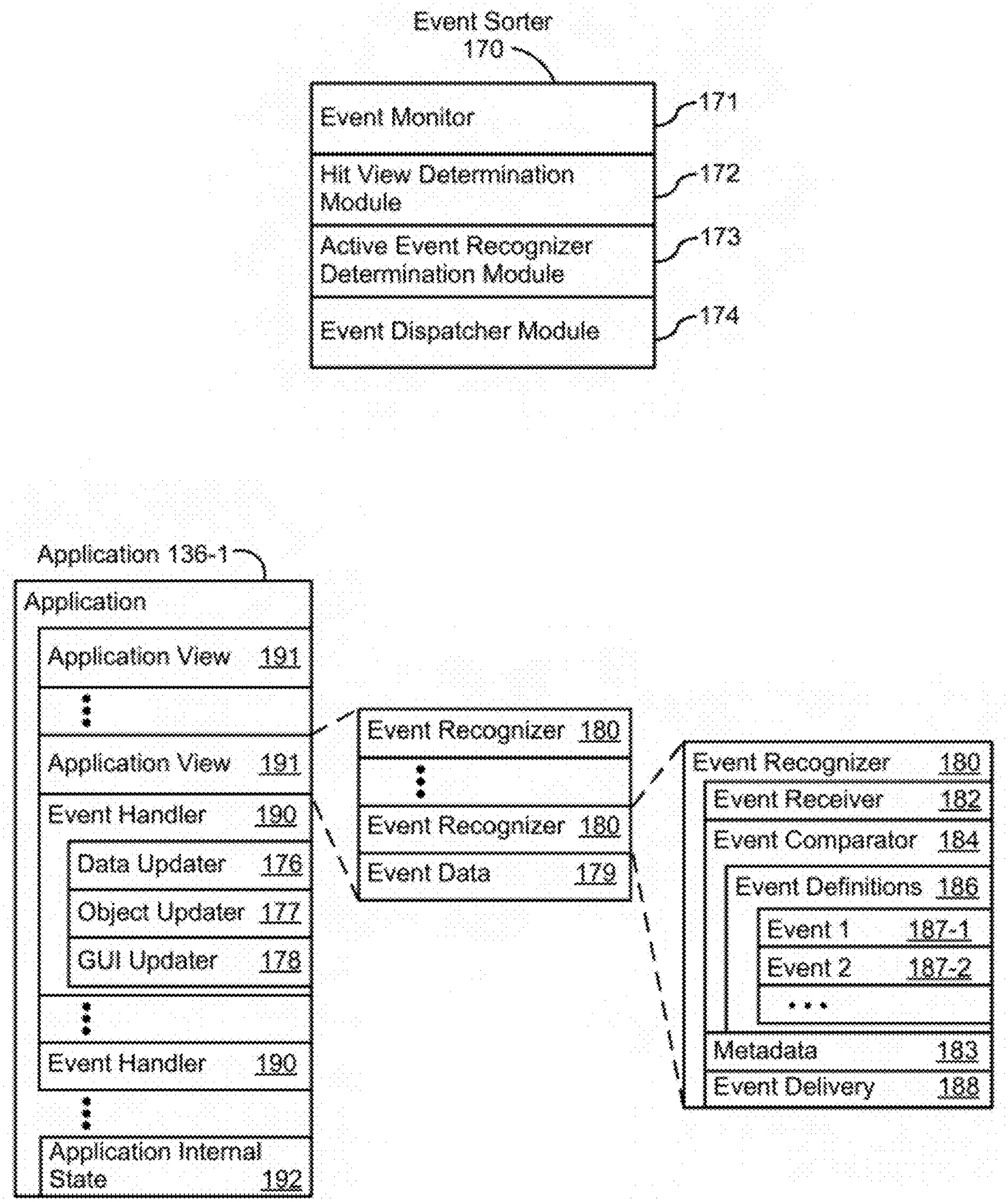
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
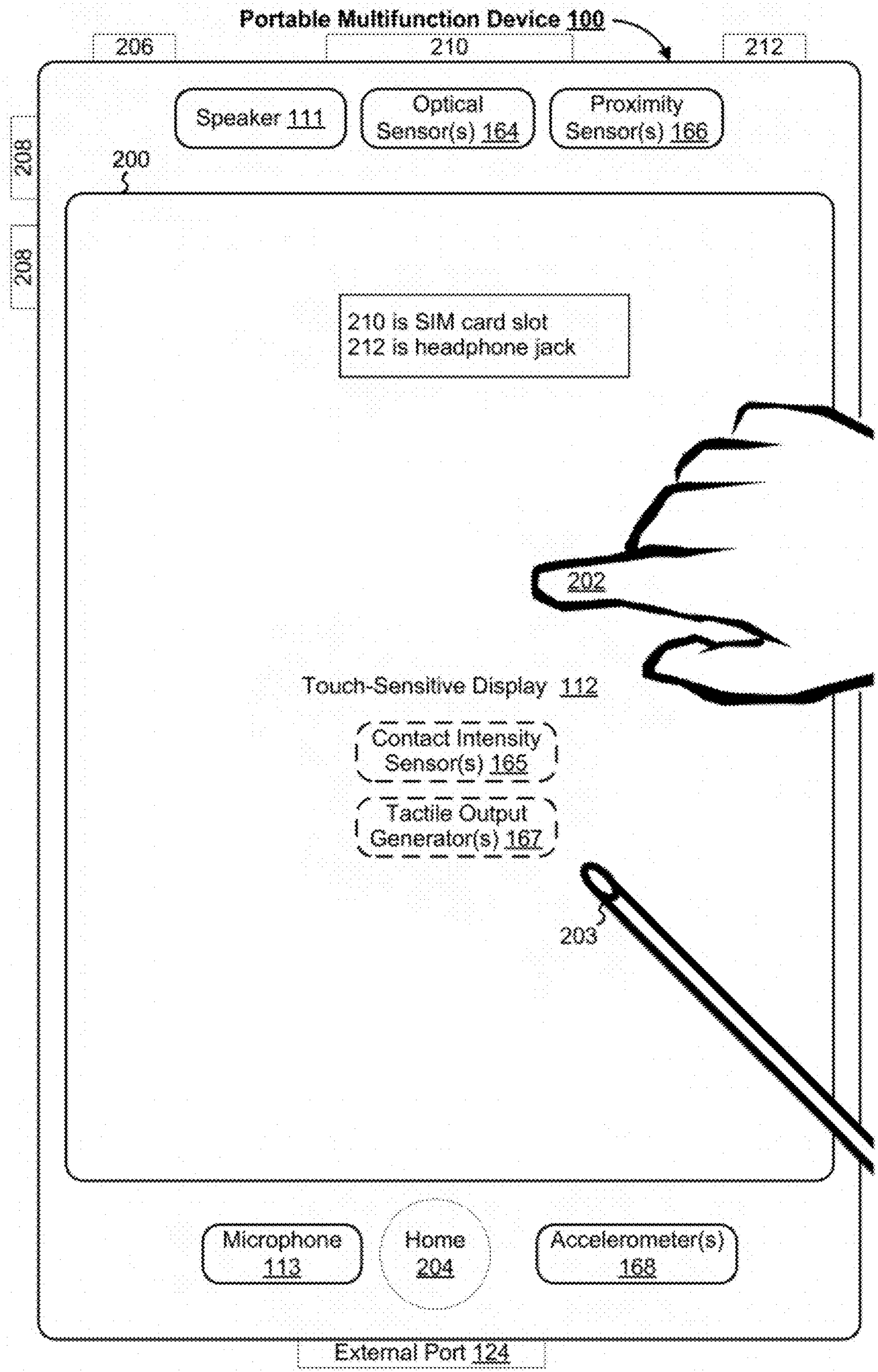
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed toward embodiments of user interfaces ("UI") that are, optionally, implemented on portable multifunction device 100.

Figure 4A:
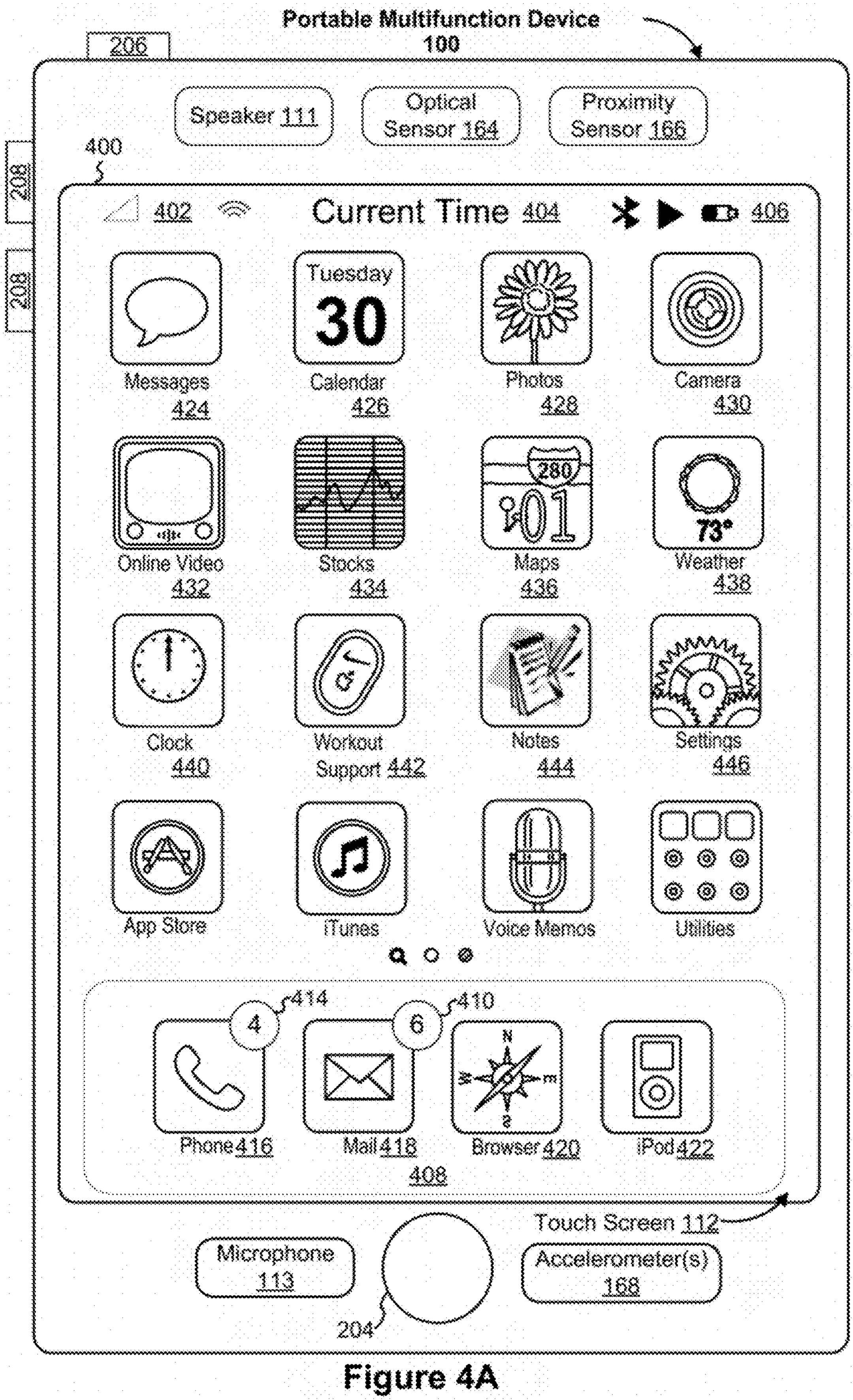
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser"; and

Icon 422 for video and music player module 152, also referred to as iPod (trademark of Apple Inc.) module 152, labeled "iPod"; and Icons for other applications, such as:

Icon 424 for IM module 141, labeled "Text";

Icon 426 for calendar module 148, labeled "Calendar";

Icon 428 for image management module 144, labeled "Photos";

Icon 430 for camera module 143, labeled "Camera";

Icon 432 for online video module 155, labeled "Online Video";

Icon 434 for stocks widget 149-2, labeled "Stocks";

Icon 436 for map module 154, labeled "Map";

Icon 438 for weather widget 149-1, labeled "Weather";

Icon 440 for alarm clock widget 169-6, labeled "Clock";

Icon 442 for workout support module 142, labeled "Workout Support";

Icon 444 for notes module 153, labeled "Notes"; and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
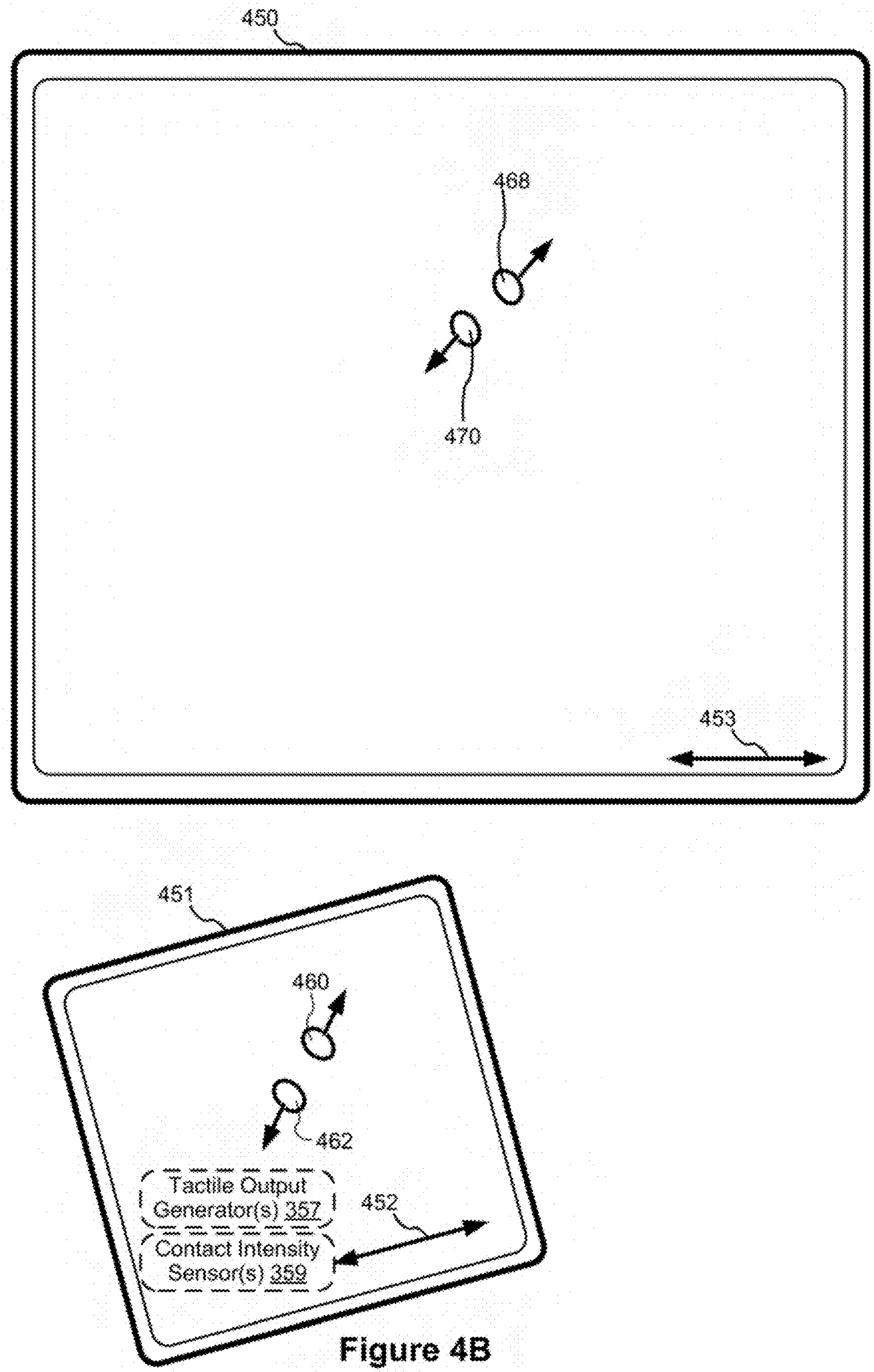
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7KK) described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed toward embodiments of user interfaces ("UI") and associated processes that may be implemented on an electronic device, such as a portable multifunction device 100 with a display, a touch-sensitive surface, and optionally one or more sensors to detect intensity of contacts with the touch-sensitive surface, or a device 300 with a one or more processors, non-transitory memory, a display, and an input device.

FIGS. 5A-5KK illustrate example user interfaces for switching between full screen mode and split view mode in accordance with some embodiments. The user interfaces in these figures are used to illustrate the processes described below, including the processes in FIGS. 8A-8D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 5A:
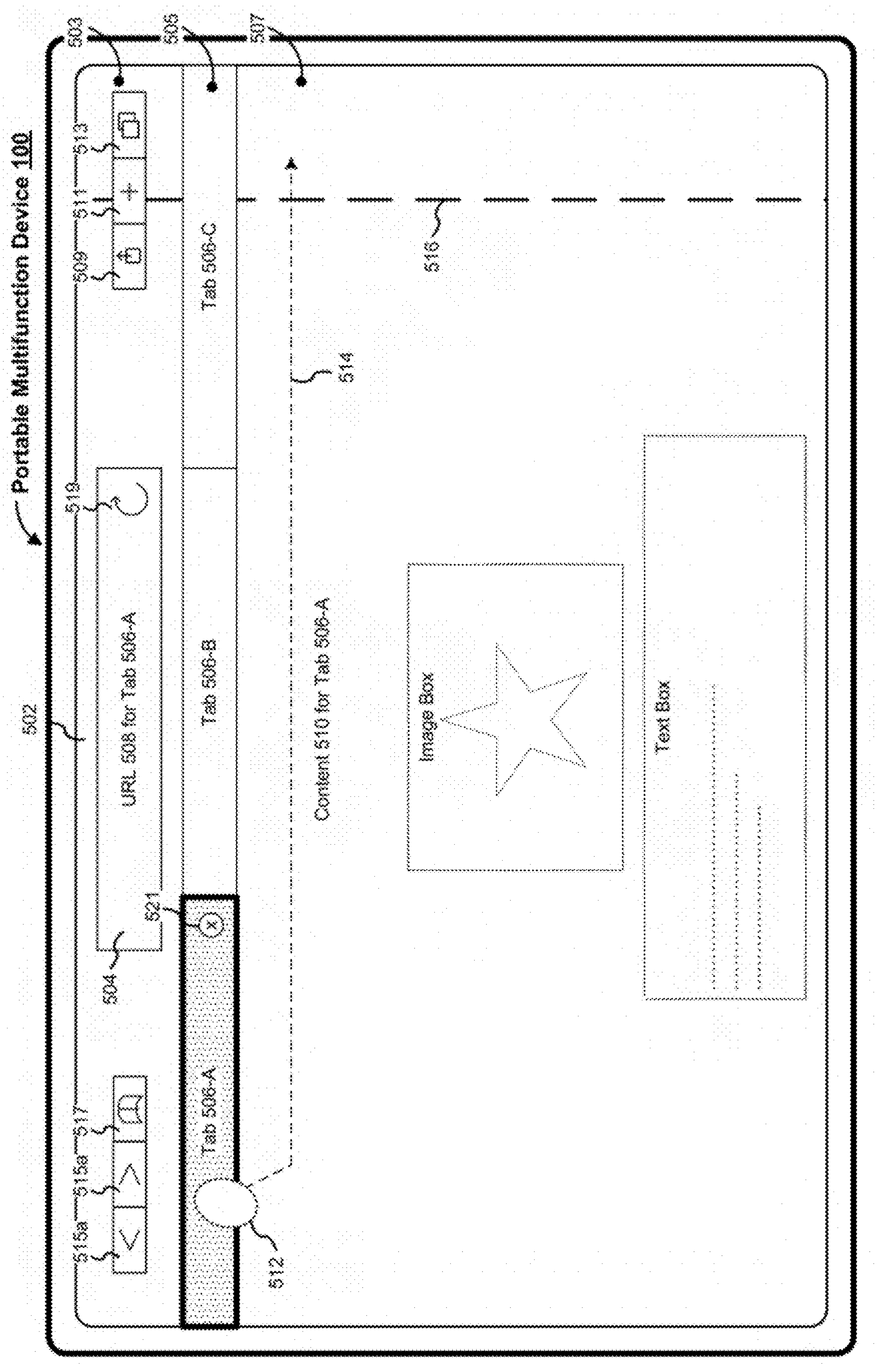
FIGS. 5A-5KK illustrate example user interfaces for switching between full screen mode and split screen mode in accordance with some embodiments.

FIGS. 5A-5D illustrate a sequence in which the user interface transitions from full screen mode to split screen mode in response to dragging a tab to a predefined region of the user interface. FIG. 5A illustrates a window 502 in a full screen mode with a chrome region 503, a tab bar 505, and a content region 507. For example, the window 502 is associated with an instance of a web browser application. FIG. 5A shows the window 502 displayed within a display area of the portable multifunction device 100 (e.g., associated with a touch screen) in a browser view. For example, the display or touchscreen of the device 100 defines the dimensions of the display area.

In some embodiments, the window 502 is associated with an instance of a web browser application, an email application, a messaging application, a document viewing application, a document processing application, or the like. In some embodiments, the content 510 displayed in the window 502 is associated with an electronic document such as a web page, a text file, an electronic mail message, an SMS, or the like.

In FIG. 5A, the tab bar 505 includes a plurality of tabs 506-A, 506-B, and 506-C. In FIG. 5A, the address bar 504 includes the URL (uniform resource locator) 508 for a web page associated with the tab 506-A. The content region 507 includes content 510 for the web page associated with the tab 506-A. As such, in FIG. 5A, the tab 506-A is active or in the foreground. In FIG. 5A, the tabs 506-B and 506-C are inactive or in the background.

In some embodiments, new tabs are added to the tab bar 505 by opening new web pages (e.g., via the addition menu 558 in FIG. 5K) or opening new tabs (e.g., by a combination of keystrokes such as Crtl+T). According to some embodiments, selection of an inactive/background tab causes the selected tab to become an active/foreground tab and also causes the previously active/foreground tab to become an inactive/background tab. In some cases, each tab is associated with a different web page or tabbed window. In some embodiments, each tab is associated with its own browsing history. In some embodiments, the user of the device 100 has the option to close a tab (e.g., by selecting affordance 521 in FIG. 5A or a combination of keystrokes such as Crtl+W). When a tab is closed, the corresponding tab is removed from the tab bar 505. According to some embodiments, the web pages associated with the tabs are all concurrently open, even though the background tabs are not displayed on the user interface.

In FIG. 5A, the chrome region 503 includes the address bar 504 with a refresh affordance 519, which, when activated (e.g., with a contact), causes the web page associated with the tab 506-A to be reloaded or refreshed. The chrome region 503 also includes a plurality of affordances including: a share affordance 509, which, when activated (e.g., with a contact), causes the web page associated with the tab 506-A to be shared with one or more contacts via email, SMS, a social media network, and/or the like; an addition affordance 511, which, when activated (e.g., with a contact), causes display of a menu (e.g., the addition menu 558 in FIG. 5K); a tab affordance 513, which, when activated (e.g., with a contact), causes the window 502 to transition from browser to tab view (e.g., the window 530 in FIG. 5E); a back affordance 515*a*, which, when activated (e.g., with a contact), causes a previous web page to be displayed in the tab 506-A; a forward affordance 515*b*, which, when activated (e.g., with a contact), causes a next web page to be displayed in the tab 506-A; and a read list/bookmark affordance 517, which, when activated (e.g., with a contact), causes the web page associated with the tab 506-A to be added to a reading list or to be bookmarked. FIG. 5A also illustrates a dragging gesture with a contact 512, where the tab 506-A is dragged according to movement vector 514 over a threshold line 516.

Figure 5B:
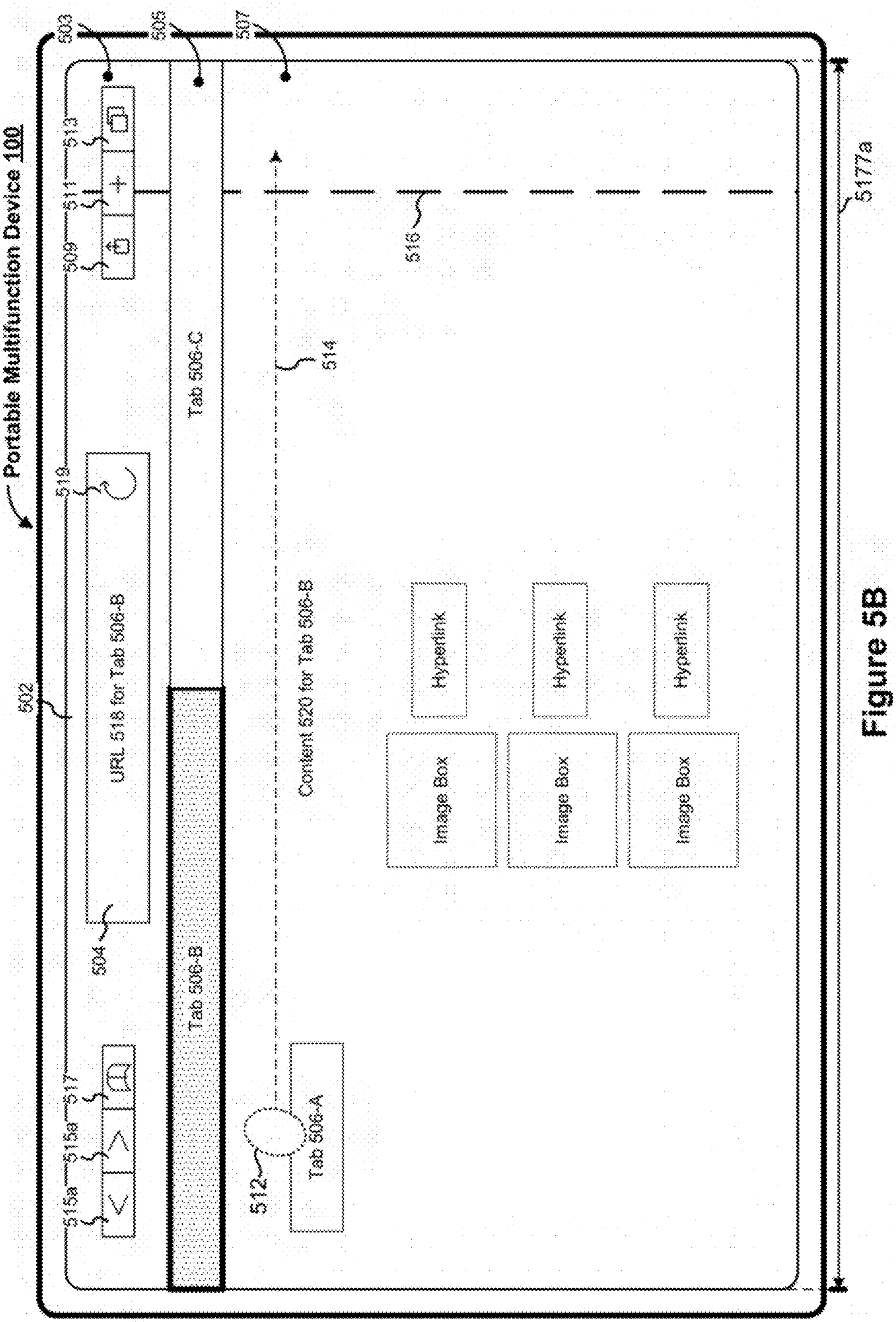

FIG. 5B illustrates the tab 506-A detached from the tab bar 505 in response to the dragging gesture. In FIG. 5B, the address bar 504 includes the URL 518 for the web page associated with the tab 506-B, and the content region 507 includes content 520 for the web page associated with the tab 506-B. As such, in FIG. 5B, the tab 506-B is active or in the foreground.

Figure 5C:
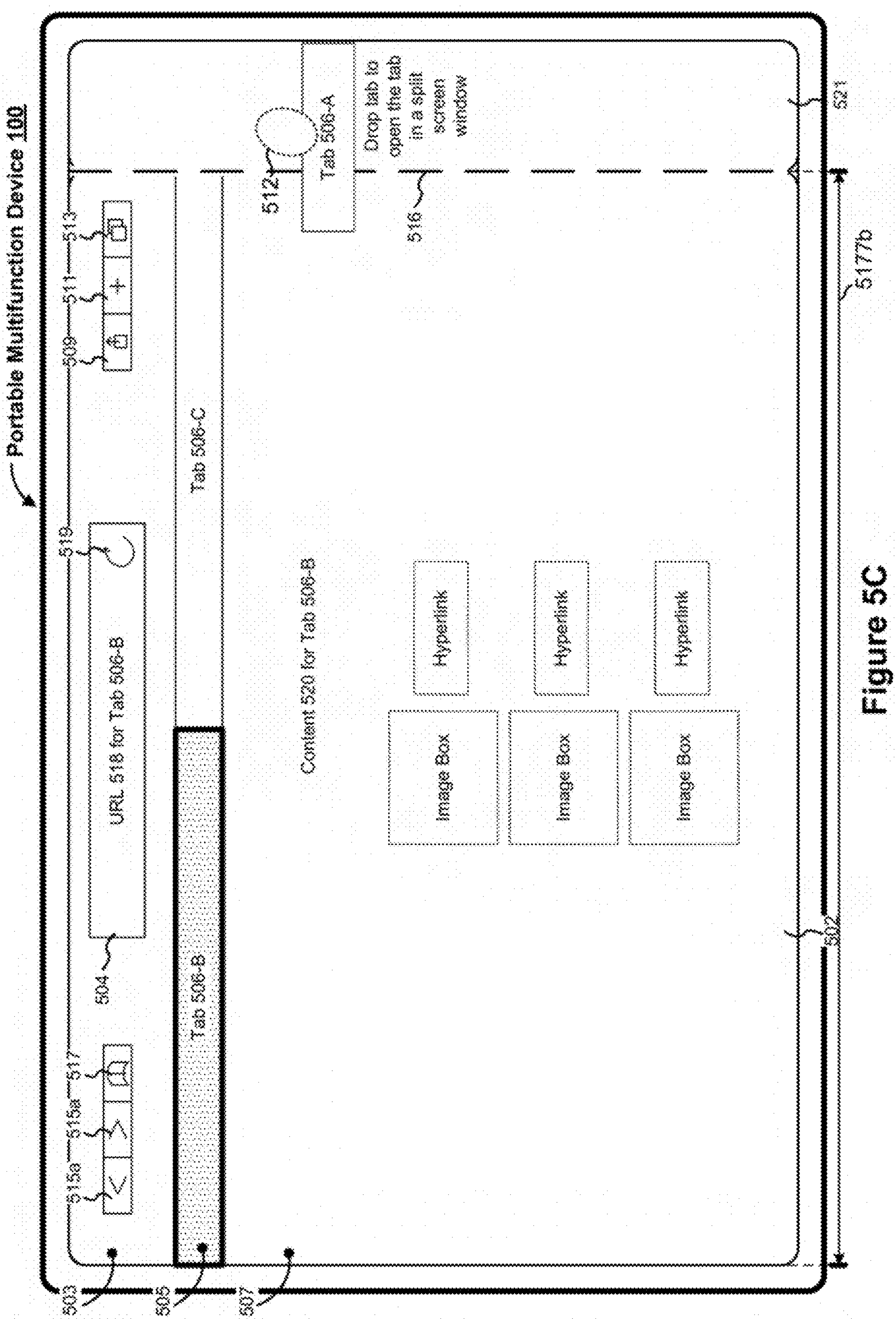

FIG. 5C illustrates a drop zone 521 between the right edge of the display area and the threshold line 516 in response to the tab 506-A breaching the threshold line 516 due to the dragging gesture. For example, a transition between full screen and split screen modes is triggered by dropping a tab in the drop zone 521. For example, the window 502 is displayed at a reduced size in FIG. 5C as compared to FIGS. 5A-5B. The value of a respective dimension (e.g., the width) of the window 502 is 5177*b* in FIG. 5C as compared to 5177*a* in FIG. 5B, where 5177*a* is greater than 5177*b*.

Figure 5D:
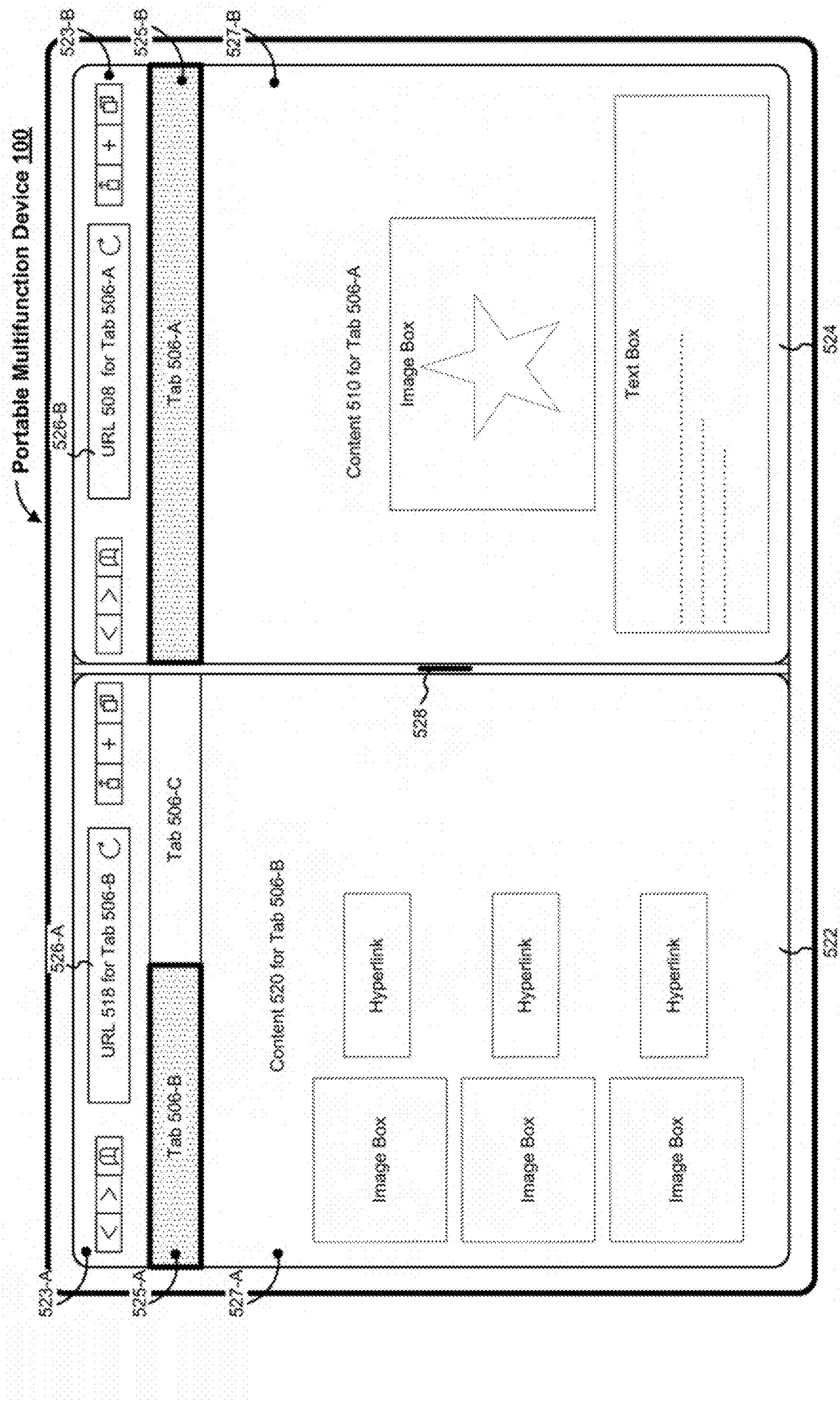

FIG. 5D illustrates a first window 522 and a second window 524 in a split screen mode in response to dropping the tab 506-A in the drop zone 521 in FIG. 5C. For example, the first window 522 and the second window 524 are associated with different instances of the web browser application. FIG. 5D shows the first window 522 and the second window 524 in the browser view.

In some embodiments, the first window 522 is associated with an instance of a web browser application, an email application, a messaging application, a document viewing application, a document processing application, or the like. In some embodiments, the first content 520 displayed in the first window 522 is associated with an electronic document such as a web page, a text file, an electronic mail message, an SMS, or the like. In some embodiments, the second window 524 is associated with an instance of a web browser application, an email application, a messaging application, a document viewing application, a document processing application, or the like. In some embodiments, the second content 510 displayed in the second window 524 is associated with an electronic document such as a web page, a text file, an electronic mail message, an SMS, or the like.

In FIG. 5D, the first window 522 includes a chrome region 523-A, a tab bar 525-A, and a content region 527-A. The tab bar 525-A includes tabs 506-B and 506-C. In FIG. 5D, the address bar 526-A includes the URL 518 for the web page associated with the tab 506-B, and the content region 527-A includes the content 520 for the web page associated with the tab 506-B. As such, in FIG. 5D, the tab 506-B is active or in the foreground in the first window 522. For example, the chrome region 523-A includes similar affordances to those in the chrome region 503 in FIGS. 5A-5B.

In FIG. 5D, the second window 524 includes a chrome region 523-B, a tab bar 525-B, and a content region 527-B. The tab bar 525-B includes the tab 506-A. In FIG. 5D, the address bar 526-B includes the URL 508 for the web page associated with the tab 506-A, and the content region 527-B includes the content 510 for the web page associated with the tab 506-A. As such, in FIG. 5D, the tab 506-A is active or in the foreground in the second window 524. FIG. 5D also illustrates a divider 528 between the first window 522 and the second window 524. For example, the user of the portable multifunction device 100 is able to resize the first window 522 and the second window 524 by dragging the divider 528. For example, the chrome region 523-B includes similar affordances to those in the chrome region 503 in FIGS. 5A-5B.

Figure 5E:
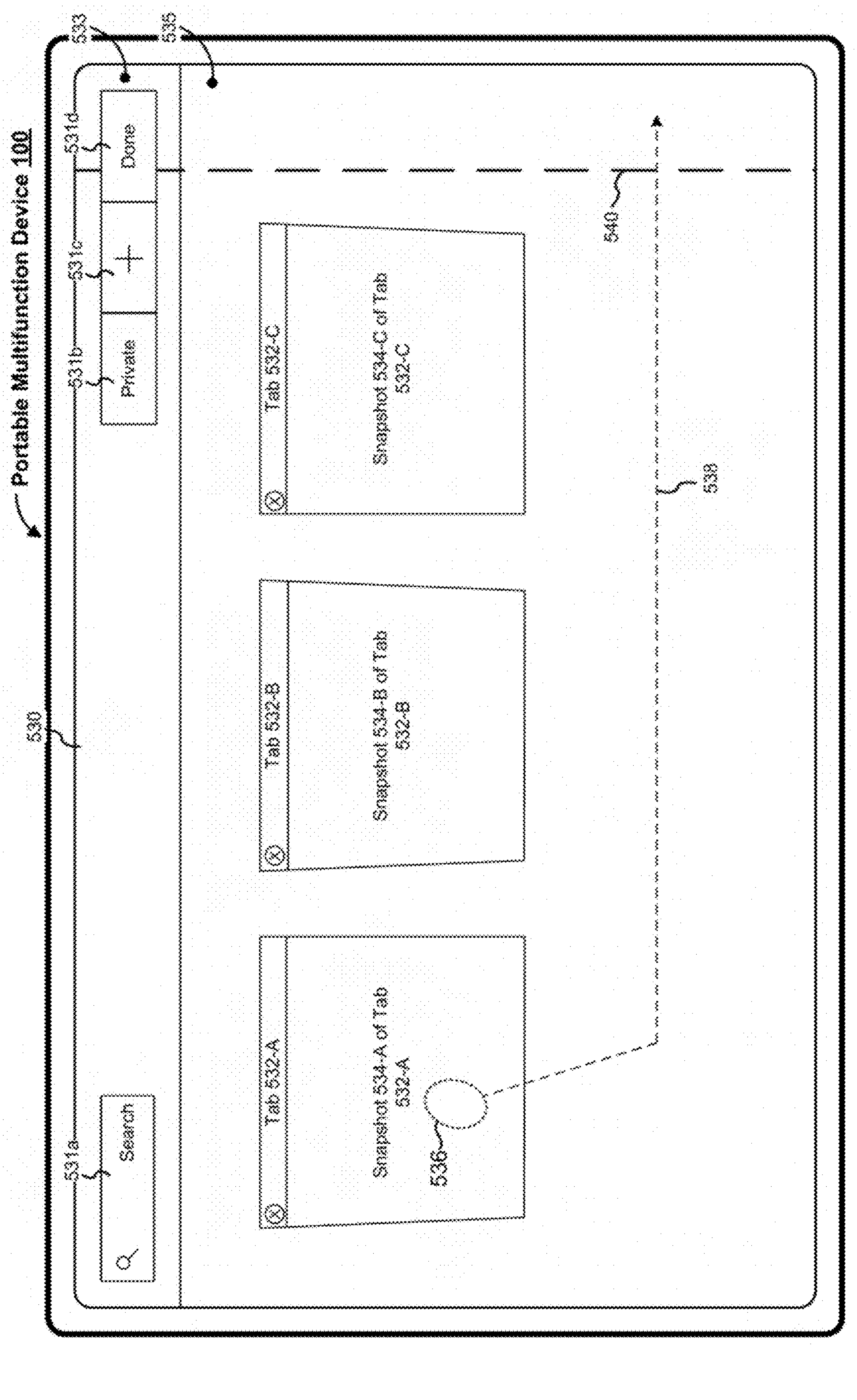

FIGS. 5E-5I illustrate another sequence in which the user interface transitions from full screen mode to split screen mode in response to dragging a tab to a predefined region of the user interface. FIG. 5E illustrates a window 530 in a full screen mode with a first region 533 and a second region 535. For example, the window 530 is associated with a web browser application. FIG. 5E shows the window 530 displayed within a display area of the portable multifunction device 100 (e.g., associated with a touch screen) in a tab view.

In some embodiments, the window 530 is associated with an instance of a web browser application, an email application, a messaging application, a document viewing application, a document processing application, or the like. In some embodiments, the tabs 532-A, 532-B, and 532-C in the second region 535 of the window 530 are associated with electronic documents such as web pages, text files, electronic mail messages, an SMSs, or the like.

In FIG. 5E, the second region 535 includes a plurality of tabs 532-A, 532-B, and 532-C with corresponding snapshots 534-A, 534-B, and 534-C of the content of the respective tabs. The first region 533 includes: a search box 531*a* for searching for a text string amongst the tabs 532-A, 532-B, and 532-C; a private affordance 531*b*, which, when activated (e.g., with a contact), causes the window 530 to enter a private browsing mode where the search and browsing history will not be tracked; an addition affordance 531*c*, which, when activated (e.g., with a contact), causes display of a menu (e.g., the addition menu 558 in FIG. 5K); and a done affordance 531-*d*, which, when activated (e.g., with a contact), causes the window 530 to transition from tab view to browser view (e.g., the window 502 in FIG. 5A). FIG. 5E also illustrates a dragging gesture with a contact 536, where the tab 532-A is dragged according to movement vector 538 over a threshold line 540.

Figure 5F:
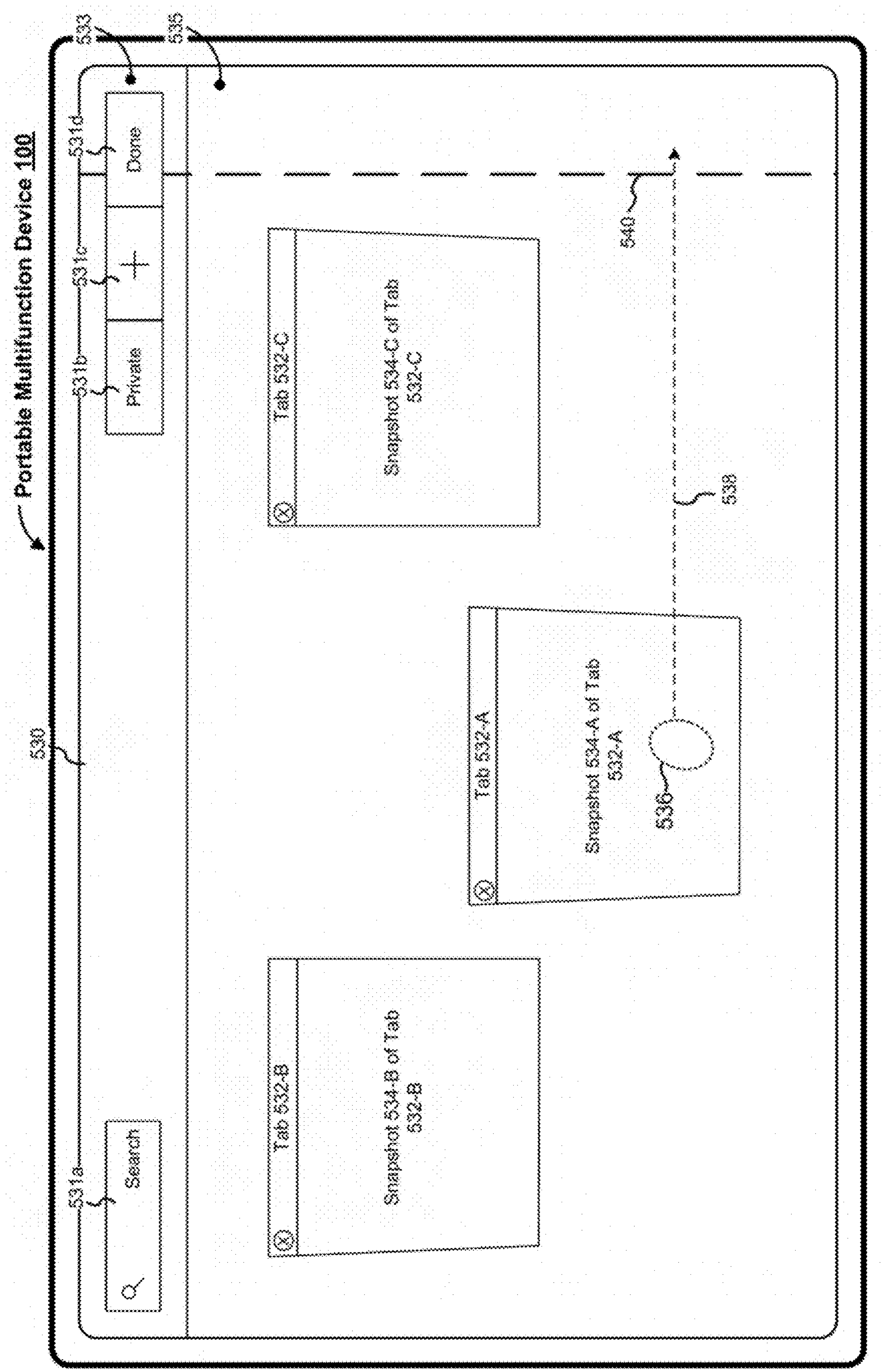
Figure 5G:
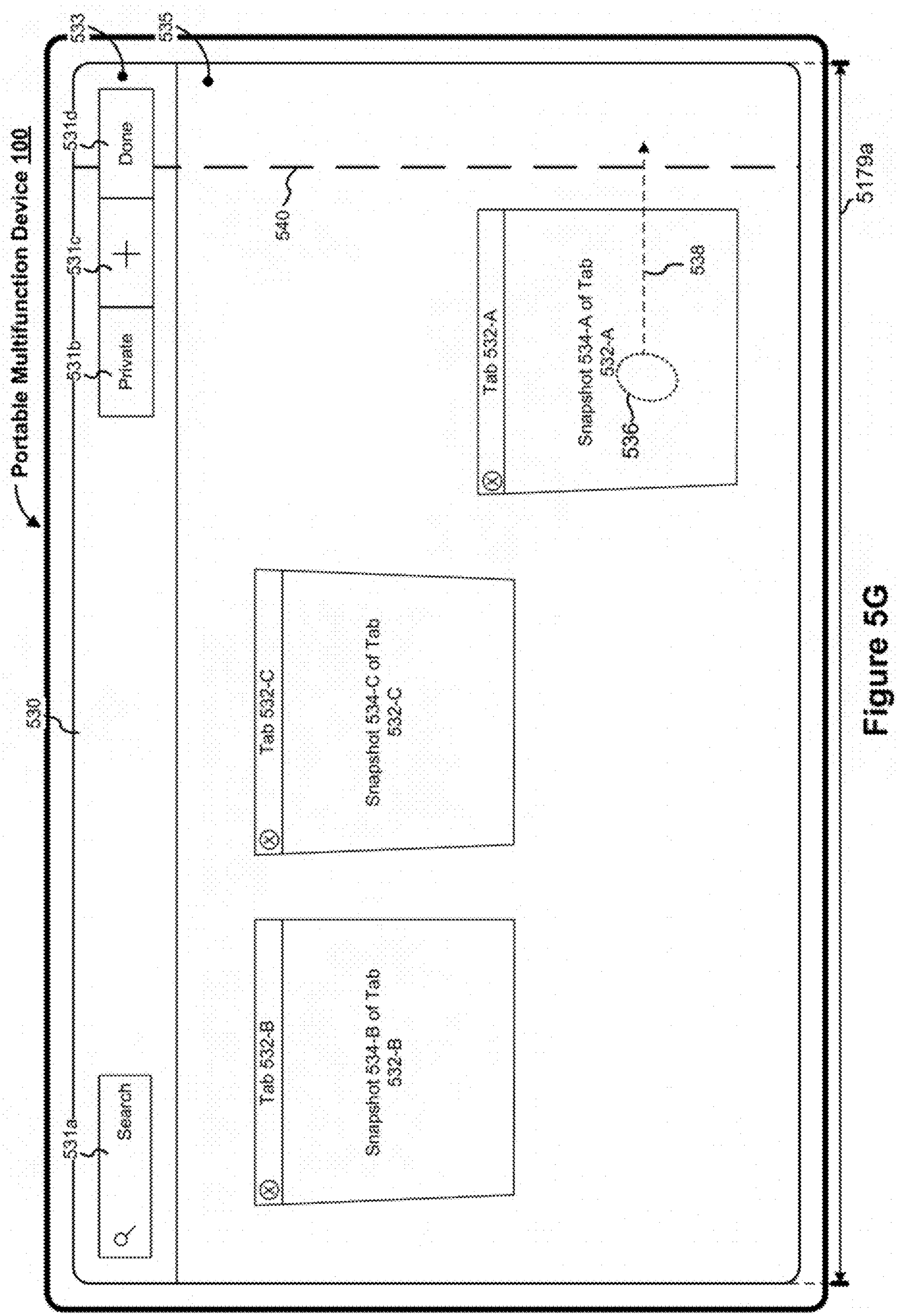
Figure 5H:
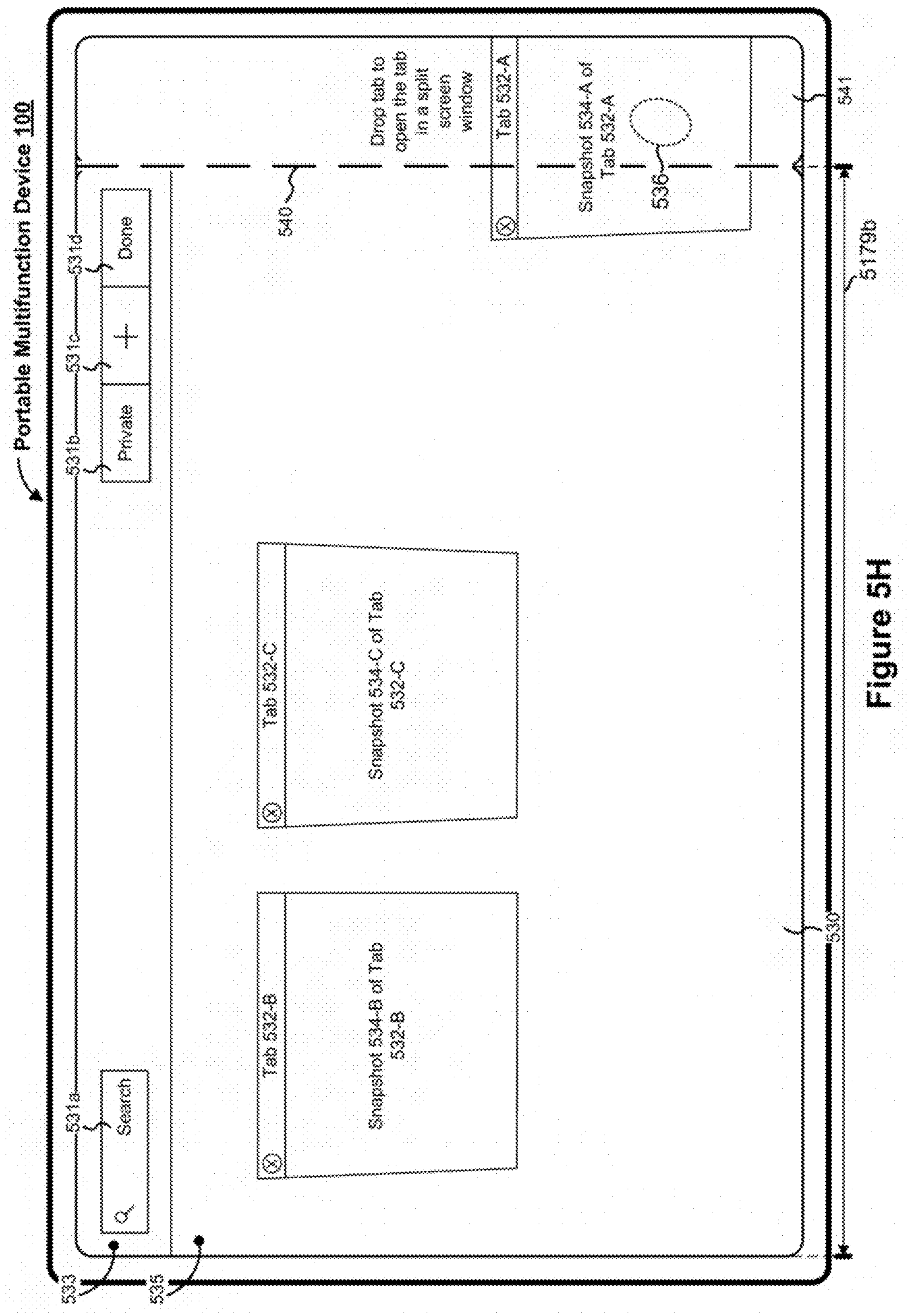

FIGS. 5F-5G show movement of the tab 532-A according to the dragging gesture. FIG. 5H illustrates a drop zone 541 between the right edge of the display area and the threshold line 540 in response to the tab 532-A breaching the threshold line 540 due to the dragging gesture. For example, a transition between full screen and split screen modes is triggered by dropping a tab in the drop zone 541. For example, the window 530 is displayed at a reduced size in FIG. 5H as compared to FIGS. 5E-5G. The value of a respective dimension (e.g., the width) of the window 530 is 5179*b* in FIG. 5H as compared to 5179*a* in FIG. 5G, where 5179*a* is greater than 5179*b*.

Figure 5I:
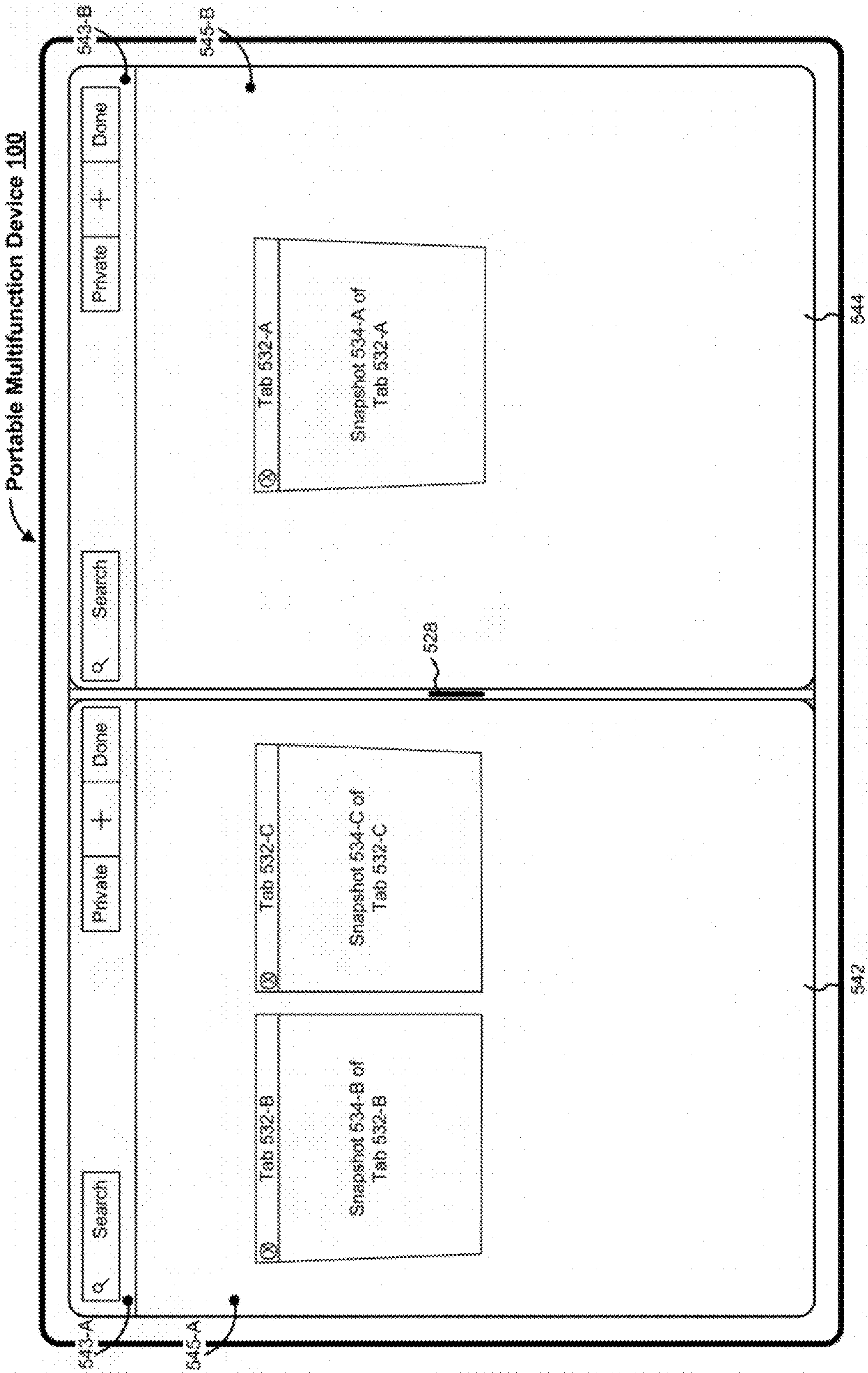

FIG. 5I illustrates a first window 542 and a second window 544 in a split screen mode in response to dropping the tab 532-A in the drop zone 541 in FIG. 5H. For example, the first window 542 and the second window 544 are associated with different instances of the web browser application. FIG. 5I shows the first window 542 and the second window 544 in the tab view.

In some embodiments, the first window 542 is associated with an instance of a web browser application, an email application, a messaging application, a document viewing application, a document processing application, or the like. In some embodiments, the tabs 532-B and 532-C in the second region 545-A of the first window 542 are associated with electronic documents such as web pages, text files, electronic mail messages, an SMSs, or the like. In some embodiments, the second window 544 is associated with an instance of a web browser application, an email application, a messaging application, a document viewing application, a document processing application, or the like. In some embodiments, the tab 532-A in the second region 545-B of the second window 544 are associated with electronic documents such as web pages, text files, electronic mail messages, an SMSs, or the like.

In FIG. 5I, the first window 542 includes a first region 543-A (e.g., with affordances similar to those in the first region 533 in FIGS. 5E-5H) and a second region 545-A. The second region 545-A includes tabs 532-B and 532-C with corresponding snapshots 534-B and 534-C of the content of the respective tabs. For example, the first region 543-A includes affordances similar to those in the first region 533 in FIGS. 5E-5H.

Similarly, in FIG. 5I, the second window 544 includes a first region 543-B and a second region 545-B. The second region 545-B includes the tab 532-A with a snapshot 534-A of the content of the tab 532-A. For example, the first region 543-A includes affordances similar to those in the first region 533 in FIGS. 5E-5H. FIG. 5I also illustrates a divider 528 between the first window 542 and the second window 544. For example, the user of the portable multifunction device 100 is able to resize the first window 542 and the second window 544 by dragging the divider 528.

Figure 5J:
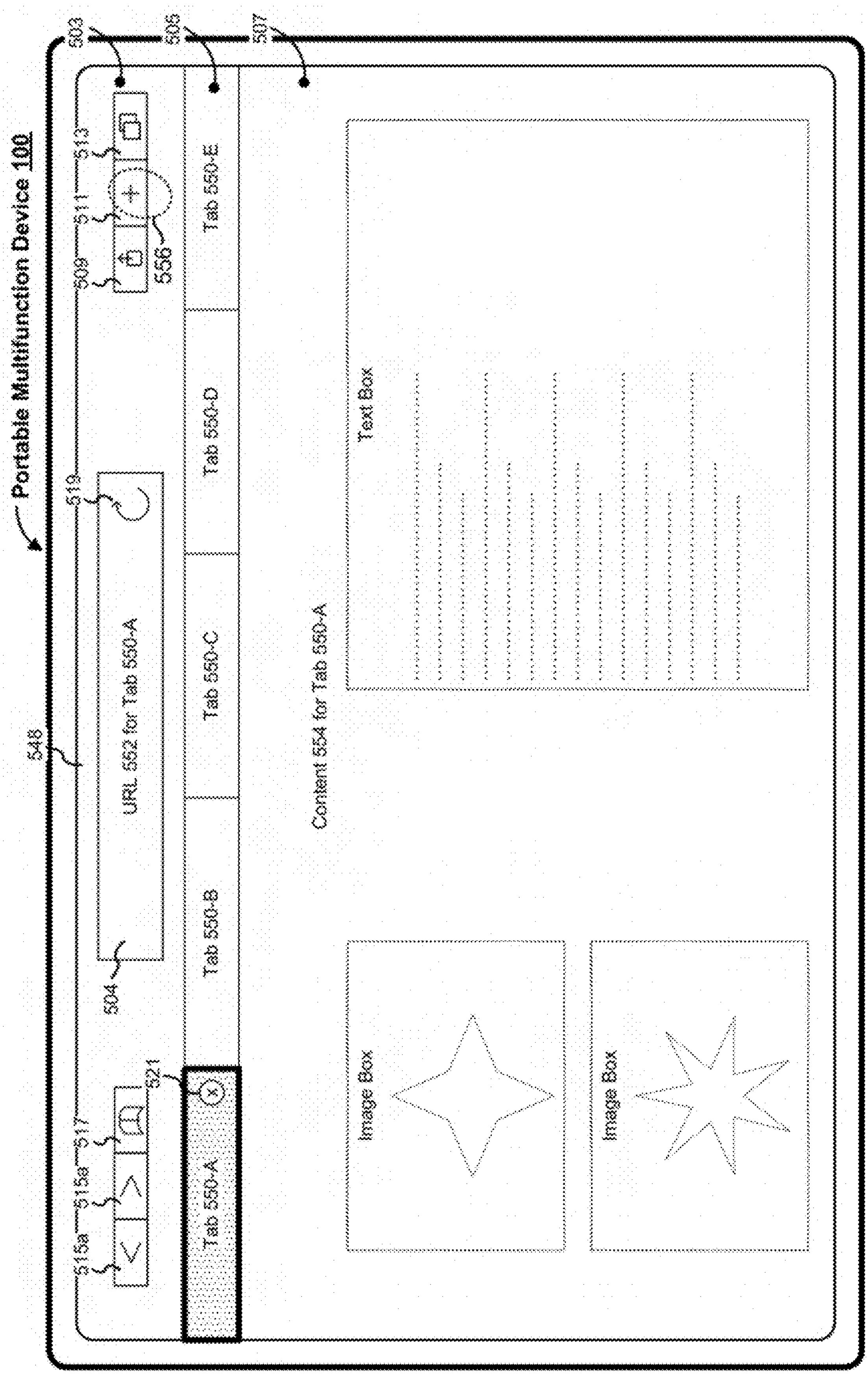
Figure 5K:
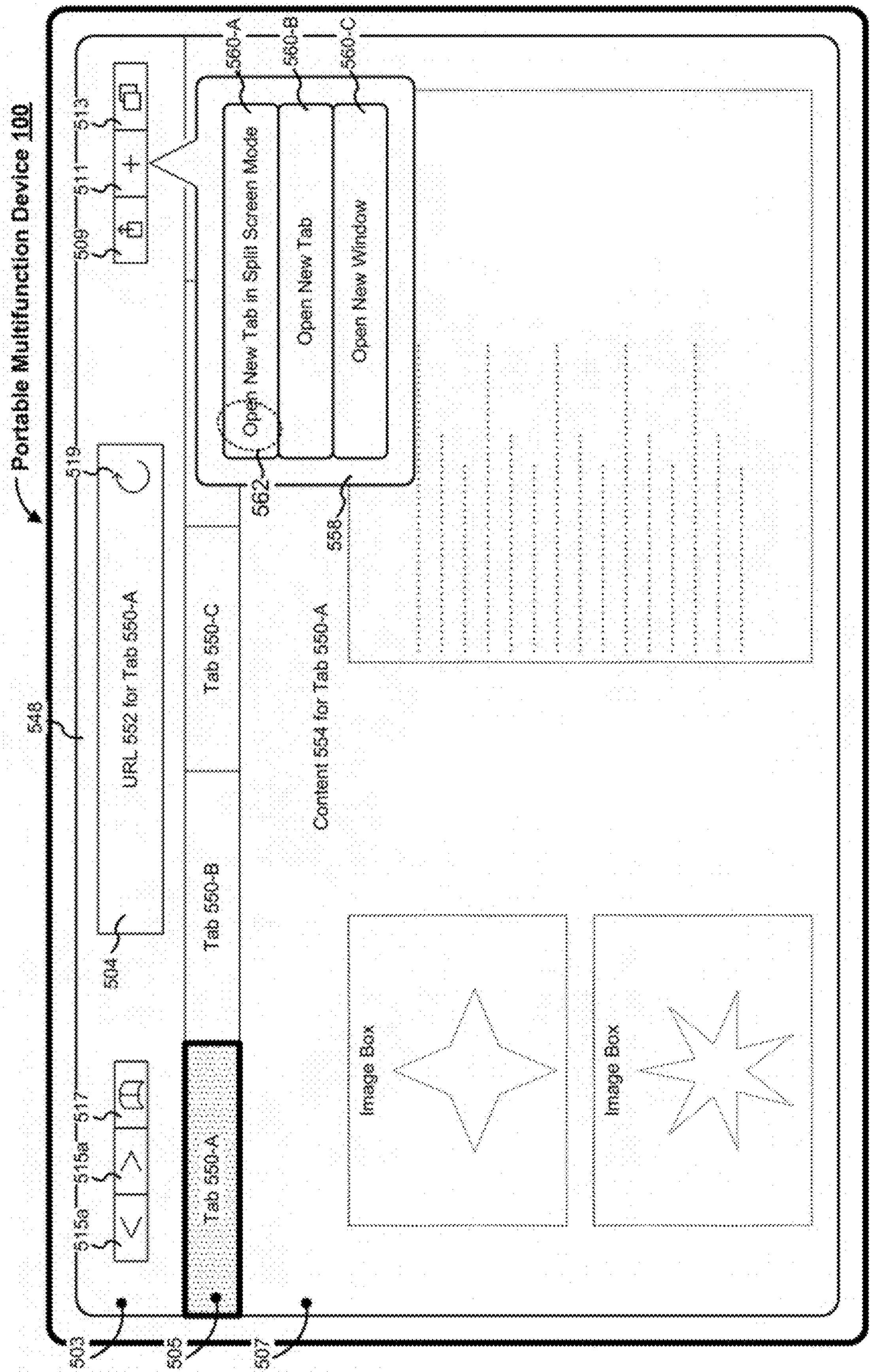
Figure 5L:
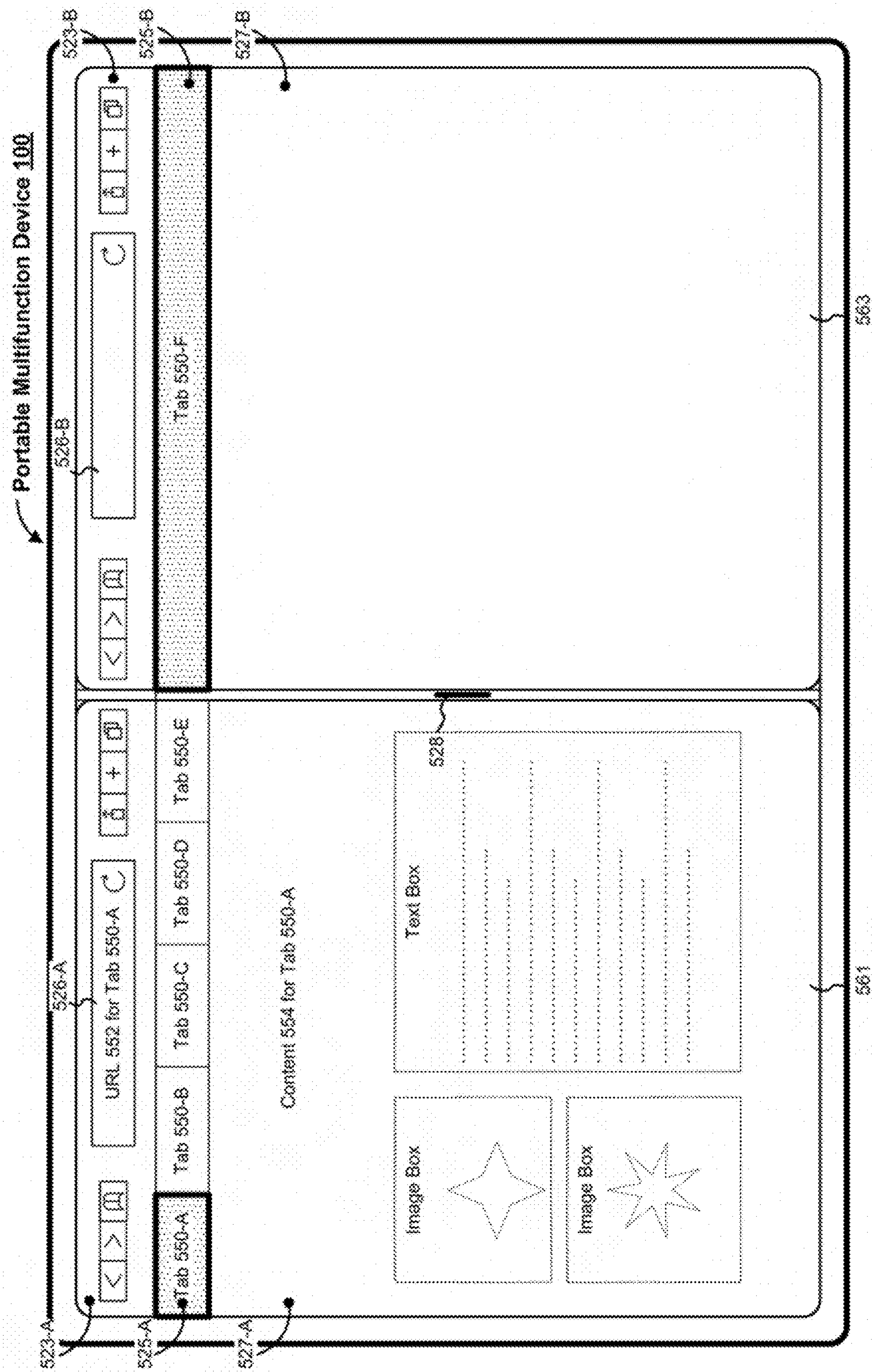

FIGS. 5J-5L illustrate a sequence in which the user interface transitions from full screen mode to split screen mode in response to selection of an open new tab in split screen affordance. FIG. 5J illustrates a window 548 in a full screen mode. For example, the window 548 is associated with an instance of a web browser application. FIG. 5J shows the window 548 displayed within a display area of the portable multifunction device 100 (e.g., associated with a touch screen) in a browser view. FIG. 5J is similar to and adapted from FIG. 5A. As such, FIGS. 5A and 5J include similar user interfaces and elements labeled with the same reference number in both figures have the same function, only the differences are described herein for the sake of brevity.

In some embodiments, the window 548 is associated with an instance of a web browser application, an email application, a messaging application, a document viewing application, a document processing application, or the like. In some embodiments, the content 554 displayed in the window 548 is associated with an electronic document such as a web page, a text file, an electronic mail message, an SMS, or the like.

In FIG. 5J, the tab bar 505 includes a plurality of tabs 550-A, 550-B, 550-C, 550-D, and 550-E. In FIG. 5J, the address bar 504 includes the URL 552 for the web page associated with the tab 550-A, and the content region 507 includes content 554 for the web page associated with the tab 550-A. As such, in FIG. 5J, the tab 550-A is active or in the foreground. FIG. 5J also illustrates a contact 556 detected at a location corresponding to the addition affordance 511.

FIG. 5K illustrates an addition menu 558 overlaid on the window 548 in response to selection of the addition affordance 511 in FIG. 5J. The addition menu 558 includes: a first affordance 560-A (e.g., the split screen affordance), which, when activated (e.g., with a contact), causes transition of the user interface from full screen to split screen mode with the foreground tab (e.g., the tab 550-A) in a separate window; a second affordance 560-B, which, when activated (e.g., with a contact), causes the foreground tab (e.g., the tab 550-A) to be become a background tab and a new tab to displayed as a foreground tab within the current full screen window; and a third affordance 560-C, which, when activated (e.g., with a contact), causes a separate full screen window to be displayed. For example, a transition between full screen and split screen modes is triggered by selection of the first affordance 560-A. FIG. 5K also illustrates a contact 562 detected at a location corresponding to the first affordance 560-A.

FIG. 5L illustrates a first window 561 and a second window 563 in a split screen mode in response to selection of the first affordance 560-A in FIG. 5K. For example, the first window 561 and the second window 563 are associated with different instances of the web browser application. FIG. 5L shows the first window 561 and the second window 563 in the browser view.

In some embodiments, the first window 561 is associated with an instance of a web browser application, an email application, a messaging application, a document viewing application, a document processing application, or the like. In some embodiments, the first content 554 displayed in the first window 561 is associated with an electronic document such as a web page, a text file, an electronic mail message, an SMS, or the like. In some embodiments, the second window 563 is associated with an instance of a web browser application, an email application, a messaging application, a document viewing application, a document processing application, or the like.

In FIG. 5L, the first window 561 includes a chrome region 523-A, a tab bar 525-A, and a content region 527-A. The tab bar 525-A includes tabs 550-A, 550-B, 550-C, 550-D, and 550-E. In FIG. 5L, the address bar 526-A includes the URL 552 for the web page associated with the tab 550-A, and the content region 527-A includes content 554 for the tab 550-A. As such, in FIG. 5L, the tab 550-A is active or in the foreground in the first window 561. FIG. 5L also illustrates a divider 528 between the first window 561 and the second window 563. For example, the user of the device 100 is able to resize the first window 561 and the second window 563 by dragging the divider 528.

In FIG. 5L, the second window 564 includes a chrome region 523-B, a tab bar 525-B, and a content region 527-B. The tab bar 525-B does not include a URL, and the content region 527-B does not include content. As such, the tab 550-F is a new tab that is not associated with a web page.

Figure 5M:
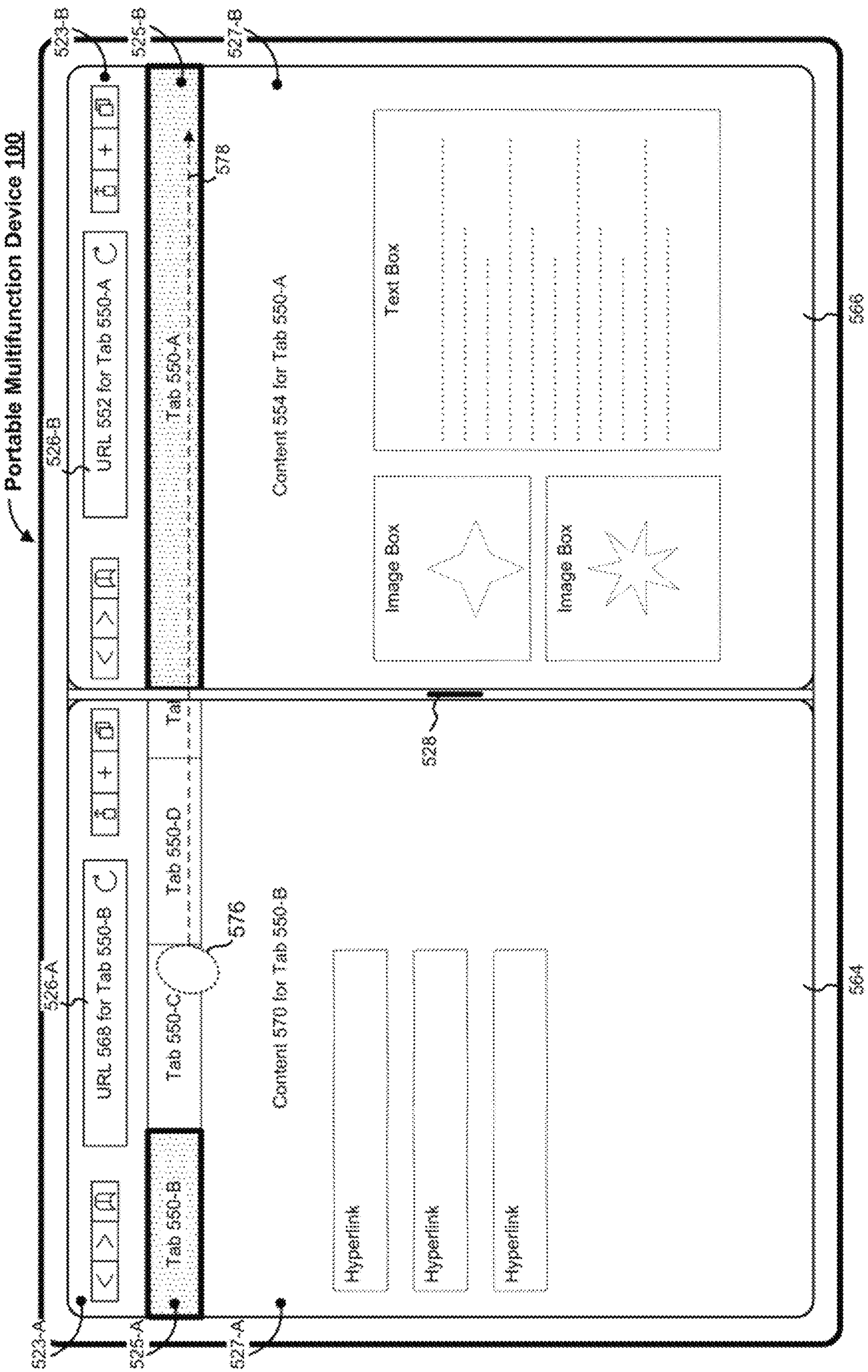

FIGS. 5M-5P illustrate a sequence in which a tab is dragged between windows of the user interface in the split screen mode. FIG. 5M illustrates a first window 564 and a second window 566 in a split screen mode. For example, the first window 564 and the second window 566 are associated with different instances of the web browser application. FIG. 5M shows the first window 564 and the second window 566 in the browser view. FIG. 5M also illustrates a dragging gesture with a contact 576, where the tab 550-C is dragged according to movement vector 578 from the tab bar 525-A associated with the first window 564 to the tab bar 525-B associated with the second window 566.

In some embodiments, the first window 564 is associated with an instance of a web browser application, an email application, a messaging application, a document viewing application, a document processing application, or the like. In some embodiments, the first content 570 displayed in the first window 564 is associated with an electronic document such as a web page, a text file, an electronic mail message, an SMS, or the like. In some embodiments, the second window 566 is associated with an instance of a web browser application, an email application, a messaging application, a document viewing application, a document processing application, or the like. In some embodiments, the second content 554 displayed in the second window 566 is associated with an electronic document such as a web page, a text file, an electronic mail message, an SMS, or the like.

In FIG. 5M, the first window 564 includes a chrome region 523-A, a tab bar 525-A, and a content region 527-A. The tab bar 525-A includes tabs 550-B, 550-C, 550-D, and 550-E (occluded). In FIG. 5M, the address bar 526-A includes the URL 568 for the web page associated with the tab 550-B, and the content region 527-A includes the content 570 for the web page associated with the tab 550-B. As such, in FIG. 5M, the tab 550-B is active or in the foreground in the first window 564.

In FIG. 5M, the second window 564 includes a chrome region 523-B, a tab bar 525-B, and a content region 527-B. The tab bar 525-B includes the tab 550-A. In FIG. 5M, the address bar 526-B includes the URL 552 for the web page associated with the tab 550-A, and the content region 527-B includes the content 554 for the web page associated with the tab 560-A. As such, in FIG. 5M, the tab 550-A is active or in the foreground in the second window 566. FIG. 5M also illustrates a divider 528 between the first window 564 and the second window 566. For example, the user of the device 100 is able to resize the first window 564 and the second window 566 by dragging the divider 528.

Figure 5N:
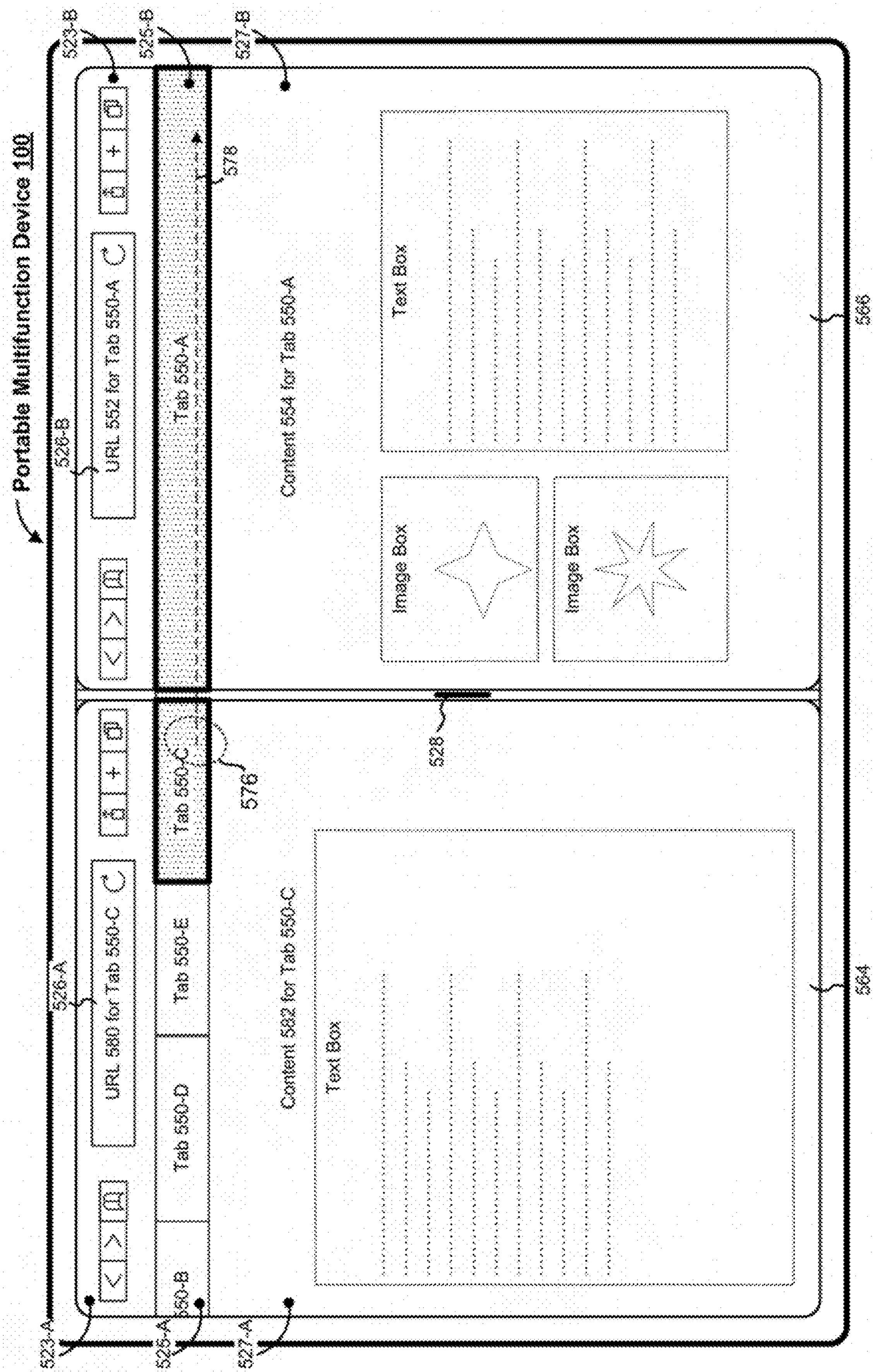

FIGS. 5M-5N illustrate the tab 550-C scrolling through the other tabs in the tab bar 525-A according to the dragging gesture. In FIG. 5N, the address bar 526-A includes the URL 580 for the web page associated with the tab 550-C, and the content region 527-A includes the content 582 for the web page associated with the tab 550-C. As such, in FIG. 5N, the tab 550-C is active or in the foreground in the first window 564.

Figure 5O:
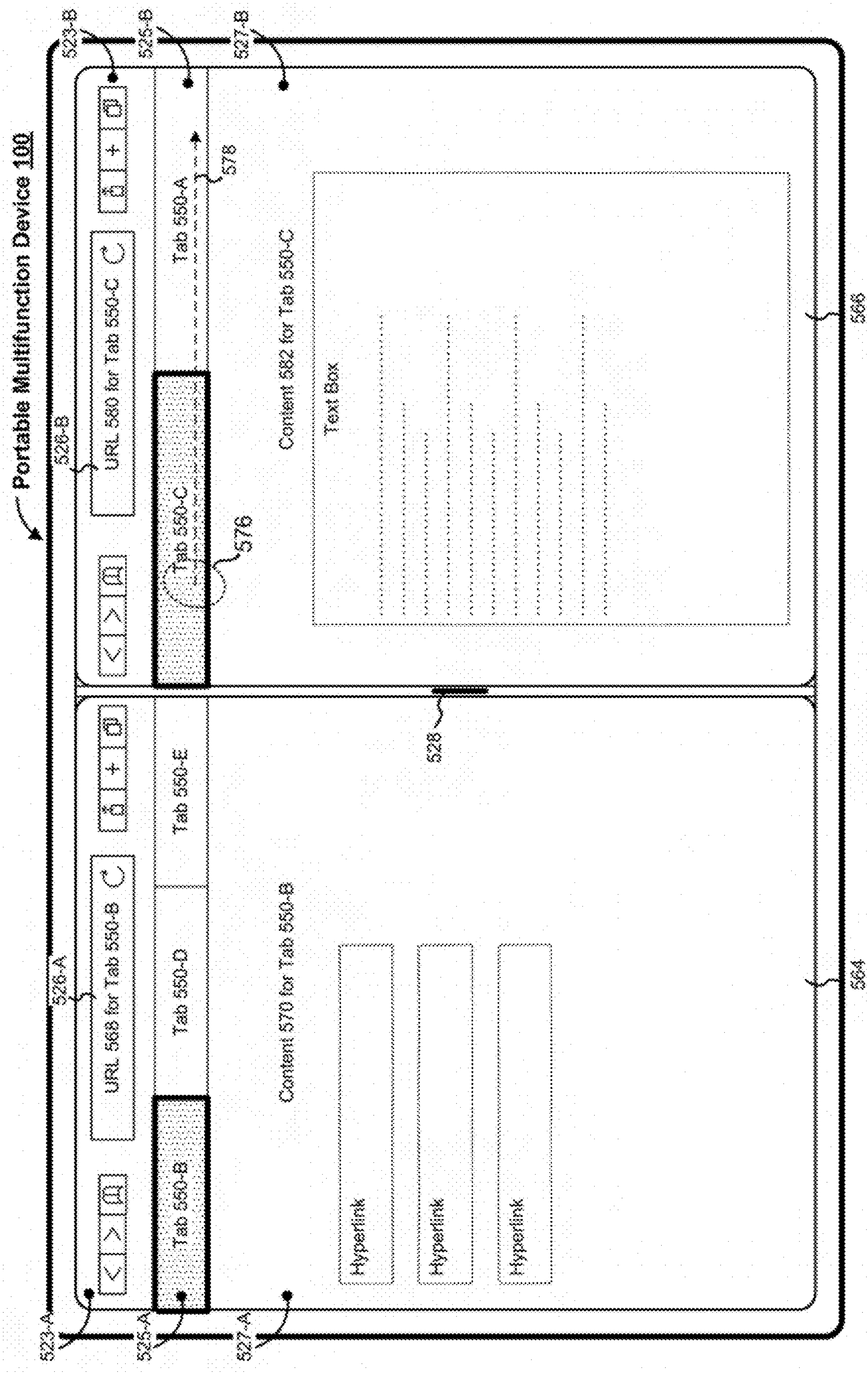
Figure 5P:
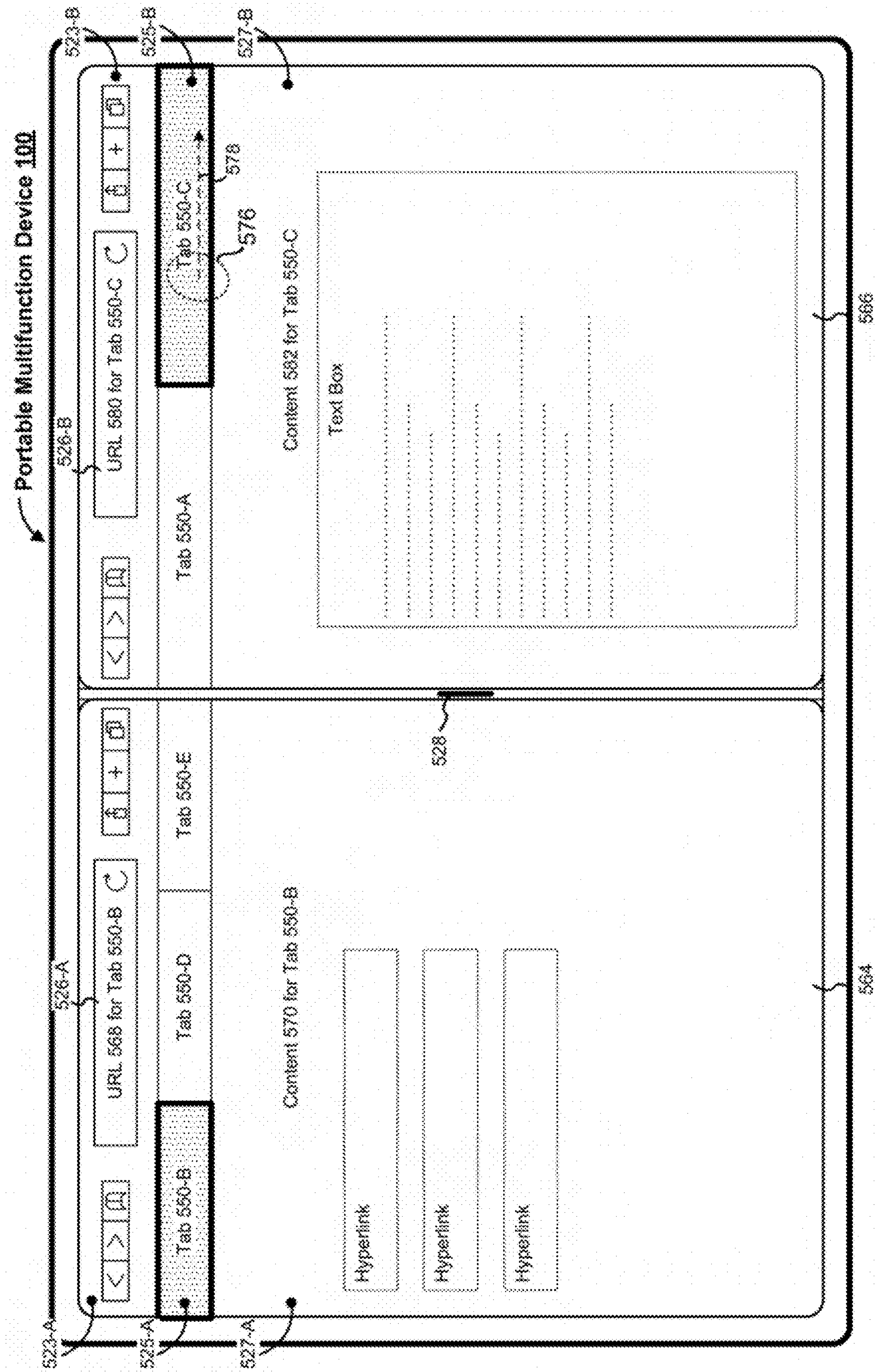
Figure 5Q:
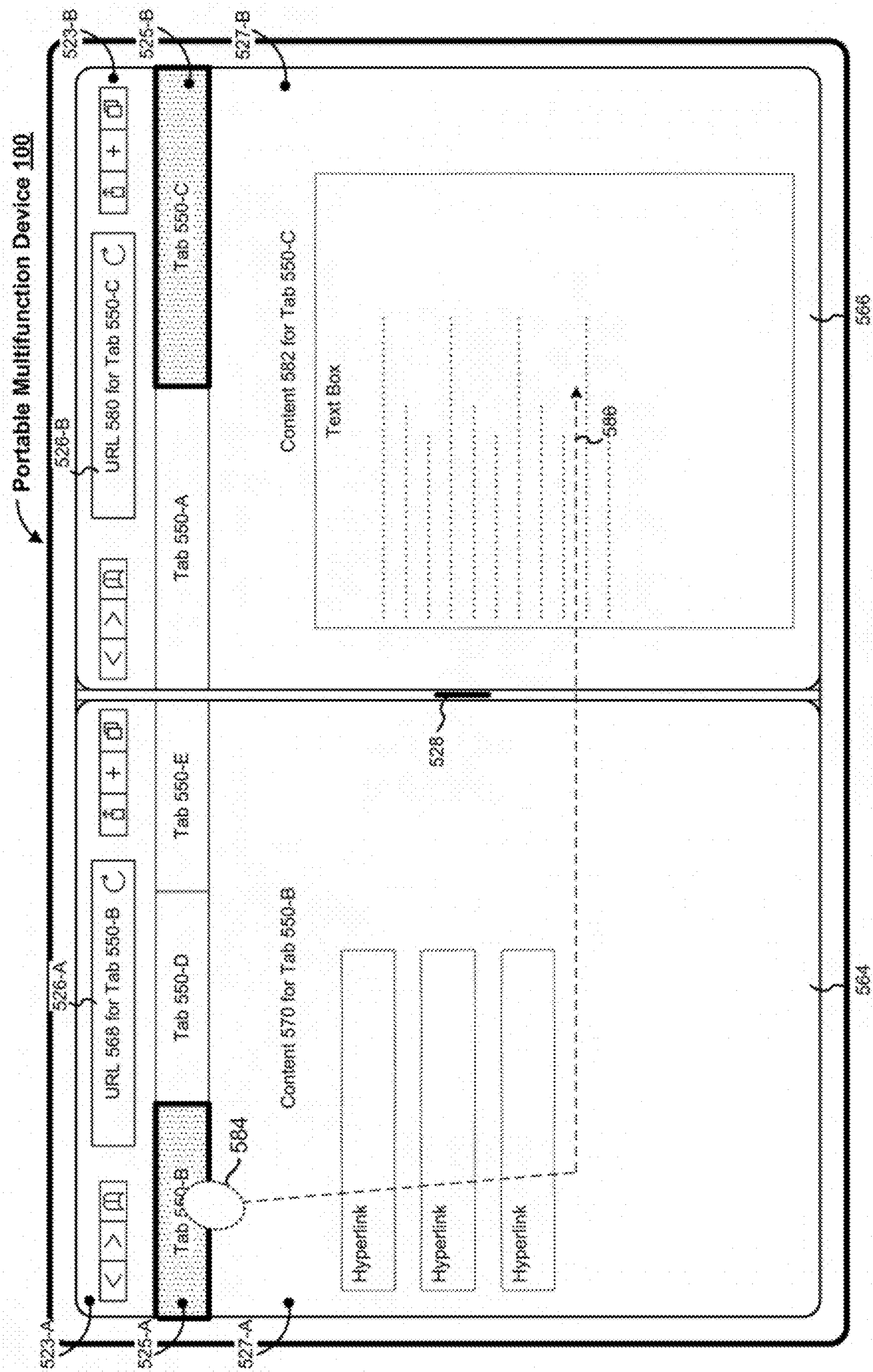

FIGS. 5N-5Q illustrate the tab 550-C transitioning from the tab bar 525-A associated with the first window 564 to the tab bar 525-B associated with the second window 566. FIGS. 5O-5Q illustrate the tab 550-C scrolling through the tab bar 525-B according to the dragging gesture. In FIGS. 5O-5Q, the address bar 526-B includes the URL 580 for the web page associated with the tab 550-C, and the content region 527-B includes the content 582 for the web page associated with the tab 550-C. As such, in FIGS. 5O-5Q, the tab 550-C is active or in the foreground in the second window 566. Furthermore, in FIGS. 5O-5Q, the address bar 526-A includes the URL 568 for the web page associated with the tab 550-B, and the content region 527-A includes the content 570 for the web page associated with the tab 550-B. As such, in FIGS. 5O-5Q, the tab 550-B is active or in the foreground in the first window 564.

Figure 5R:
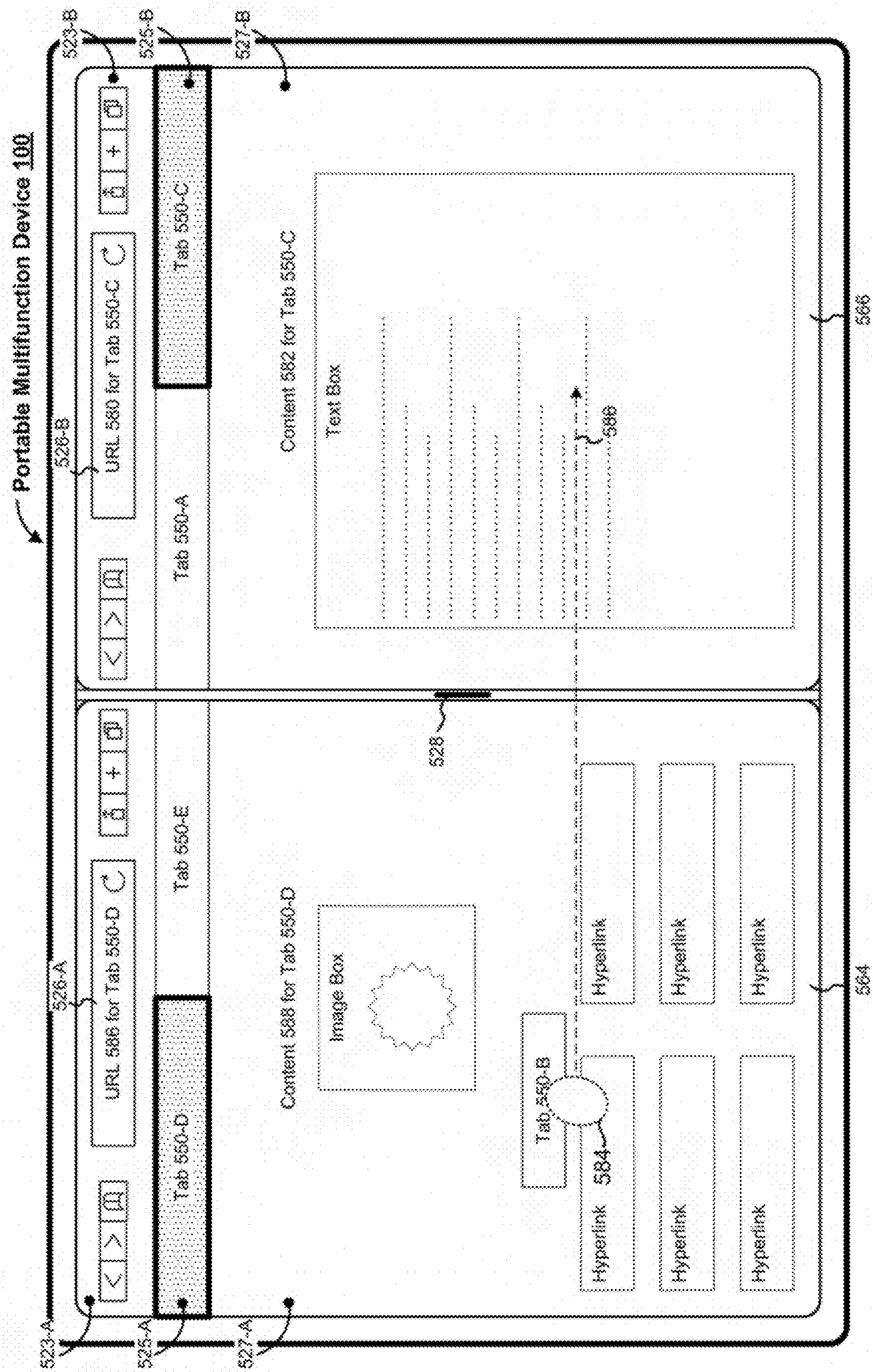

FIGS. 5Q-5T illustrate another sequence in which a tab is dragged between windows of the user interface in the split screen mode. FIG. 5Q illustrates a dragging gesture with a contact 584, where the tab 550-B is dragged according to movement vector 586 from the tab bar 525-A associated with the first window 564 to the content region 527-B associated with the second window 566. FIG. 5R illustrates the tab 550-B detached from the tab bar 525-A in response to the dragging gesture. In FIG. 5R, the address bar 526-A includes the URL 586 for the web page associated with the tab 550-D, and the content region 527-A includes the content 588 for the web page associated with the tab 550-D. As such, in FIG. 5R, the tab 550-D is active or in the foreground in the first window 564.

Figure 5S:
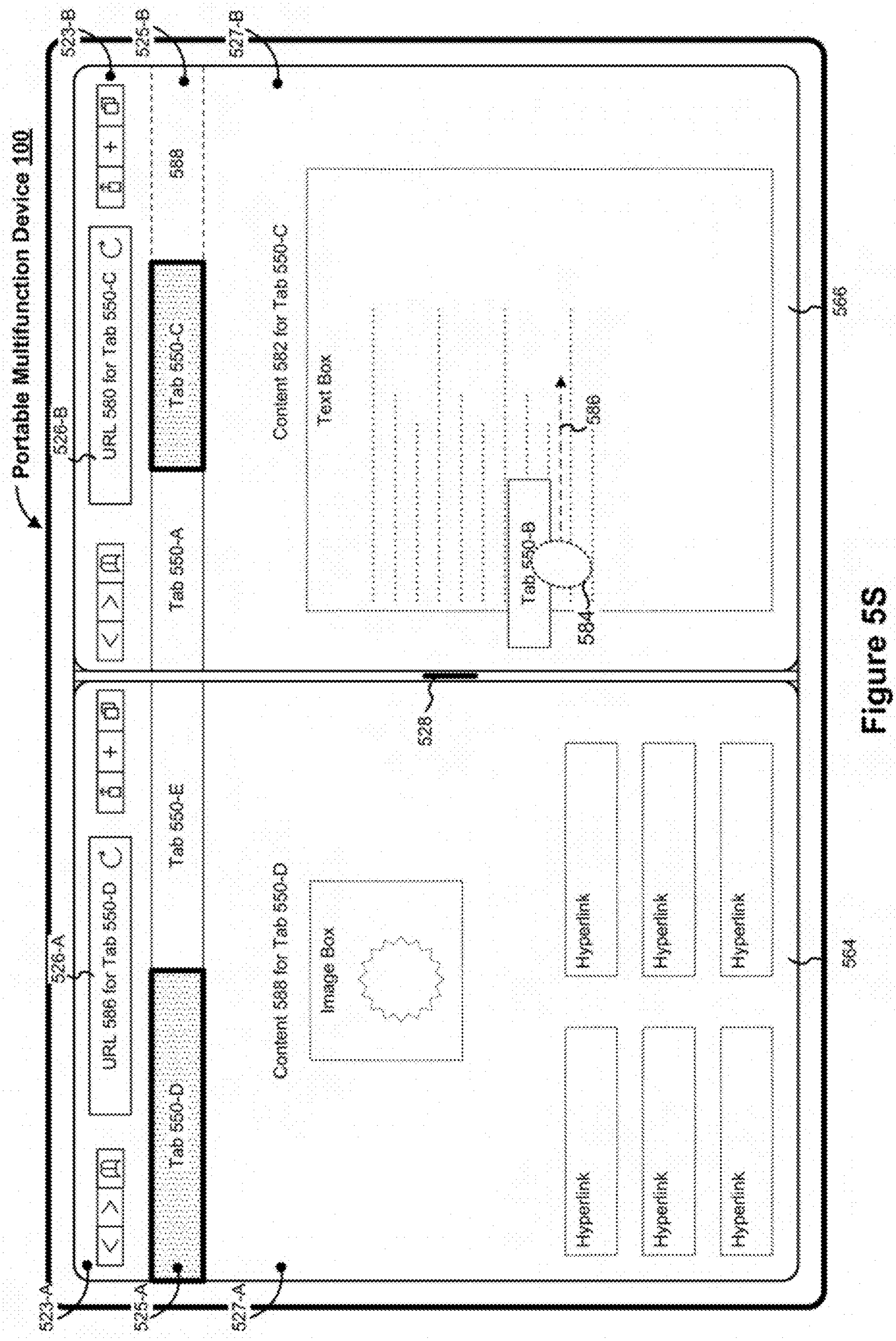
Figure 5T:
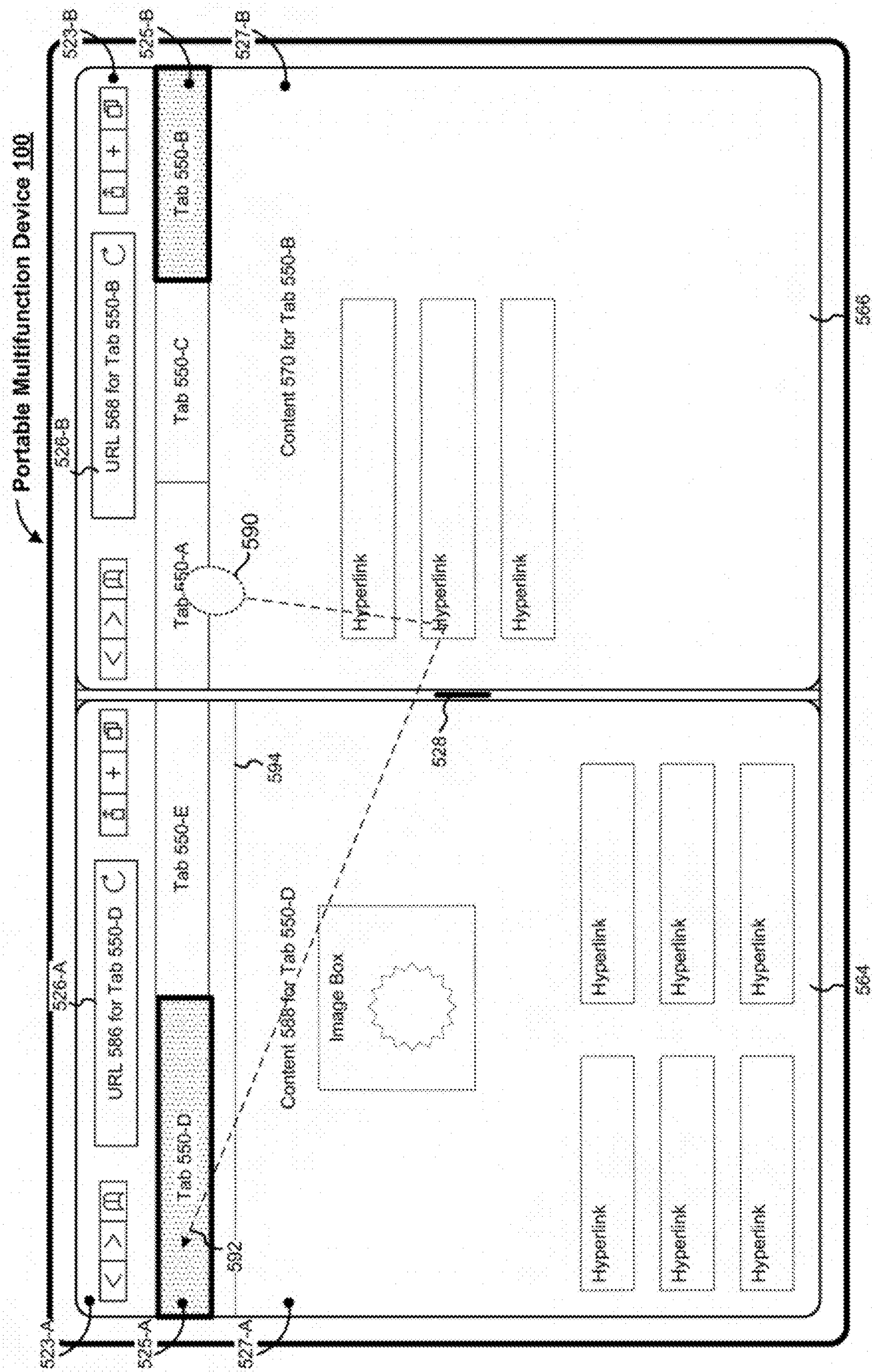

FIG. 5S illustrates a potential location 588 for the tab 550-D in response to the tab 550-D entering the content region 527-B of the second window 564 due to the dragging gesture. FIG. 5T illustrates the tab 550-B in the tab bar 525-B in response to the tab 550-B being dropped in the content region 527-B of the second window 566. FIG. 5T also illustrates that the address bar 526-B includes the URL 538 for the web page associated with the tab 550-B, and the content region 527-B includes the content 570 for the web page associated with the tab 550-B. As such, in FIG. 5T, the tab 550-B is active or in the foreground in the second window 566.

FIGS. 5T-5X illustrate yet another sequence in which a tab is dragged between windows of the user interface in the split screen mode. FIG. 5T further illustrates a dragging gesture with a contact 590, where the tab 550-A is dragged according to movement vector 592 from the tab bar 525-B associated with the second window 566 to the tab bar 525-A associated with the first window 564.

Figure 5U:
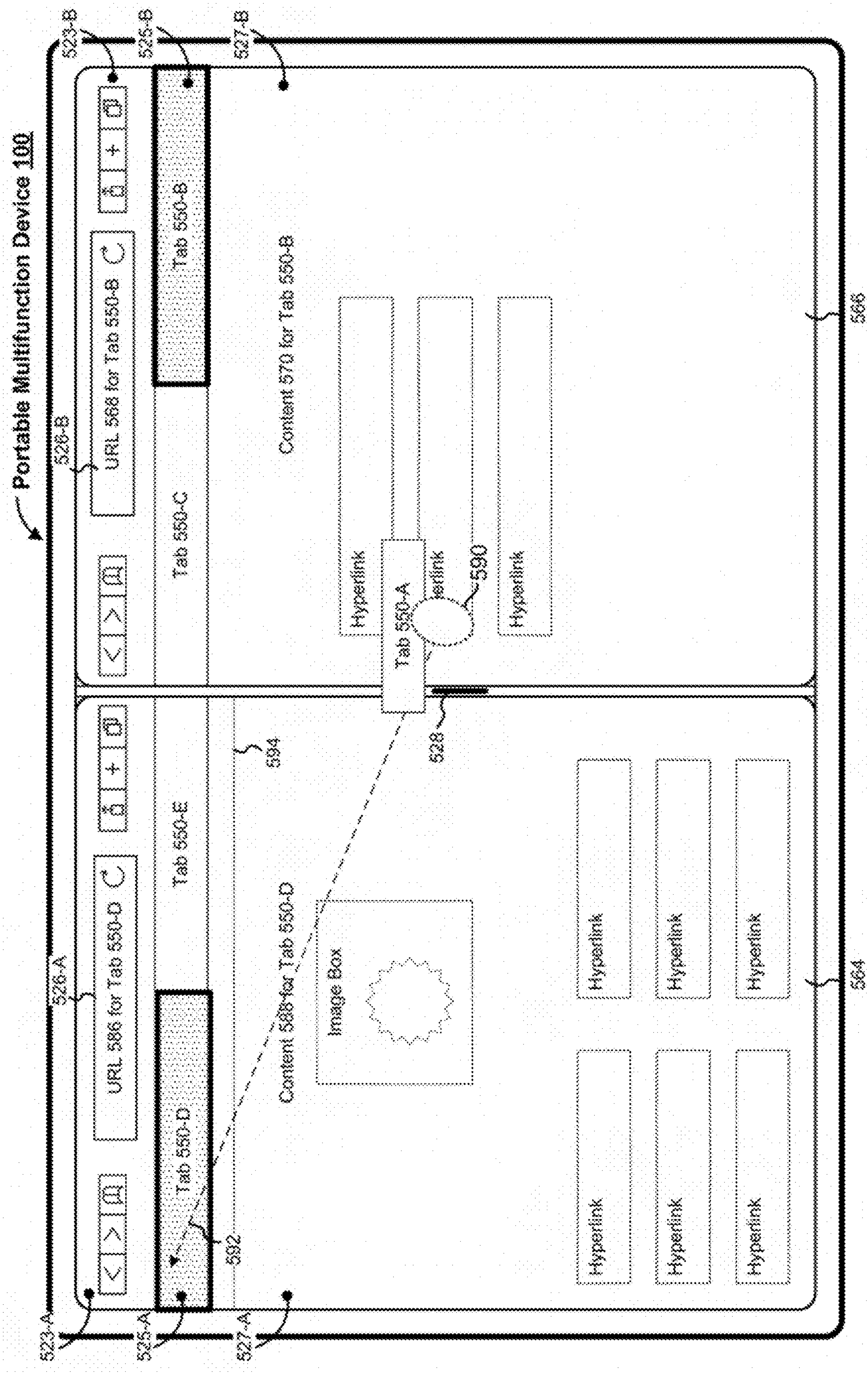
Figure 5V:
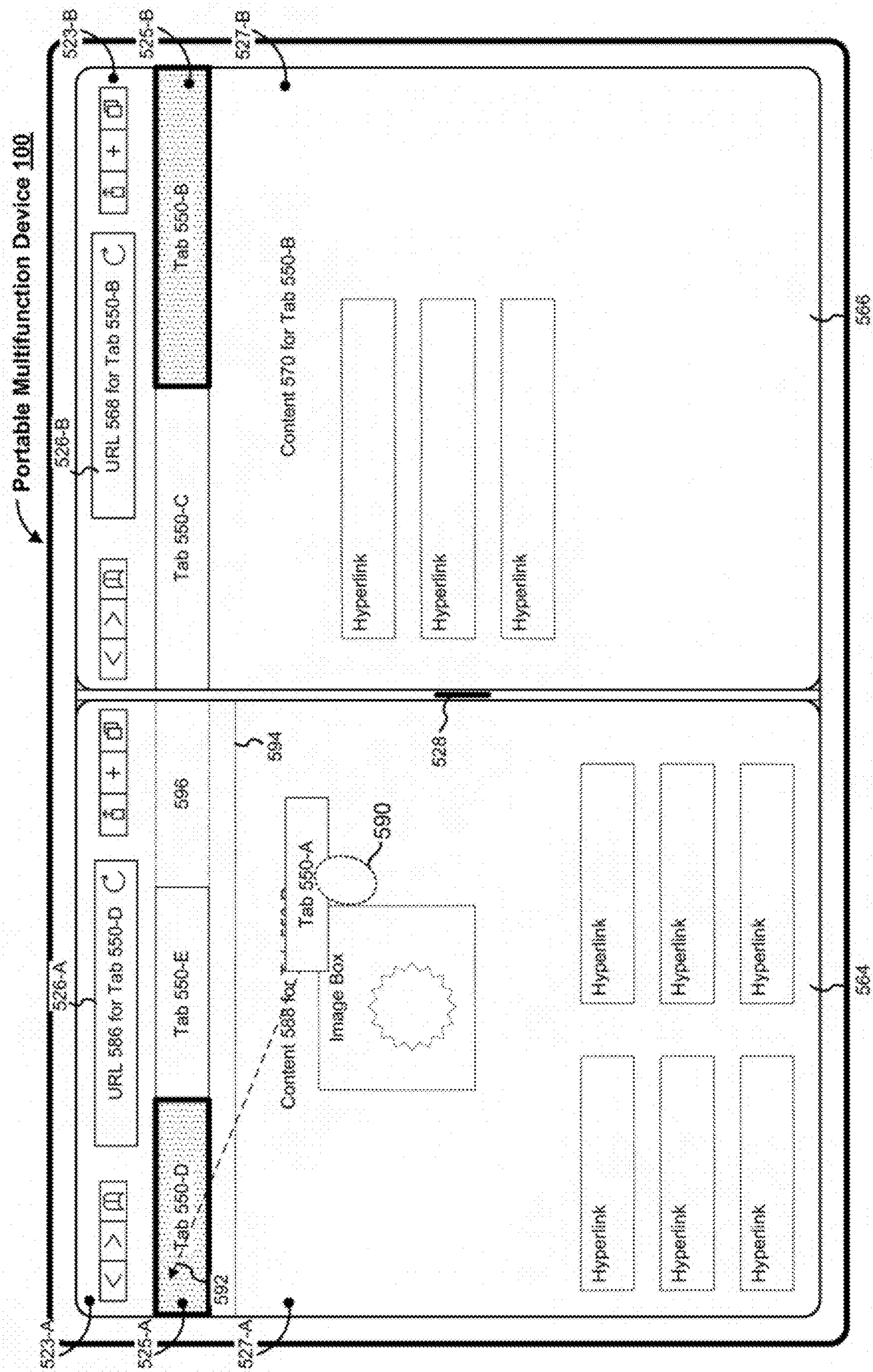
Figure 5W:
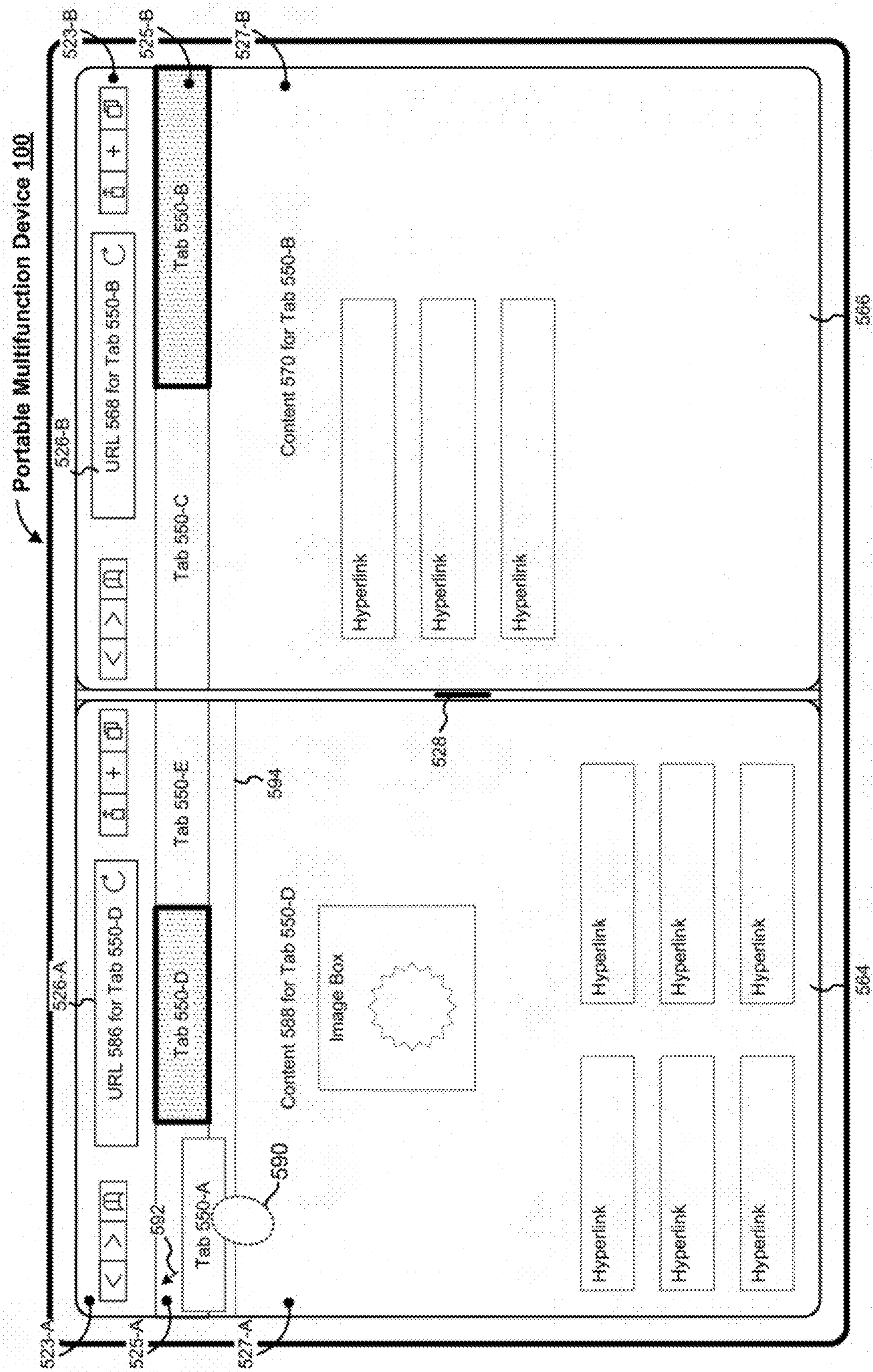

FIG. 5U illustrates the tab 550-A detached from the tab bar 525-B in response to the dragging gesture. FIG. 5V illustrates a potential location 596 for the tab 550-A in response to the tab 550-A entering the content region 527-A of the first window 564 due to the dragging gesture. FIG. 5W illustrates removal of the potential location 596 for the tab 550-A in response to the tab 550-A breaching a buffer threshold 594 for the tab bar 525-A due to the dragging gesture.

Figure 5X:
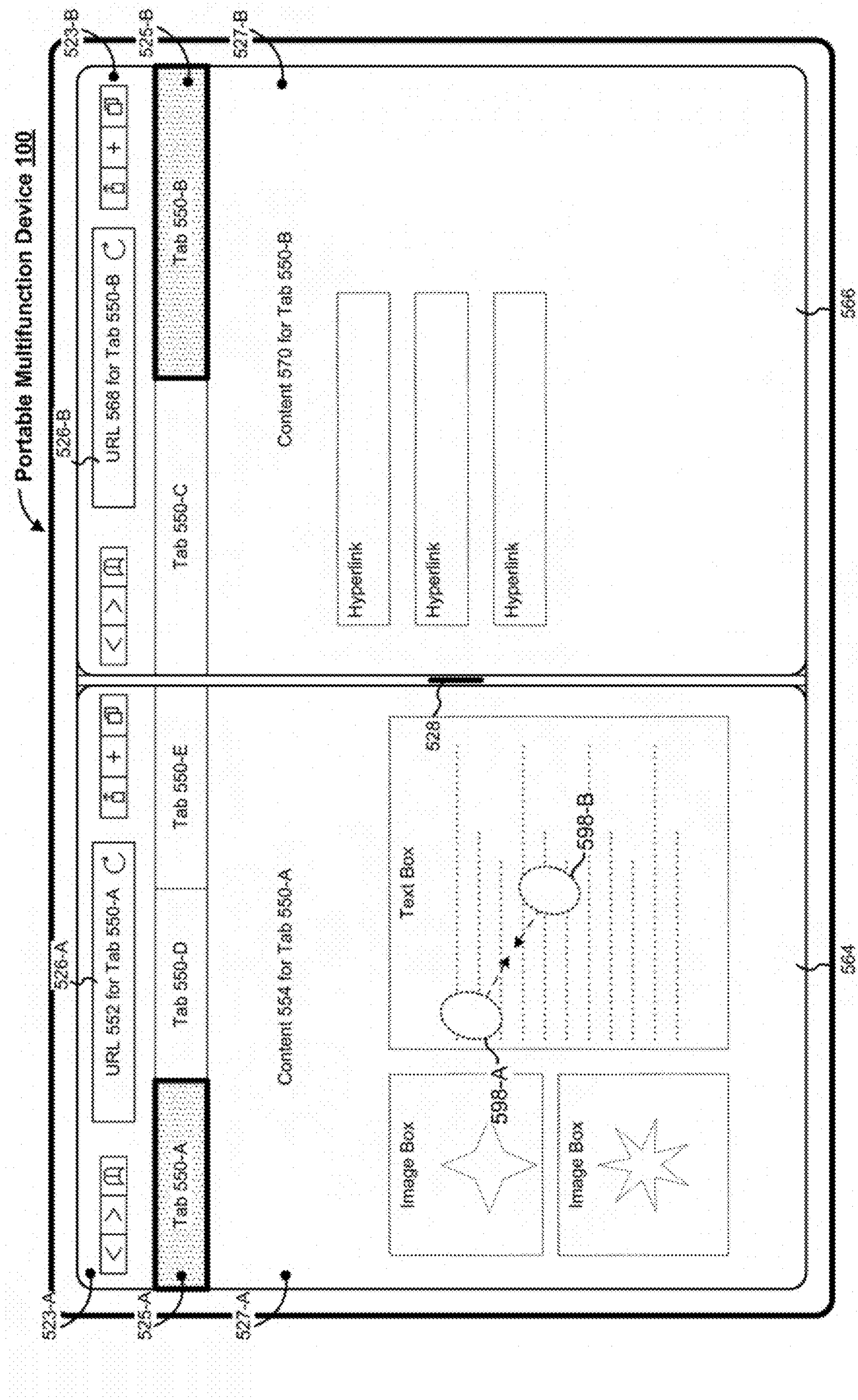

FIG. 5X illustrates the tab 550-A in the tab bar 525-A in response to the tab 550-A being dropped in the tab bar 525-A of the first window 564. FIG. 5X also illustrates that the address bar 526-A includes the URL 552 for the web page associated with the tab 550-A, and the content region 527-A includes the content 554 for the web page associated with the tab 550-A. As such, in FIG. 5X, the tab 550-A is active or in the foreground in the first window 564.

Figure 5Y:
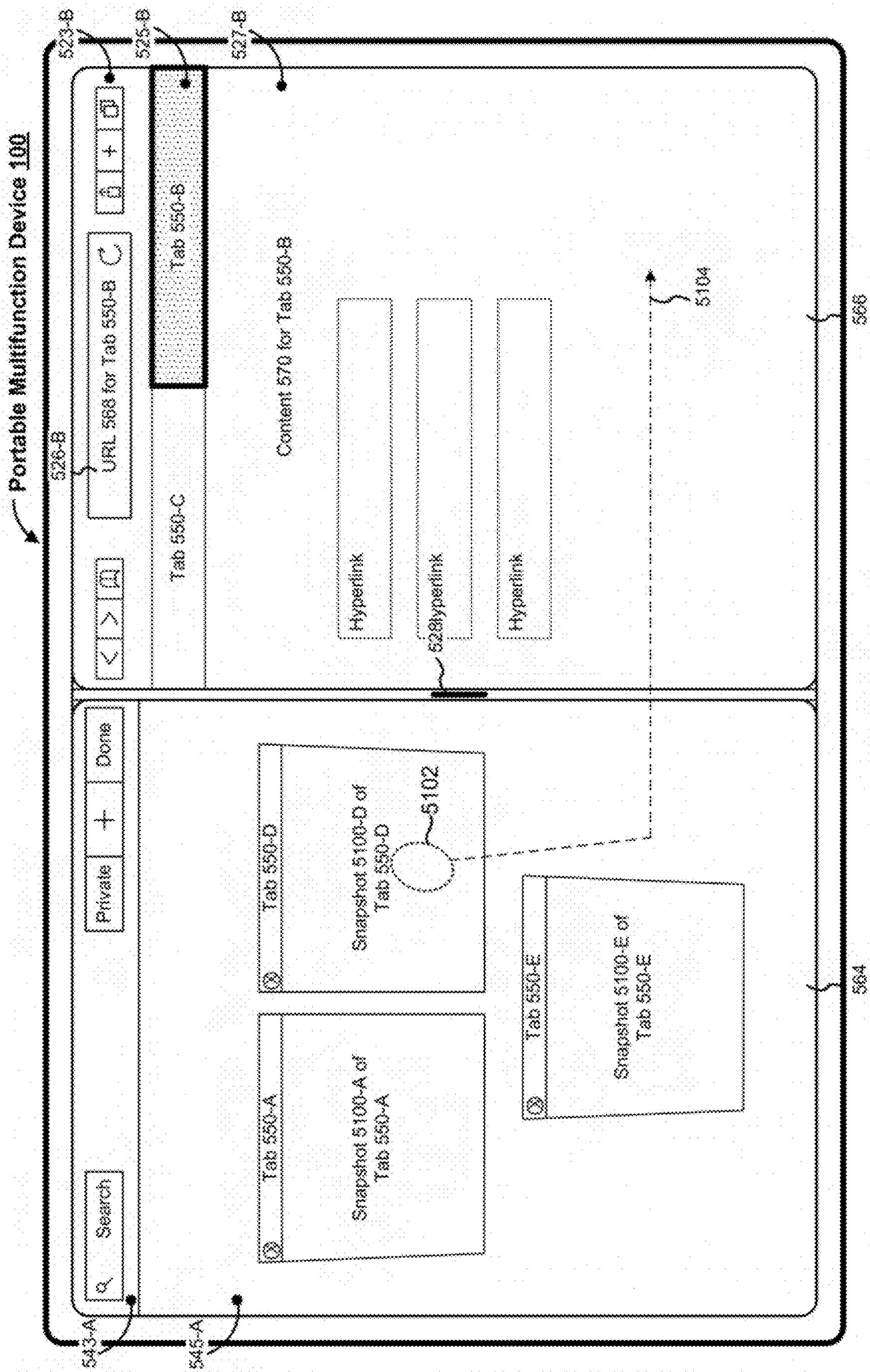

FIGS. 5X-5Y illustrate a sequence in which the first window 564 transitions from a browser view to a tab view. FIG. 5X further illustrates a pinch-in gesture with contacts 598-A and 598-B detected within the content region 527-A of the first window 564. FIG. 5Y illustrates the first window 564 in a tab view in response to the pinch-in gesture in FIG. 5X. In FIG. 5Y, the first window 564 includes a first region 543-A and a second region 545-A. The second region 545-A includes tabs 550-A, 550-D, and 550-E with corresponding snapshots 5100-A, 5100-D, and 5100-E of the content of the respective tabs. For example, a window in split screen mode transitions from browser view to tab view in response to a pinch-in gesture or the like. For example, a window in split screen mode transitions from tab view to browser view in response to a pinch-in gesture or the like.

Figure 5Z:
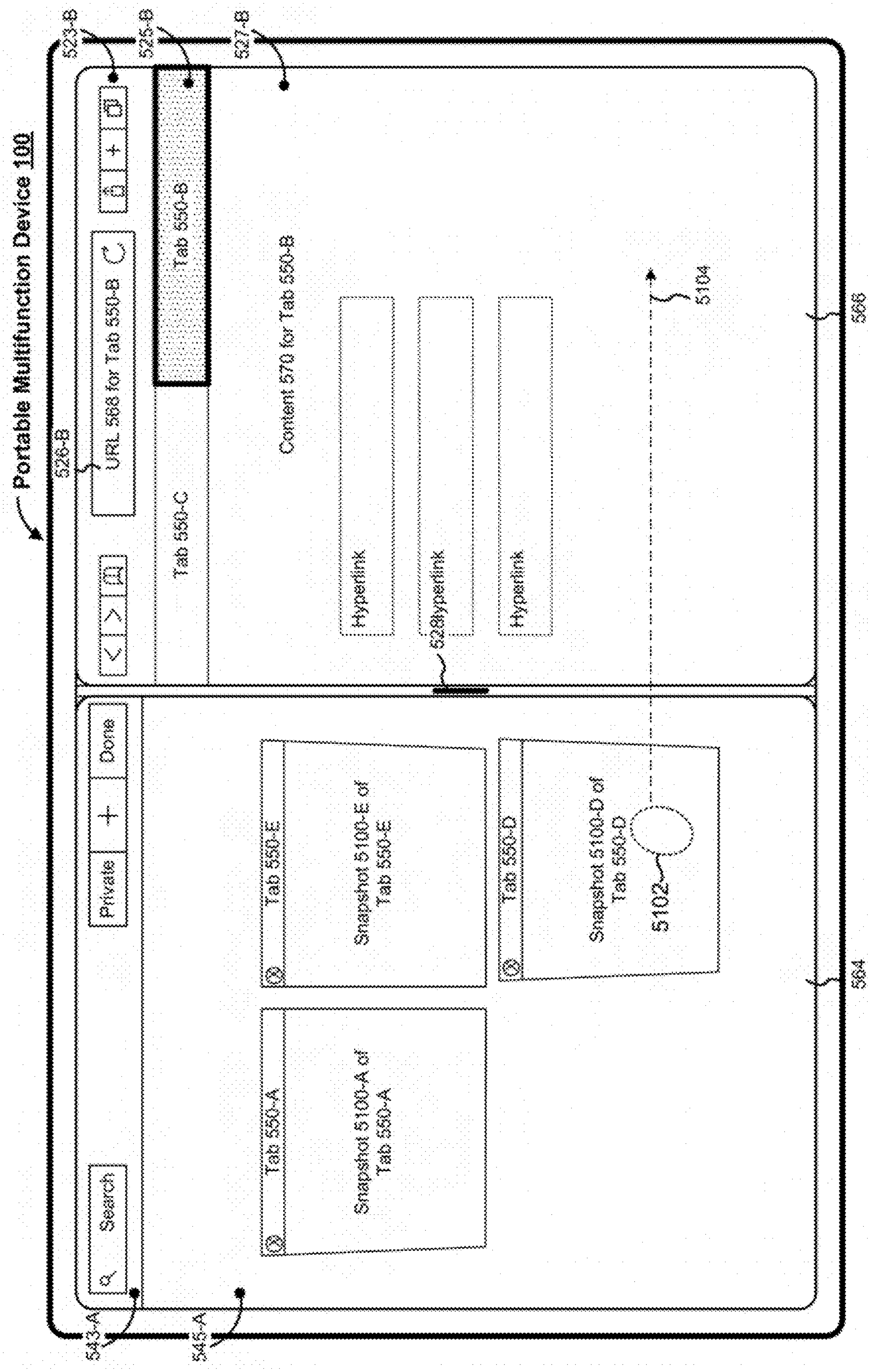
Figure 5A:
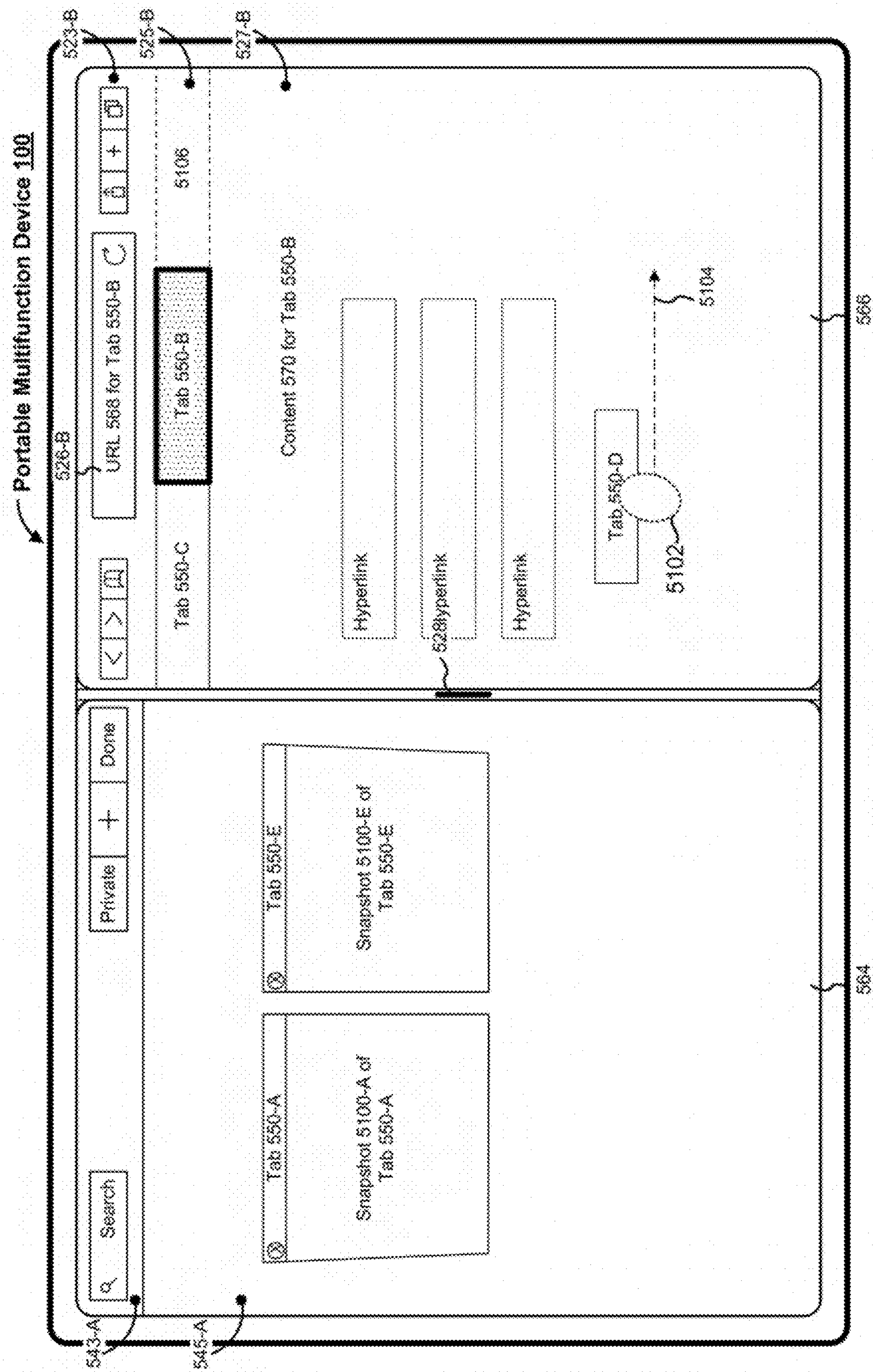
Figure 5B:
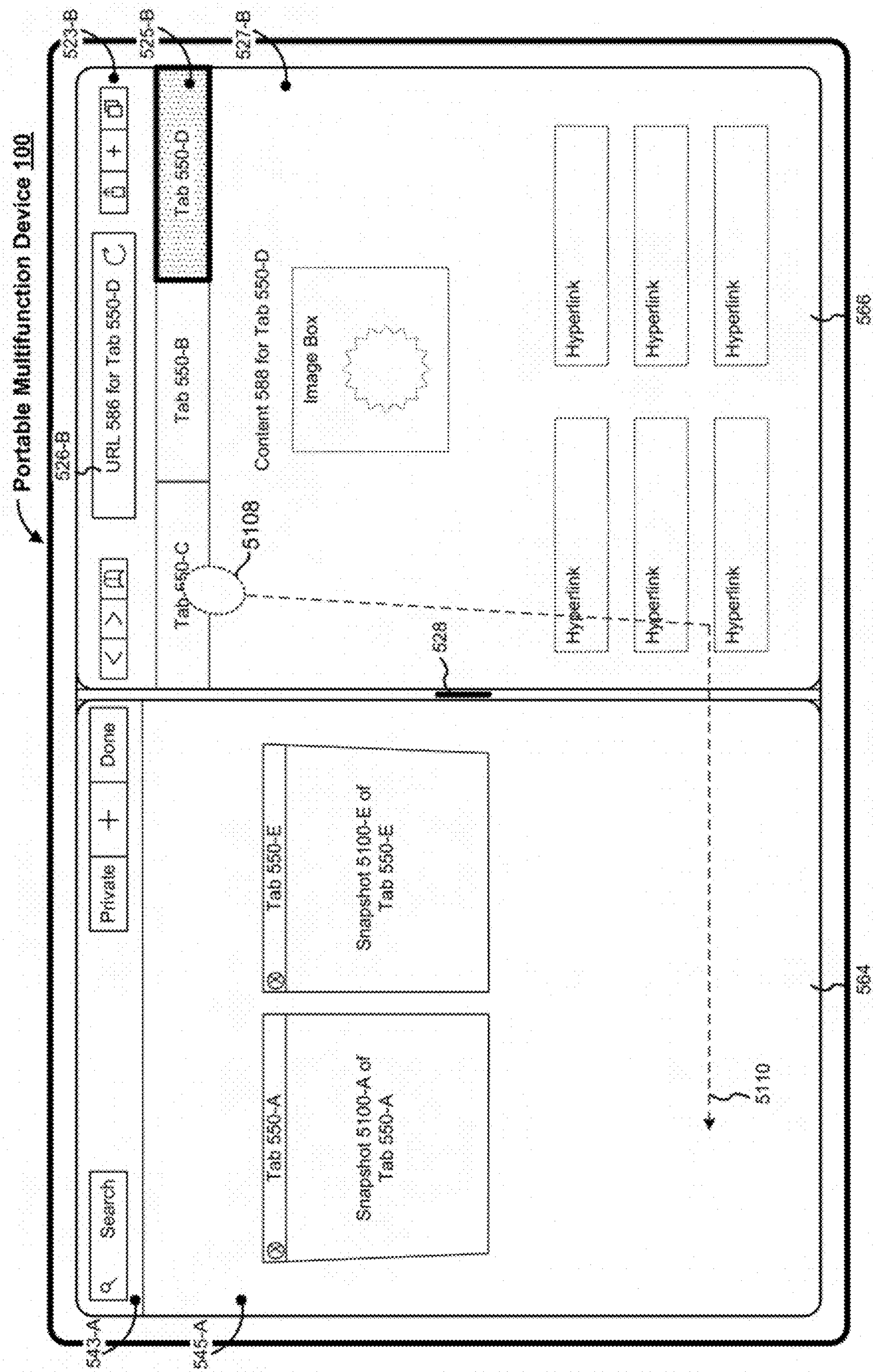
Figure 5C:
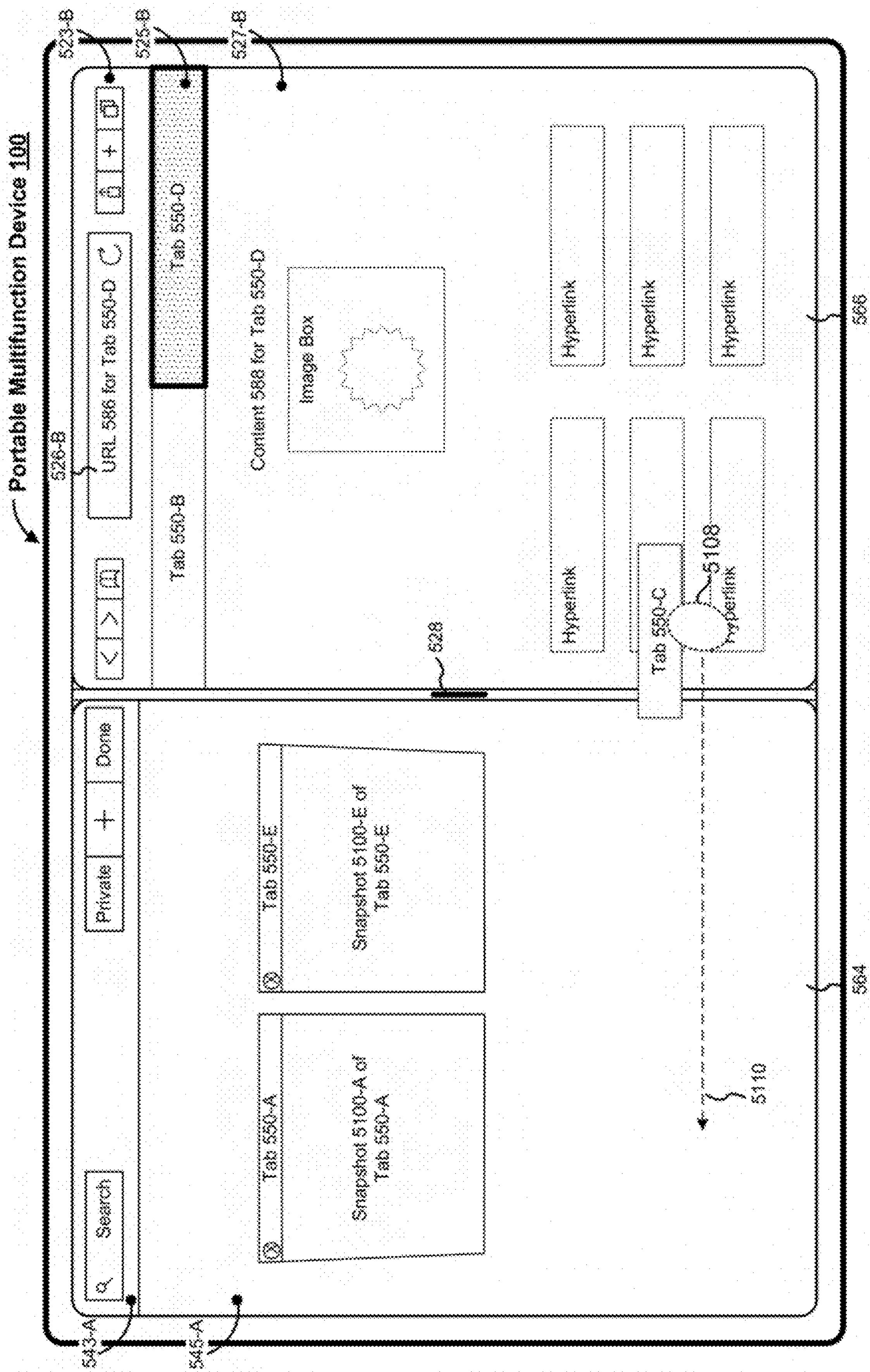
Figure 5D:
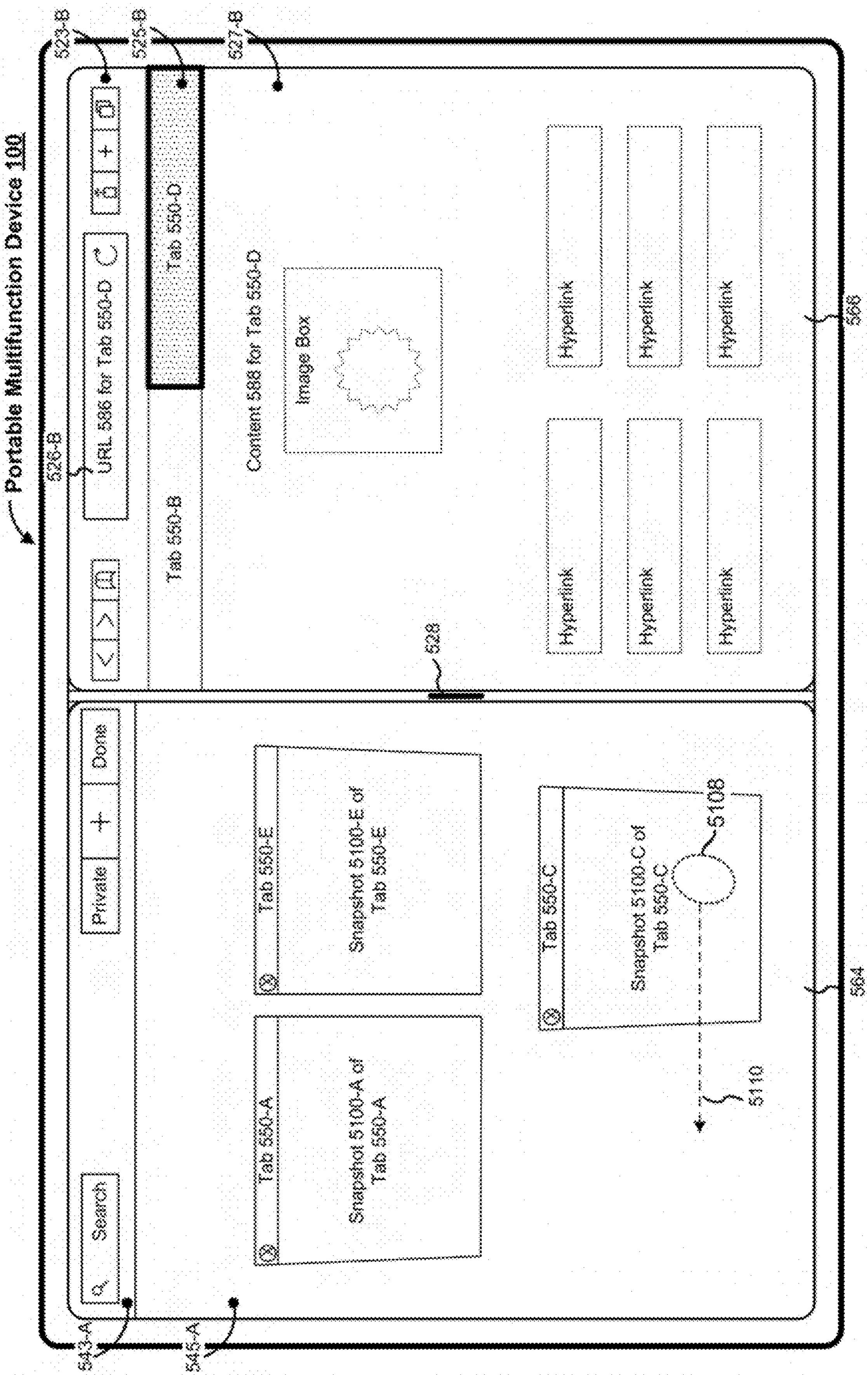
Figure 5E:
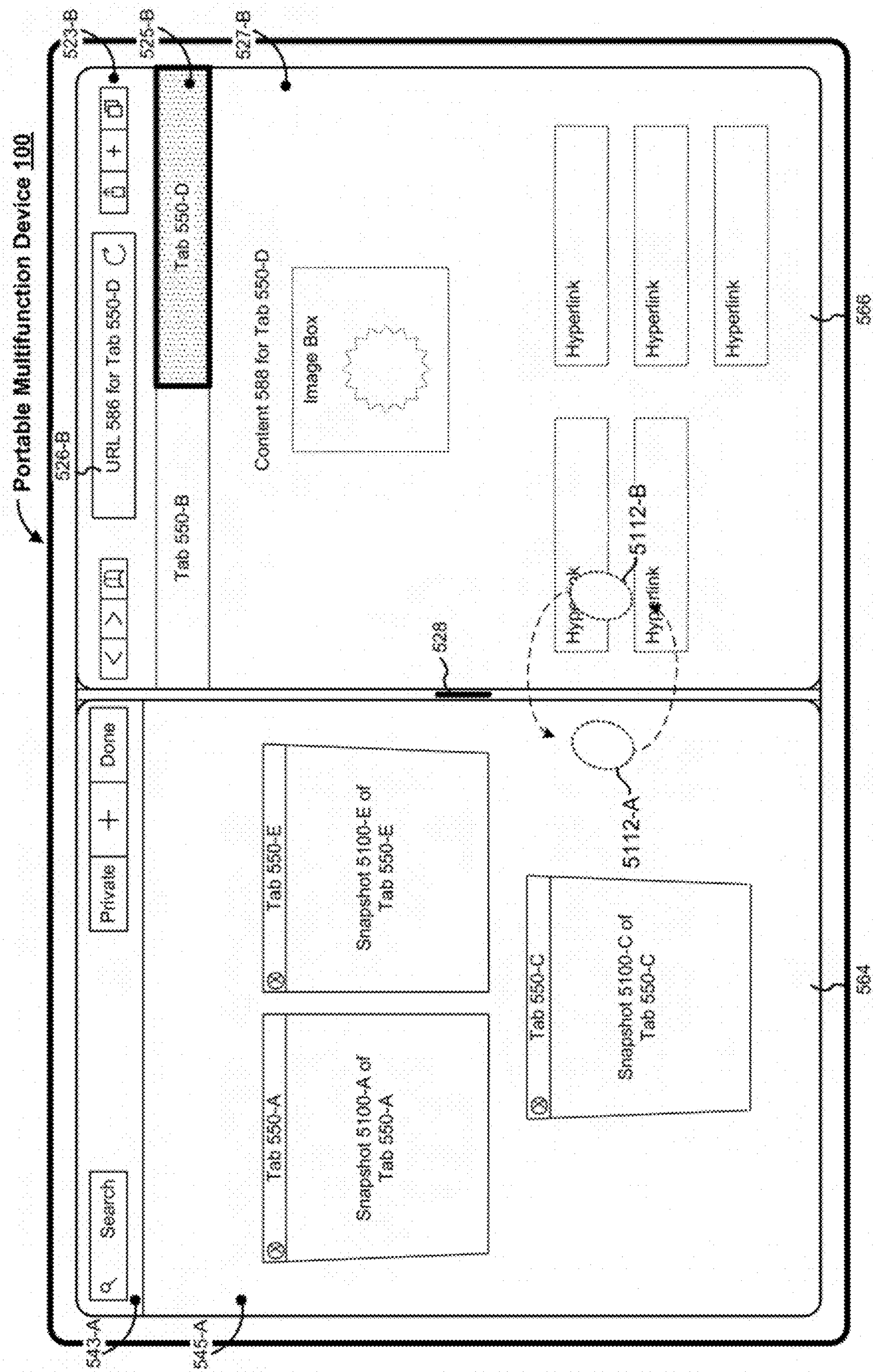
Figure 5F:
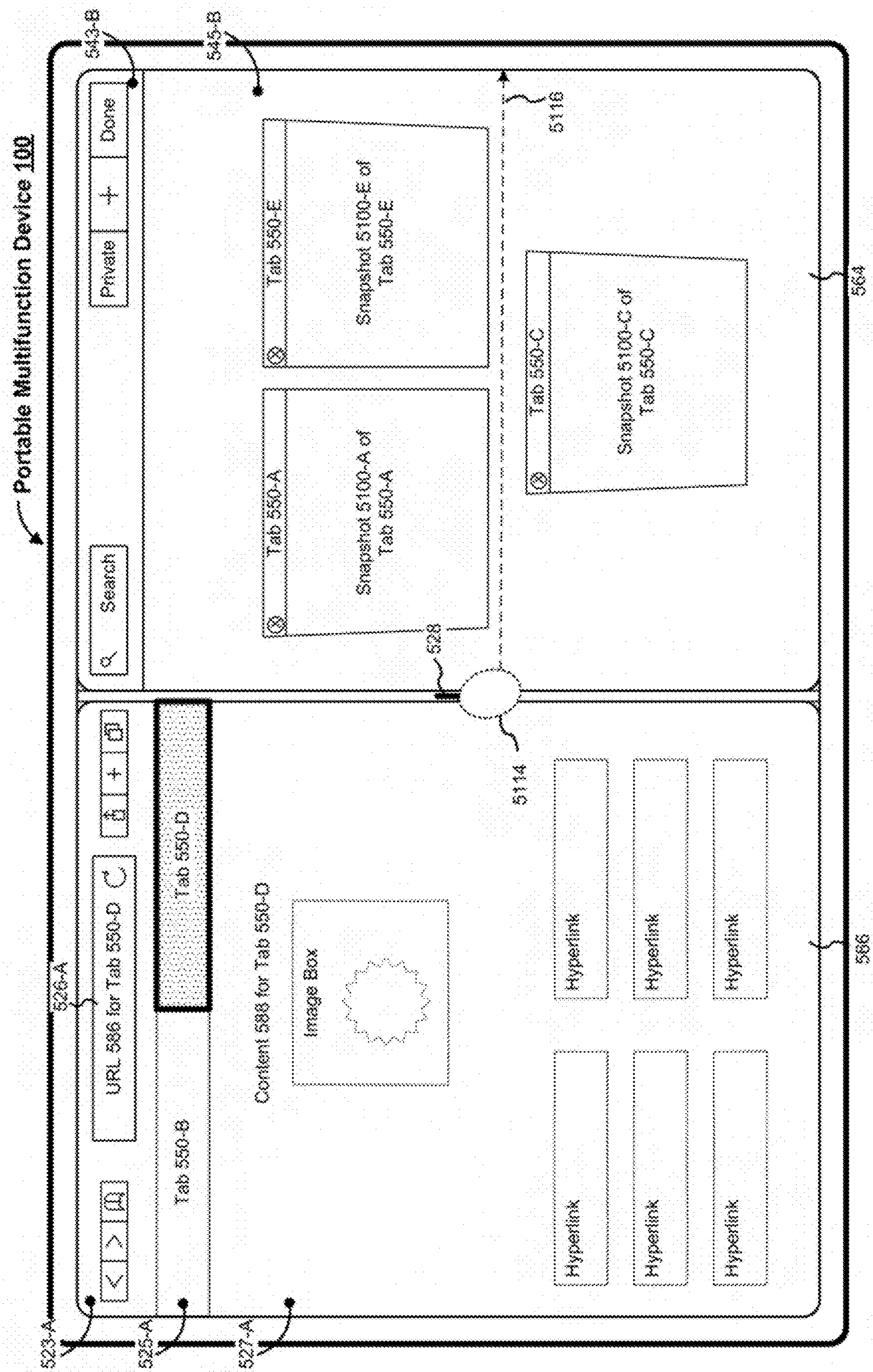
Figure 5G:
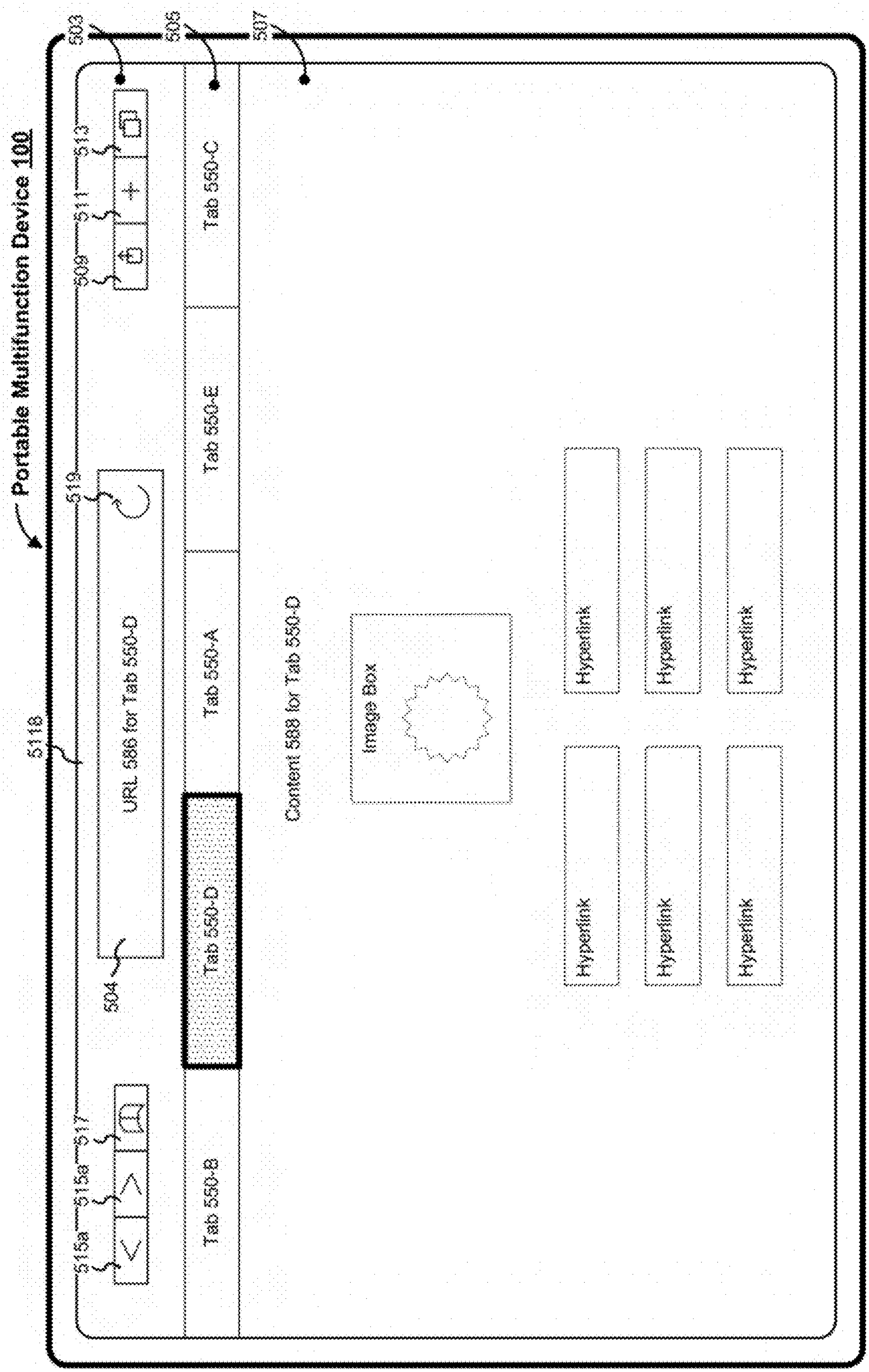
Figure 5H:
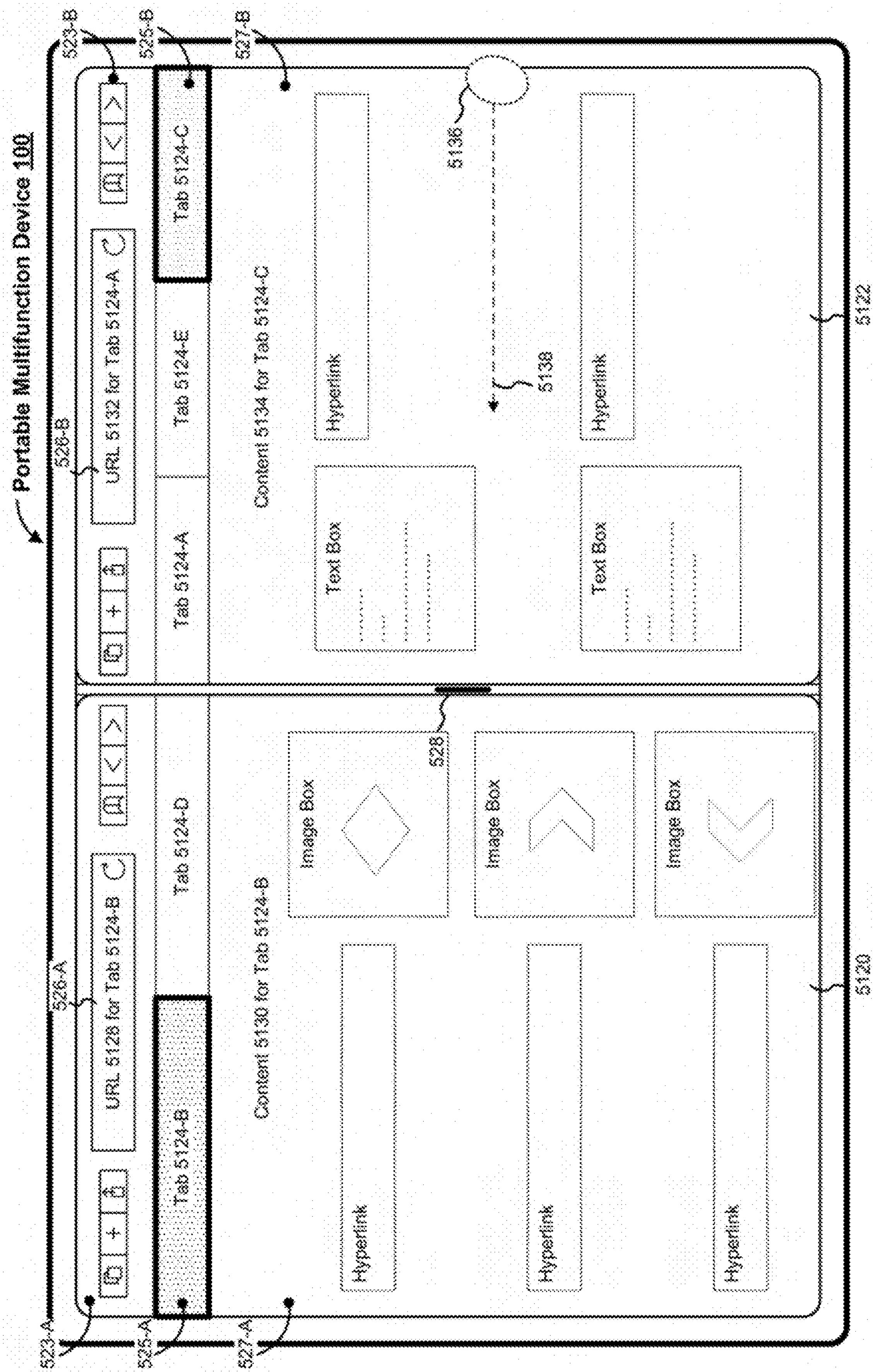
Figure 5I:
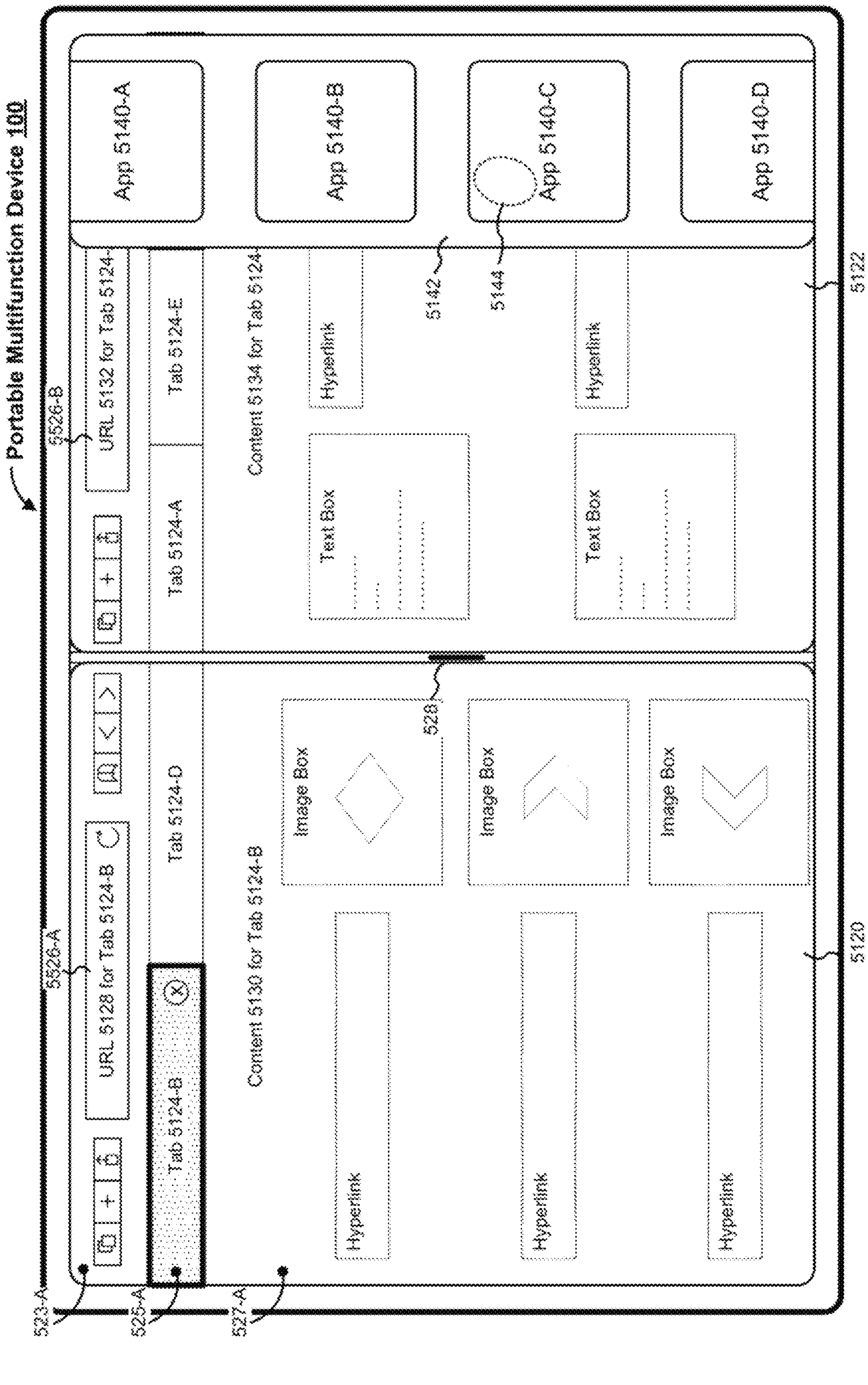
Figure 5J:
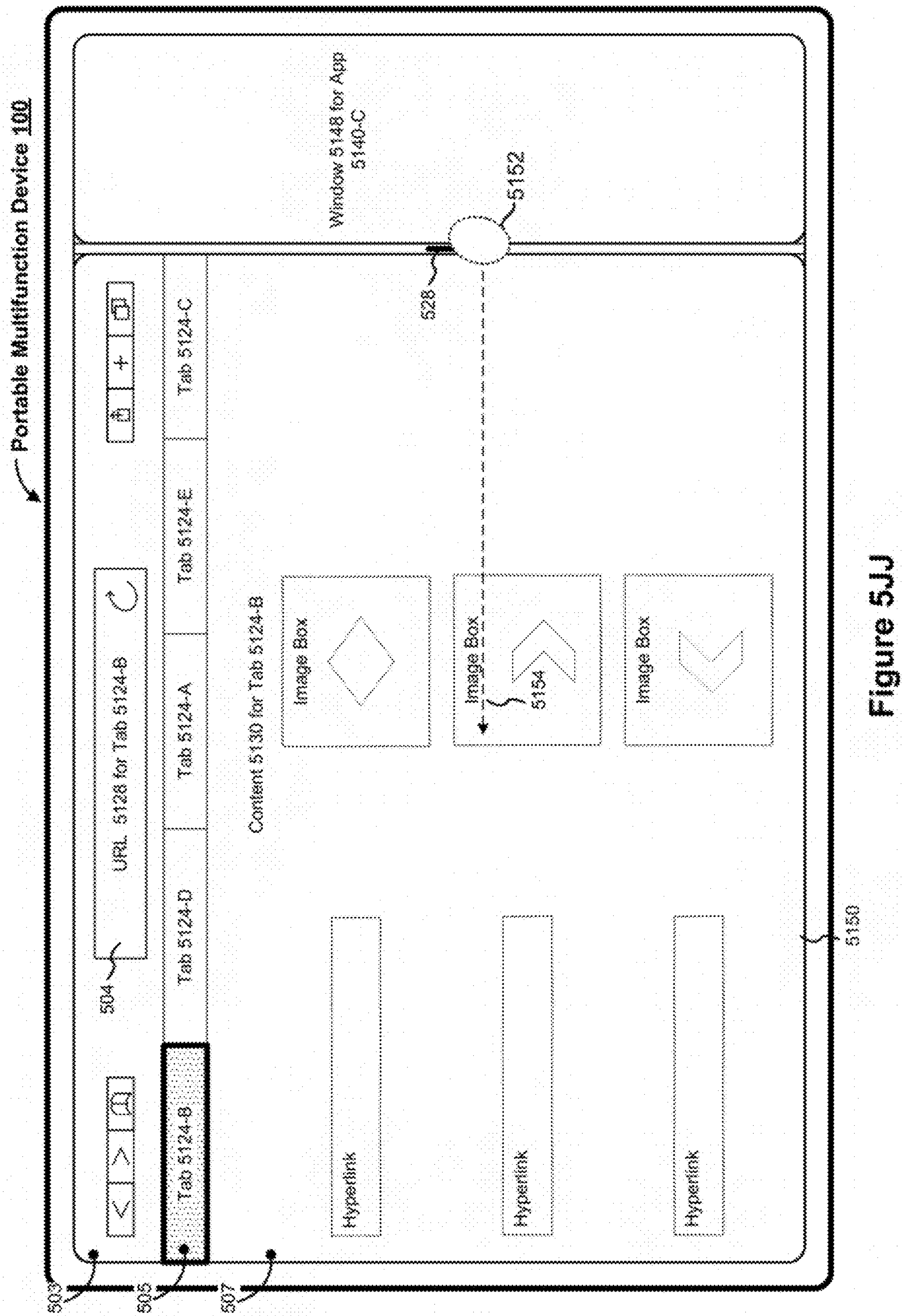
Figure 5K:
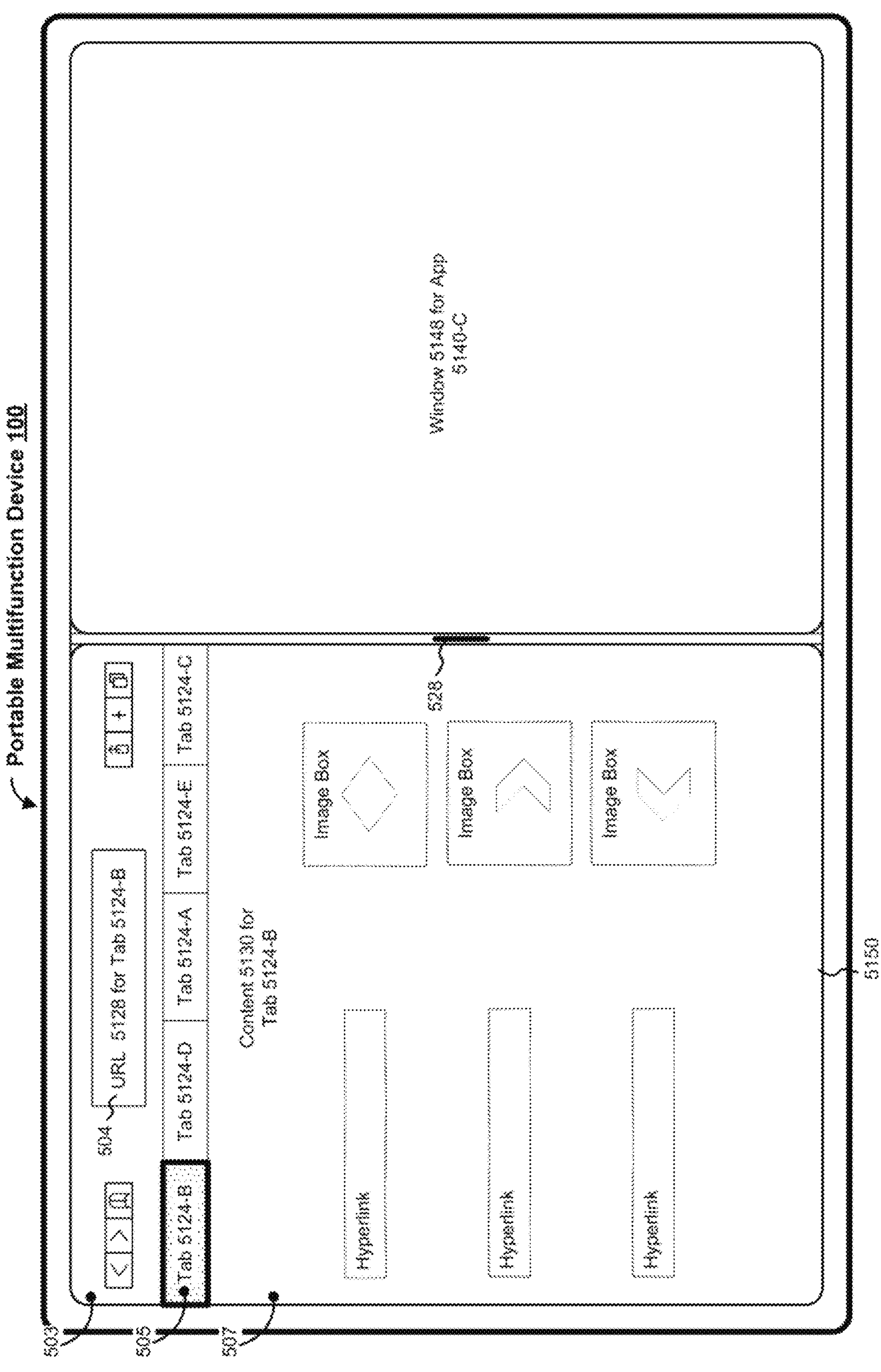

FIGS. 5Y-5BB illustrate a sequence in which a tab is dragged between windows of the user interface in the split screen mode. FIG. 5Y also illustrates a dragging gesture with a contact 5102, where the tab 550-D is dragged according to movement vector 5104 from the second region 545-A associated with the first window 564 to the content region 527-B associated with the second window 566. FIG. 5Z illustrates moving the tab 550-D according to the movement vector 5104.

FIG. 5AA illustrates transforming the tab 550-D (e.g., from a snapshot to a tab icon) in response to moving the tab 550-D into the content region 527-B of the second window 566 due to the dragging gesture. FIG. 5AA also illustrates a potential location 5106 for the tab 550-D in response to the tab 550-D entering the content region 527-B of the second window 566 due to the dragging gesture. FIG. 5BB illustrates the tab 550-D in the tab bar 525-B in response to the tab 550-D being dropped in the content region 527-B of the second window 566. FIG. 5BB also illustrates that the address bar 526-B includes the URL 586 for the web page associated with the tab 550-D, and the content region 527-B includes the content 588 for the web page associated with the tab 550-D. As such, in FIG. 5BB, the tab 550-D is active or in the foreground in the second window 566.

FIGS. 5BB-5EE illustrate another sequence in which a tab is dragged between windows of the user interface in the split screen mode. FIG. 5BB further illustrates a dragging gesture with a contact 5108, where the tab 550-C is dragged according to movement vector 5110 from the content region 527-B associated with the second window 566 to the second region 545-A associated with the first window 564. FIG. 5CC illustrates moving the tab 550-C according to the movement vector 5110.

FIG. 5DD illustrates transforming the tab 550-C (e.g., from a tab icon to a snapshot) in response to moving the tab 550-C into the second region 545-B of the first window 546 due to the dragging gesture. FIG. 5EE illustrates the tab 550-C in the second region 545-B of the first window 546 in response to the tab 550-C being dropped in the second region 545-B of the first window 546.

FIGS. 5EE-5FF illustrate a sequence in which the positions of the windows of the user interface in split screen mode are switched in response to a gesture. FIG. 5EE also illustrates a counter-clockwise twist gesture with contacts 5132-A and 5132-B detected between the first window 564 and the second window 564. FIG. 5FF illustrates that the positions of the first window 564 and the second window 564 are switched relative to their positions in FIG. 5EE in response to the counter-clockwise twist gesture in FIG. 5EE. For example, the positions of the first window 564 and the second window 566 are switched in response to a clockwise twist gesture or other gesture.

FIGS. 5FF-5GG illustrate a sequence in which the split screen windows of the user interface are merged in response to dragging a divider that separates the windows of the user interface in the split screen mode. FIG. 5FF also illustrates a dragging gesture with a contact 5114, where the divider 528 is dragged to an edge of the user interface (e.g., right edge) according to a movement vector 5116 (e.g., left-to-right dragging gesture). FIG. 5GG illustrates a merged window 5118 (e.g., a full screen window) in response to the dragging gesture in FIG. 5FF. In FIG. 5GG, the merged window 5118 includes the tabs from the first window 564 and the second window 566 in the left-to-right order as shown in FIG. 5FF. For example, the merged window 5118 is associated with an instance of a web browser application. Furthermore, FIG. 5GG shows the merged window 5118 in the browser view.

The merged window 5118 in FIG. 5GG is similar to and adapted from the window 502 in FIG. 5A. As such, FIGS. 5A and 5GG include similar user interfaces and elements labeled with the same reference number in both figures have the same function, only the differences are described herein for the sake of brevity. In FIG. 5GG, the tab bar 505 includes a plurality of tabs 550-B, 550-D, 550-A, 550-E, and 550-C in left-to-right order. In FIG. 5GG, the address bar 504 includes the URL 586 for the web page associated with the tab 550-D, and the content region 507 includes the content 588 for the web page associated with the tab 550-D. As such, in FIG. 5GG, the tab 550-D is active or in the foreground.

FIGS. 5HH-5JJ illustrate a sequence in which the split screen windows of the user interface are merged in response to a multitasking operation. FIG. 5HH illustrates a first window 5120 and a second window 5122 in a split screen mode. FIG. 5HH is similar to and adapted from FIG. 5M. As such, FIGS. 5M and 5HH include similar user interfaces and elements labeled with the same reference number in both figures have the same function, only the differences are described herein for the sake of brevity. For example, the first window 5120 and the second window 5122 are associated with different instances of the web browser application. FIG. 5HH shows the first window 5120 and the second window 5122 in the browser view.

In some embodiments, the first window 5120 is associated with an instance of a web browser application, an email application, a messaging application, a document viewing application, a document processing application, or the like. In some embodiments, the first content 5130 displayed in the first window 5120 is associated with an electronic document such as a web page, a text file, an electronic mail message, an SMS, or the like. In some embodiments, the second window 5122 is associated with an instance of a web browser application, an email application, a messaging application, a document viewing application, a document processing application, or the like. In some embodiments, the second content 5134 displayed in the second window 5122 is associated with an electronic document such as a web page, a text file, an electronic mail message, an SMS, or the like.

In FIG. 5HH, the tab bar 525-A includes tabs 5124-B and 5124-D. In FIG. HH, the address bar 526-A includes the URL 5128 for the web page associated with the tab 5124-B, and the content region 527-A includes content the 5130 for the web page associated with the tab 5124-B. As such, in FIG. 5HH, the tab 5124-B is active or in the foreground in the first window 5120.

In FIG. 5HH, the tab bar 525-B includes the tabs 5124-A, 5124-E, and 5124-C. In FIG. 5HH, the address bar 526-B includes the URL 5132 for the web page associated with the tab 5124-C, and the content region 527-B includes the content 5134 for the web page associated with the tab 5124-C. As such, in FIG. 5HH, the tab 5124-C is active or in the foreground in the second window 5122. FIG. 5HH also illustrates a divider 528 between the first window 5120 and the second window 5122. For example, the user of the portable multifunction device 100 is able to resize the first window 5120 and the second window 5122 by dragging the divider 528.

FIG. 5HH further illustrates a dragging gesture with a contact 5136 from an edge of the display area toward the divider 528 according to a movement vector 5138. FIG. 5II illustrates a multitasking selection pane 5142 overlaid on the second window 5122 in response to the dragging gesture in FIG. 5HH. In FIG. 5II, the multitasking selection pane 5142 includes a plurality of affordances associated with applications 5140-A, 5140-B, 5140-C, and 5140-D (e.g., applications different from the web browser application), which, when activated (e.g., with a contact), cause the first window 5120 and the second window 5122 to be merged into a single window and a separate window for the selected application to be displayed. FIG. 5HH also illustrates a contact 5144 detected at a location corresponding to an affordance for the application 5140-C.

FIG. 5JJ illustrates a merged window 5150 (e.g., a partial screen tiled window) in response to selection of the affordance for the application 5140-C in FIG. 5II. For example, the merged window 5150 is associated with an instance of a web browser application that includes the tabs from the first window 5120 and the second window 5122 in the left-to-right order as shown in FIG. 5II. FIG. 5JJ shows the merged window 5150 in the browser view.

The merged window 5150 in FIG. 5JJ is similar to and adapted from the window 502 in FIG. 5A. As such, FIGS. 5A and 5JJ include similar user interfaces and elements labeled with the same reference number in both figures have the same function, only the differences are described herein for the sake of brevity. In FIG. 5JJ, the tab bar 505 includes a plurality of tabs 5124-B, 5124-D, 5124-A, 5124-E, and 5124-C in left-to-right order. In FIG. 5JJ, the address bar 504 includes the URL 5128 for the web page associated with the tab 5124-B, and the content region 507 includes the content 5130 for the web page associated with the tab 5124-D. As such, in FIG. 5JJ, the tab 5124-A is active or in the foreground.

FIG. 5JJ also illustrates a window 5148 (e.g., a partial screen tiled window) in response to selection of the affordance for the application 5140-C in FIG. 5II. For example, the window 5148 is associated with an instance of the application 5140-C (e.g., an application different from the web browser application).

FIGS. 5JJ-5KK illustrate a sequence in which the window 5148 and the merged window 5150 are resized. FIG. 5JJ illustrates a dragging gesture with a contact 5152, where the divider is dragged toward the center of the display area according to the movement vector 5154. FIG. 5KK illustrates the window 5148 and the merged window 5150 at different sizes as compared to FIG. 5JJ in response to the dragging gesture in FIG. 5JJ. For example, in FIG. 5KK, the size of the window 5148 is increased and the size of the merged window 5150 is reduced in comparison to FIG. 5JJ.

FIGS. 6A-6J illustrate example user interfaces for switching between full screen mode and split screen mode in accordance with some embodiments. The user interfaces in these figures are used to illustrate the processes described below, including the processes in FIGS. 8A-8D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 6A:
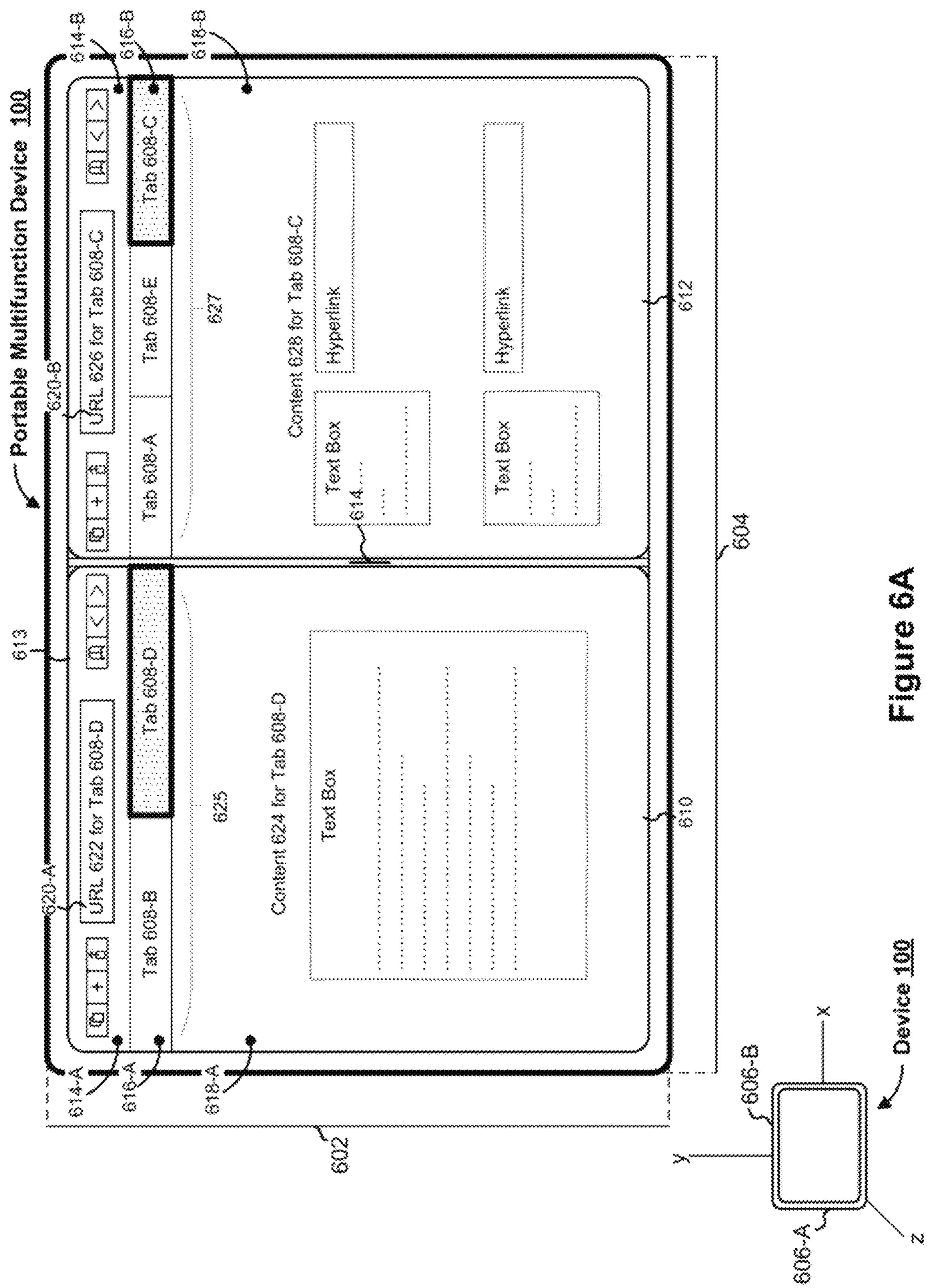
FIGS. 6A-6J illustrate example user interfaces for switching between full screen mode and split screen mode in accordance with some embodiments.

FIG. 6A illustrates a first window 610 with a first set of tabs 625 and a second window 612 with a second set of tabs 627 in a split screen mode. In FIG. 6A, a first edge 606-A of a display area 613 (sometimes also herein called a "display region) of the portable multifunction device 100 (e.g., the touch screen) corresponds to a dimension 602, and a second edge 606-B of the device 100 corresponds to a dimension 604. For example, in FIG. 6A, the dimension 602 is less than the dimension 604. As such, the device 100 is in landscape orientation in FIG. 6A. For example, the first window 610 and the second window 612 are associated with different instances of a web browser application. FIG. 6A shows the first window 610 and the second window 612 in a browser view.

In some embodiments, the first window 610 is associated with an instance of a web browser application, an email application, a messaging application, a document viewing application, a document processing application, or the like. In some embodiments, the first content 624 displayed in the first window 610 is associated with an electronic document such as a web page, a text file, an electronic mail message, an SMS, or the like. In some embodiments, the second window 612 is associated with an instance of a web browser application, an email application, a messaging application, a document viewing application, a document processing application, or the like. In some embodiments, the second content 628 displayed in the second window 612 is associated with an electronic document such as a web page, a text file, an electronic mail message, an SMS, or the like.

In FIG. 6A, the first window 610 includes a chrome region 614-A, a tab bar 616-A, and a content region 618-A. The tab bar 616-A includes the first set of tabs 625 with tabs 608-B and 608-D in left-to-right order. In FIG. 6A, the address bar 620-A includes the URL (uniform resource locator) 622 for the web page associated with the tab 608-D, and the content region 618-A includes the content 624 for the web page associated with the tab 608-D. As such, in FIG. 6A, the tab 608-D is active or in the foreground in the first window 610. In FIG. 6A, the tab 608-B is inactive or in the background of the first window 610.

In FIG. 6A, the second window 612 includes a chrome region 614-B, a tab bar 616-B, and a content region 618-B. The tab bar 616-B includes the second set of tabs 627 with tabs 608-A, 608-E, and 608-C in left-to-right order. In FIG. 6A, the address bar 620-B includes the URL 626 for the web page associated with the tab 608-C, and the content region 618-B includes content 628 for the web page associated with the tab 608-C. As such, in FIG. 6A, the tab 608-C is active or in the foreground in the second window 612. In FIG. 6A, the tabs 608-A and 608-E is inactive or in the background of the second window 612. FIG. 6A also illustrates a divider 614 between the first window 610 and the second window 612. For example, the user of the portable multifunction device 100 is able to resize the first window 610 and the second window 612 by dragging the divider 614.

In some embodiments, new tabs are added to the tab bars 616-A and 616-B by opening new web pages or opening new tabs (e.g., by a combination of keystrokes such as Crtl+T). According to some embodiments, selection of an inactive/background tab causes the selected tab to become an active/foreground tab and also causes the previously active tab to become an inactive/background tab. In some cases, each tab is associated with a different web page or tabbed window. In some embodiments, each tab is associated with its own browsing history. In some embodiments, the user of the device 100 has the option to close a tab. When a tab is closed, the corresponding tab is removed from the tab bar 616-A or 616-B. According to some embodiments, the web pages associated with the tabs are all concurrently open, even though the background tabs are not displayed on the user interface.

Figure 6B:
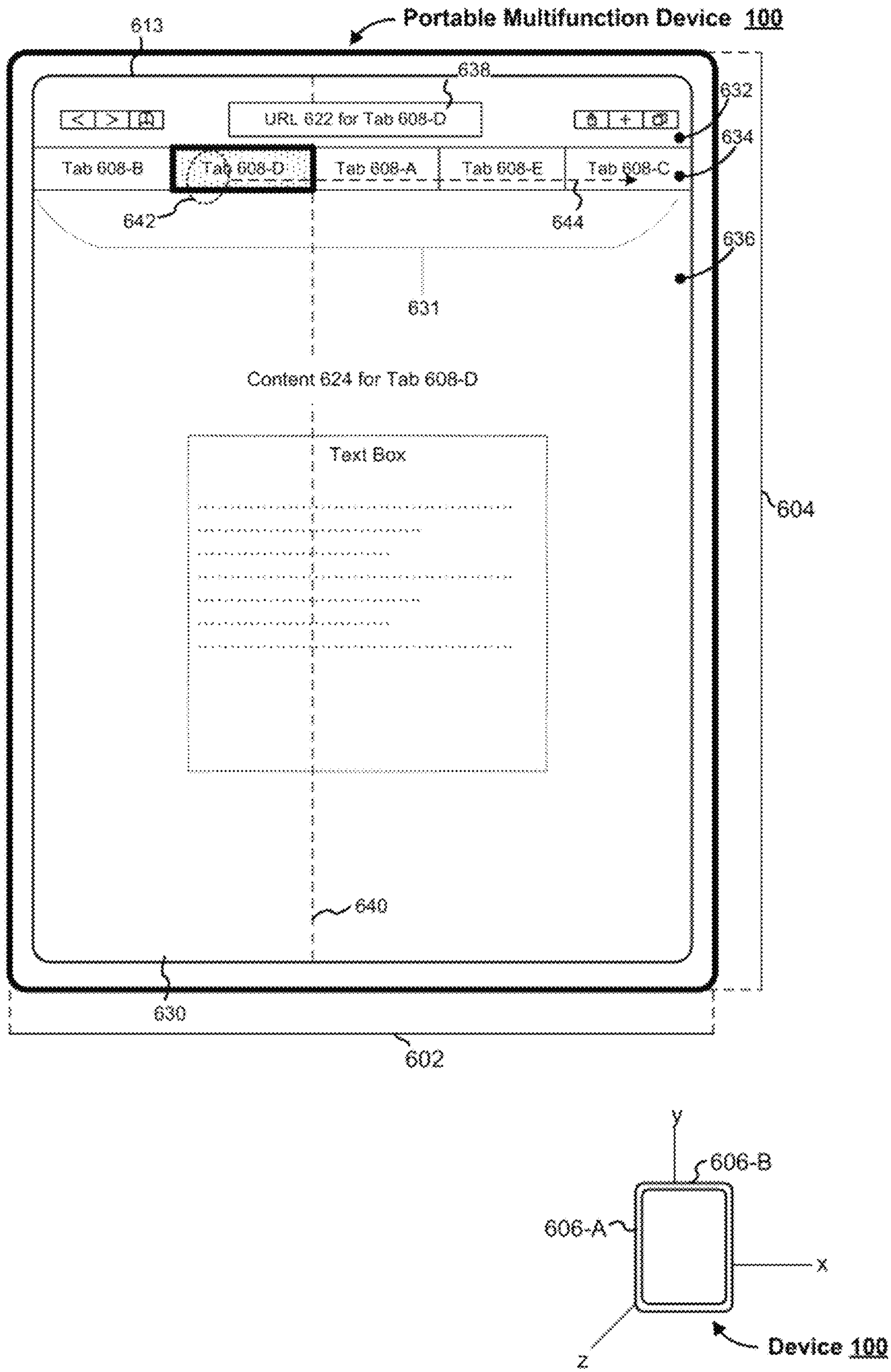
Figure 6C:
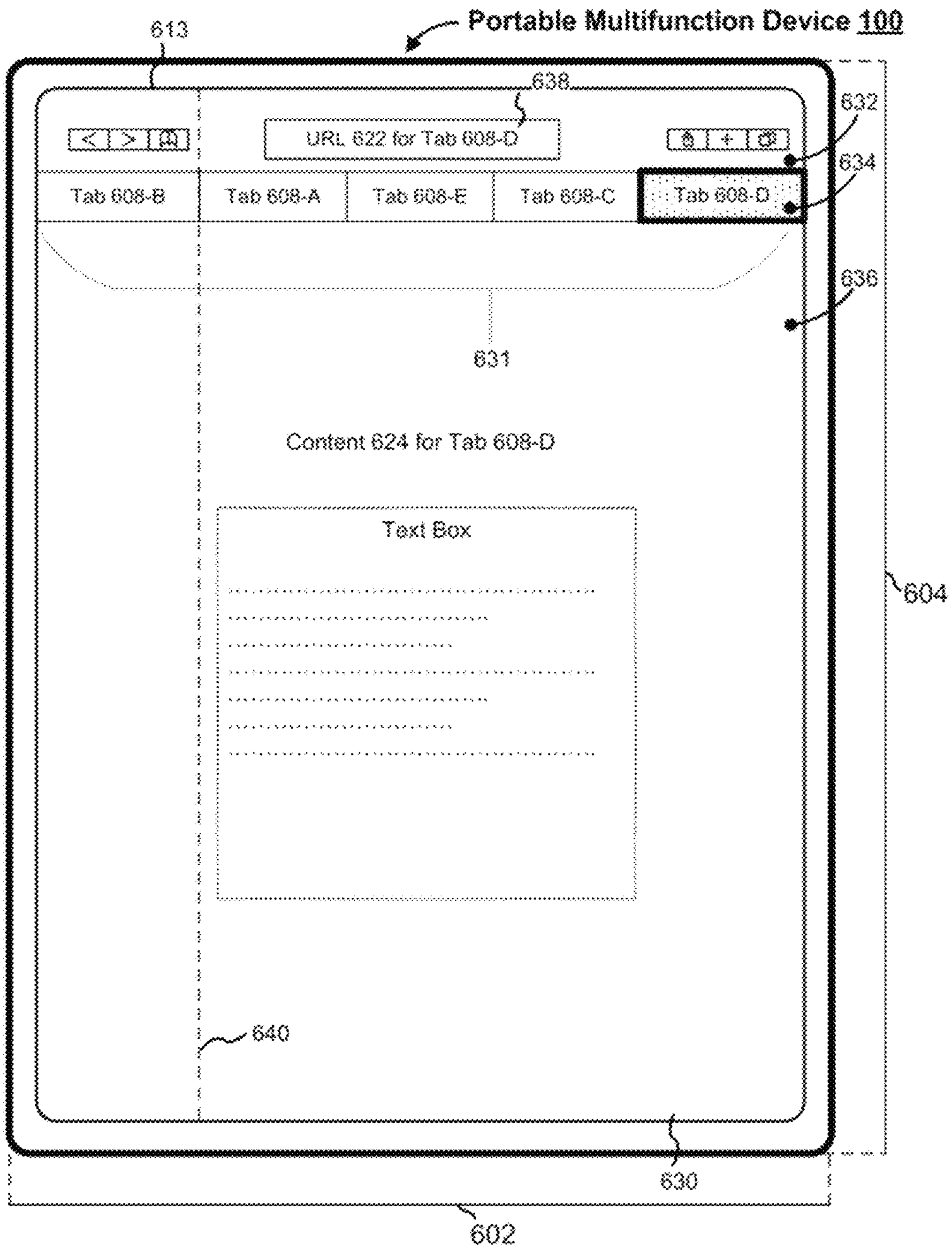
Figure 6C:
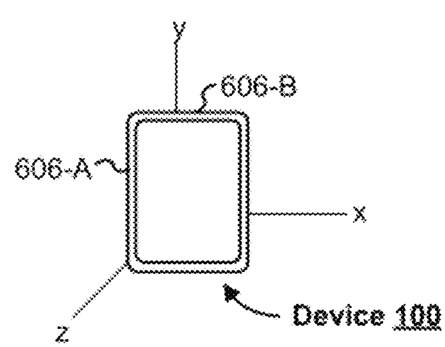
Figure 6D:
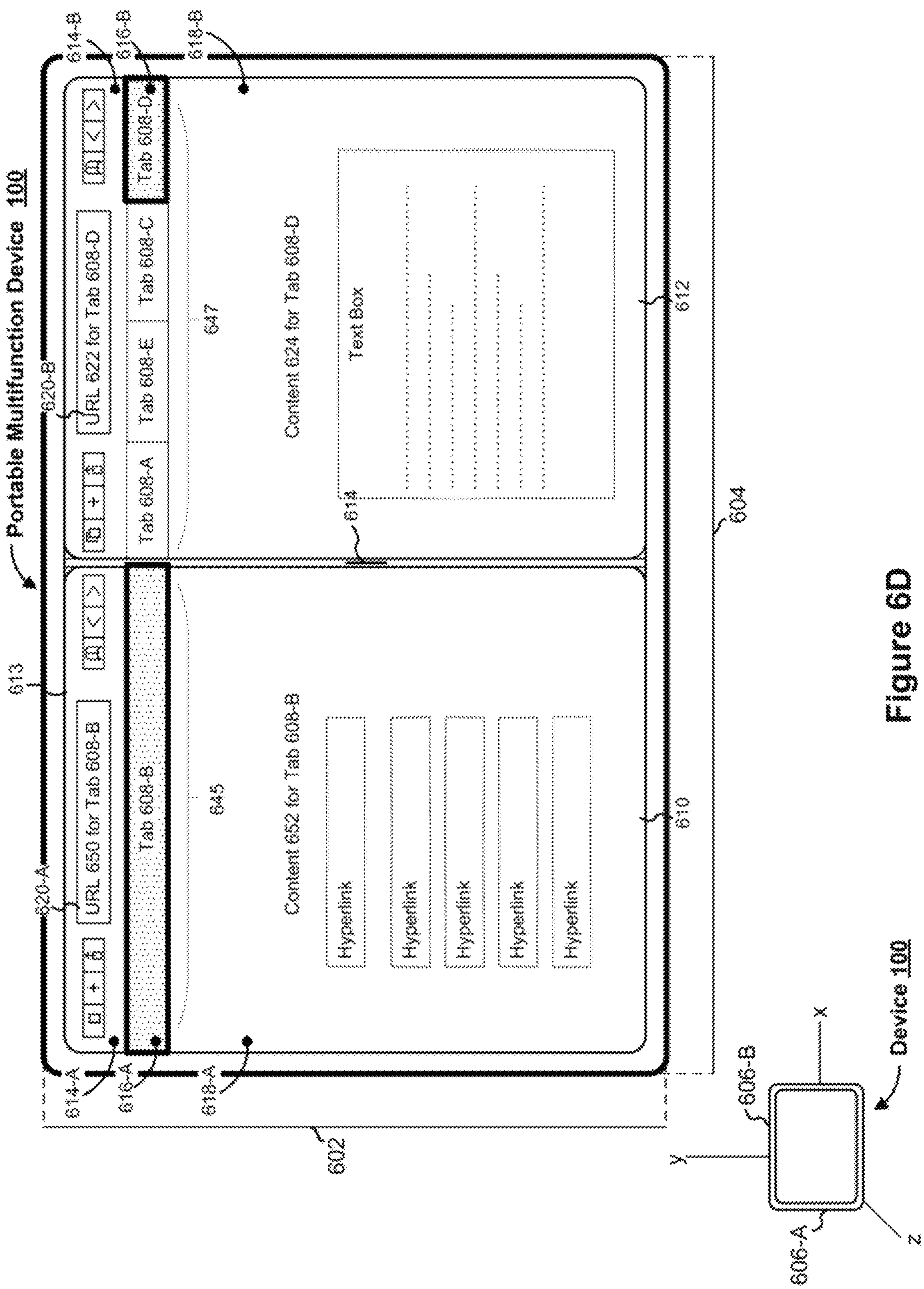

FIGS. 6B-6D illustrate a first sequence in which tabs are rearranged within a merged window prior to reverting to the split screen mode. FIG. 6B illustrates a merged window 630 with a merged set of tabs 631 in response to a change of at least dimension of the display area 613 of the device 100 from FIG. 6A. In FIG. 6B, a first edge 606-A of the display area 613 of the portable multifunction device 100 corresponds to the dimension 604, and a second edge 606-B of the device 100 corresponds to the dimension 602. For example, in FIG. 6B, the dimension 602 is greater than the dimension 604. As such, the device 100 changed from landscape orientation in FIG. 6A to portrait orientation in FIG. 6B. For example, the merged window 630 is associated with an instance of a web browser application. FIG. 6B shows the merged window 630 in a browser view.

In some embodiments, the merged window 630 is associated with an instance of a web browser application, an email application, a messaging application, a document viewing application, a document processing application, or the like. In some embodiments, the content 624 displayed in the merged window 630 is associated with an electronic document such as a web page, a text file, an electronic mail message, an SMS, or the like.

In FIG. 6B, the merged window 630 includes a chrome region 632, a tab bar 634, and a content region 636. The tab bar 634 includes the merged set of tabs 631 with tabs 608-B, 608-D, 608A, 608-E, and 608-C in left-to-right order. In FIG. 6B, the address bar 638 includes the URL 622 for the web page associated with the tab 608-D, and the content region 636 includes the content 624 for the web page associated with the tab 608-D. As such, in FIG. 6B, the tab 608-D is active or in the foreground in the merged window 630.

As shown in FIG. 6B, the merged set of tabs 631 is separated by a virtual divider 640 (e.g., an invisible line) between tabs 608-D and 608-A, which corresponds to the divider 614 between the first set of tabs 625 in the first window 610 and the second set of tabs 627 in the second window 612 in FIG. 6A. Furthermore, the merged set of tabs 631 have the same order (e.g., horizontally or left-to-right) as the first set of tabs 625 and the second set of tabs 627 in FIG. 6A. FIG. 6B also shows a dragging gesture with a contact 642, where the tab 608-D is dragged across the virtual divider 640 in a first direction (e.g., left-to-right) according to a movement vector 644.

FIG. 6C illustrates the merged set of tabs 631 rearranged according to the dragging gesture in FIG. 6B. As shown in FIG. 6B, the merged set of tabs 631 is separated by the virtual divider 640 (e.g., an invisible line) between tabs 608-B and 608-A. In FIG. 6C, the tab bar 634 includes the merged set of tabs 631 with tabs 608-B, 608-A, 608-E, 608-C, and 608-D in left-to-right order.

FIG. 6D illustrates the first window 610 with a third set of tabs 645 and the second window 612 with a fourth set of tabs 647 in the split screen mode in response to a change of at least dimension of the display area 613 of the device 100 from FIG. 6C. In FIG. 6D, a first edge 606-A of the display area 613 of the portable multifunction device 100 corresponds to the dimension 602, and a second edge 606-B of the device 100 corresponds to the dimension 604. For example, in FIG. 6D, the dimension 602 is less than the dimension 604. As such, the device 100 changed from portrait orientation in FIG. 6C to landscape orientation in FIG. 6D.

As shown in FIG. 6D, the tab bar 616-A includes the third set of tabs 645 with the tab 608-B. In FIG. 6D, the address bar 620-A includes the URL 650 for the web page associated with the tab 608-B, and the content region 618-A includes the content 652 for the web page associated with the tab 608-B. As such, in FIG. 6D, the tab 608-B is active or in the foreground in the first window 610.

As shown in FIG. 6D, the tab bar 616-B includes the fourth set of tabs 647 with tabs 608-A, 608-E, 608-C, and 608-D in left-to-right order. In FIG. 6D, the address bar 620-B includes the URL 622 for the web page associated with the tab 608-D, and the content region 618-B includes the content 624 for the web page associated with the tab 608-D. As such, in FIG. 6D, the tab 608-D is active or in the foreground in the second window 612.

Thus, after rearranging the merged set of tabs 631 by dragging the tab 608-D across the virtual divider 640 in the first direction (e.g., left-to-right) in FIG. 6B, the third set of tabs 645 no longer includes the tab 608-D as compared to the first set of tabs 625 in FIG. 6A. And, after rearranging the merged set of tabs 631 by dragging the tab 608-D across the virtual divider 640 in the first direction (e.g., left-to-right) in FIG. 6B, the fourth set of tabs 647 includes the tab 608-D as compared to second set of tabs 627 in FIG. 6A.

Figure 6E:
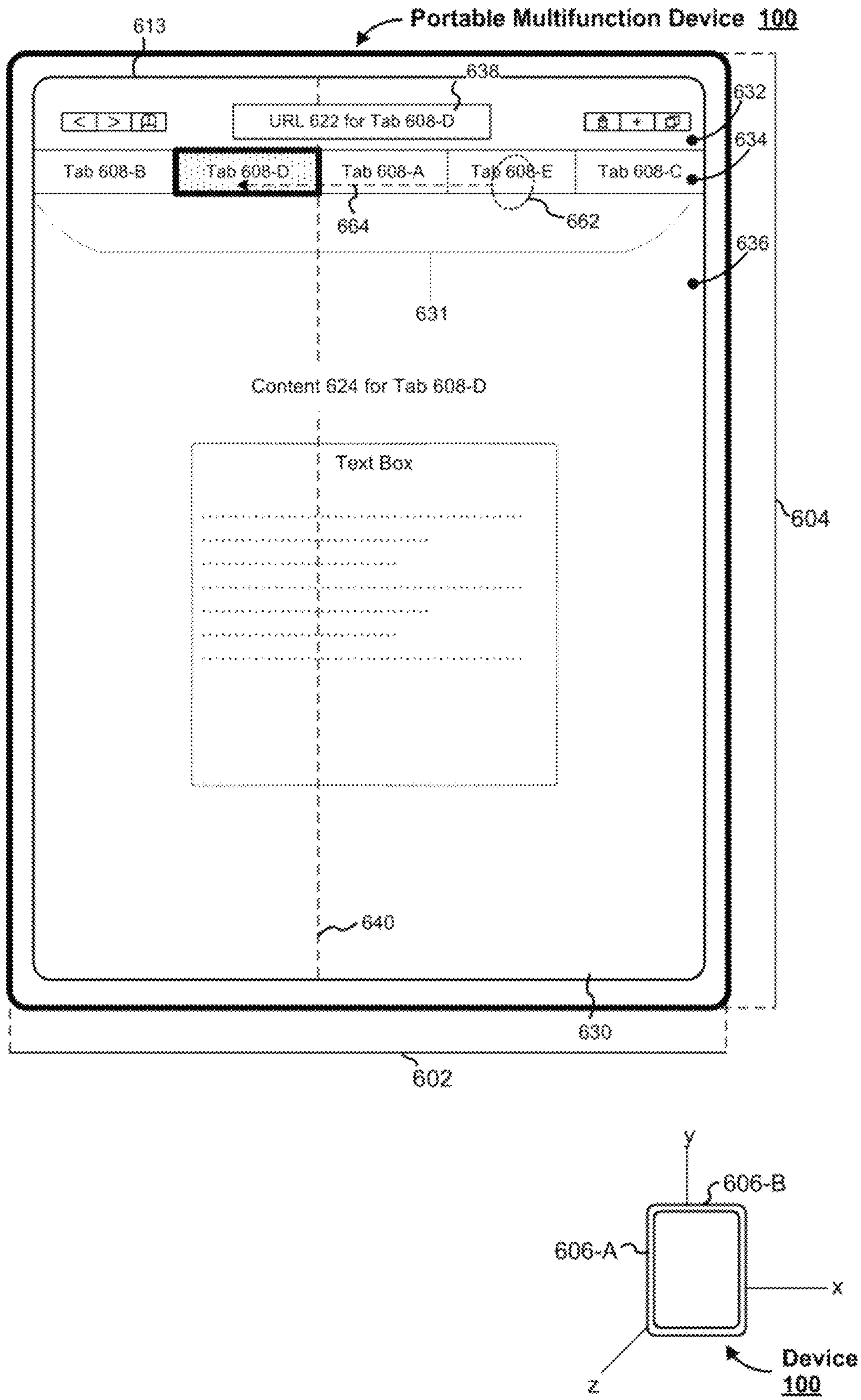
Figure 6F:
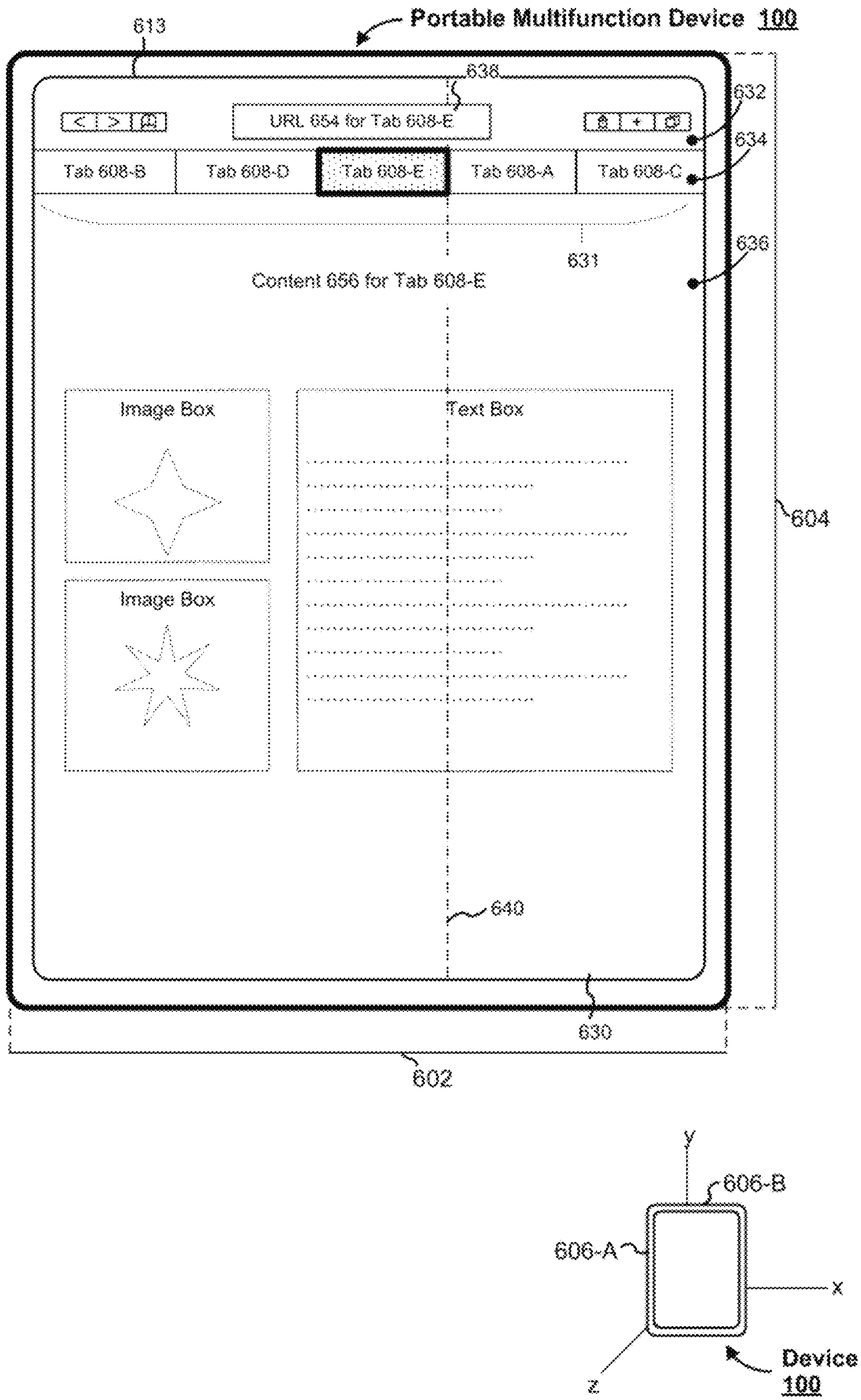
Figure 6G:
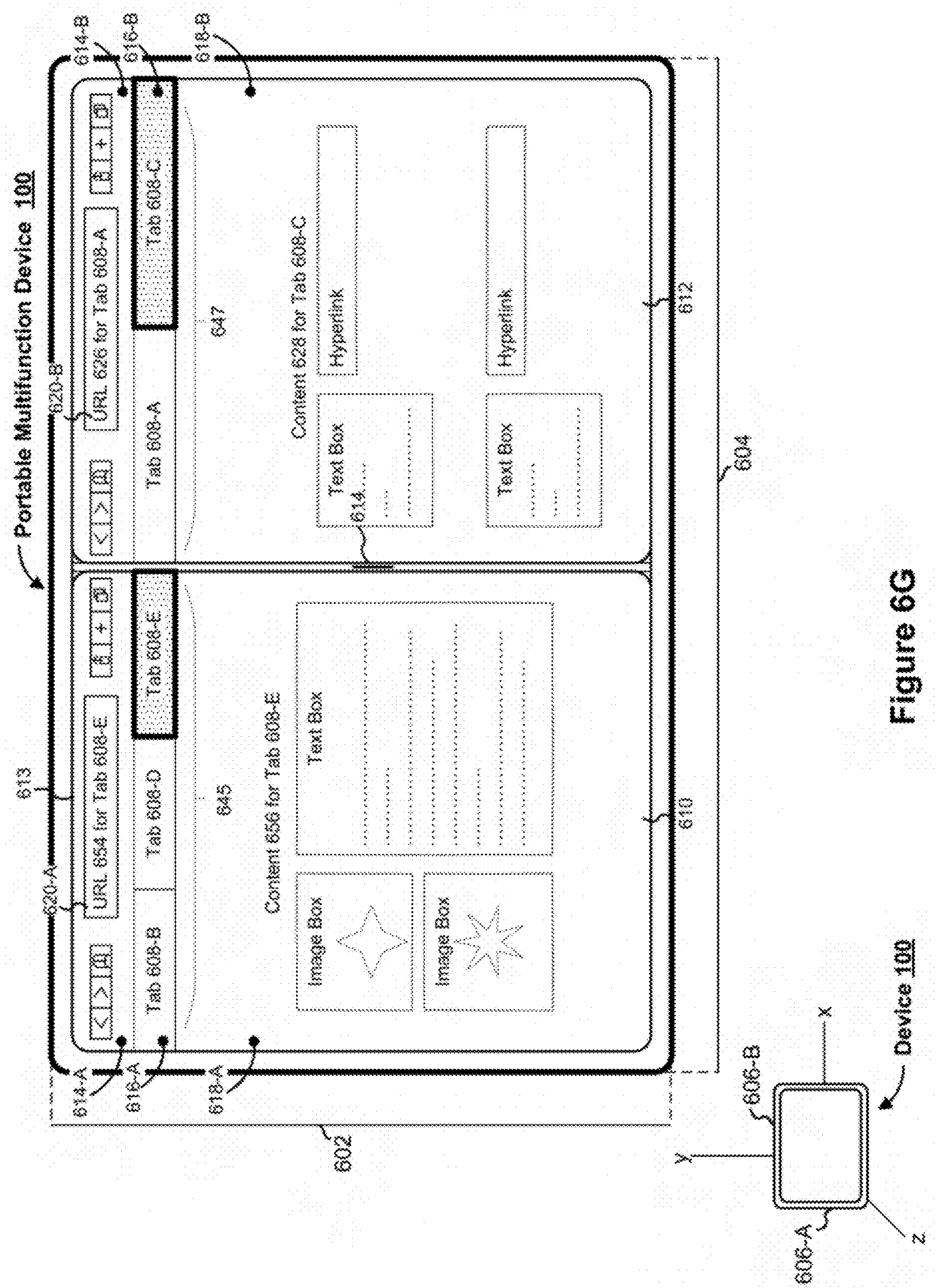

FIGS. 6E-6G illustrate a second sequence in which tabs are rearranged within a merged window prior to reverting to the split screen mode. FIG. 6E illustrates a merged window 630 with a merged set of tabs 631 in response to a change of at least dimension of the display area 613 of the device 100 from FIG. 6A. In FIG. 6E, a first edge 606-A of the display area 613 of the portable multifunction device 100 corresponds to the dimension 604, and a second edge 606-B of the device 100 corresponds to the dimension 602. For example, in FIG. 6E, the dimension 602 is greater than the dimension 604. As such, the device 100 changed from landscape orientation in FIG. 6A to portrait orientation in FIG. 6E.

FIG. 6E is similar to and adapted from FIG. 6B. As such, FIG. 6B and FIG. 6E include common reference numbers and only the differences are described herein for the sake of brevity. As shown in FIG. 6E, the merged set of tabs 631 is separated by a virtual divider 640 (e.g., an invisible line) between tabs 608-D and 608-A, which corresponds to the divider 614 between the first set of tabs 625 in the first window 610 and the second set of tabs 627 in the second window 612 in FIG. 6A. Furthermore, the merged set of tabs 631 have the same order (e.g., horizontally or left-to-right) as the first set of tabs 625 and the second set of tabs 627 in FIG. 6A. FIG. 6E also shows a dragging gesture with a contact 662, where the tab 608-E is dragged across the virtual divider 640 in a second direction (e.g., right-to-left) according to a movement vector 664.

FIG. 6F illustrates the merged set of tabs 631 rearranged according to the dragging gesture in FIG. 6E. As shown in FIG. 6F, the merged set of tabs 631 is separated by the virtual divider 640 (e.g., an invisible line) between tabs 608-E and 608-A. In FIG. 6F, the tab bar 634 includes the merged set of tabs 631 with tabs 608-B, 608-D, 608-E, 608-A, and 608-C in left-to-right order. In FIG. 6F, the address bar 638 includes the URL 654 for the web page associated with the tab 608-E, and the content region 636 includes the content 656 for the web page associated with the tab 608-E. As such, in FIG. 6F, the tab 608-E is active or in the foreground in the merged window 630.

FIG. 6G illustrates the first window 610 with a third set of tabs 645 and the second window 612 with a fourth set of tabs 647 in the split screen mode in response to a change of at least dimension of the display area 613 of the device 100 from FIG. 6F. In FIG. 6G, a first edge 606-A of the display area 613 of the portable multifunction device 100 corresponds to the dimension 602, and a second edge 606-B of the device 100 corresponds to the dimension 604. For example, in FIG. 6G, the dimension 602 is less than the dimension 604. As such, the device 100 changed from portrait orientation in FIG. 6F to landscape orientation in FIG. 6G.

As shown in FIG. 6G, the tab bar 616-A includes the third set of tabs 645 with the tabs 608-B, 608-D, and 608-E in left-to-right order. In FIG. 6G, the address bar 620-A includes the URL 654 for the web page associated with the tab 608-E, and the content region 618-A includes the content 656 for the web page associated with the tab 608-E. As such, in FIG. 6G, the tab 608-E is active or in the foreground in the first window 610.

As shown in FIG. 6G, the tab bar 616-B includes the fourth set of tabs 647 with tabs 608-A and 608-C in left-to-right order. In FIG. 6G, the address bar 620-B includes the URL 626 for the web page associated with the tab 608-C, and the content region 618-B includes the content 628 for the web page associated with the tab 608-C. As such, in FIG. 6G, the tab 608-C is active or in the foreground in the second window 612.

Thus, after rearranging the merged set of tabs 631 by dragging the tab 608-E across the virtual divider 640 in the second direction (e.g., right-to-left) in FIG. 6E, the fourth set of tabs 647 no longer includes the tab 608-E as compared to the second set of tabs 627 in FIG. 6A. And, after rearranging the merged set of tabs 631 by dragging the tab 608-E across the virtual divider 640 in the second direction (e.g., right-to-left) in FIG. 6E, the third set of tabs 645 includes the tab 608-E as compared to first set of tabs 625 in FIG. 6A.

Figure 6H:
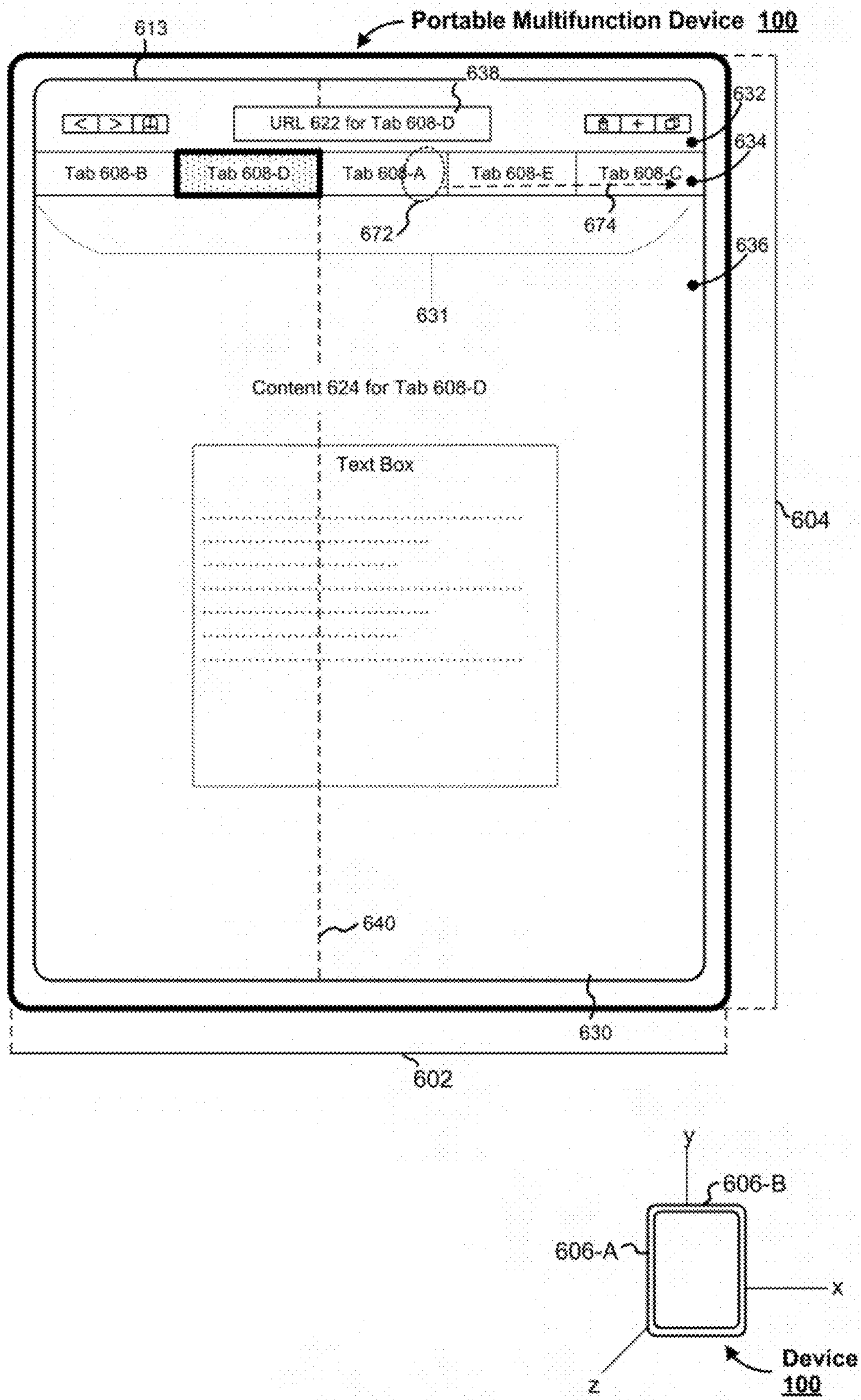
Figure 6I:
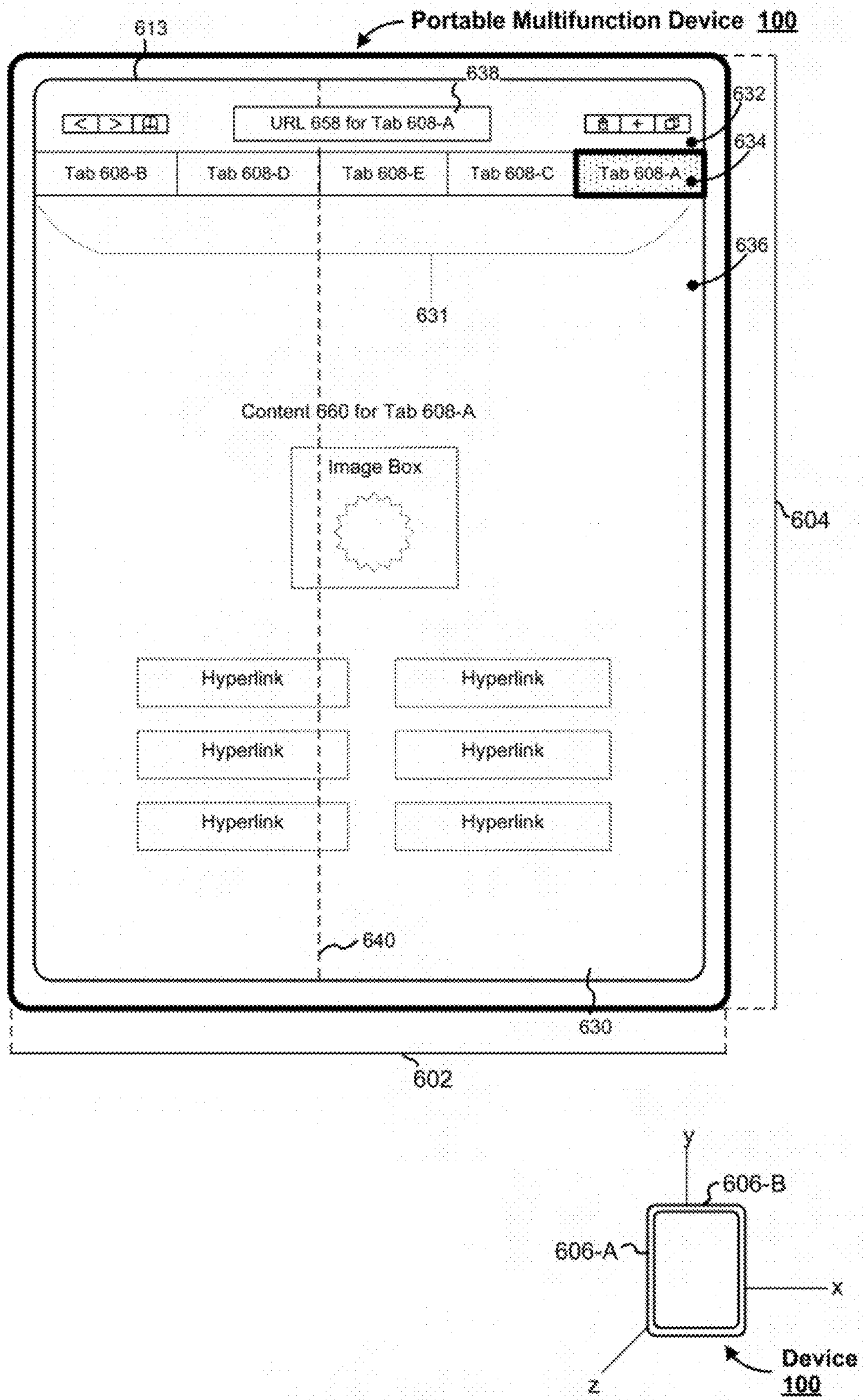
Figure 6J:
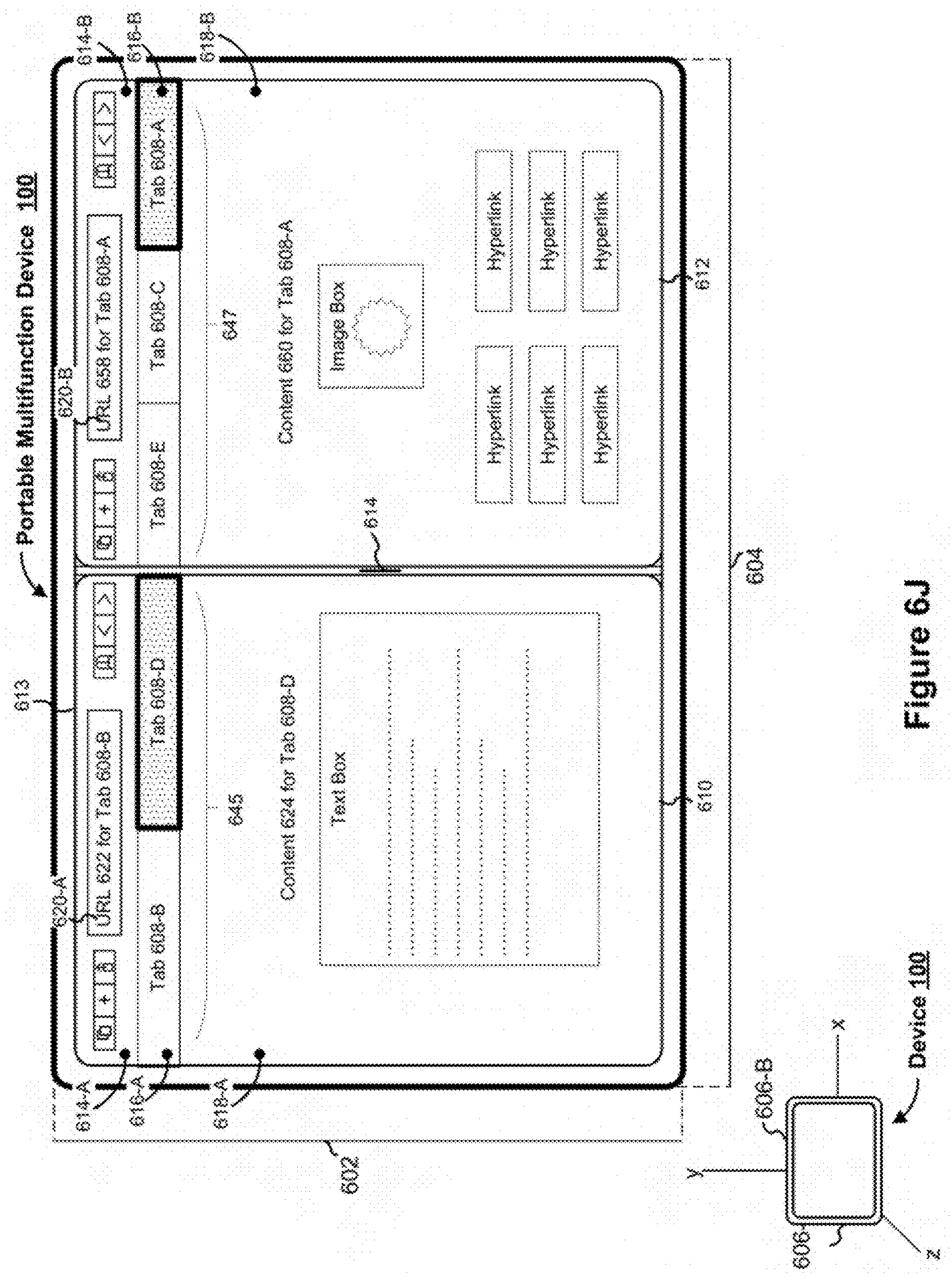

FIGS. 6H-6J illustrate a third sequence in which tabs are rearranged within a merged window prior to reverting to the split screen mode. FIG. 6H illustrates a merged window 630 with a merged set of tabs 631 in response to a change of at least dimension of the display area 613 of the device 100 from FIG. 6A. In FIG. 6H, a first edge 606-A of the display area 613 of the portable multifunction device 100 corresponds to the dimension 604, and a second edge 606-B of the device 100 corresponds to the dimension 602. For example, in FIG. 6H, the dimension 602 is greater than the dimension 604. As such, the device 100 changed from landscape orientation in FIG. 6A to portrait orientation in FIG. 6H.

FIG. 6H is similar to and adapted from FIG. 6B. As such, FIG. 6B and FIG. 6H include common reference numbers and only the differences are described herein for the sake of brevity. As shown in FIG. 6H, the merged set of tabs 631 is separated by a virtual divider 640 (e.g., an invisible line) between tabs 608-D and 608-A, which corresponds to the divider 614 between the first set of tabs 625 in the first window 610 and the second set of tabs 627 in the second window 612 in FIG. 6A. Furthermore, the merged set of tabs 631 have the same order (e.g., horizontally or left-to-right) as the first set of tabs 625 and the second set of tabs 627 in FIG. 6A. FIG. 6H also shows a dragging gesture with a contact 672, where the tab 608-A is dragged toward a right edge of the display area 613 without crossing the virtual divider 640 according to a movement vector 674.

FIG. 6I illustrates the merged set of tabs 631 rearranged according to the dragging gesture in FIG. 6H. As shown in FIG. 6I, the merged set of tabs 631 is separated by the virtual divider 640 (e.g., an invisible line) between tabs 608-D and 608-E. In FIG. 6I, the tab bar 634 includes the merged set of tabs 631 with tabs 608-B, 608-D, 608-E, 608-C, and 608-A in left-to-right order. In FIG. 6I, the address bar 638 includes the URL 658 for the web page associated with the tab 608-A, and the content region 636 includes the content 660 for the web page associated with the tab 608-A. As such, in FIG. 6I, the tab 608-A is active or in the foreground in the merged window 630.

FIG. 6J illustrates the first window 610 with a third set of tabs 645 and the second window 612 with a fourth set of tabs 647 in the split screen mode in response to a change of at least dimension of the display area 613 of the device 100 from FIG. 6I. In FIG. 6J, a first edge 606-A of the display area 613 of the portable multifunction device 100 corresponds to the dimension 602, and a second edge 606-B of the device 100 corresponds to the dimension 604. For example, in FIG. 6J, the dimension 602 is less than the dimension 604. As such, the device 100 changed from portrait orientation in FIG. 6I to landscape orientation in FIG. 6J.

As shown in FIG. 6J, the tab bar 616-A includes the third set of tabs 645 with the tabs 608-B and 608-D in left-to-right order. In FIG. 6J, the address bar 620-A includes the URL 622 for the web page associated with the tab 608-D, and the content region 618-A includes the content 624 for the web page associated with the tab 608-D. As such, in FIG. 6J, the tab 608-D is active or in the foreground in the first window 610.

As shown in FIG. 6J, the tab bar 616-B includes the fourth set of tabs 647 with tabs 608-E, 608-C, and 608-A in left-to-right order. In FIG. 6J, the address bar 620-B includes the URL 658 for the web page associated with the tab 608-A, and the content region 618-B includes the content 660 for the web page associated with the tab 608-A. As such, in FIG. 6J, the tab 608-A is active or in the foreground in the second window 612.

Thus, after rearranging the merged set of tabs 631 by dragging the tab 608-A toward an edge of the display area 613 without crossing the virtual divider 640 in FIG. 6H, the third set of tabs 645 and the fourth set of tabs 647 include the same tabs in FIG. 6J as compared to the first set of tabs 625 and the second set of tabs 627, respectively, in FIG. 6A.

FIGS. 7A-7KK illustrate example user interfaces for opening hyperlinks in split view mode in accordance with some embodiments. The user interfaces in these figures are used to illustrate the processes described below, including the processes in FIGS. 9A-9C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 7A:
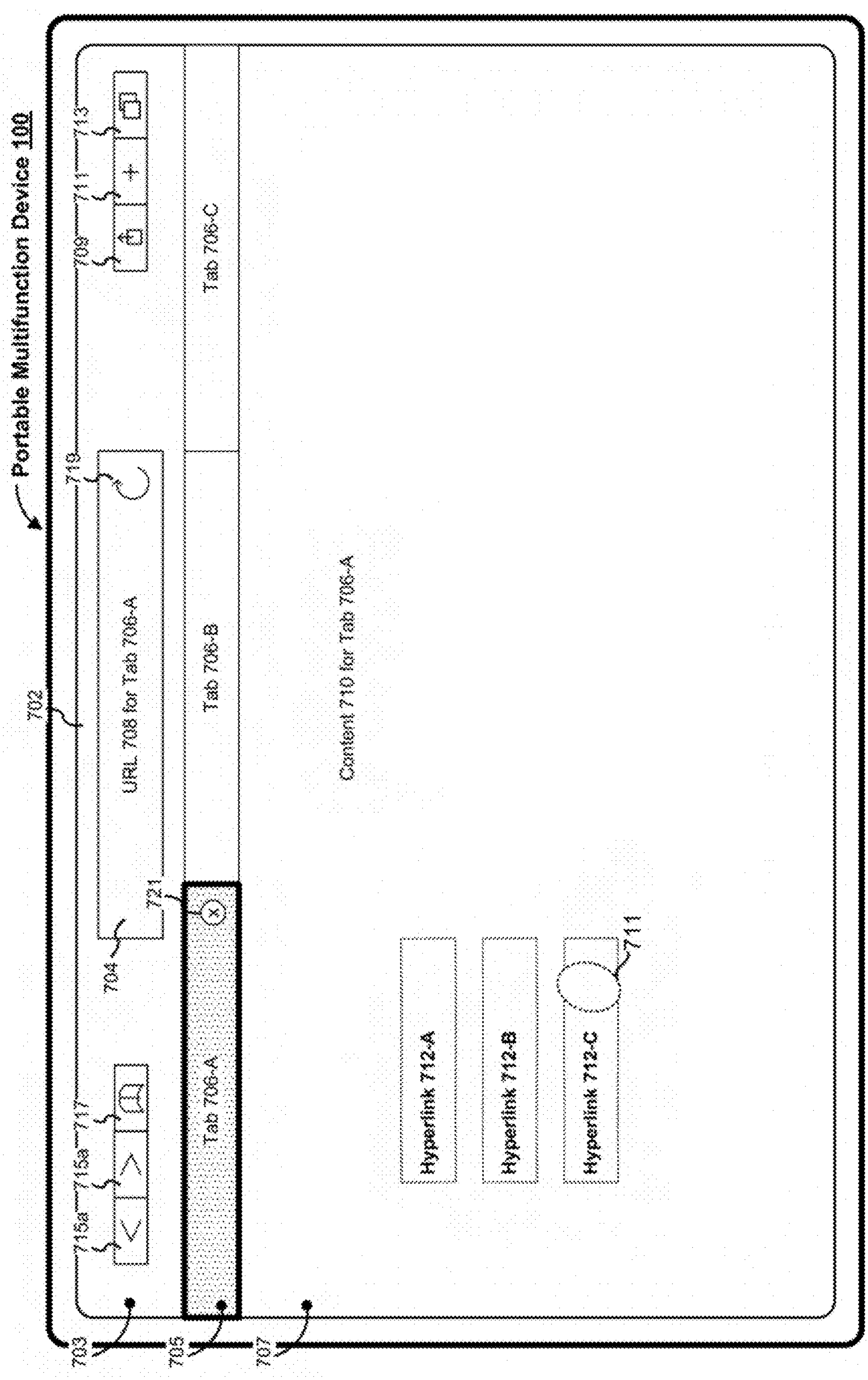
FIGS. 7A-7KK illustrate example user interfaces for opening hyperlinks in split view mode in accordance with some embodiments.
Figure 7B:
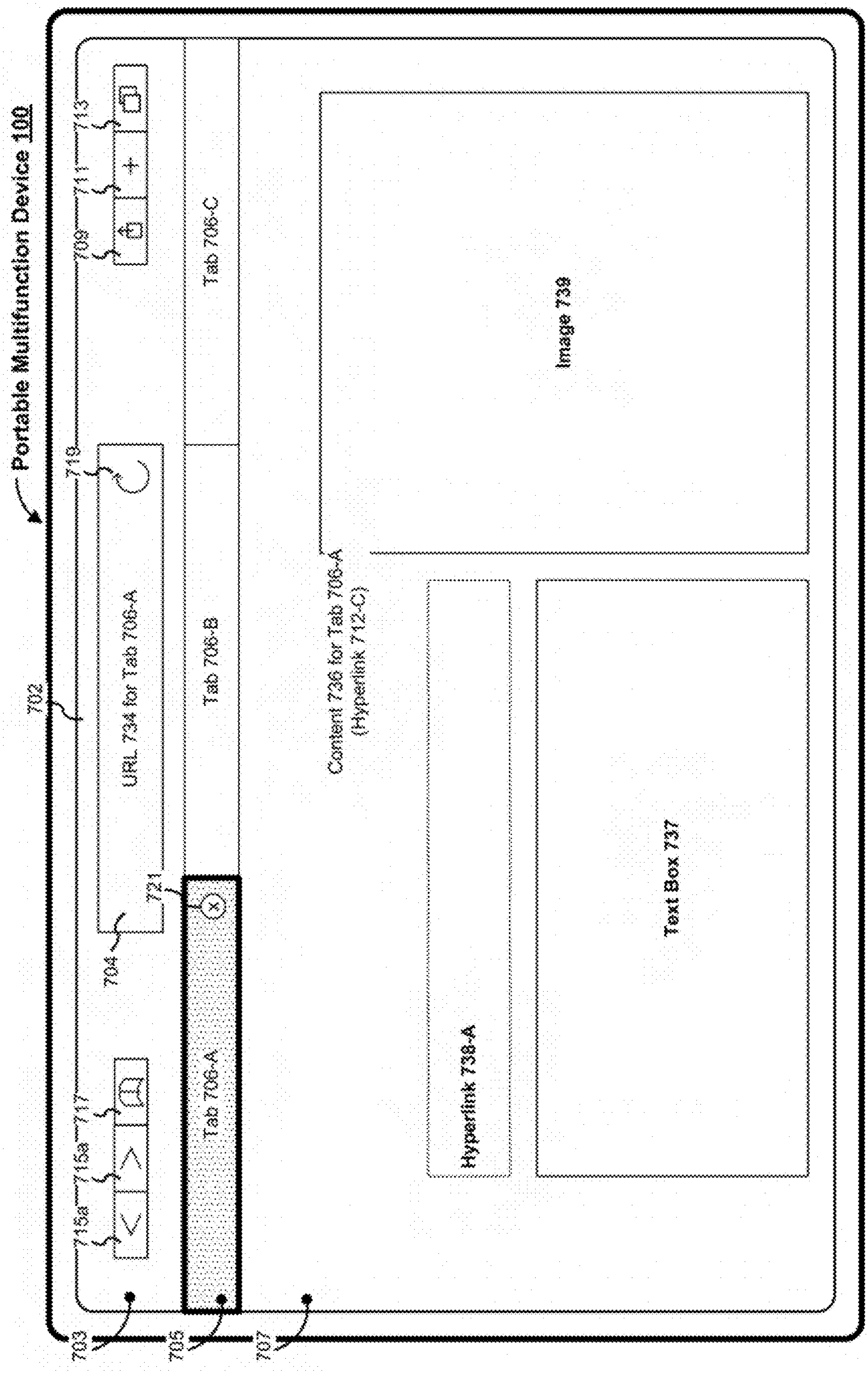

FIGS. 7A-7B illustrate a sequence in which content associated with a hyperlink in a window in full screen mode is opened in the window in full screen mode. FIG. 7A illustrates a window 702 in full screen mode with a chrome region 703, a tab bar 705, and a content region 707. For example, the window 702 is associated with an instance of a web browser application. FIG. 7A shows the window 702 displayed within a display area of the portable multifunction device 100 (e.g., associated with a touch screen) in a browser view. For example, the display or touchscreen of the device 100 defines the dimensions of the display area.

In some embodiments, the window 702 is associated with an instance of a web browser application, an email application, a messaging application, a document viewing application, a document processing application, or the like. In some embodiments, the content 710 displayed in the window 702 is associated with an electronic document such as a web page, a text file, an electronic mail message, an SMS, or the like.

In FIG. 7A, the tab bar 705 includes a plurality of tabs 706-A, 706-B, and 706-C. In FIG. 7A, the address bar 704 includes the URL (uniform resource locator) 708 for a web page associated with the tab 706-A, and the content region 707 includes the content 710 for the web page associated with the tab 706-A. As such, in FIG. 7A, the tab 706-A is active or in the foreground. In FIG. 7A, the 706-B and 706-C are inactive or in the background. As shown in FIG. 7A, the content 710 includes a plurality of hyperlinks 712-A, 712-B, and 712-C.

In some embodiments, new tabs are added to the tab bar 705 by opening new web pages or opening new tabs (e.g., by a combination of keystrokes such as Crtl+T). According to some embodiments, selection of an inactive/background tab causes the selected tab to become an active/foreground tab and also causes the previously active tab to become an inactive/background tab. In some cases, each tab is associated with a different web page or tabbed window. In some embodiments, each tab is associated with its own browsing history. In some embodiments, the user of the device 100 has the option to close a tab (e.g., by selecting affordance 721 in FIG. 7A or a combination of keystrokes such as Crtl+W). When a tab is closed, the corresponding tab is removed from the tab bar 705. According to some embodiments, the web pages associated with the tabs are all concurrently open, even though the background tabs are not displayed on the user interface.

In FIG. 7A, the chrome region 703 includes the address bar 704 with a refresh affordance 719, which, when activated (e.g., with a contact), causes the web page associated with the tab 706-A to be reloaded or refreshed. The chrome region 703 also includes a plurality of affordances including: a share affordance 709, which, when activated (e.g., with a contact), causes the web page associated with the tab 706-A to be shared with one or more contacts via email, SMS, a social media network, and/or the like; an addition affordance 711, which, when activated (e.g., with a contact), causes display of a menu with options to add a new tab to the window 702 or open a new window; a tab affordance 713, which, when activated (e.g., with a contact), causes the window 702 to transition from browser view to tab view; a back affordance 715*a*, which, when activated (e.g., with a contact), causes a previous web page to be displayed in the tab 706-A; a forward affordance 715*b*, which, when activated (e.g., with a contact), causes a next web page to be displayed in the tab 706-A; and a read list/bookmark affordance 717, which, when activated (e.g., with a contact), causes the web page associated with the tab 706-A to be added to a reading list or to be bookmarked.

FIG. 7A also illustrates a contact 711 (e.g., a one finger tap gesture) detected at a location corresponding to the hyperlink 712-C. FIG. 7B shows content 736 for web page associated with the hyperlink 712-C in the content region 707 of the window 702 in full screen mode in response to selection of the hyperlink 712-C in FIG. 7A. In FIG. 7B, the content 736 includes a hyperlink 738-A, a text box 737, and an image 739. FIG. 7B also shows the URL 734 for web page associated with the hyperlink 712-C in the address box 704.

Figure 7C:
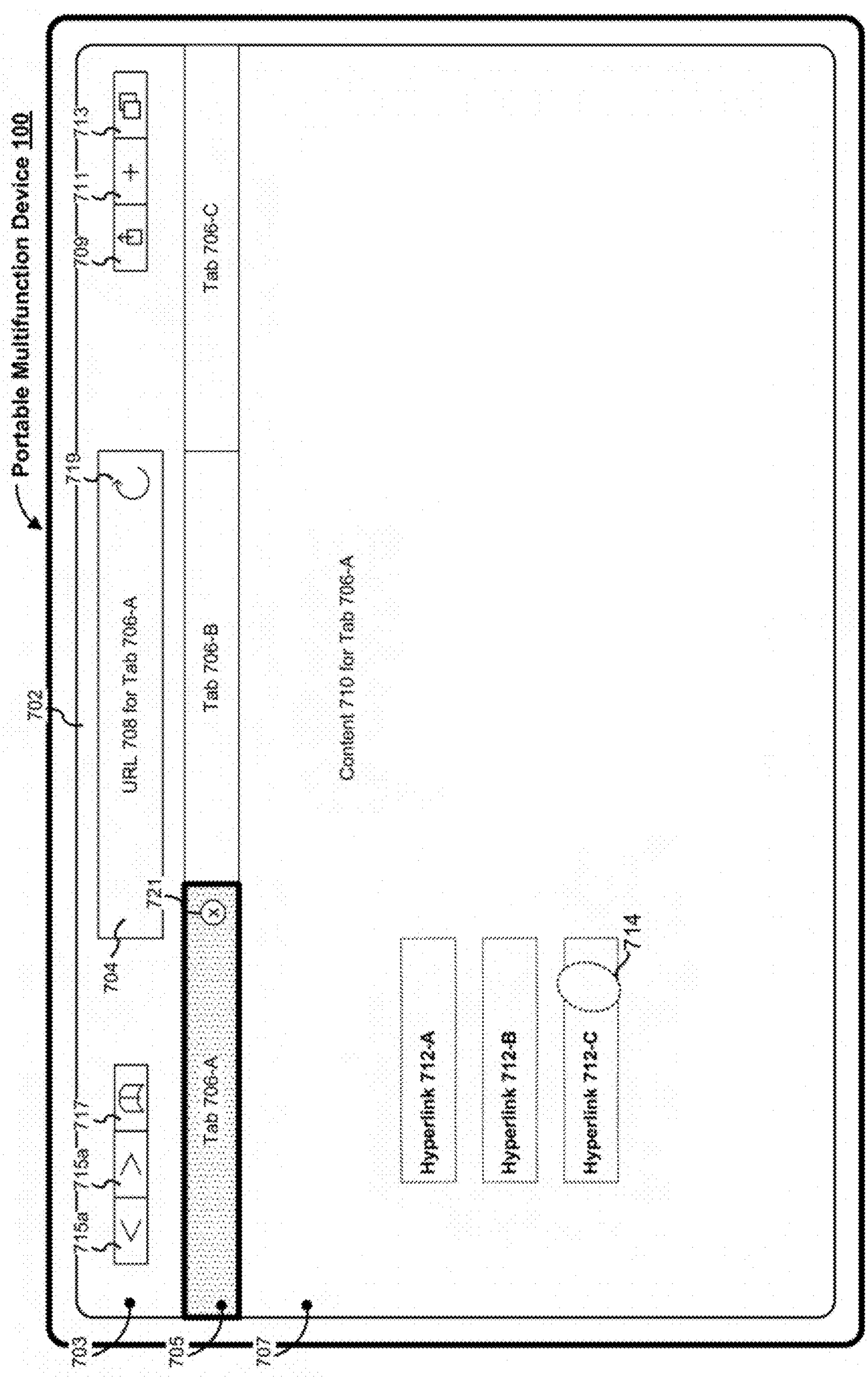
Figure 7D:
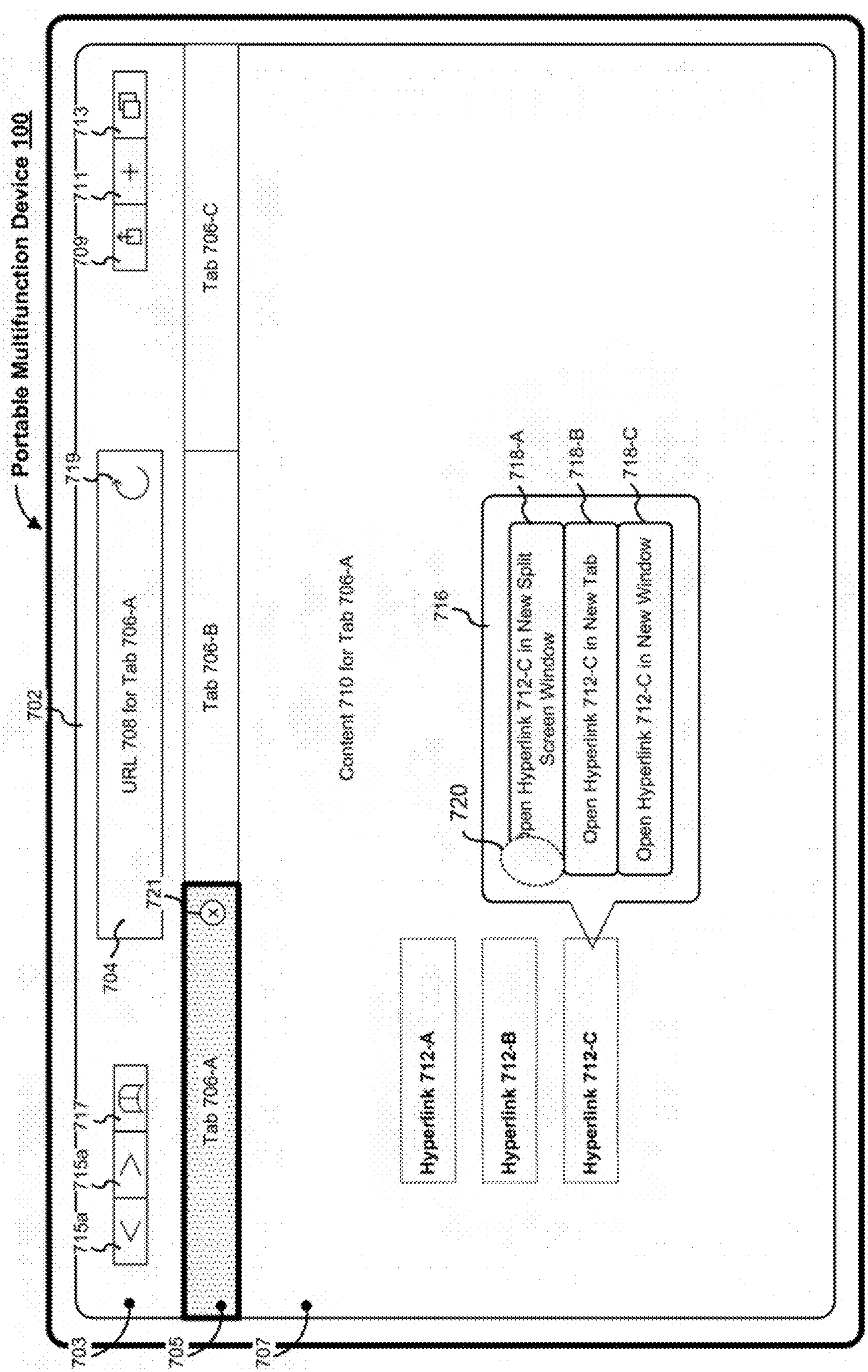
Figure 7E:
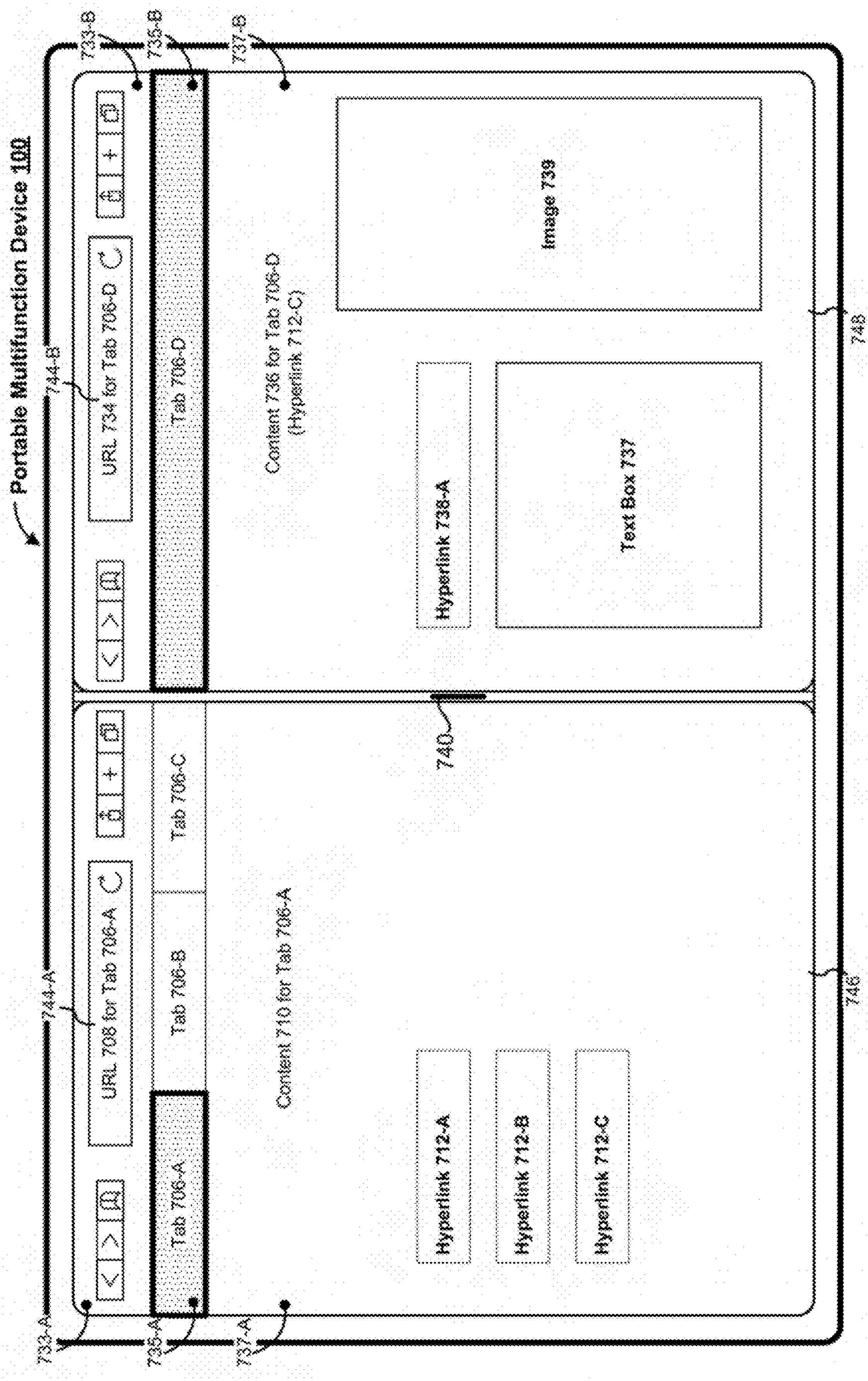

FIGS. 7C-7E illustrate a sequence in which content associated with a hyperlink in a window in full screen mode is opened in a second window in split screen mode. FIG. 7C is similar to and adapted from FIG. 7A. As such, FIG. 7A and FIG. 7C include common reference numbers and only the differences are described herein for the sake of brevity. FIG. 7C illustrates a gesture with a contact 714 (e.g., a one finger long press gesture) detected at a location corresponding to the hyperlink 712-C.

FIG. 7D illustrates a menu 716 overlaid on the window 702 in response to the one finger long press gesture in FIG. 7C. In FIG. 7D, the menu 716 includes: a first affordance 718-A, which, when activated (e.g., with a contact), causes the content associated with the hyperlink 712-C to be displayed in a new partial screen window in split screen mode; a second affordance 718-B, which, when activated (e.g., with a contact), causes the tab 706-A to become a background tab and also causes content associated with the hyperlink 712-C to be displayed in a new tab in the foreground in the window 702 in full screen mode; and a third affordance 718-C, which, when activated (e.g., with a contact), causes the content associated with the hyperlink 712-C to be displayed in a new window in full screen mode. FIG. 7D also illustrates a contact 720 detected at a location corresponding to the first affordance 718-A.

FIG. 7E illustrates a first window 746 and a second window 748 in a split screen mode in response to selection of the first affordance 718-A in FIG. 7D. For example, the first window 746 and the second window 748 are associated with different instances of the web browser application. FIG. 7E shows the first window 746 and the second window 748 in the browser view.

In some embodiments, the first window 746 is associated with an instance of a web browser application, an email application, a messaging application, a document viewing application, a document processing application, or the like. In some embodiments, the first content 710 displayed in the first window 746 is associated with an electronic document such as a web page, a text file, an electronic mail message, an SMS, or the like. In some embodiments, the second window 748 is associated with an instance of a web browser application, an email application, a messaging application, a document viewing application, a document processing application, or the like. In some embodiments, the second content 736 displayed in the second window 748 is associated with an electronic document such as a web page, a text file, an electronic mail message, an SMS, or the like.

In FIG. 7E, the first window 746 includes a chrome region 733-A, a tab bar 735-A, and a content region 737-A. The tab bar 735-A includes tabs 706-A, 706-B and 706-C. In FIG. 7E, the address bar 744-A includes the URL 708 for the web page associated with the tab 706-A, and the content region 737-A includes the content 710 for the web page associated with the tab 706-A. As such, in FIG. 7E, the tab 706-A is active or in the foreground in the first window 746. For example, the chrome region 733-A includes similar affordances to those in the chrome region 703 in FIGS. 7C-7D.

In FIG. 7E, the second window 748 includes a chrome region 733-B, a tab bar 735-B, and a content region 737-B. The tab bar 735-B includes the tab 706-D. As shown in FIG. 7E, the second window 748 shows content 736 for the web page associated with the hyperlink 712-C in FIGS. 7C-7D. In FIG. 7E, the content 736 includes a hyperlink 738-A, a text box 737, and an image 739. FIG. 7E also shows the URL 734 for the web page associated with the hyperlink 712-C in the address box 744-B. As such, in FIG. 7E, the tab 706-D is active or in the foreground in the second window 748. For example, the chrome region 733-B includes similar affordances to those in the chrome region 703 in FIGS. 7C-7D. FIG. 7E also illustrates a divider 740 between the first window 746 and the second window 748. For example, the user of the device 100 is able to resize the first window 746 and the second window 748 by dragging the divider 740.

Figure 7F:
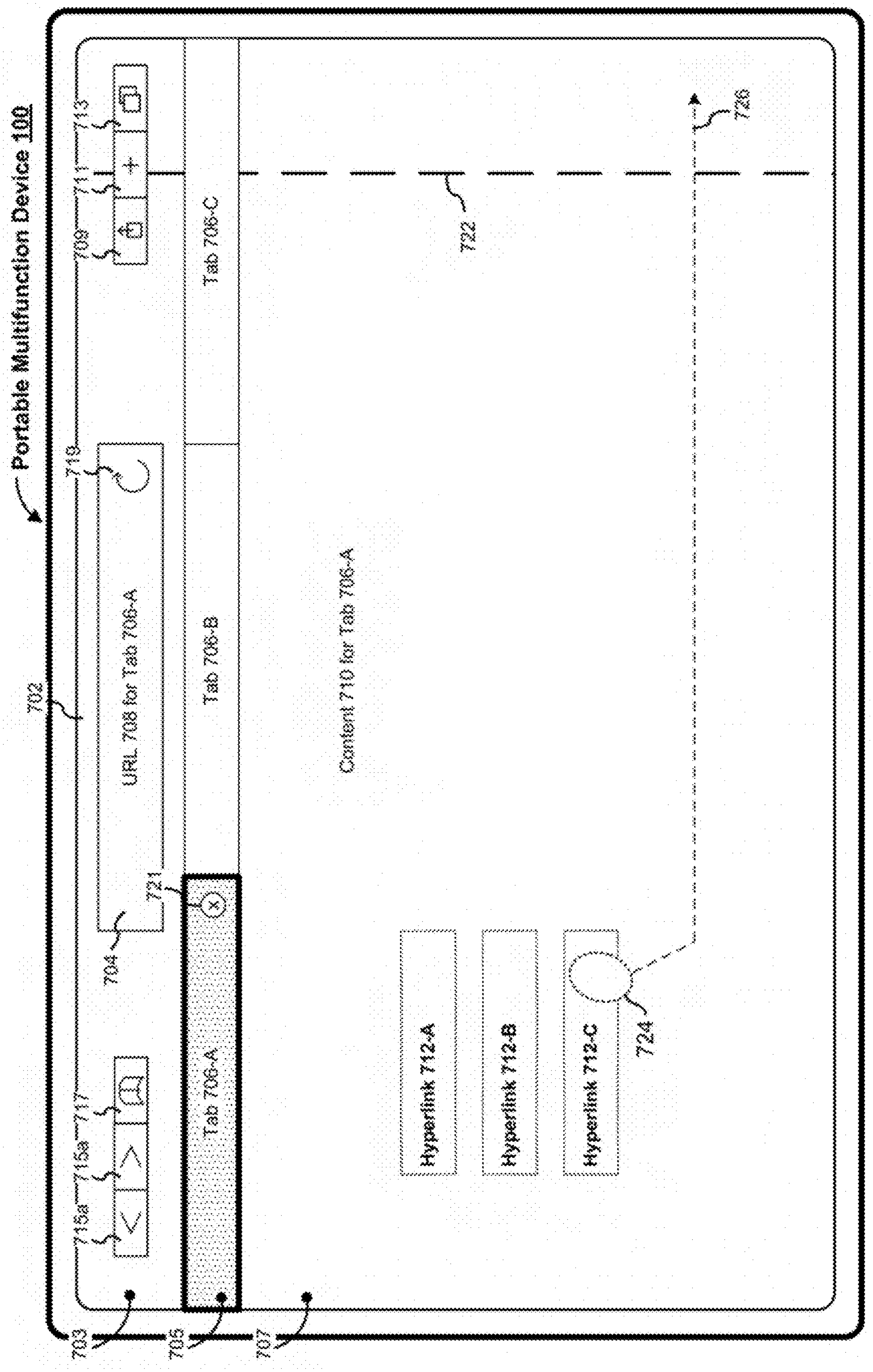
Figure 7G:
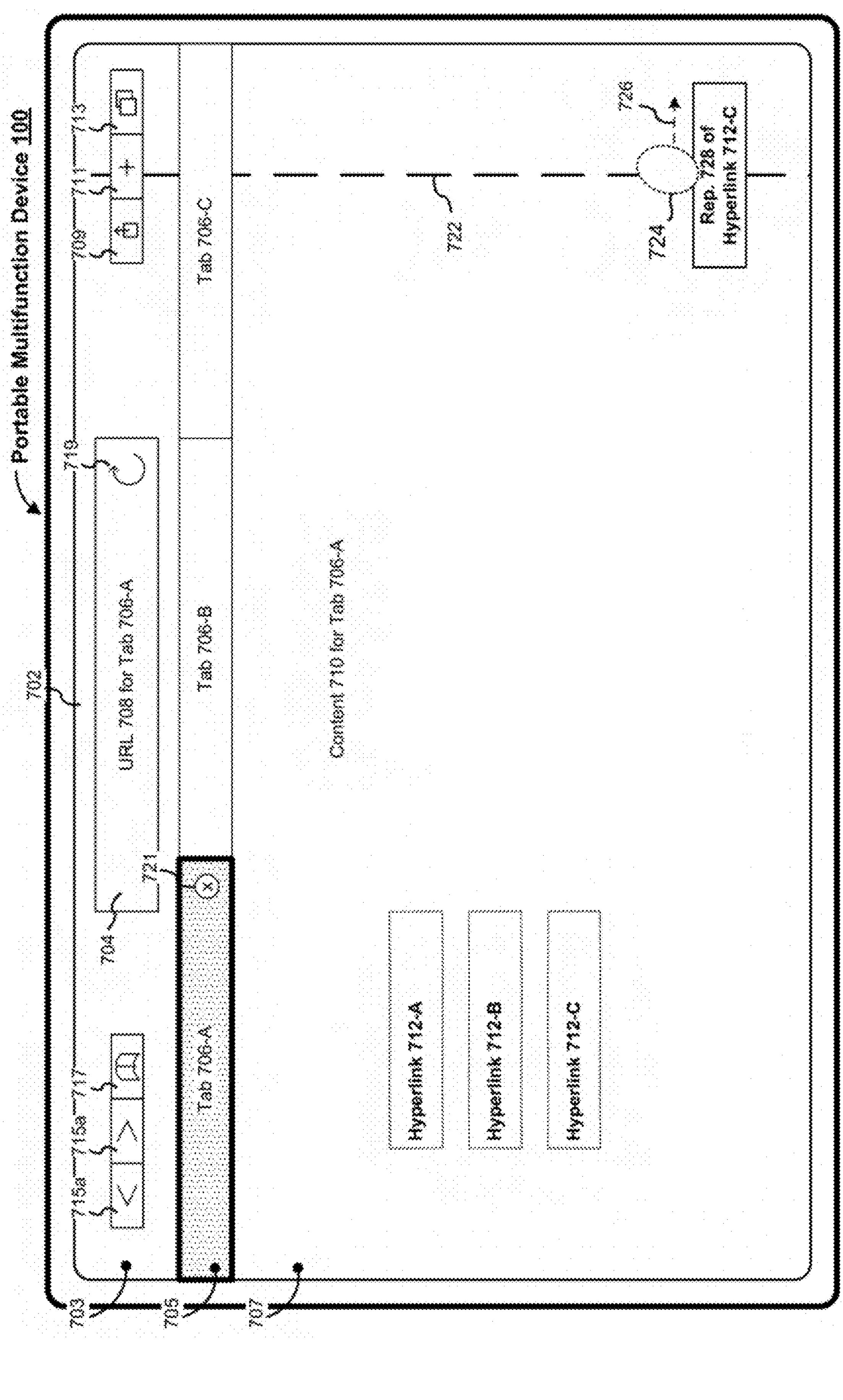
Figure 7H:
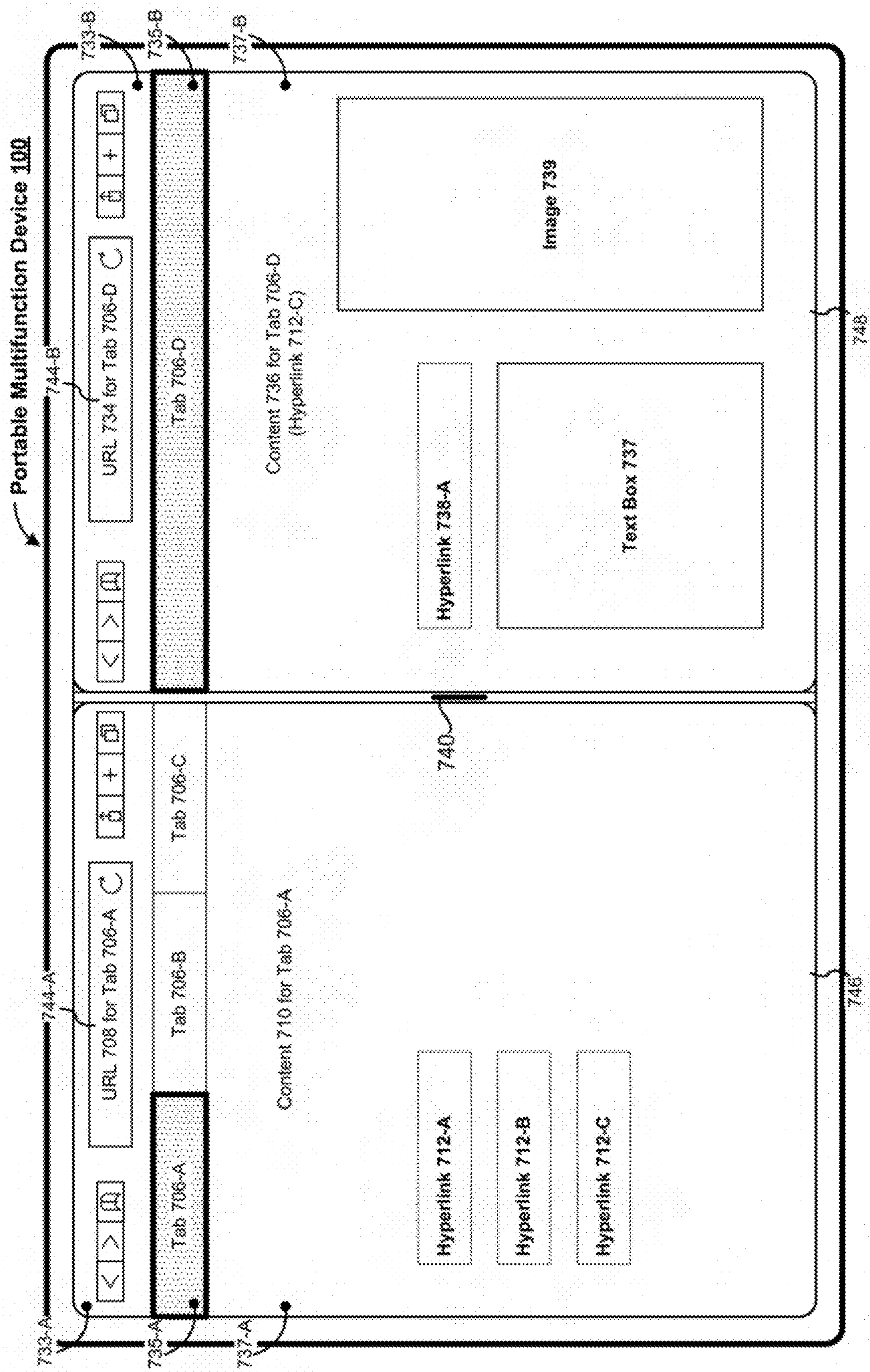

FIGS. 7F-7H illustrate another sequence in which content associated with a hyperlink in a window in full screen mode is opened in a second window in split screen mode. FIG. 7F is similar to and adapted from FIG. 7A. As such, FIG. 7A and FIG. 7F include common reference numbers and only the differences are described herein for the sake of brevity. FIG. 7F illustrates a dragging gesture with a contact 724, where the hyperlink 712-C is dragged over a threshold line 722 according to a movement vector 726.

FIG. 7G illustrates a graphical representation 728 of the hyperlink 712-C over the threshold line 722. For example, the graphical representation 728 is a thumbnail or snapshot of the content 736 for the web page associated with the hyperlink 712-C. In another example, the graphical representation 728 is an icon representing the hyperlink 712-C.

FIG. 7H illustrates a first window 746 and a second window 748 in a split screen mode in response to the graphical representation 728 being dropped in a predefined region between the right edge of the display area and the threshold line 722 in FIG. 7G. FIG. 7H is similar to and adapted from FIG. 7E. As such, FIG. 7E and FIG. 7H include common reference numbers and only the differences are described herein for the sake of brevity. As shown in FIG. 7H, the second window 748 shows content 736 for the web page associated with the hyperlink 712-C in FIGS. 7F-7G. In FIG. 7H, the content 736 includes a hyperlink 738-A, a text box 737, and an image 739. FIG. 7H also shows the URL 734 for the web page associated with the hyperlink 712-C in the address box 744-B. As such, in FIG. 7H, the tab 706-D is active or in the foreground in the second window 748.

Figure 7I:
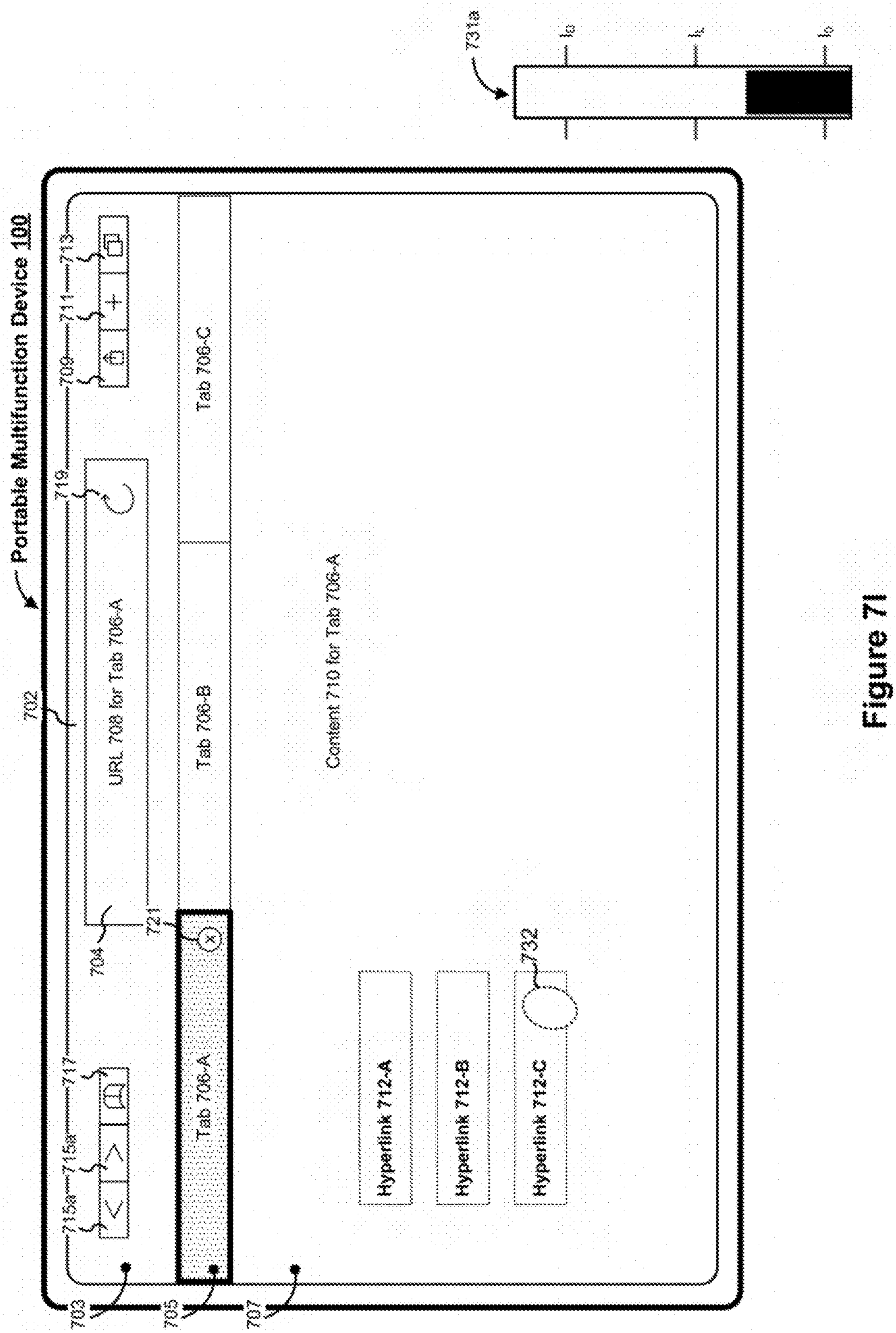
Figure 7J:
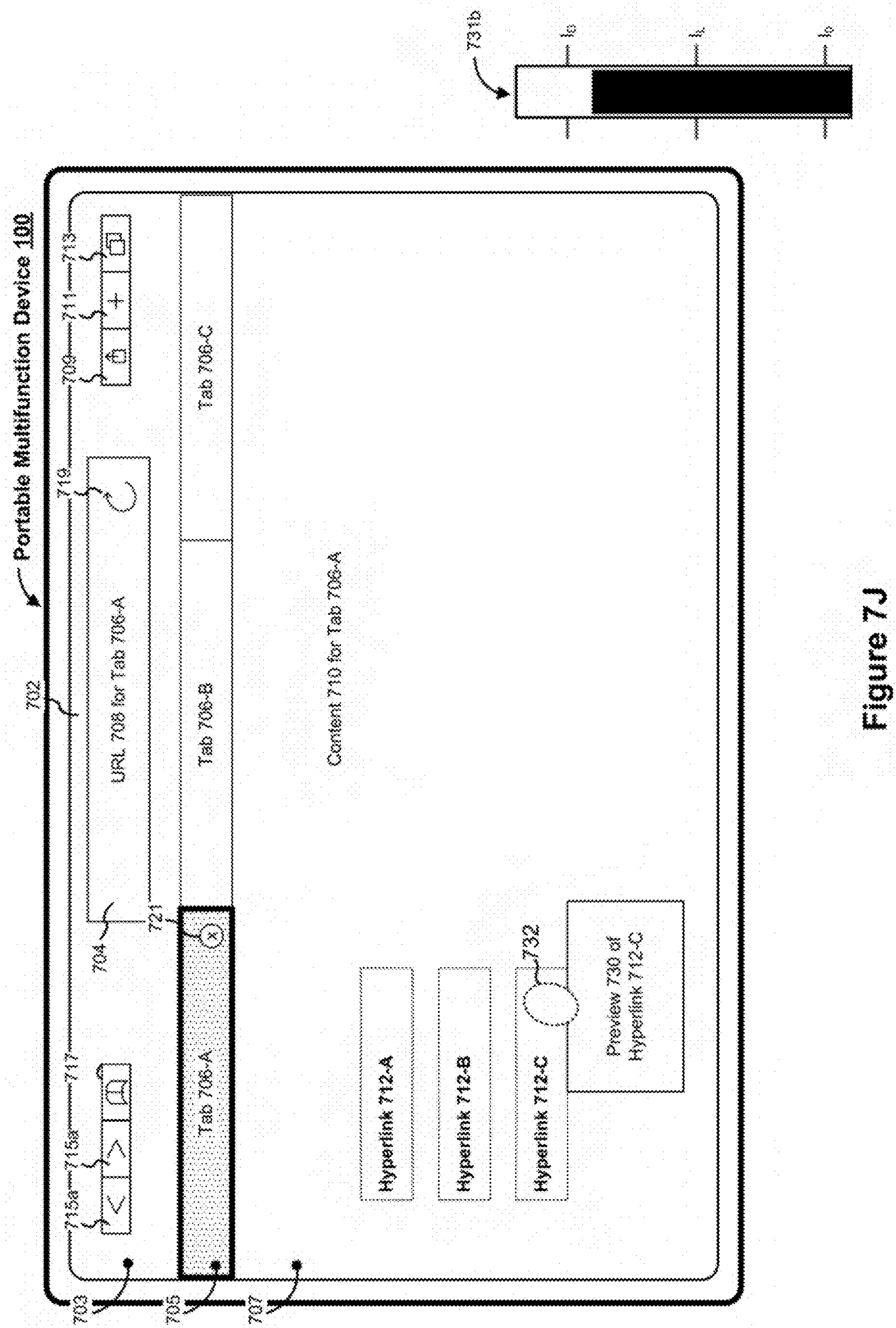
Figure 7K:
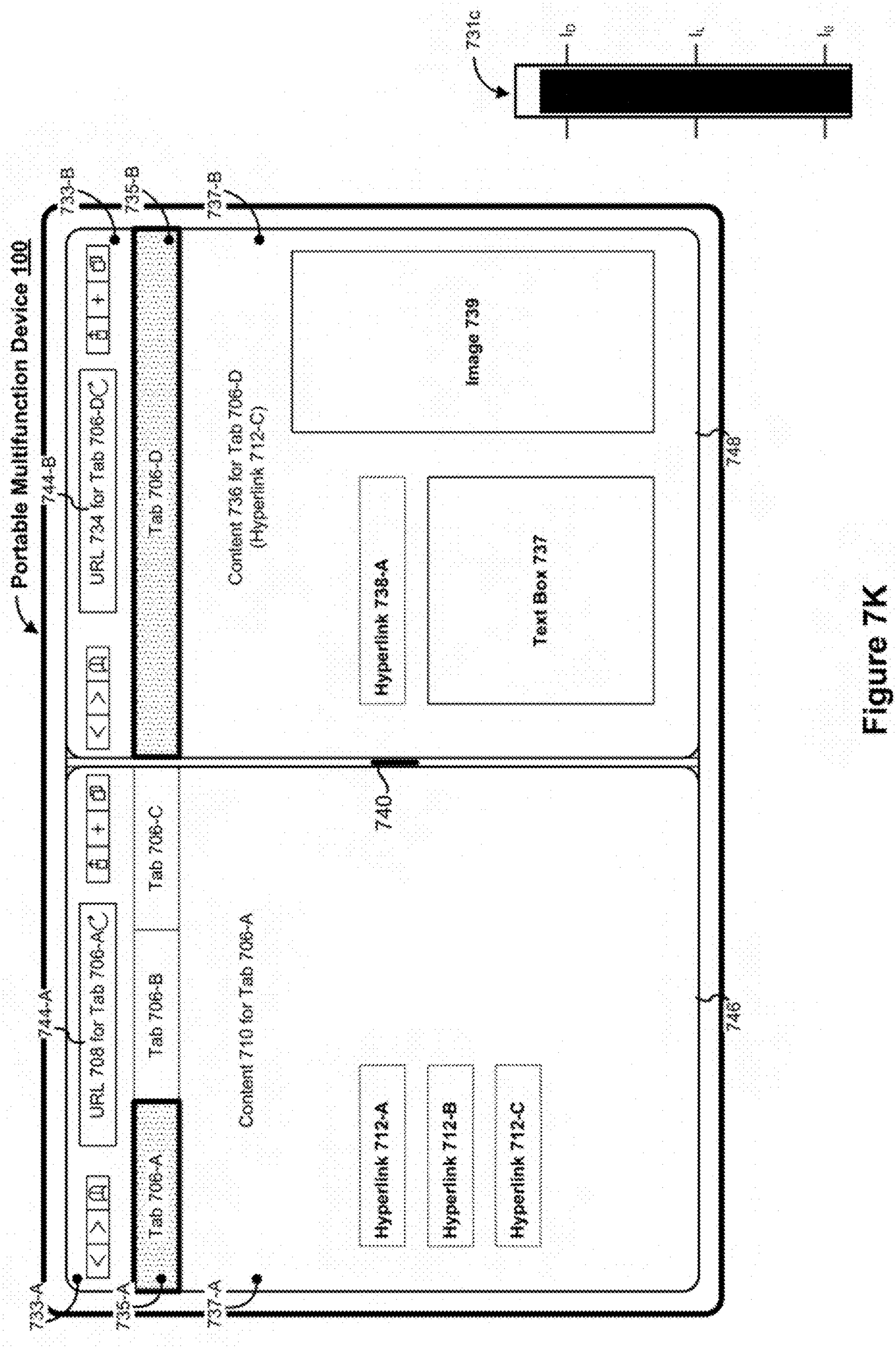

FIGS. 7I-7K illustrate yet another sequence in which content associated with a hyperlink in a window in full screen mode is opened in a second window in split screen mode. FIG. 7I is similar to and adapted from FIG. 7A. As such, FIG. 7A and FIG. 7I include common reference numbers and only the differences are described herein for the sake of brevity. FIG. 7I illustrates a contact 732 (e.g., a one finger deep press gesture) detected at a location corresponding to the hyperlink 712-C with an intensity 731*a* greater than $I_0$ and less than $I_L$. For example, the content 710 in the window 702 is maintained in response to detecting the contact 732 with the intensity 731*a*.

FIG. 7J illustrates a preview 730 of the content 736 for the web page associated with the hyperlink 712-C in response to detecting the contact 732 (e.g., the one finger press gesture) with an intensity 731*b* greater than $I_L$ and less than $I_D$. For example, the preview 730 is a thumbnail or snapshot of the content 736 for the web page associated with the hyperlink 712-C. In some embodiments, the size of the preview changes dynamically as the intensity of the contact changes (e.g., as the intensity of the contact increases, the size of the preview increases and as the intensity of the contact decreases, the size of the preview decreases).

FIG. 7K illustrates a first window 746 and a second window 748 in a split screen mode in response to detecting the contact 732 (e.g., the one finger press gesture) with an intensity 731*c* greater than $I_D$. FIG. 7K is similar to and adapted from FIG. 7E. As such, FIG. 7E and FIG. 7K include common reference numbers and only the differences are described herein for the sake of brevity. As shown in FIG. 7K, the second window 748 shows content 736 for the web page associated with the hyperlink 712-C in FIGS. 7I-7J. In FIG. 7K, the content 736 includes a hyperlink 738-A, a text box 737, and an image 739. FIG. 7K also shows the URL 734 for the web page associated with the hyperlink 712-C in the address box 744-B. As such, in FIG. 7K, the tab 706-D is active or in the foreground in the second window 748.

Figure 7L:
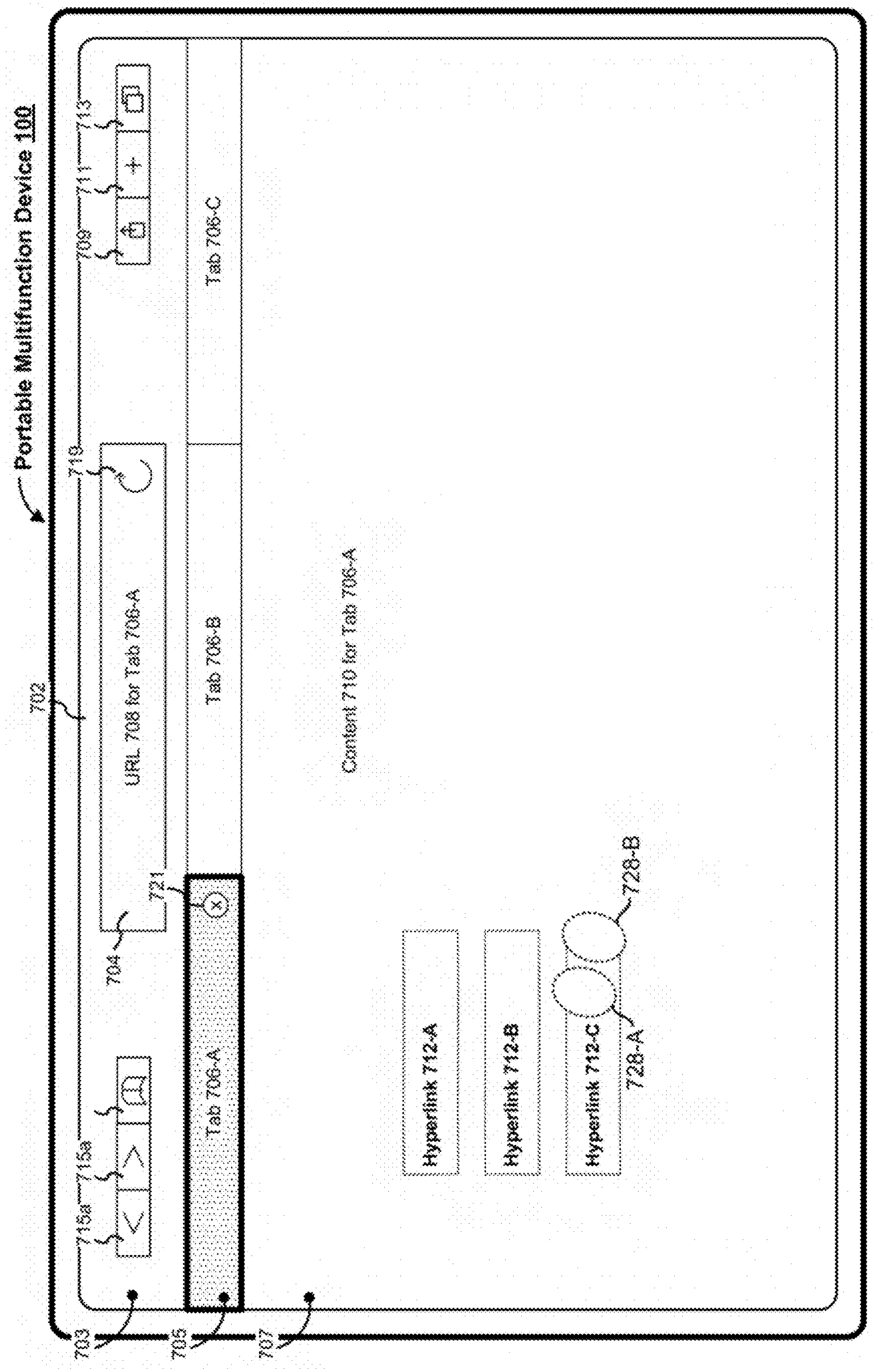
Figure 7M:
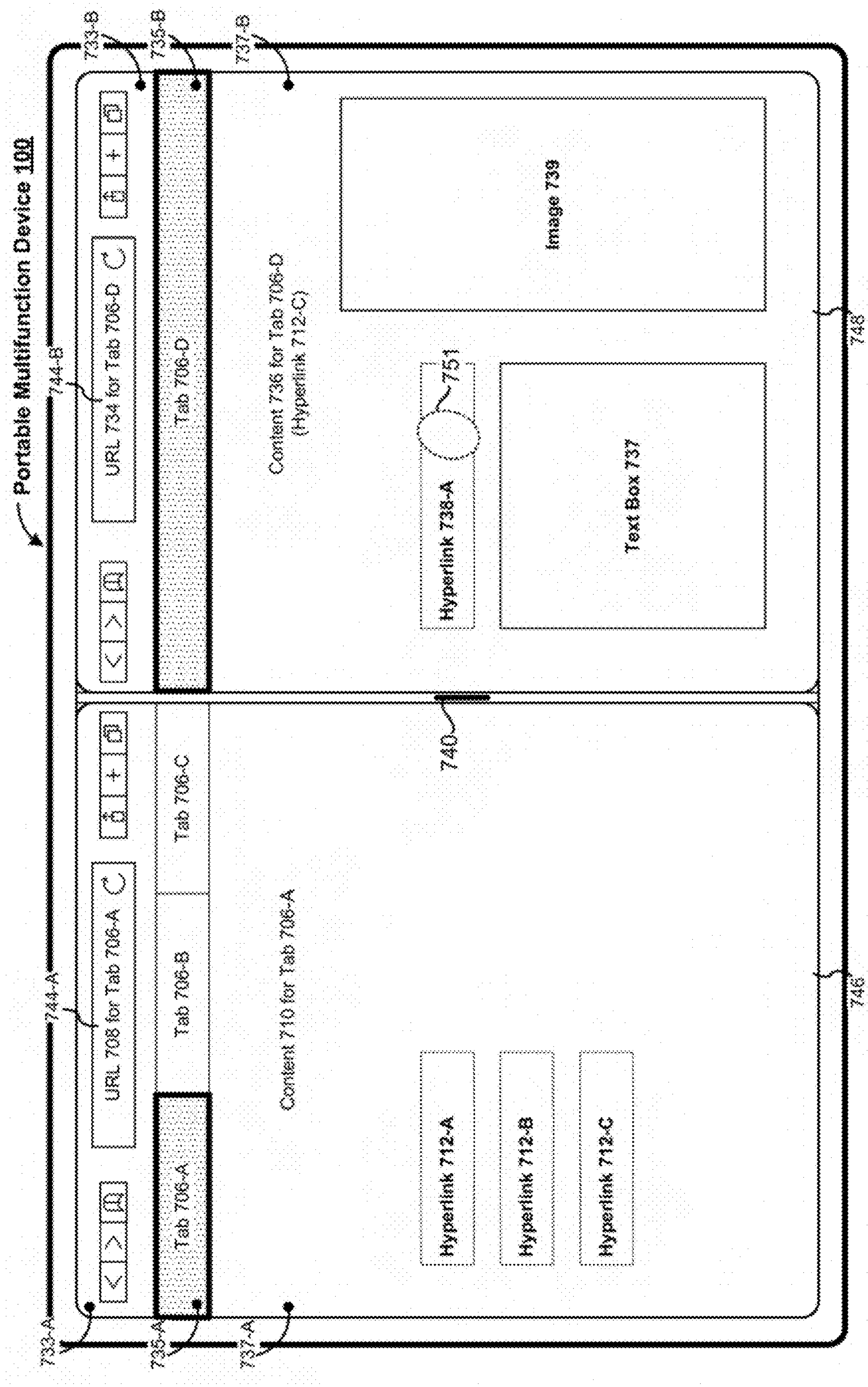

FIGS. 7L-7M illustrate yet another sequence in which content associated with a hyperlink in a window in full screen mode is opened in a second window in split screen mode. FIG. 7L is similar to and adapted from FIG. 7A. As such, FIG. 7A and FIG. 7L include common reference numbers and only the differences are described herein for the sake of brevity. FIG. 7L illustrates a gesture with contacts 728-A and 728-B (e.g., a two finger tap gesture) detected at a location corresponding to the hyperlink 712-C.

FIG. 7M illustrates a first window 746 and a second window 748 in a split screen mode in response to detecting the two finger tap gesture in FIG. 7L. FIG. 7M is similar to and adapted from FIG. 7E. As such, FIG. 7E and FIG. 7M include common reference numbers and only the differences are described herein for the sake of brevity. As shown in FIG. 7M, the second window 748 shows content 736 for the web page associated with the hyperlink 712-C in FIG. 7L. In FIG. 7M, the content 736 includes a hyperlink 738-A, a text box 737, and an image 739. FIG. 7M also shows the URL 734 for the web page associated with the hyperlink 712-C in the address box 744-B. As such, in FIG. 7M, the tab 706-D is active or in the foreground in the second window 748.

Figure 7N:
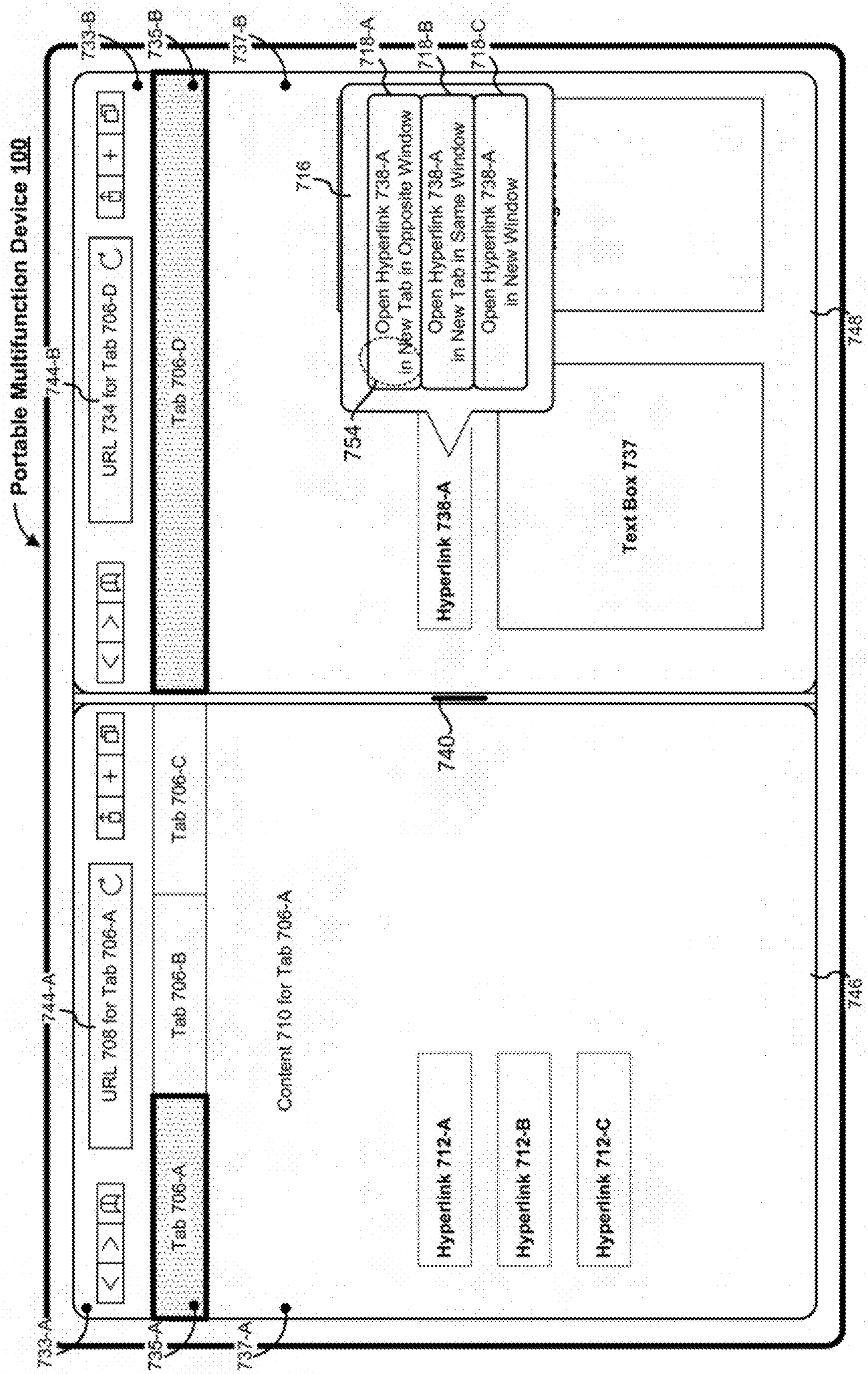
Figure 7O:
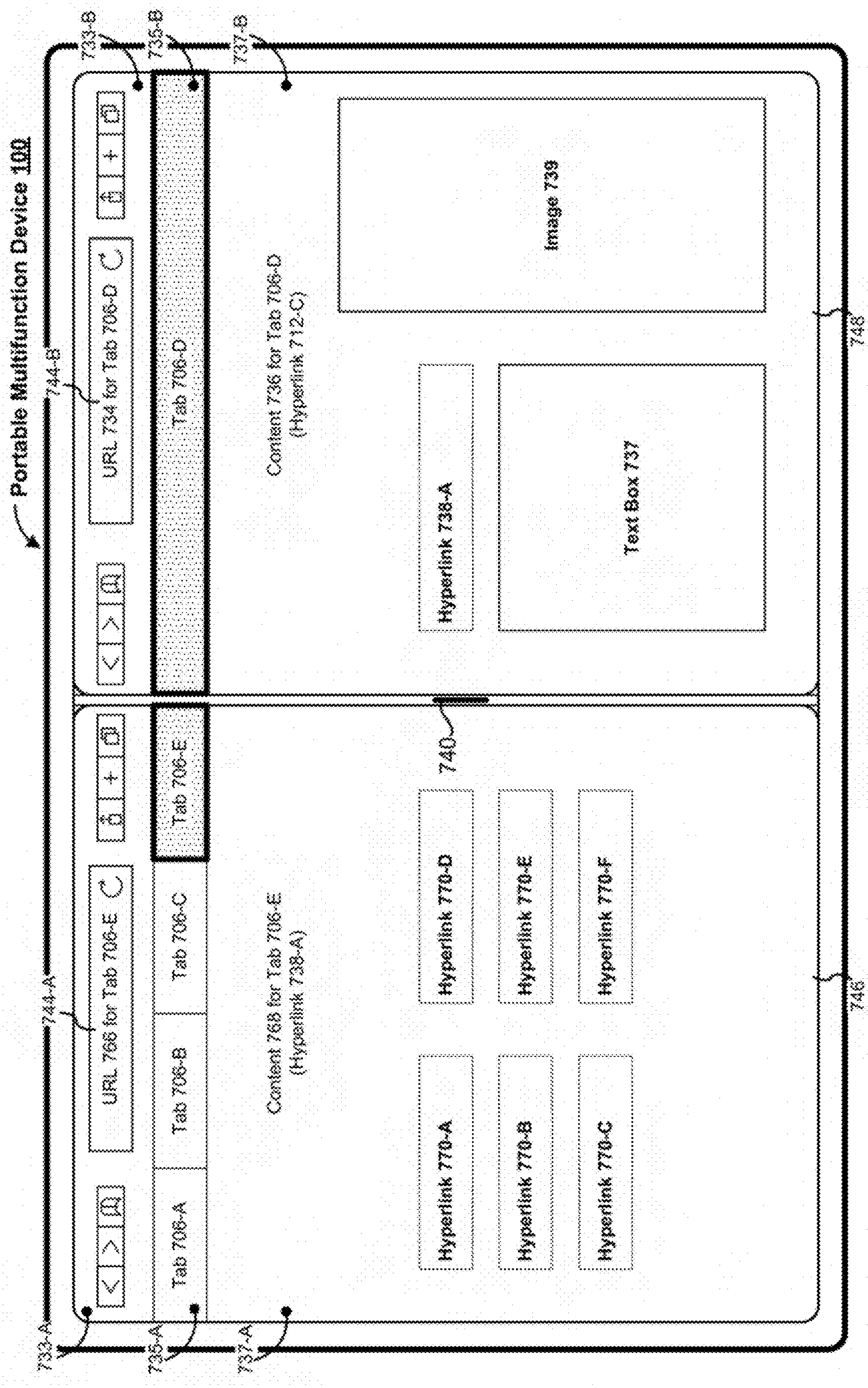

FIGS. 7M-7O illustrate a sequence in which content associated with a hyperlink in a second window in split screen mode is opened in a first window in split screen mode. FIG. 7M also illustrates a gesture with a contact 751 (e.g., a one finger long press gesture) detected at a location corresponding to the hyperlink 738-A in the second window 748.

FIG. 7N illustrates a menu 716 overlaid on the second window 748 in response to the one finger long press gesture in FIG. 7M. In FIG. 7N, the menu 716 includes: a first affordance 718-A, which, when activated (e.g., with a contact), causes the tab 7-6-A to become a background tab and also causes the content for the web page associated with the hyperlink 738-A to be displayed in a new tab in the first window 746 in split screen mode; a second affordance 718-B, which, when activated (e.g., with a contact), causes the tab 706-D to become a background tab and also causes content for the web page associated with the hyperlink 738-A to be displayed in a new tab in the second window 748 in split screen mode; and a third affordance 718-C, which, when activated (e.g., with a contact), causes the content for the web page associated with the hyperlink 738-A to be displayed in a new window in full screen mode. FIG. 7D also illustrates a contact 754 detected at a location corresponding to the first affordance 718-A.

FIG. 7O illustrates a new tab 706-E in the first window 746 with the content 768 for the web page associated with a hyperlink 738-A in response to selection of the first affordance 718-A in FIG. 7N. As shown in FIG. 7O, the first window 746 shows the content 768 for the web page associated with the hyperlink 738-A in FIGS. 7M-7N. In FIG. 7O, the content 768 includes a plurality of hyperlinks 770-A, 770-B, 770-C, 770-D, 770-E, and 770-F. FIG. 7O also shows the URL 766 for the web page associated with the hyperlink 738-A in the address box 744-A. As such, in FIG. 7O, the tab 706-E is active or in the foreground, and the tabs 706-A, 706-B, and 706-C are inactive or in the background in the first window 746.

Figure 7P:
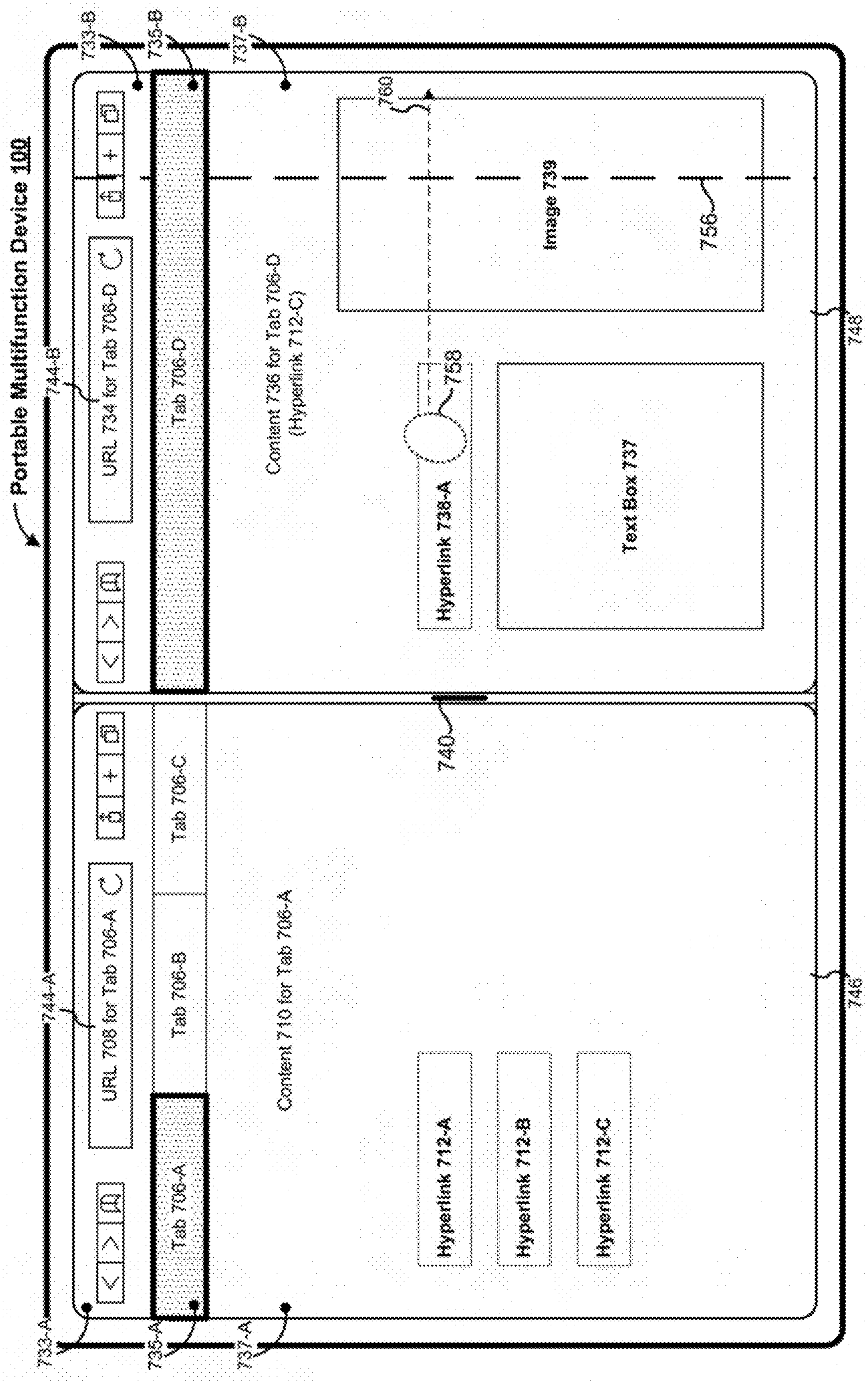
Figure 7Q:
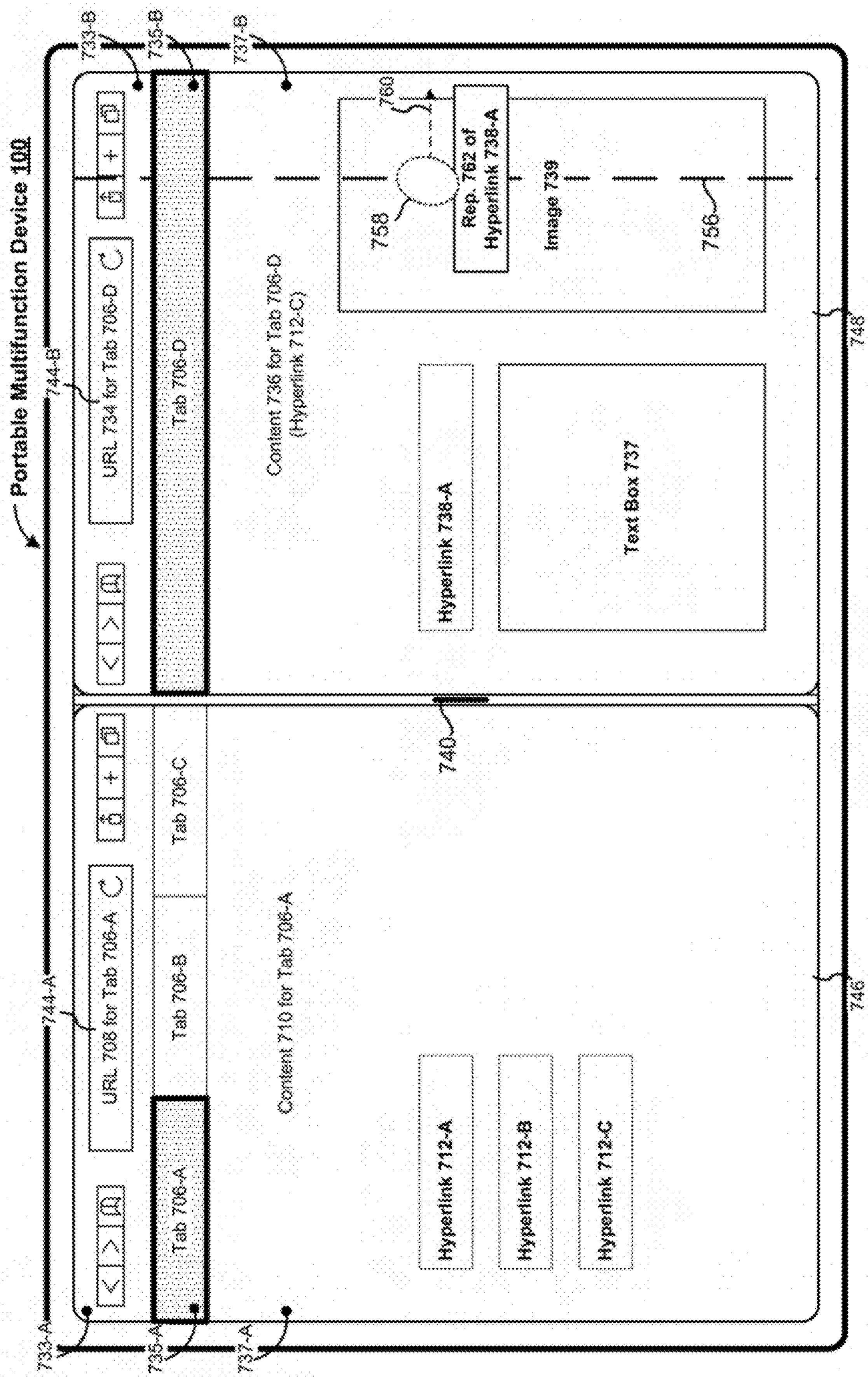
Figure 7R:
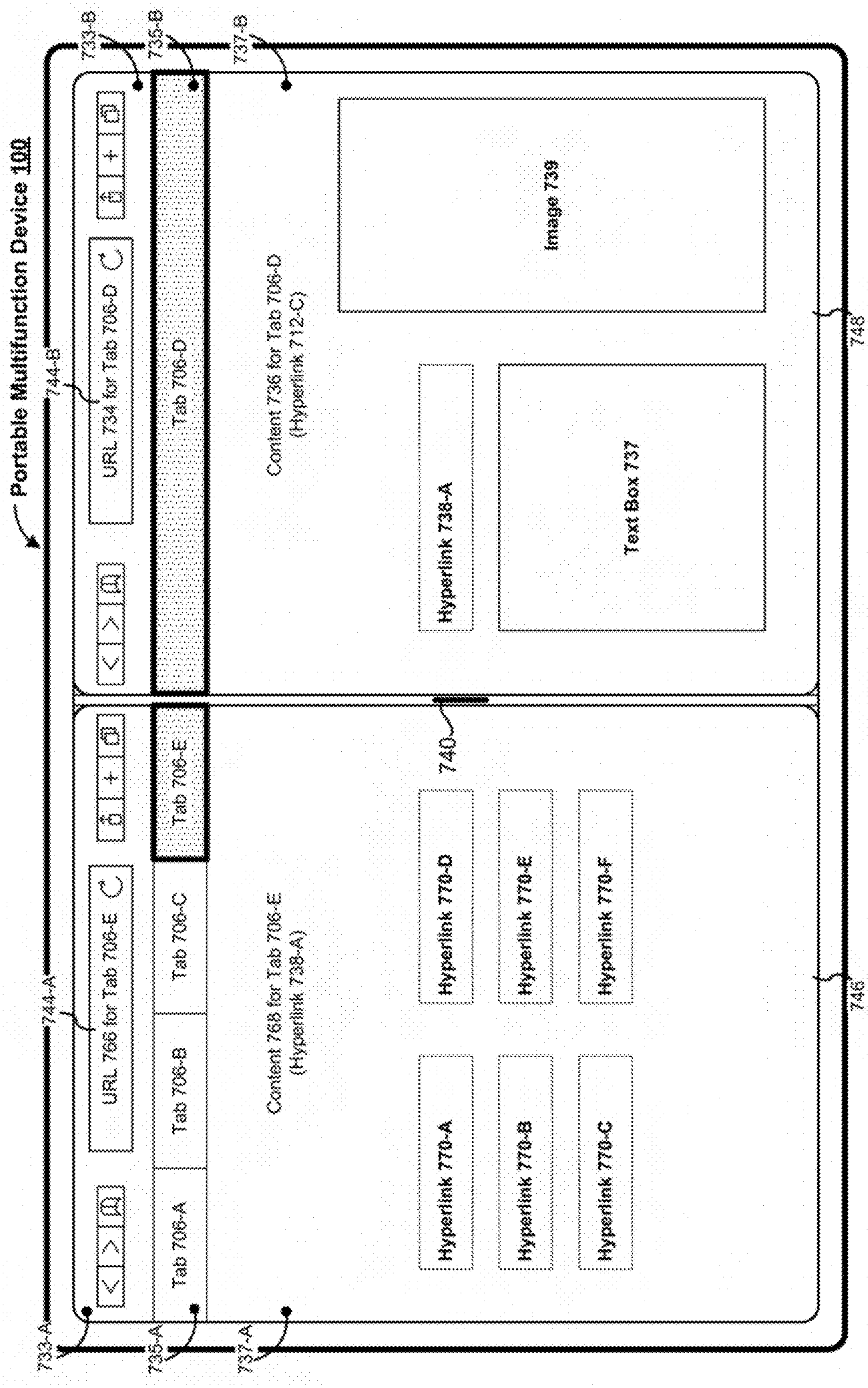

FIGS. 7P-7R illustrate another sequence in which content associated with a hyperlink in a second window in split screen mode is opened in a first window in split screen mode. FIG. 7P is similar to and adapted from FIG. 7E. As such, FIG. 7E and FIG. 7P include common reference numbers and only the differences are described herein for the sake of brevity. FIG. 7P illustrates a dragging gesture with a contact 758, where the hyperlink 738-A is dragged over a threshold line 756 according to a movement vector 760.

FIG. 7Q illustrates a graphical representation 762 of the hyperlink 738-A over the threshold 760. For example, the graphical representation 762 is a thumbnail or snapshot of the content 768 for the web page associated with the hyperlink 738-A. In another example, the graphical representation 762 is an icon representing the hyperlink 738-A.

FIG. 7R illustrates a new tab 706-E in the first window 746 with the content 768 associated with a hyperlink 738-A in response to the graphical representation 762 being dropped in a predefined region between the right edge of the display area and the threshold line 756 in FIG. 7Q. For example, when a hyperlink is dragged into the predefined region (e.g., a drop zone or "hot" region), it triggers content associated the hyperlink to be opened in a new foreground tab in the opposite window in split screen mode.

FIG. 7R is similar to and adapted from FIG. 7O. As such, FIG. 7O and FIG. 7R include common reference numbers and only the differences are described herein for the sake of brevity. As shown in FIG. 7R, the new tab 706-E associated with the hyperlink 738-A is active in the first window 746. In FIG. 7R, the first window 736 shows the content 768 for the web page associated with the hyperlink 738-A. FIG. 7R also shows the URL 766 for the web page associated with the hyperlink 738-A in the address box 744-A.

Figure 7S:
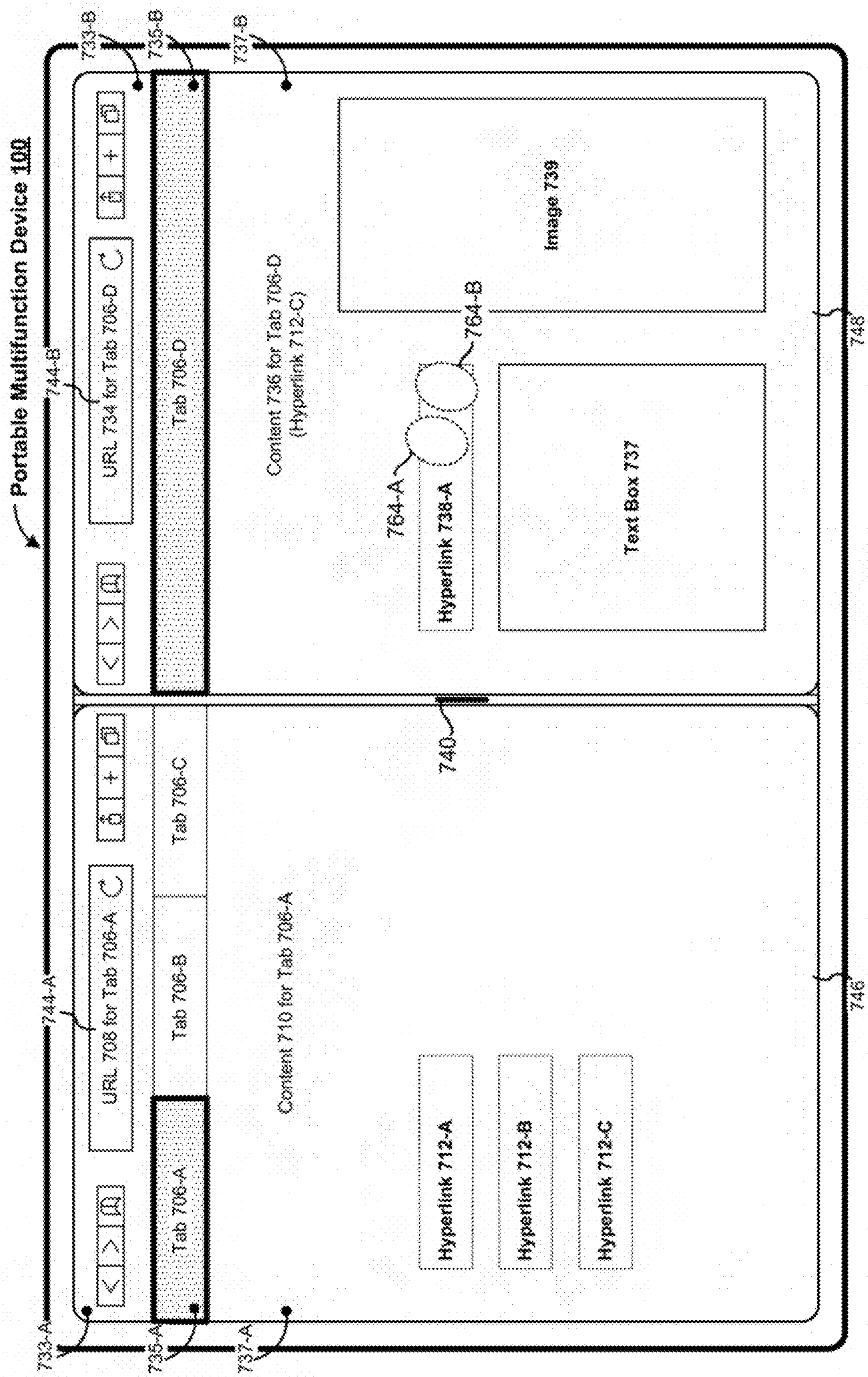
Figure 7T:
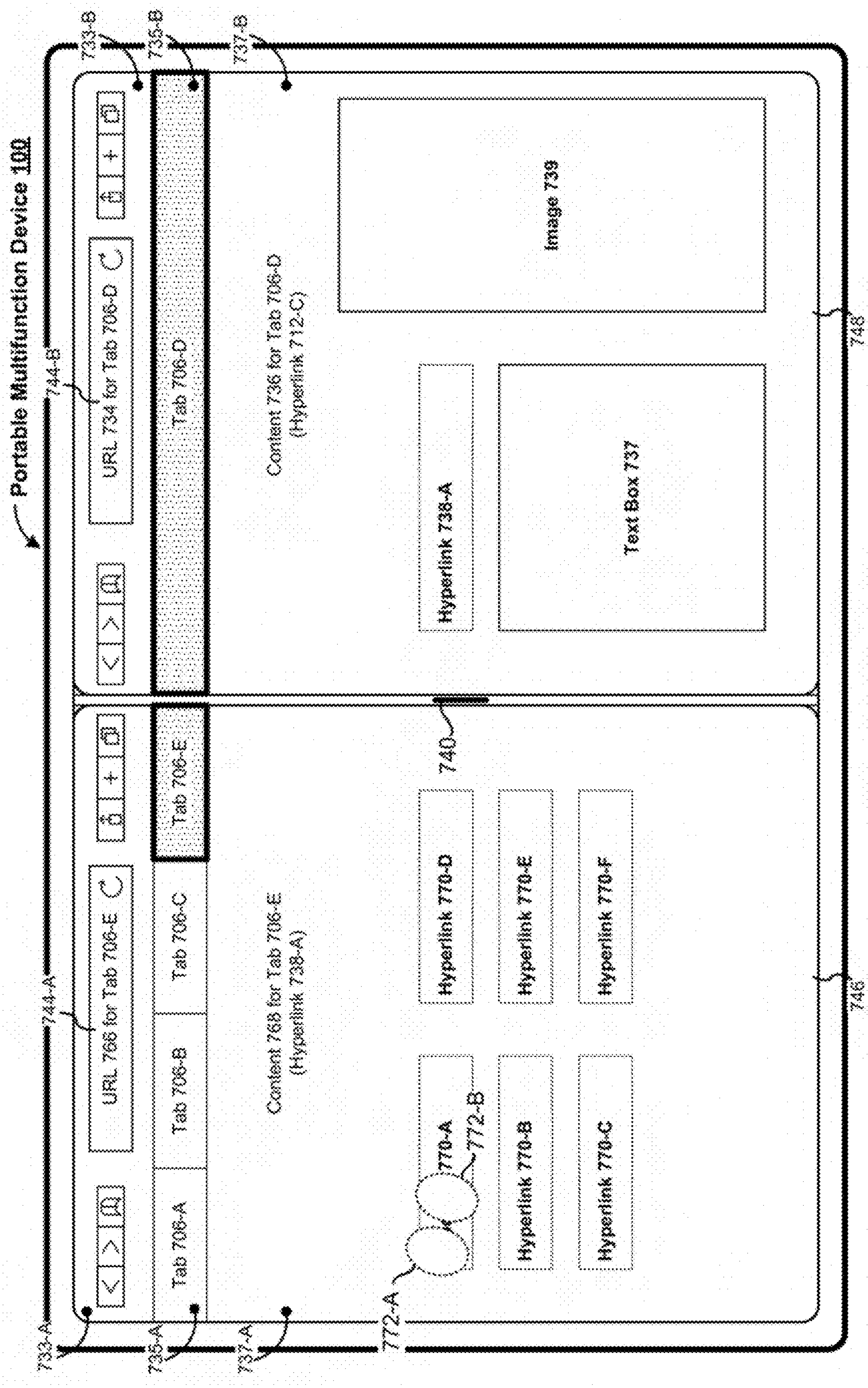

FIGS. 7S-7T illustrate yet another sequence in which content associated with a hyperlink in a second window in split screen mode is opened in a first window in split screen mode. FIG. 7S is similar to and adapted from FIG. 7E. As such, FIG. 7E and FIG. 7S include common reference numbers and only the differences are described herein for the sake of brevity. FIG. 7S illustrates a gesture with contacts 764-A and 764-B (e.g., a two finger tap gesture) detected at a location corresponding to the hyperlink 738-A.

FIG. 7T illustrates a new tab 706-E in the first window 746 with the content 768 associated with a hyperlink 738-A in response to the two finger tap gesture in FIG. 7S. FIG. 7T is similar to and adapted from FIG. 7O. As such, FIG. 7O and FIG. 7T include common reference numbers and only the differences are described herein for the sake of brevity. As shown in FIG. 7T, the new tab 706-E associated with the hyperlink 738-A is active in the first window 746. In FIG. 7T, the first window 736 shows the content 768 for the web page associated with the hyperlink 738-A. FIG. 7T also shows the URL 766 for the web page associated with the hyperlink 738-A in the address box 744-A.

Figure 7U:
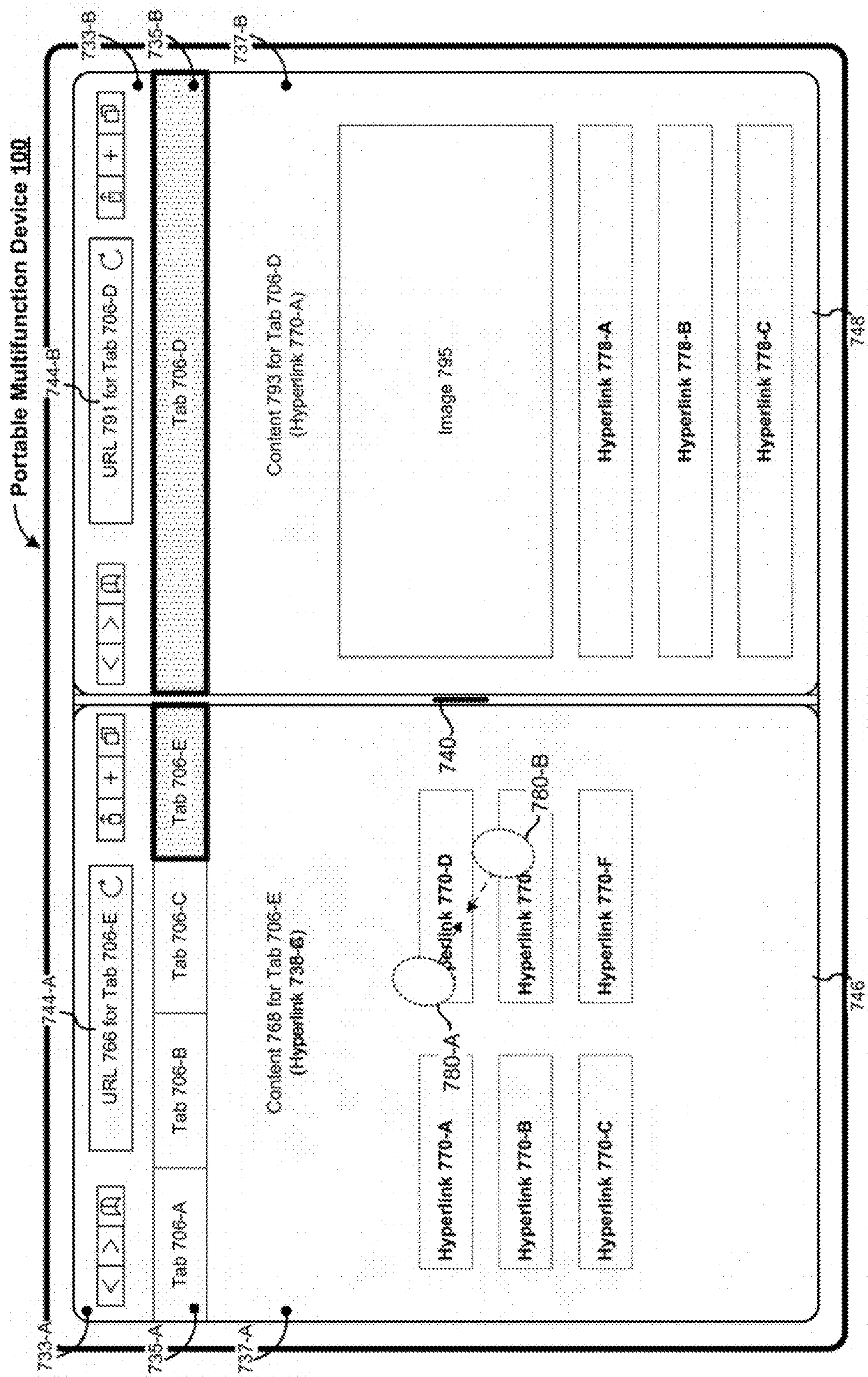

FIGS. 7T-7U illustrate a sequence in which content associated with a hyperlink in a first window in split screen mode is opened in a second window in split screen mode. FIG. 7T also illustrates a gesture with contacts 772-A and 772-B (e.g., a two finger tap gesture) detected at a location corresponding to the hyperlink 770-A.

FIG. 7U illustrates content 793 associated with a hyperlink 770-A replacing display of content 736 within the tab 706-D in the second window 746 in response to the two finger tap gesture in FIG. 7T. As shown in FIG. 7U, the second window 748 shows content 793 for the web page associated with the hyperlink 770-A in FIG. 7T. In FIG. 7E, the content 793 includes an image 795 and a plurality of hyperlinks 778-A, 778-B, and 778-C. FIG. 7U also shows the URL 791 for the web page associated with the hyperlink 770-A in the address box 744-B. As such, in FIG. 7U, the tab 706-D is active or in the foreground in the second window 748.

Figure 7V:
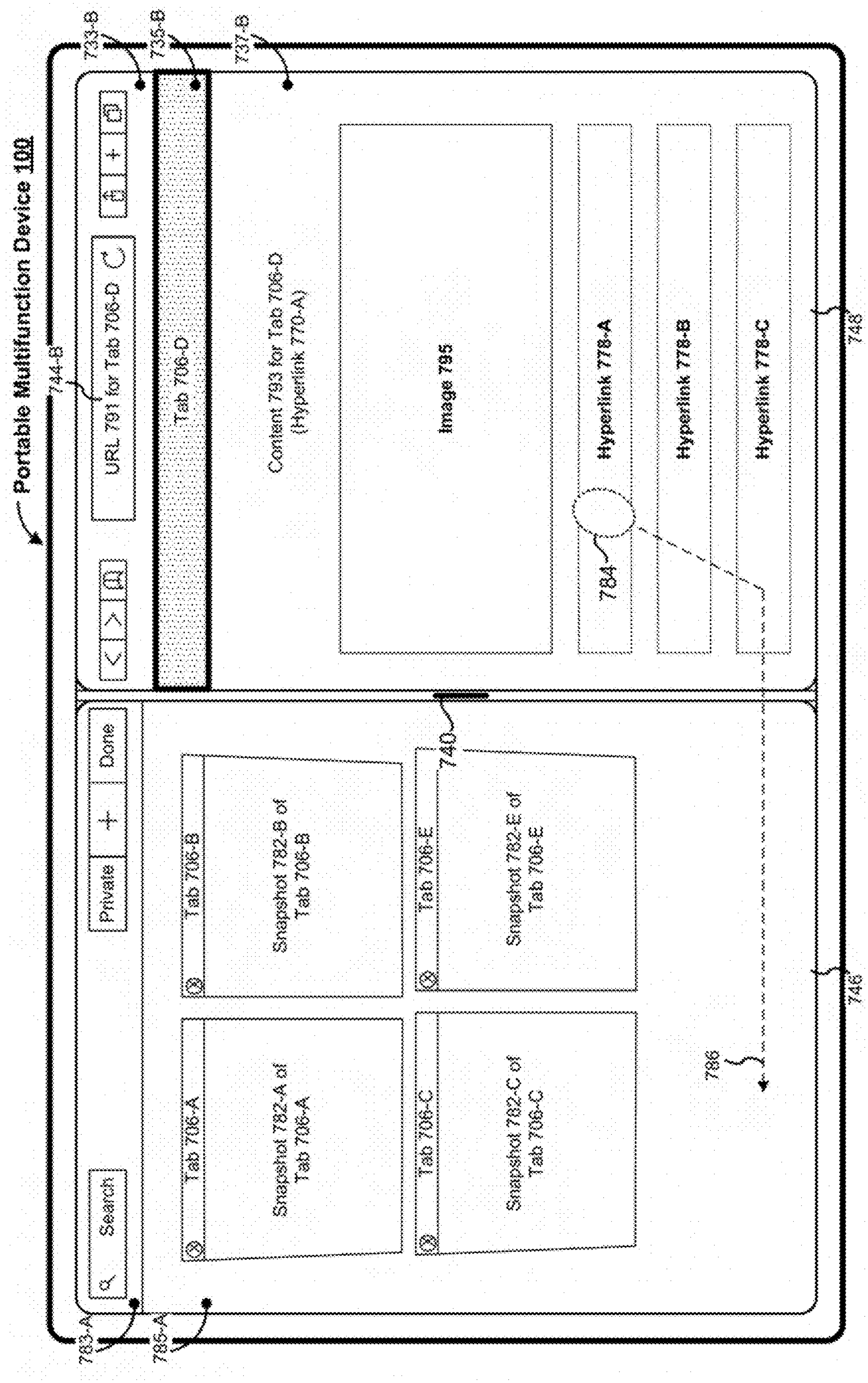

FIGS. 7U-7V illustrate a sequence in which the first window in split screen mode transitions from browser to tab view. FIG. 7U also illustrates a pinch-in gesture with contacts 780-A and 780-B detected within the first window 746. FIG. 7V illustrates the first window 746 in a tab view in response to the pinch-in gesture in FIG. 7U. In FIG. 7V, the first window 746 includes a first region 783-A and a second region 785-A. The second region 785-A includes tabs 706-A, 706-B, 706-C, and 706-E with corresponding snapshots 782-A, 782-B, 782-C, and 782-E of the content of the respective tabs. As such, the first window 746 transitions from browser view in FIG. 7U to tab view in FIG. 7V in response to the pinch-in gesture in FIG. 7U. For example, a window in split screen mode transitions from browser view to tab view in response to a pinch-in gesture or the like. For example, a window in split screen mode transitions from tab view to browser view in response to a pinch-in gesture or the like.

FIGS. 7V-7Y illustrate a sequence in which a hyperlink is dragged between the windows in split screen mode. FIG. 7V also illustrates a dragging gesture with a contact 784, where the hyperlink 778-A is dragged from the second window 748 to the first window 746 according to the movement vector 786.

Figure 7W:
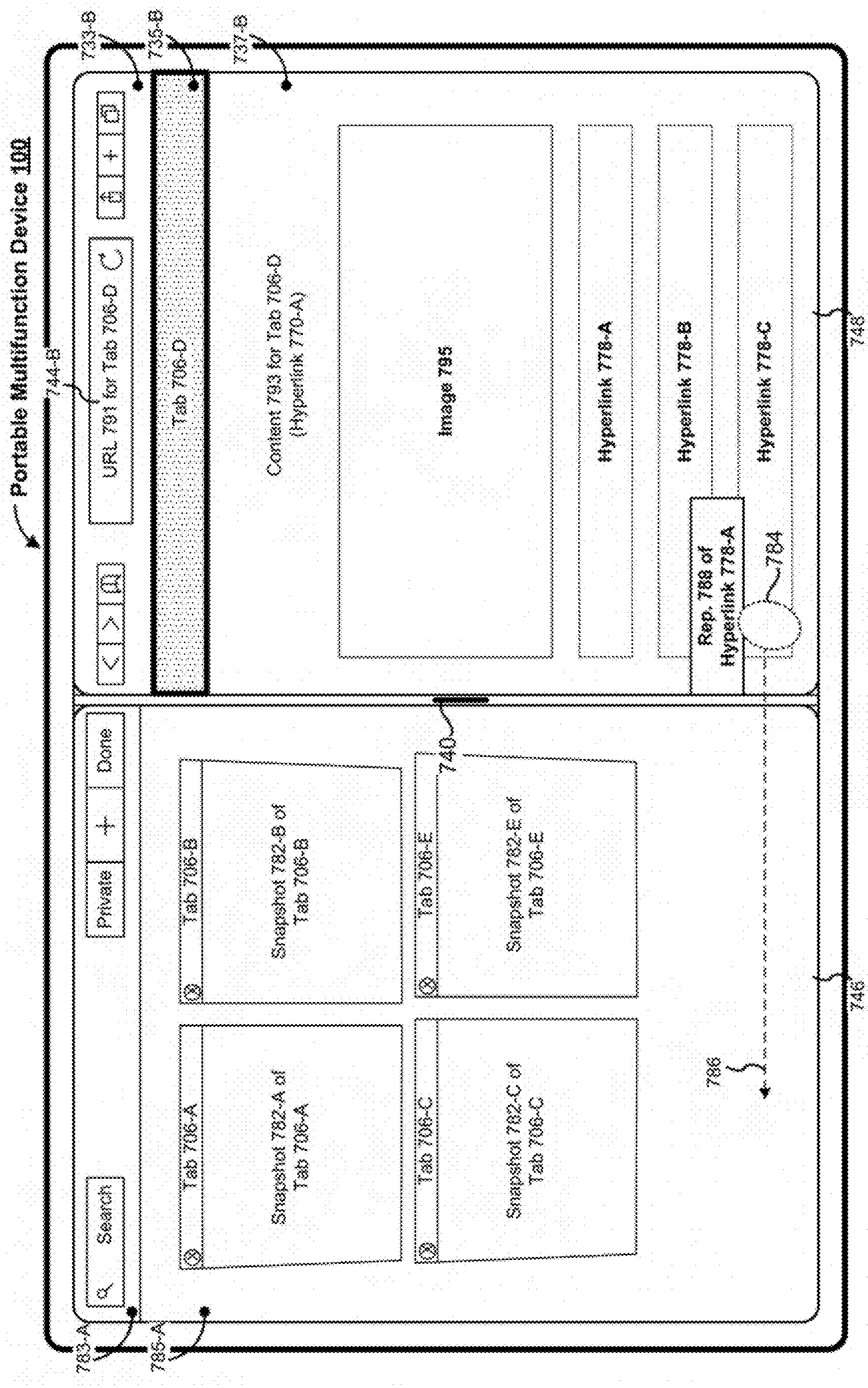

FIG. 7W illustrates a graphical representation 788 of the hyperlink 778-A moving according to the movement vector 786. For example, the graphical representation 788 is a thumbnail or snapshot of content for the web page associated with the hyperlink 778-A. In another example, the graphical representation 788 is an icon representing the hyperlink 778-A.

Figure 7X:
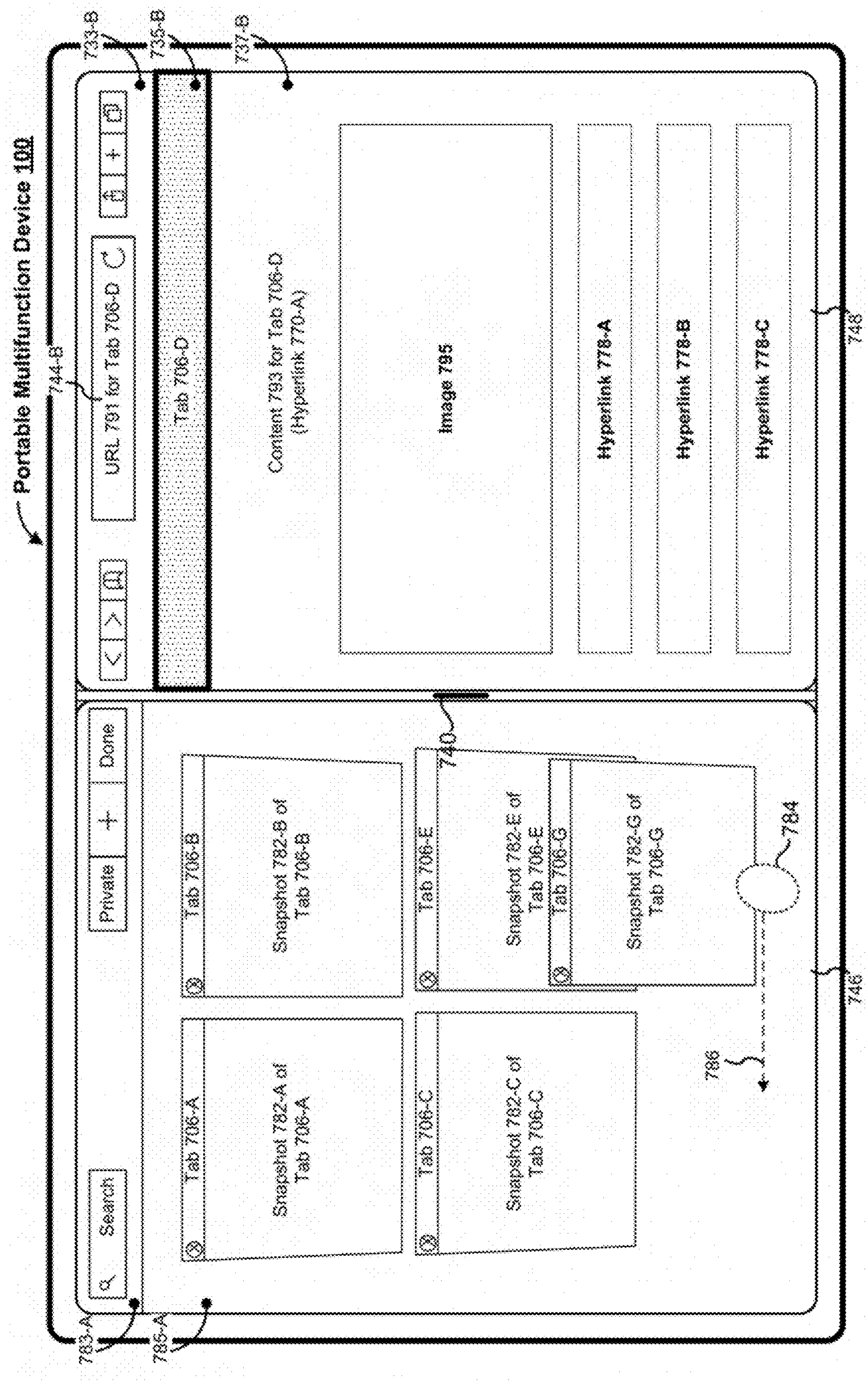
Figure 7Y:
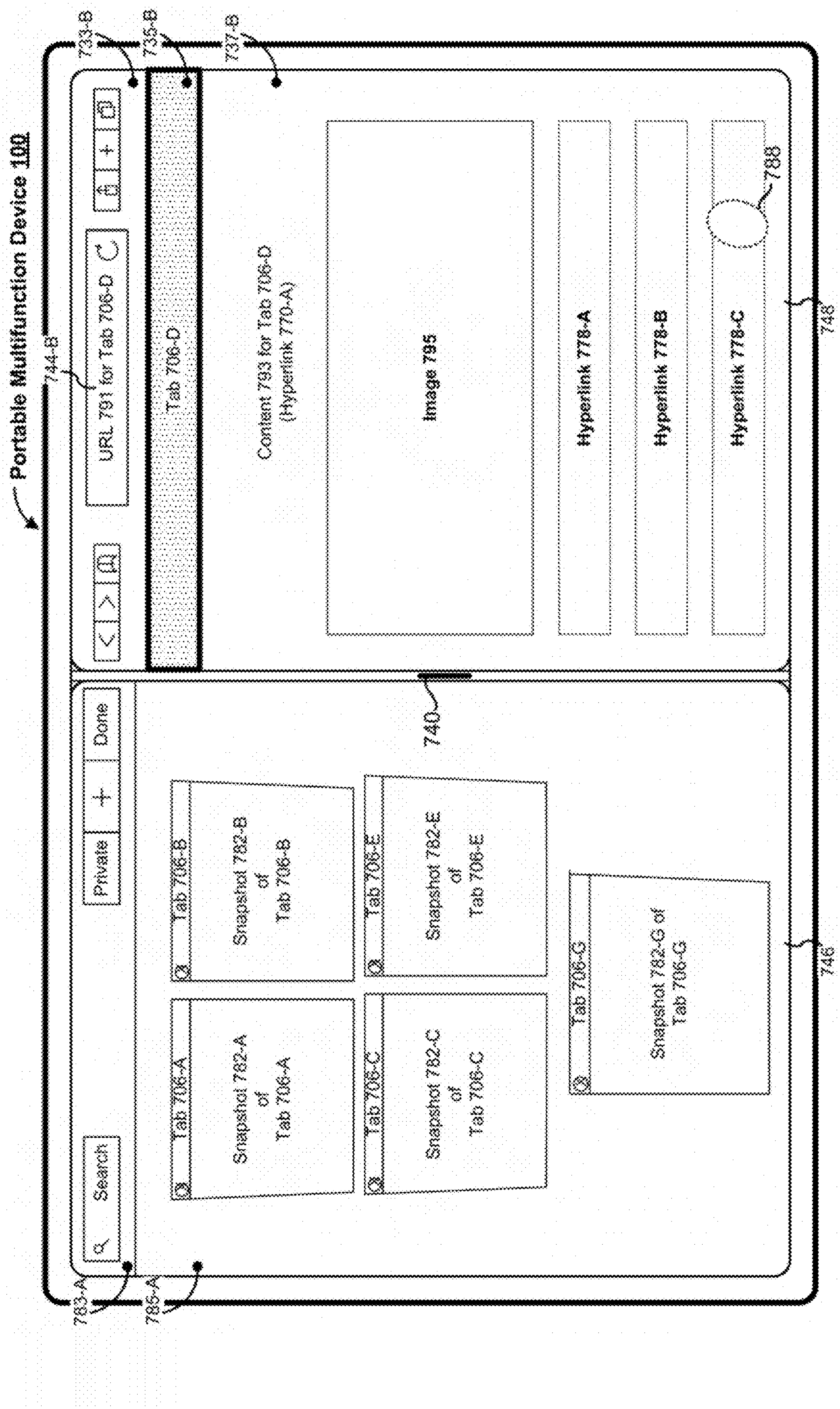

FIG. 7X illustrates transforming the graphical representation 788 of the hyperlink 778-A into the tab 706-G with a snapshot 782-G of the content for the web page associated with the hyperlink 778-A in response to moving the graphical representation 788 into the second window 746 according to the movement vector 786. FIG. 7Y illustrates the tab 706-G within the second region 785-A of the first window 746 in response to dropping the tab 706-G within the second window 746.

Figure 7Z:
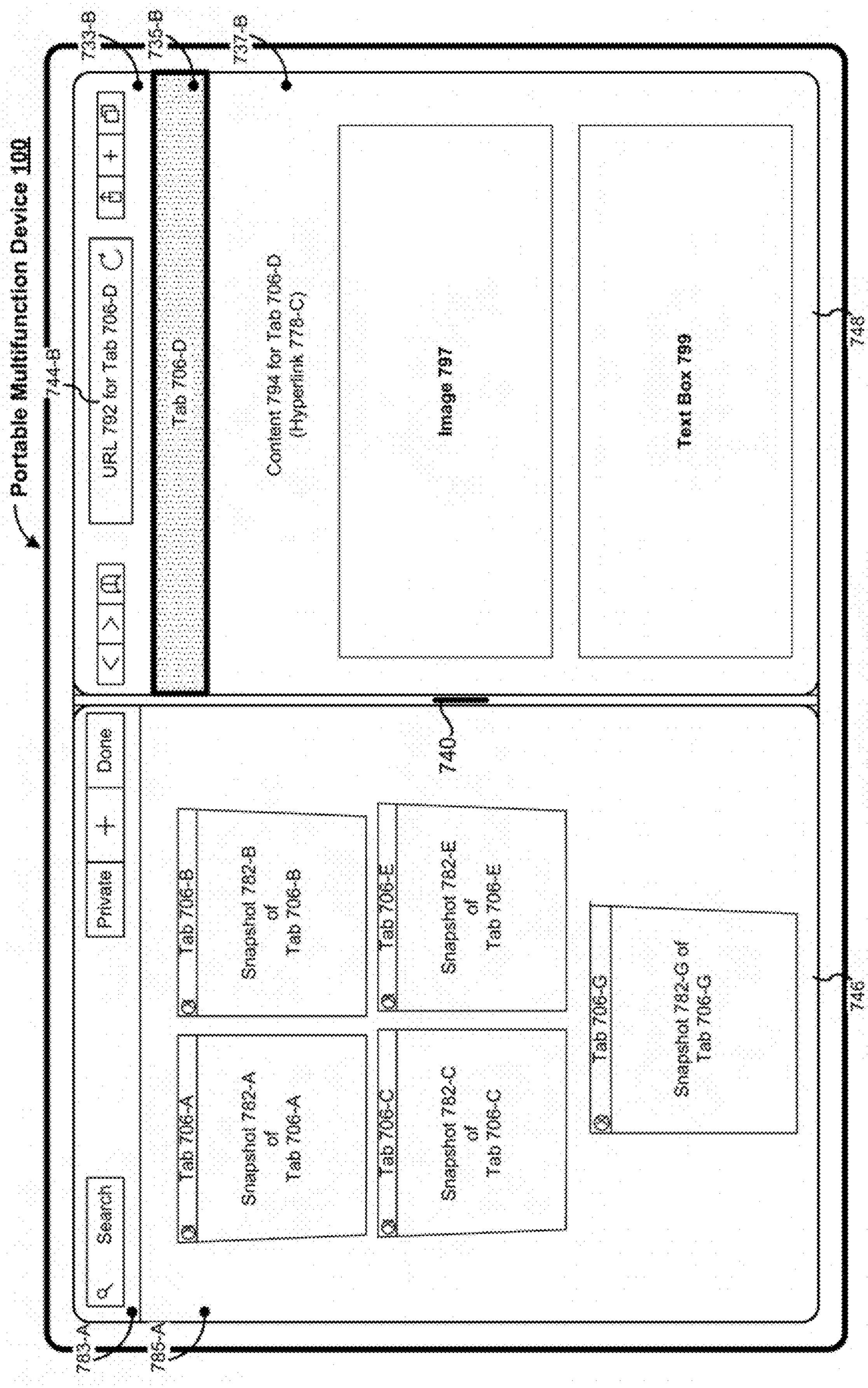
Figure 7A:
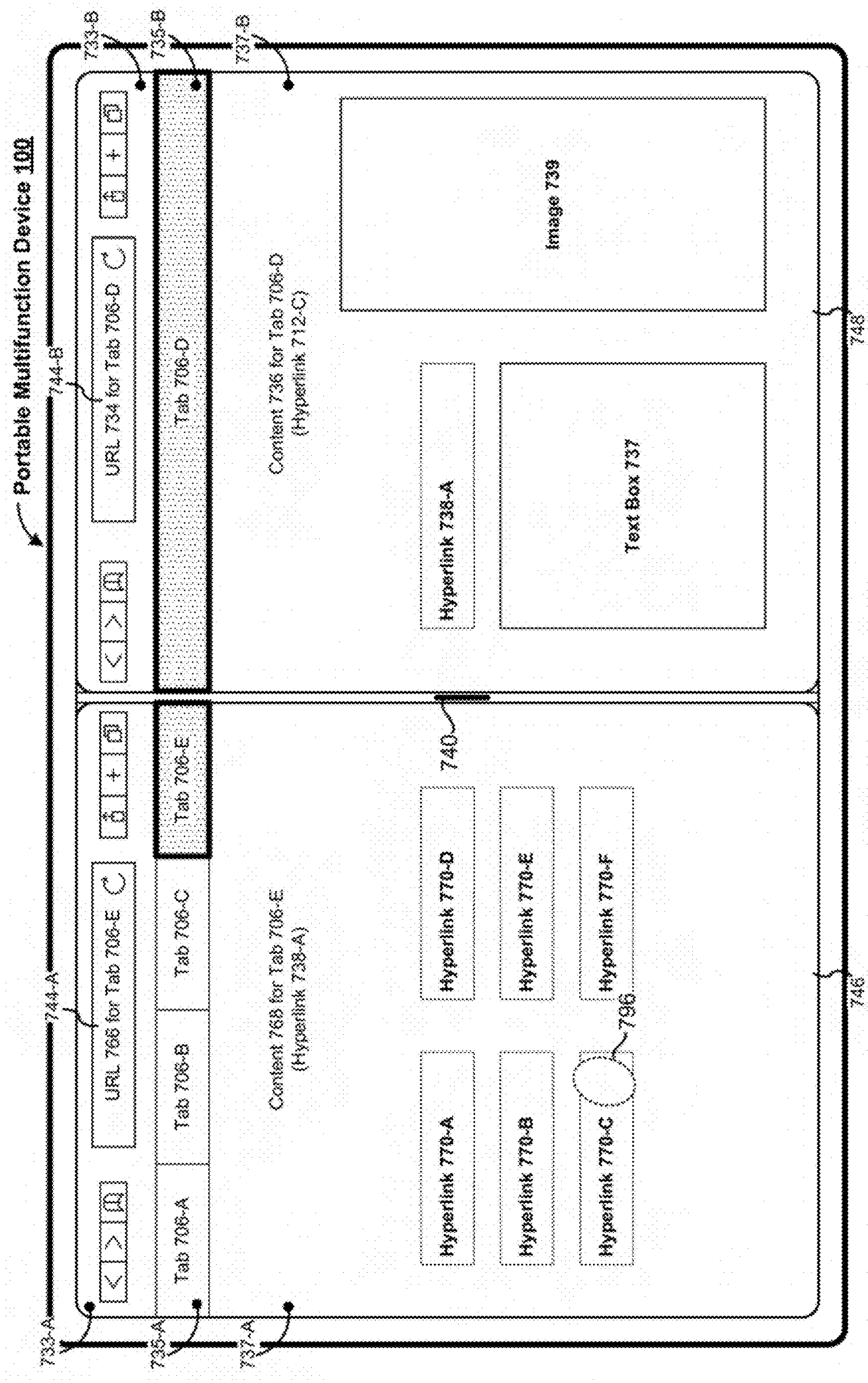
Figure 7B:
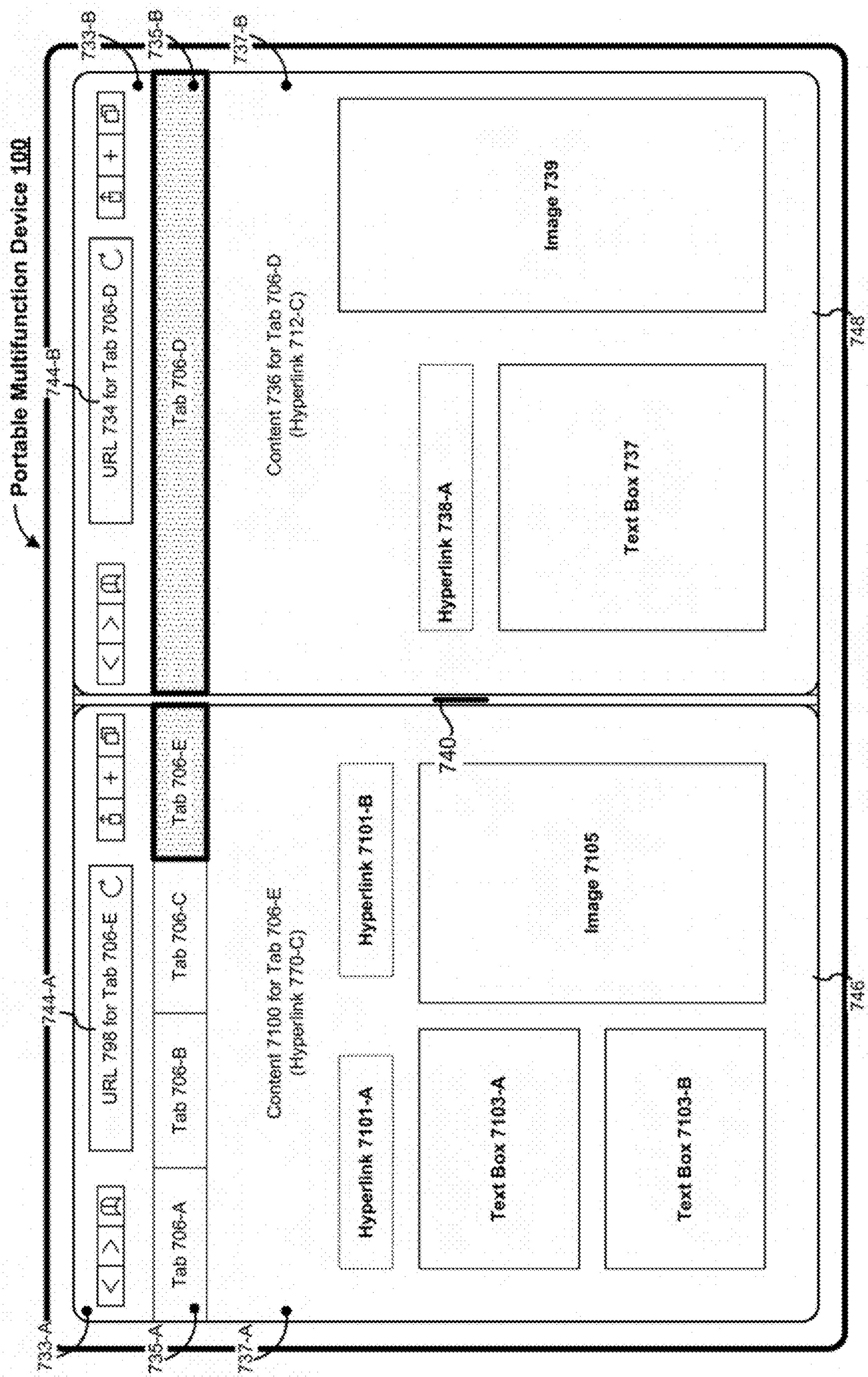
Figure 7C:
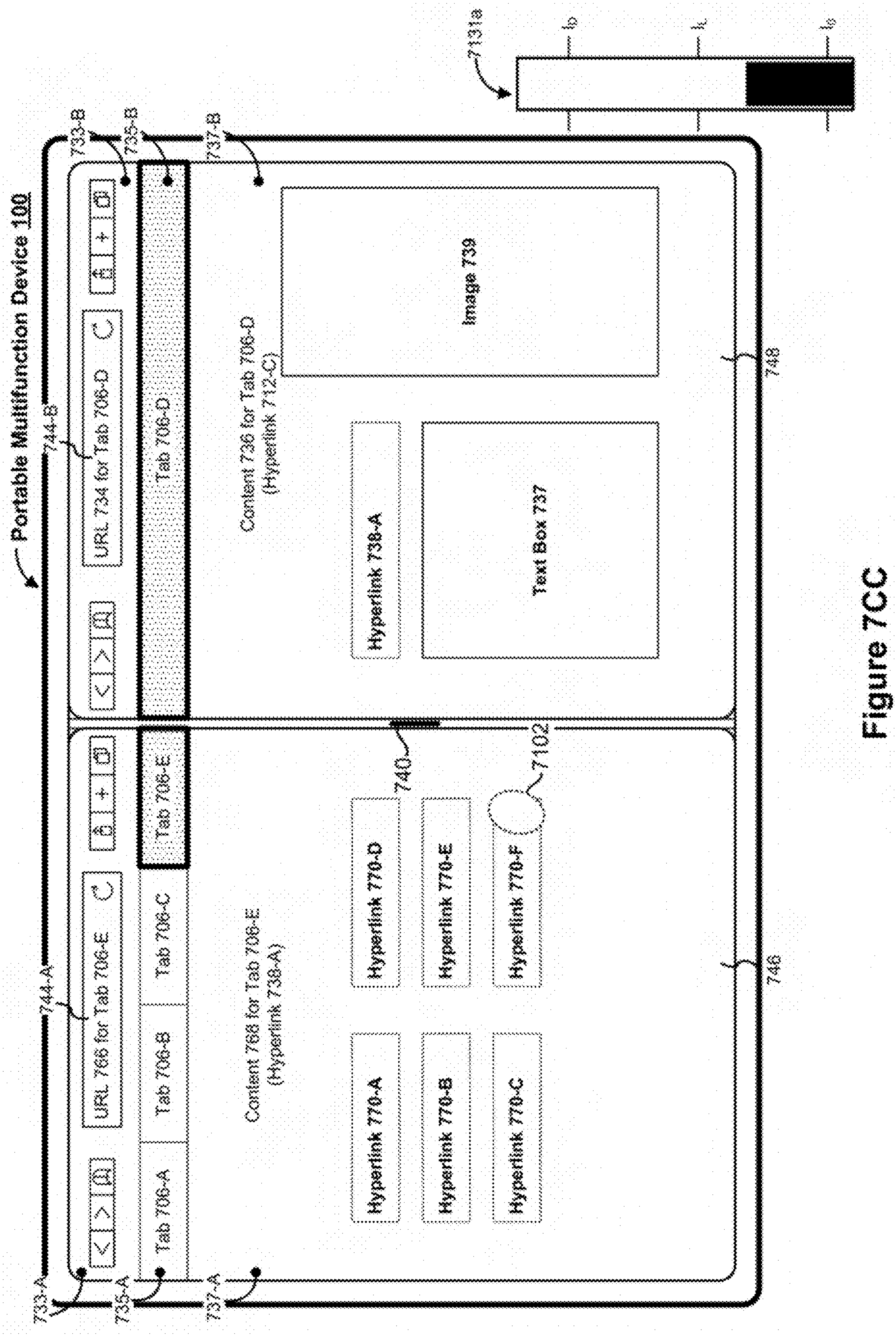
Figure 7D:
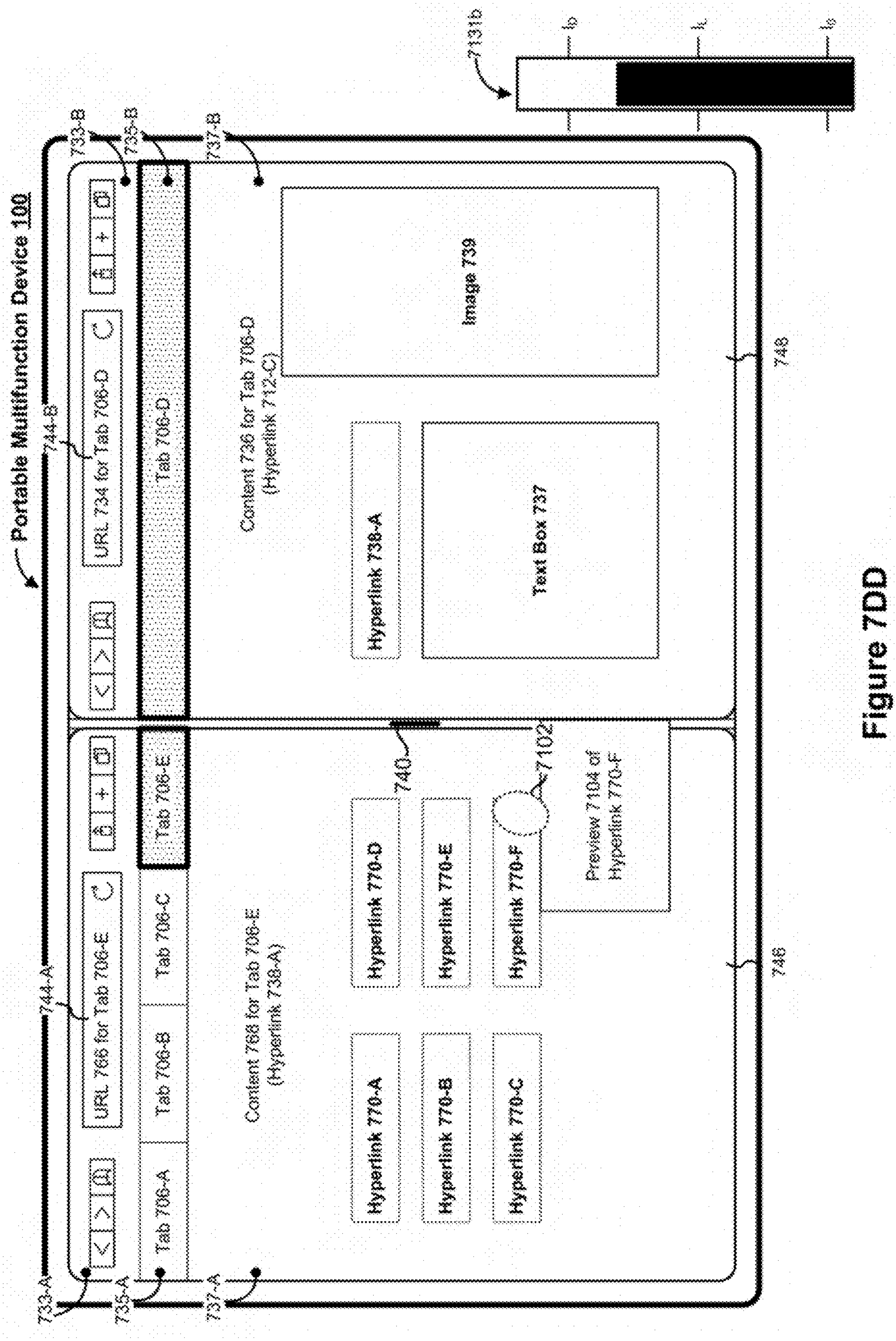
Figure 7E:
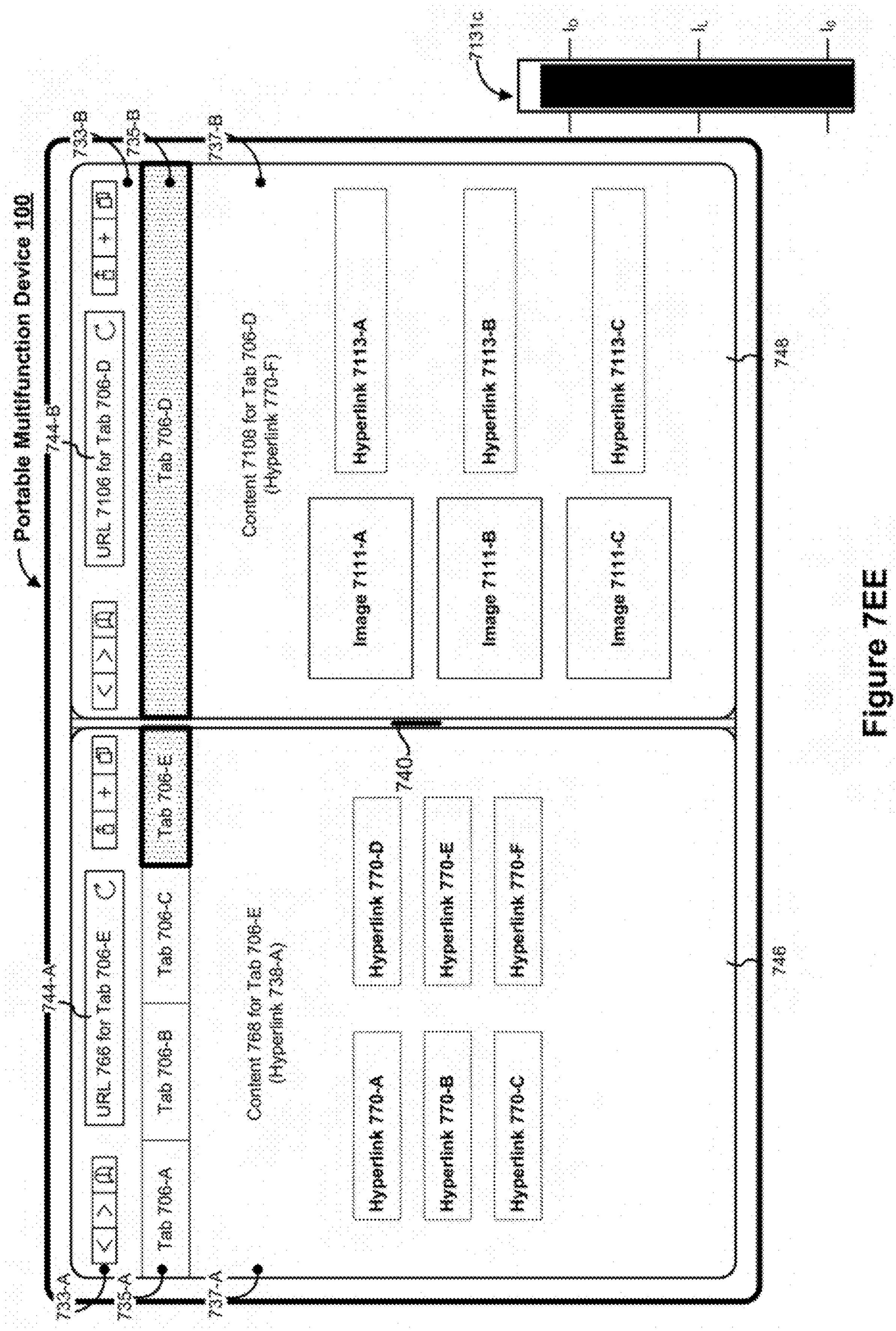
Figure 7F:
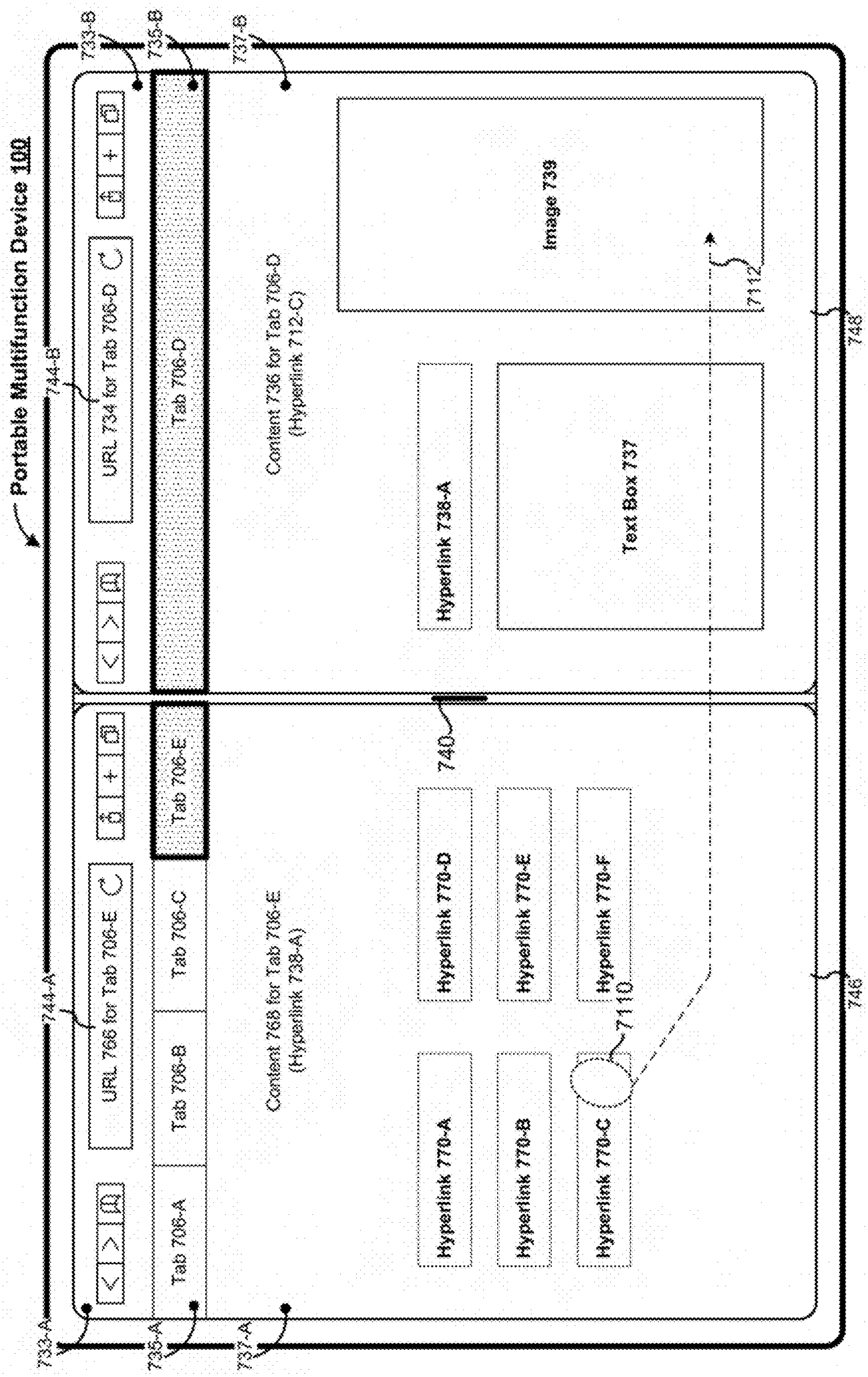
Figure 7G:
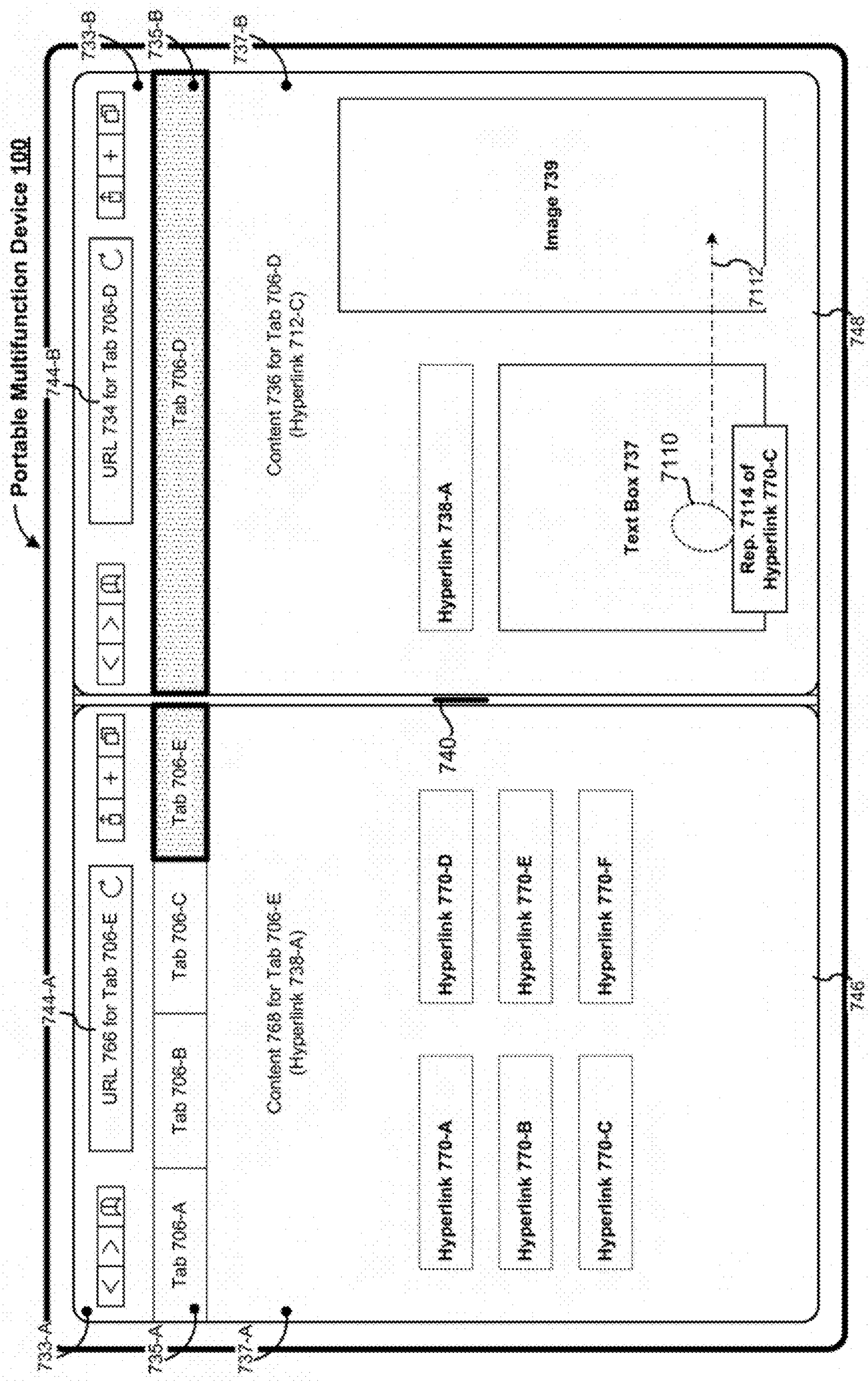
Figure 7H:
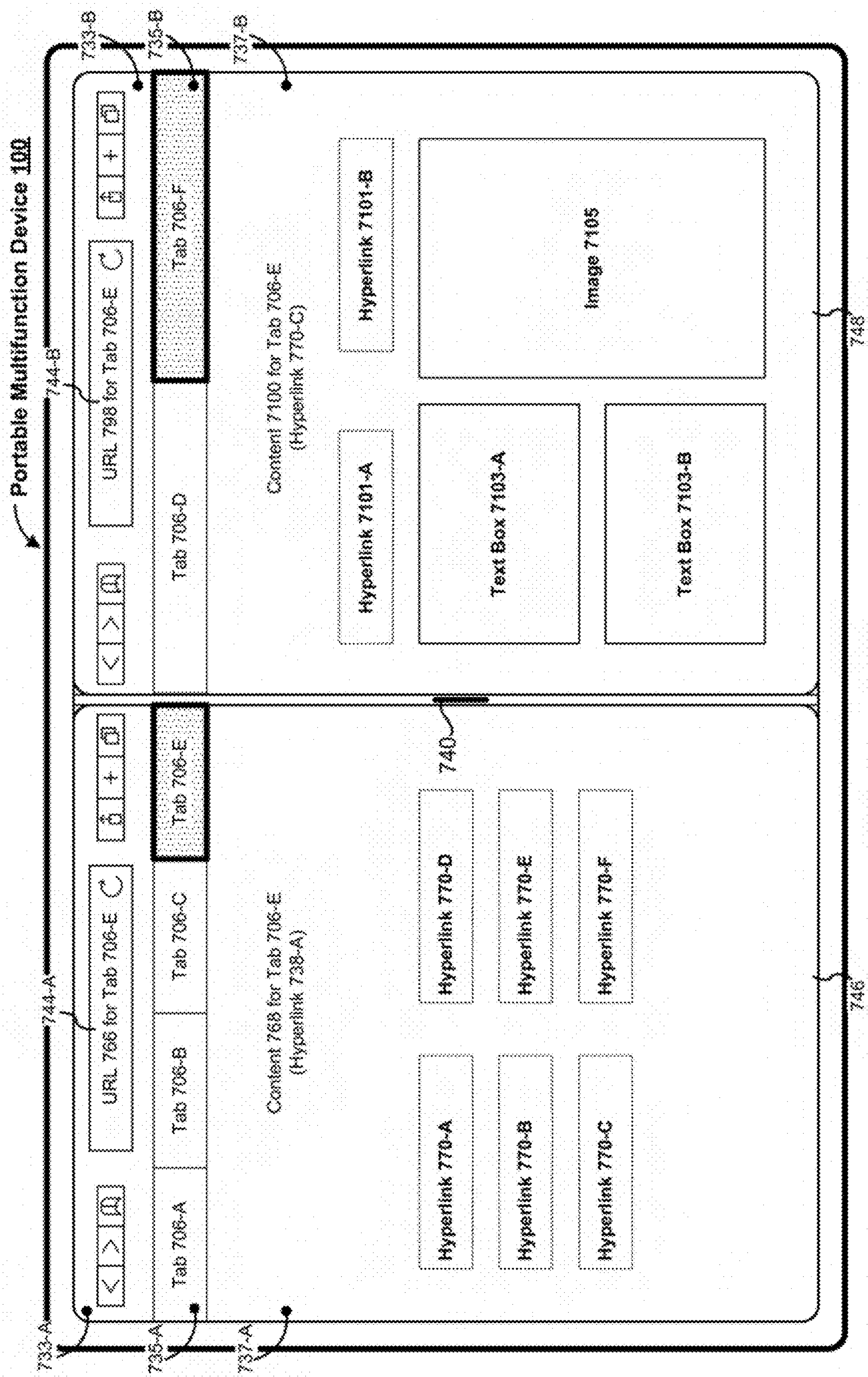
Figure 7I:
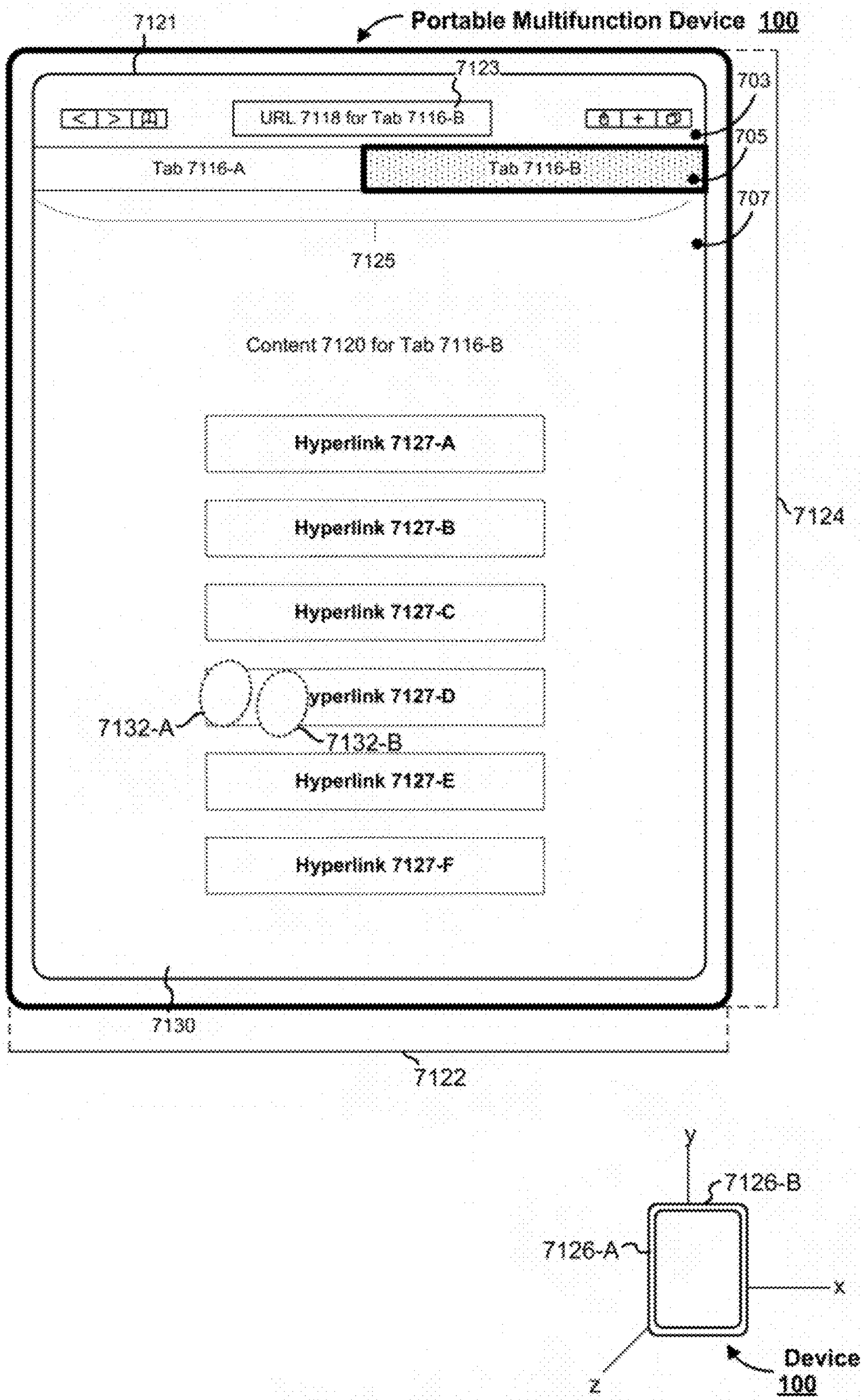
Figure 7J:
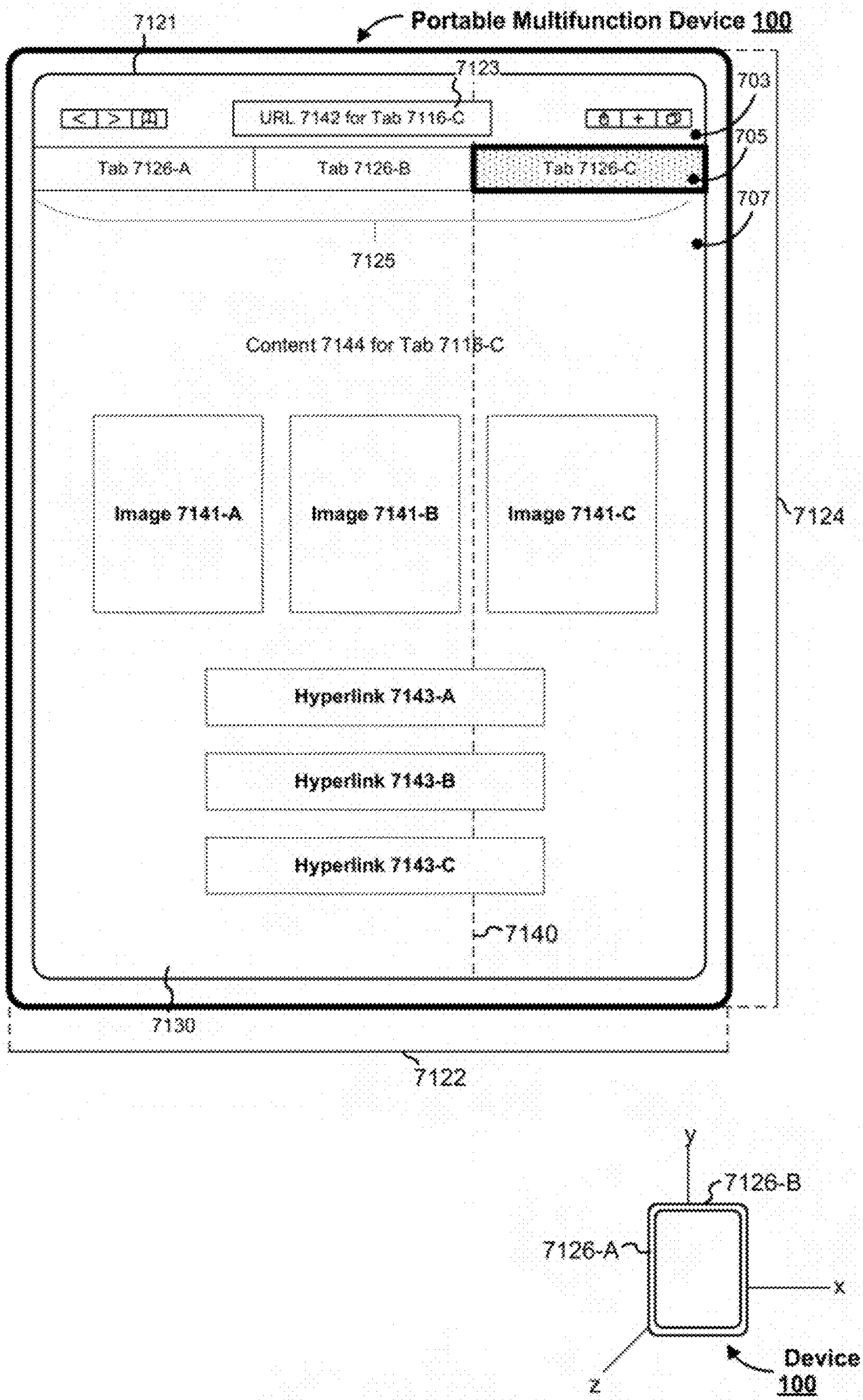
Figure 7K:
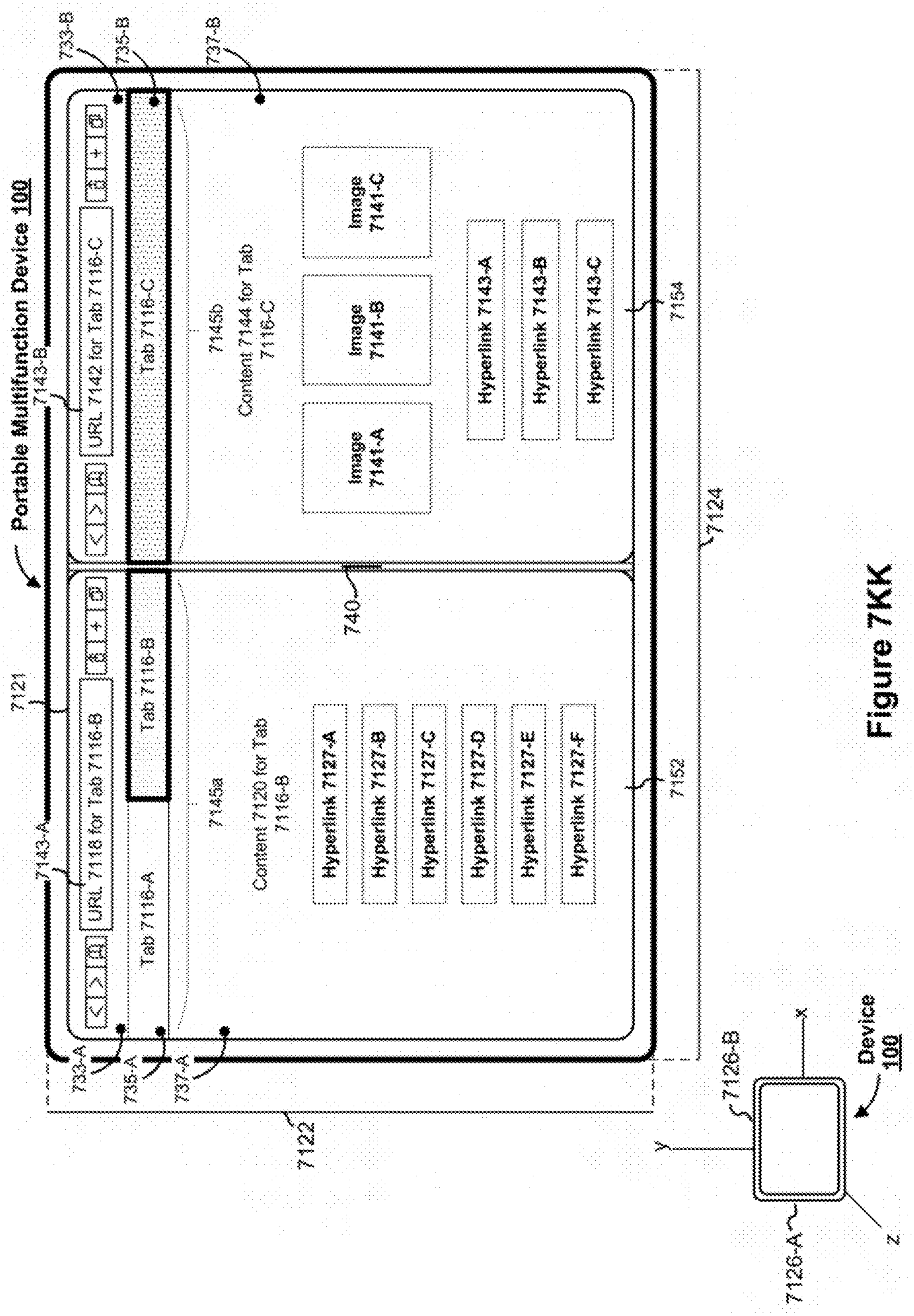
Figure 8A:
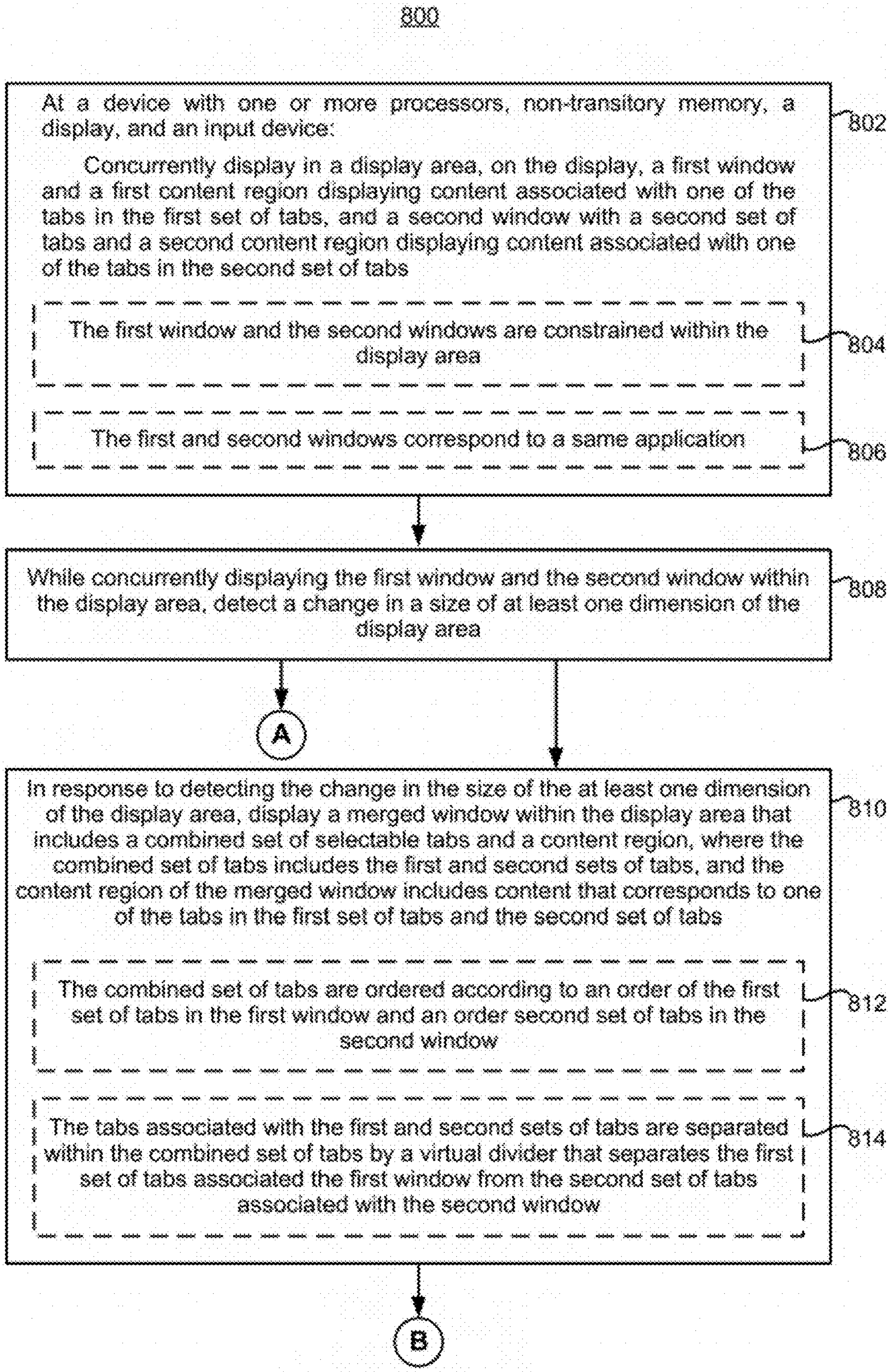
Figure 8D:
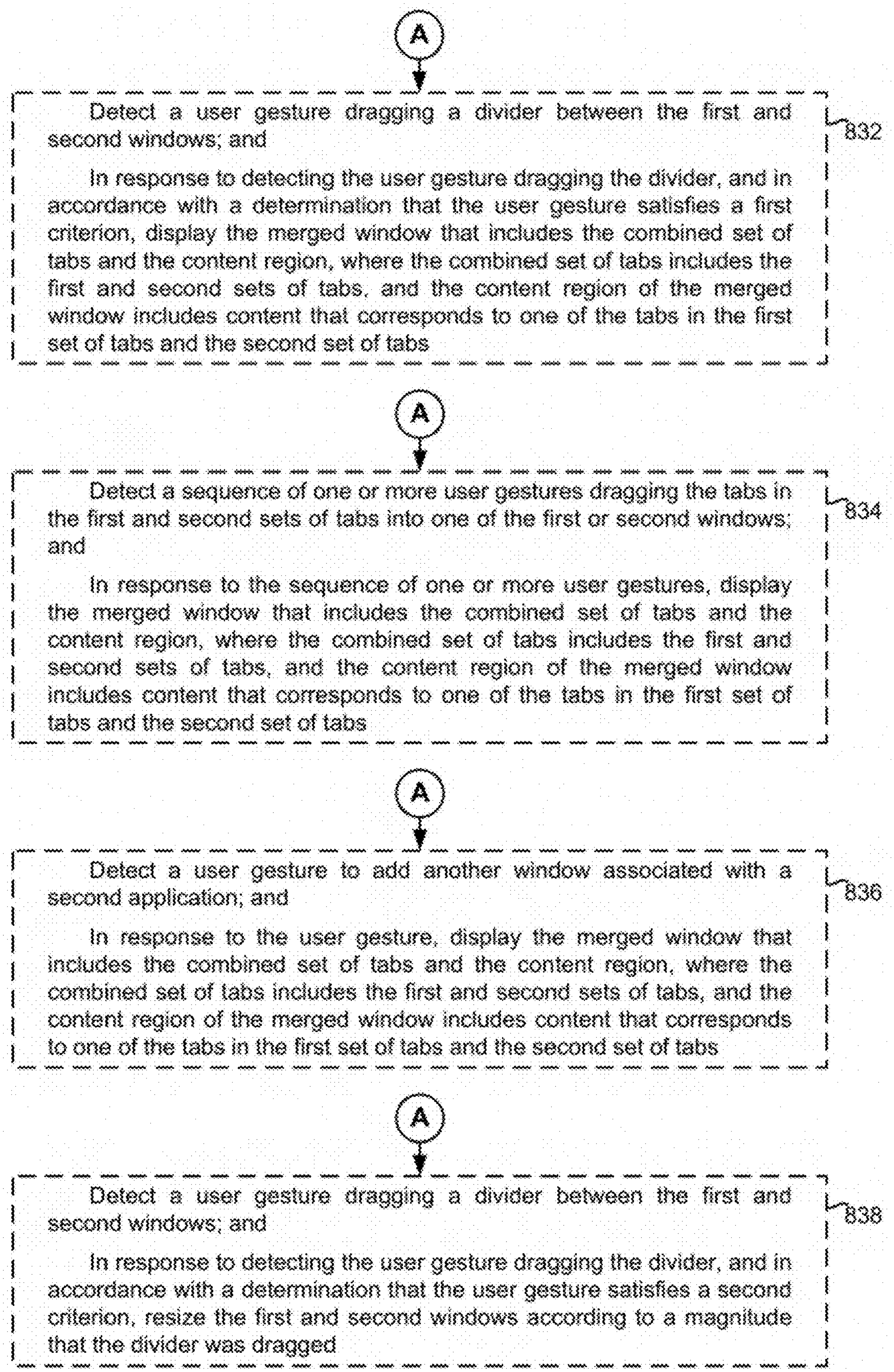

FIGS. 7Y-7Z illustrate a sequence in which content associated with a hyperlink in a second window in split screen mode is opened in the second window. FIG. 7Y also illustrates a contact 788 (e.g., a one finger tap gesture) at a location corresponding to the hyperlink 778-C within the second window 748.

FIG. 7Z illustrates the content 794 associated with the hyperlink 778-C replacing display of the content 793 within the tab 706-D in the second window 746 in response to selection of the hyperlink 778-C with the one finger tap gesture in FIG. 7Y. As shown in FIG. 7Z, the second window 748 shows the content 794 for the web page associated with the hyperlink 778-C in FIG. 7Y. In FIG. 7Z, the content 794 includes images 797 and 799. FIG. 7Z also shows the URL 792 for the web page associated with the hyperlink 778-C in the address box 744-B. As such, in FIG. 7Z, the tab 706-D is active or in the foreground in the second window 748.

FIGS. 7AA-7BB illustrate a sequence in which content associated with a hyperlink in a first window in split screen mode is opened in the first window. FIG. 7AA is similar to and adapted from FIG. 7O. As such, FIG. 7O and FIG. 7AA include common reference numbers and only the differences are described herein for the sake of brevity. FIG. 7AA illustrates a contact 796 (e.g., a one finger tap gesture) at a location corresponding to the hyperlink 770-C within the first window 746.

FIG. 7BB illustrates the content 7100 associated with the hyperlink 770-C replacing display of the content 768 within the tab 706-E in the first window 746 in response to selection of the hyperlink 770-C with the one finger tap gesture in FIG. 7AA. As shown in FIG. 7BB, the first window 746 shows content 7100 for the web page associated with the hyperlink 770-C in FIG. 7AA. In FIG. 7BB, the content 7100 includes hyperlinks 7101-A and 7101-B, text boxes 7103-A and 7103-B, and an image 7105. FIG. 7BB also shows the URL 798 for the web page associated with the hyperlink 770-C in the address box 744-A. As such, in FIG. 7BB, the tab 706-E is active or in the foreground in the first window 746.

FIGS. 7CC-7EE illustrate a sequence in which content associated with a hyperlink in a first window in split screen mode is opened in a second window in split screen mode. FIG. 7CC is similar to and adapted from FIG. 7O. As such, FIG. 7O and FIG. 7CC include common reference numbers and only the differences are described herein for the sake of brevity. FIG. 7CC illustrates a contact 7102 (e.g., a one finger deep press gesture) detected at a location corresponding to the hyperlink 770-F with an intensity 7131*a* greater than $I_0$ and less than $I_L$. For example, the content 768 in the first window 746 and the content 736 in the second window 748 is maintained in response to detecting the contact 7102 with the intensity 7131*a*.

FIG. 7DD illustrates a preview 7104 of the content 7108 for the web page associated with the hyperlink 770-F in response to detecting the contact 7102 (e.g., the one finger press gesture) with an intensity 7131*b* greater than $I_L$ and less than $I_D$. For example, the preview 7104 is a thumbnail or snapshot of the content 7108 for the web page associated with the hyperlink 770-F.

FIG. 7EE illustrates content 7108 associated with the hyperlink 770-F replacing display of the content 736 within the tab 706-D in the second window 748 in response to detecting the contact 732 (e.g., the one finger press gesture) with an intensity 7131*c* greater than $I_D$. As shown in FIG. 7EE, the second window 748 shows content 7108 for the web page associated with the hyperlink 770-F in FIGS. 7CC-7DD. In FIG. 7EE, the content 7108 includes a plurality of images 7111-A, 7111-B, and 7111-C and a plurality of hyperlinks 7113-A, 7113-B, and 7113-C. FIG. 7EE also shows the URL 7106 for the web page associated with the hyperlink 770-F in the address box 744-B. As such, in FIG. 7EE, the tab 706-D is active or in the foreground in the second window 748.

FIGS. 7FF-7HH illustrate another sequence in which a hyperlink is dragged between the windows in split screen mode. FIG. 7FF is similar to and adapted from FIG. 7O. As such, FIG. 7O and FIG. 7FF include common reference numbers and only the differences are described herein for the sake of brevity. FIG. 7FF illustrates a dragging gesture with a contact 7110, where the hyperlink 770-C is dragged from the first window 746 to the second window 748 according to the movement vector 7112.

FIG. 7GG illustrates a graphical representation 7114 of the hyperlink 770-C moving according to the movement vector 7112. For example, the graphical representation 7114 is a thumbnail or snapshot of content 7100 for the web page associated with the hyperlink 770-C. In another example, the graphical representation 7114 is an icon representing the hyperlink 770-C.

FIG. 7HH illustrates a new tab 706-F in the second window 748 with the content 7100 associated with a hyperlink 770-C in response to dropping the graphical representation 7114 within the second window 748. As shown in FIG. 7HH, the second window 748 shows the content 7100 for the web page associated with the hyperlink 770-C in FIGS. 7FF-7GG. In FIG. 7O, the content 768 includes hyperlinks 7101-A and 7101-B, text boxes 7103-A and 7103-B, and an image 7105. FIG. 7HH also shows the URL 798 for the web page associated with the hyperlink 770-C in the address box 744-B. As such, in FIG. 7HH, the tab 706-F is active or in the foreground, and the tab 706-D is inactive or in the background in the second window 748.

FIGS. 7II-7KK illustrate a sequence in a merged set of tabs in a full screen mode is separated into two sets of tabs in separate windows in a split screen mode in response to a change of at least dimension of the display area. FIG. 7II illustrates a window 7130 with a merged set of tabs 7125 in a full screen mode. In FIG. 7II, a first edge 7126-A of a display area 7121 (sometimes also herein called a "display region") of the device 100 (e.g., the touch screen) corresponds to a dimension 7124, and a second edge 7126-B of the display area 7121 of the device 100 corresponds to a dimension 7122. For example, in FIG. 7II, the dimension 7122 is less than the dimension 7124. As such, the device 100 is in portrait orientation in FIG. 7II. For example, the window 7130 is associated with an instance of a web browser application. FIG. 7II shows the window 7130 in a browser view. For example, the display or touchscreen of the device 100 defines the dimensions of the display area 7121.

In some embodiments, the window 7130 is associated with an instance of a web browser application, an email application, a messaging application, a document viewing application, a document processing application, or the like. In some embodiments, the content 7120 displayed in the window 7130 is associated with an electronic document such as a web page, a text file, an electronic mail message, an SMS, or the like.

In FIG. 7II, the window 7130 includes a chrome region 703, a tab bar 705, and a content region 707. The tab bar 705 includes the merged set of tabs 7125 with tabs 7116-A and 7116-B in left-to-right order. In FIG. 7II, the address bar 7123 includes the URL (uniform resource locator) 7118 for the web page associated with the tab 7116-B, and the content region 707 includes the content 7120 for the web page associated with the 7116-B. As such, in FIG. 7II, the tab 7116-B is active or in the foreground in the user interface 702. In FIG. 7II, the tab 7116-A is inactive or in the background of the user interface 702.

As shown in FIG. 7II, the content 7120 includes a plurality of hyperlinks 7127-A, 7127-B, 7127-C, 7127-D, 7127-E, and 7127-F. FIG. 7II also illustrates a gesture with contacts 7132-A and 7132-B (e.g., a two finger tap gesture) at a location corresponding to the hyperlink 7127-D. For example, the two finger tap gesture in FIG. 7II corresponds to an operation to open the content associated with the hyperlink 7127-D in a new tab in an opposite window in split screen mode.

FIG. 7JJ illustrates a new tab 7126-C with the content 7144 associated with the hyperlink 7127-D in the window 7130 in response to the gesture in FIG. 7II. As shown in FIG. 7JJ, the window 7130 shows the content 7144 for the web page associated with the hyperlink 7127-D in FIG. 7II. In FIG. 7JJ, the content 7144 includes images 7141-A, 7141-B, and 7141-C and hyperlinks 7143-A, 7143-B, and 7143-C. FIG. 7JJ also shows the URL 7142 for the web page associated with the hyperlink 7127-D in the address box 7123. As such, in FIG. 7JJ, the tab 7126-C is active or in the foreground, and the tabs 7116-A and 7116-B are inactive or in the background in the window 7130.

As shown in FIG. 7JJ, the merged set of tabs 7125 includes tabs 7116-A, 7116-B, and 7116-C in left-to-right order. In FIG. 7JJ, a virtual divider 7140 separates the tabs 7116-A and 7116-B from the tab 7116-C in response to the gesture in FIG. 7II.

FIG. 7KK illustrates a first window 7152 with a first set of tabs 7145*a* and a second window 7154 with a second set of tabs 7145*b* in a split screen mode in response to a change of at least dimension of the display area 7121 of the device 100 from FIG. 7JJ. In FIG. 7KK, a first edge 7126-A of the display area display area 7121 of the device 100 corresponds to the dimension 7122, and a second edge 7126-B of the device 100 corresponds to the dimension 7124. For example, in FIG. 7KK, the dimension 7122 is less than the dimension 7124. As such, the device 100 changed from portrait orientation in FIG. 7JJ to landscape orientation in FIG. 7KK.

In some embodiments, the first window 7152 is associated with an instance of a web browser application, an email application, a messaging application, a document viewing application, a document processing application, or the like. In some embodiments, the first content 7120 displayed in the first window 7152 is associated with an electronic document such as a web page, a text file, an electronic mail message, an SMS, or the like. In some embodiments, the second window 7154 is associated with an instance of a web browser application, an email application, a messaging application, a document viewing application, a document processing application, or the like. In some embodiments, the second content 7144 displayed in the second window 7154 is associated with an electronic document such as a web page, a text file, an electronic mail message, an SMS, or the like.

In FIG. 7KK, the first window 7152 includes a chrome region 733-A, a tab bar 735-A, and a content region 737-A. The tab bar 735-A includes the first set of tabs 7145*a* with tabs 7116-A and 7116-B in left-to-right order. Similar to the window 7130 in FIG. 7II, the address bar 7143-A in FIG. 7KK includes the URL 7118, and the content region 737-A includes content 7120 in FIG. 7KK. As such, in FIG. 7KK, the tab 7116-B is active or in the foreground in the first window 7152, and the tab 7116-A is inactive or in the background of the first window 7152.

In FIG. 7KK, the second window 7154 includes a chrome region 733-B, a tab bar 735-B, and a content region 737-B. The tab bar 735-B includes the second set of tabs 7145*b* with tab 7116-C. Similar to the window 7130 in FIG. 7JJ, the address bar 7143-B in FIG. 7KK includes the URL 7142, and the content region 737-C includes the content 7144 in FIG. 7KK. As such, in FIG. 7KK, the tab 7116-C is active or in the foreground in the second window 7154. FIG. 7LL also illustrates a divider 740 between the first window 7152 and the second window 7154. For example, the user of the device 100 is able to resize the first window 7152 and the second window 7154*by* dragging the divider 740.

As shown in FIG. 7KK, the first set of tabs 7145*a* corresponds to the tabs to the left of the virtual divider 7140 in FIG. 7JJ prior to the change of at least dimension of the display area 7121. Similarly, the second set of tabs 7145*b*, in FIG. 7KK, corresponds to the tabs to the right of the virtual divider 7140 in FIG. 7JJ prior to the change of at least dimension of the display area 7121.

8A-8D illustrate a flow diagram of a method 800 of switching between full screen mode and split screen mode in accordance with some embodiments. The method 800 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 800 are, optionally, combined and/or the order of some operations is, optionally, changed.

As described below, the method 800 provides an intuitive way to switch between full screen mode and split screen mode. The method reduces the cognitive burden on a user when switching between full screen mode and split screen mode, thereby creating a more efficient human-machine interface. For battery-operated electronic devices, enabling a user to switch between full screen mode and split screen mode faster and more efficiently conserves power and increases the time between battery charges.

The device concurrently displays (802), on the display, a first window (e.g., a partial screen tiled window) with a first set of tabs (e.g., one or more tabs) and a first content region displaying content associated with one of the tabs in the first set of tabs in a display area, and a second window (e.g., a partial screen tiled window) with a second set of tabs (e.g., one or more tabs) and a second content region displaying content associated with one of the tabs in the second set of tabs in the display area. As one example, in FIG. 6A, the display area 613 of the portable multifunction device 100 includes a first window 610 with a first set of tabs 625 and a second window 612 with a second set of tabs 627. For example, in FIG. 6A, the first window 610 and the second window 612 are partial screen tiled windows (e.g., each occupying approximately 50% of the display area 613).

In some embodiments, the first and second windows are separated by a divider (e.g., the divider 528 in FIG. 5M, or the divider 614 in FIG. 6A). In some embodiments, the divider can be dragged to resize the first and second windows (e.g., the sequence in FIGS. 5JJ-5KK). In some embodiments, the divider can be dragged to merge the first and second windows (e.g., the sequence in FIGS. 5FF-5GG). As such, for example, the user is able to quickly resize and/or merge windows.

In some embodiments, the first window is associated with an instance of a web browser application, an email application, a messaging application, a document viewing application, a document processing application, or the like. In some embodiments, the first content is associated with an electronic document such as a web page, a text file, an electronic mail message, an SMS, or the like. In some embodiments, the second window is associated with an instance of a web browser application, an email application, a messaging application, a document viewing application, a document processing application, or the like. In some embodiments, the second content is associated with an electronic document such as a web page, a text file, an electronic mail message, an SMS, or the like.

In some embodiments, the first window and the second windows are constrained (804) within the display area. For example, in FIG. 6A, the first window 610 and the second window 612 are constrained to the display area 613. For example, the display or touchscreen of the device 100 defines the dimensions of the display area 613.

In some embodiments, the first and second windows correspond to (806) a same application. For example, in FIG. 6A, the first window 610 and the second window 612 corresponds to different instances of a web browser application. In FIG. 6A, the first window 610 and the second window 612 are shown in browser view.

In some embodiments, with reference to FIG. 5M, the first tab bar 525-A including the first set of tabs (e.g., tabs 550-B, 550-C, 550-D, 550-E (occluded)) and the second tab bar 525-B including the second set of tabs (e.g., tab 550-A) operates as a single, unified tab bar. In some embodiments, with reference to FIG. 5M, the unified tab bar includes a first region (e.g., the first tab bar 525-A in FIG. 5M) in the first window 564 that includes the first set of tabs and a second region (e.g., the second tab bar 525-B in FIG. 5M) in the second window 566 that includes the second set of tabs.

In some embodiments, when a respective tab is moved (e.g., tab 550-C in FIGS. 5M-5Q), the respective tab is soft-locked to the unified tab bar. For example, in FIGS. 5Q-5M the tab 550-C is soft-locked to the unified tab bar as the user moves the tab 550-C between the first window 564 and the second window 566 with dragging gesture. In some embodiments, the respective tab is detached from the unified tab bar by satisfying one or more velocity, force, and/or angle criteria associated with the unified tab bar. For example, in FIGS. 5Q-5S, the tab 550-B is detached from the unified tab bar as the user moves the tab 550-B between the first window 564 and the second window 566 with dragging gesture. For example, a dragged tab stays "on rails" within the unified tab bar unless a threshold amount of force is used to detach the tab from the unified tab bar.

In some embodiments, after a respective tab is detached from the unified tab bar, a graphical representation of the respective tab matches the view mode of the window over which the tab is located. when dragged over a divider between the first and second tiled windows. As one example, as the tab 550-B is dragged between the windows in FIGS. 5Q-5T, the graphical representation of the tab 550-B is a tab icon when positioned over the first window 564 in FIG. 5R, and the graphical representation of the tab 550-B is a tab icon when positioned over the second window 566 in FIG. 5S (e.g., drag the tab from a window in browser view to another window in browser view). As another example, as the tab 550-D is dragged between the windows in FIGS. 5Y-5BB, the graphical representation of the tab 550-D is a snapshot when positioned over the first window 564 in FIG. 5Z, and the graphical representation of the tab 550-B is a tab icon when positioned over the second window 566 in FIG. 5AA (e.g., drag the tab from a window in tab view or to a window in browser view).

While concurrently displaying the first window and the second window within the display area, the device detects (808) a change in a size of at least one dimension of the display area. In some embodiments, the device detects a reduction in width of the display area due to rotation of the display from a first orientation (landscape) to a second orientation (portrait) (e.g., the sequence in FIGS. 6A-6B). As one example, in FIGS. 6A-6B, the device 100 detects a change from landscape orientation in FIG. 6A to portrait orientation in FIG. 6B. In some embodiments, the device detects a reduction in height of the display area due to rotation of the display from the second orientation (portrait) to the first orientation (landscape) (e.g., the sequence in FIGS. 6C-6D). As an example, in FIGS. 6C-6D, the device 100 detects a change from portrait orientation in FIG. 6C to landscape orientation in FIG. 6D. In some embodiments, the detects a reduction in width of the display area for the first and second windows due to the introduction of another window or pane next to the first and second windows. For example, the sequence in FIGS. 5HH-5JJ shows the introduction of and the selection from the multitasking selection pane 5142.

In response to detecting the change in the size of the at least one dimension of the display area, the device displays (810) a merged window within the display area that includes a combined set of selectable tabs and a content region, where the combined set of tabs includes the first and second sets of tabs, and the content region of the merged window includes content that corresponds to one of the tabs in the first set of tabs and the second set of tabs. As such, the device 100 switches from windows in split screen mode to a merged window in full screen mode in response to rotation of the device 100 from landscape to portrait orientation. As one example, in FIGS. 6A-6B, the device 100 detects a change from landscape orientation in FIG. 6A to portrait orientation in FIG. 6B. As a result, the first window 610 and the second window 612 in split screen mode in FIG. 6A are replaced with the merged window 630 in full screen mode in FIG. 6B. In some embodiments, as a result of blocks 832 (e.g., the sequence in FIGS. 5FF-5GG), 834, or 836 (e.g., the sequence in FIGS. 5HH-5JJ), the windows in split screen mode are replaced with a merged window in full screen mode. As such, for example, when the size of the at least one dimension of the display area changes, the first and second windows in split screen mode transition to a merged window to provide an improved user viewing experience. In this example, the merged window makes better use of the display area after the change in the size of the at least one dimension of the display area.

In some embodiments, the combined set of tabs are ordered (812) according to an order of the first set of tabs in the first window and an order second set of tabs in the second window. As such, the ordering of the tabs is maintained after reorientation of the display area. For example, the tabs in the merged set of tabs 631 in FIG. 6B has the same order (e.g., horizontally or left-to-right) as the tabs in the first set of tabs 625 and the second set of tabs 627 in FIG. 6A. As such, for example, the user is not disoriented when the first and second windows transition to the merged window.

In some embodiments, the tabs associated with the first and second sets of tabs are separated (814) within the combined set of tabs by a virtual divider that separates the first set of tabs associated the first window from the second set of tabs associated with the second window. In some embodiments, the first and second sets of tabs are separated within the combined set of tabs by a visual divider (e.g., an invisible demarcation line) in the merged window that corresponds to the divider between the windows in the split screen mode. For example, in FIG. 6A, the first window 610 including the first set of tabs 625 (e.g., tabs 608-B and 608-D) is separated from the second window 612 including the second set of tabs 627 (e.g., tabs 608-A, 608-E, and 608-C) by the divider 614. Continuing with this example, in FIG. 6B, the tabs 608-D and 608-D are separated from the tabs 608-A, 608-E, and 608-C within the merged set of tabs 631 by the virtual divider 640.

In some embodiments, the device detects (816) a sequence of one or more user inputs adjusting an order of the combined set of tabs by moving a respective tab in the combined set of tabs from a first location within the combined set of tabs to a second location within the combined set of tabs. As one example, FIG. 6B shows a dragging gesture with a contact 642, where the tab 608-D is dragged across the virtual divider 640 in a first direction (e.g., left-to-right) according to a movement vector 644. As another example, FIG. 6E shows a dragging gesture with a contact 662, where the tab 608-E is dragged across the virtual divider 640 in a second direction (e.g., right-to-left) according to a movement vector 664. As yet another example, FIG. 6H shows a dragging gesture with a contact 672, where the tab 608-A is dragged toward a right edge of the display area 613 without crossing the virtual divider 640 according to a movement vector 674.

In some embodiments, while displaying the merged window within the display area, the device detects (818) a subsequent change in a size of at least one dimension of the display area, and, in response to detecting the subsequent change in a size of at least one dimension of the display area, the device replace display of the merged window within the display area with a third window including a third set of tabs and a third content region that displays content associated with one of the tabs in the third set of tabs concurrently displayed with a fourth window including a fourth set of tabs and a fourth content region that displays content associated with one of the tabs in the fourth set of tabs. As such, the device 100 switches from the merged window in full screen mode to windows in split screen mode in response to rotation of the device 100 from portrait to landscape orientation. As one example, in FIGS. 6C-6D, the device 100 detects a change from portrait orientation in FIG. 6C to landscape orientation in FIG. 6D. As a result, the merged window 630 in full screen mode in FIG. 6C is replaced with the first window 610 and the second window 612 in split screen mode in FIG. 6D. As such, for example, when the size of the at least one dimension of the display area changes again, the merged window transitions to the first and second windows in split screen mode to provide an improved user viewing experience. Furthermore, changes made to the order of the tabs in the merged window are reflected in the first and second windows after the transition back to the split screen mode so as not to confuse the user.

In some embodiments, the first and the third sets of tabs include (820) the same tabs, and the second and fourth of tabs include the same tabs according to a determination that moving the respective tab from the first to the second location did not cross the virtual divider. In some embodiments. the tabs in the third set of tabs and or the fourth set of tabs are reordered in accordance with the sequence of one or more user inputs (e.g., the sequence in FIGS. 6H-6J). For example, FIGS. 6H-6I show the tab 608-A being moved within the merged set of tabs 631 according to a dragging gesture without crossing the virtual divider 640. After the device 100 detects a change from portrait to landscape orientation, the merged window 630 in full screen mode in FIG. 6I is replaced with the first window 610 and the second window 612 in split screen mode in FIG. 6J. The third set of tabs 645 in FIG. 5J includes the same tabs as the first set of tabs 625 in FIG. 6A. Similarly, the fourth set of tabs 647 in FIG. 6J include the same tabs as the second set of tabs 627 in FIG. 6A. However, the position of the tab 608-A has changed in the fourth set of tabs 647 as compared to its position in the second set of tabs 627 in FIG. 6A due to the dragging gesture in FIGS. 6H-6I.

In some embodiments, the third set of tabs includes (822) a tab from the second set of tabs according to a determination that moving the respective tab from the first to the second location crossed the virtual divider in a first direction (e.g., left-to-right). For example, FIGS. 6B-6C show the tab 608-D being moved within the merged set of tabs 631 according to a dragging gesture crossing the virtual divider 640 in a left-to-right direction. After the device 100 detects a change from portrait to landscape orientation, the merged window 630 in full screen mode in FIG. 6C is replaced with the first window 610 and the second window 612 in split screen mode in FIG. 6D. The fourth set of tabs 647 in FIG. 6D includes the tab 608-D as compared to the second set of tabs 627 in FIG. 6A. Similarly, the third set of tabs 645 in FIG. 6D does not include the tab 608-D as compared to the first set of tabs 625 in FIG. 6A. As such, the tabs In some embodiments, the fourth set of tabs includes (824) a tab from the first set of tabs according to a determination that moving the respective tab from the first to the second location crossed the virtual divider in a second direction (e.g., right-to-left). For example, FIGS. 6E-6F show the tab 608-E being moved within the merged set of tabs 631 according to a dragging gesture crossing the virtual divider 640 in a right-to-left direction. After the device 100 detects a change from portrait to landscape orientation, the merged window 630 in full screen mode in FIG. 6F is replaced with the first window 610 and the second window 612 in split screen mode in FIG. 6G. The third set of tabs 645 in FIG. 6G includes the tab 608-E as compared to the first set of tabs 625 in FIG. 6A. Similarly, the fourth set of tabs 647 in FIG. 6G does not include the tab 608-E as compared to the second set of tabs 627 in FIG. 6A.

In some embodiments, while displaying the merged window within the display area, the device detects (826) a subsequent change in a size of at least one dimension of the display area, and, in response to detecting the subsequent change in the size of the at least one dimension of the display area, the device replaces display of the merged window within the display area with the first window including the first set of tabs and the first content region that displays content associated with one of the tabs in the first set of tabs concurrently displayed with the second window including the second set of tabs and the second content region that displays content associated with one of the tabs in the second set of tabs. As one example, with reference to FIG. 6B, if the device 100 detects a change from portrait to landscape orientation without detecting the dragging gesture, the merged window 630 in full screen mode in FIG. 6B would be replaced with the first window 610 and the second window 612 in split screen mode in FIG. 6A while maintaining the order of the tabs from FIG. 6B. In another example, with reference to FIG. 6J, if the device 100 detects a change from landscape to portrait orientation, the first window 610 and the second window 612 in split screen mode in FIG. 6J would be replaced with the merged window 630 in full screen mode in FIG. 6I while maintaining the order of the tabs from FIG. 6J. As such, for example, if no changes made to the order of the tabs while the merged window is displayed, the previous ordering of the tabs is reflected in the first and second windows after the transition back to the split screen mode so as not to confuse the user.

In some embodiments, prior to concurrently displaying the first and second window, the device (828): displays the first window in a full screen mode within the display area, where the first window includes the first set of tabs and the first content region that displays content associated with one of the tabs in the first set of tabs; while displaying the first window in the full screen mode within the display area without displaying the second window, detects a gesture input dragging a first tab among the first set of tabs to a predefined region of the display area; and, in response to detecting the gesture input dragging the first tab, displays the second window concurrently with the first window, where the second content displayed in the second window corresponds to content associated with the first tab that was dragged into the predefined region of the display area while the first window was displayed without displaying the second window. For example, FIGS. 5A-5C show a sequence in which the tab 506-A within the window 502 in full screen mode is dragged to a predefined region of the display associated with the area between the threshold line 516 and the right edge of the display. Continuing with this example, in response to dropping the tab 506-A in the drop zone 521, the window 502 in FIG. 5C is replaced with the first window 522 and the second window 524 in split screen mode in FIG. 5D, where the tab 506-A is opened in the second window 524.

In some embodiments, in response to dragging the first tab to the predefined region of the display, the device reduces (830) a size of at least one dimension of the first window and concurrently display a drop region for the first tab adjacent to the first window, where the drop region corresponds a location of the second window. For example, in FIG. 5C, after the dragged tab 506-A crosses the threshold line 516, a drop zone 521 (e.g., associated with the predefined region and the second window 566 in split screen mode) is concurrently displayed with the window 502 at a reduced size as compared to FIG. 5B.

In some embodiments, a transition between full screen mode and split screen mode is trigged by selecting a split screen mode affordance (e.g., the affordance 560-A in FIG. 5K) while the first window is in the full screen mode (e.g., the sequence in FIGS. 5J-5L). For example, after selecting the split screen mode affordance, the content displayed in the content region of the full window is displayed in the first window and the content region of the second window is empty. For example, after selecting the split screen mode affordance, content displayed in the content region of the full window is displayed in the first window and the content region of the second window displays a new empty tab. In some embodiments, instead of displaying a set of tabs and a content region (e.g., browser view), one of the first and seconds windows shows a set of thumbnail image tiles of the content associated with a respective set of tabs (e.g., tab view).

In some embodiments, the device detects (832) a user gesture dragging a divider between the first and second windows, and, in response to detecting the user gesture dragging the divider, and in accordance with a determination that the user gesture satisfies a first criterion, the device displays the merged window that includes the combined set of tabs and the content region, where the combined set of tabs includes the first and second sets of tabs, and the content region of the merged window includes content that corresponds to one of the tabs in the first set of tabs and the second set of tabs. In some embodiments, the user gesture satisfies the first criterion when the user gesture drags the divider to a predefined edge of the display area or within a threshold distance thereof. In some embodiments, the user gesture satisfies the first criterion when the user gesture drags the divider to either edge of the display area or within a threshold distance thereof. For example, FIGS. 5FF-5GG show a sequence in which the first window 564 and the second window 566 in split screen mode are replaced by a merged window 5118 in full screen mode in response to dragging the divider 528 toward the right edge of the display.

In some embodiments, the device detects (834) a sequence of one or more user gestures dragging the tabs in the first and second sets of tabs into one of the first or second windows, and, in response to the sequence of one or more user gestures, the device displays the merged window that includes the combined set of tabs and the content region, where the combined set of tabs includes the first and second sets of tabs, and the content region of the merged window includes content that corresponds to one of the tabs in the first set of tabs and the second set of tabs. As one example, with reference to FIG. 5L, if the tab 550-F was dragged from the second window 563 to the first window 561 (not shown), the first window 561 and the second window 563 in split screen mode would be replaced with a merged window in full screen mode with the tabs 550-A, 550-B, 550-C, 550-D, 550-E, and 550-F in an order determined based on the hypothetical dragging gesture associated with the tab 550-F.

In some embodiments, the device detects (836) a user gesture (e.g., right to left swipe from the right edge of the display area followed by selection of an application from a plurality of application representations and, optionally, an input to display the application side by side with the first application) to add another window associated with a second application (e.g., from a multitasking pane), and, in response to the user gesture, the device displays the merged window that includes the combined set of tabs and the content region, where the combined set of tabs includes the first and second sets of tabs, and the content region of the merged window includes content that corresponds to one of the tabs in the first set of tabs and the second set of tabs. In some embodiments, a multitasking pane for selecting another application window to be displayed is overlaid on the current window(s) in response to a right-to-left swipe/drag gesture from the right edge of the display area, a left-to-right swipe/drag gesture from the left edge of the display area, or the like. As one example, FIGS. 5HH-5II show a sequence in which a multitasking selection pane 5142 is overlaid on the first window 5120 and the second window 5122 in split screen mode in response to a right-to-left dragging gesture from the right edge of the display area. In response to selection of the affordance associated with the application 5140-C in FIG. 5II, the first window 5120 and the second window 5122 in split screen mode are merged into a merged window 5150 in FIG. 5JJ. In FIG. 5JJ, the merged window 5150 is concurrently displayed with a window 5148 associated with an instance of the application 5140-C. In some embodiments, an additional dragging gesture is required to switch the multitasking pane from an overlay on the first and second windows to being concurrently displayed as a partial screen tiled window along with the merged window as a partial screen tiled window.

In some embodiments, the device detects (838) a user gesture dragging a divider between the first and second windows, and, in response to detecting the user gesture dragging the divider, and in accordance with a determination that the user gesture satisfies a second criterion, the device resizes the first and second windows according to a magnitude that the divider was dragged. In some embodiments, the user gesture satisfies the second criterion when the user gesture drags the divider at least a threshold amount but not to the edge of the display area or within a threshold distance thereof. For example, FIGS. 5JJ-5KK show a sequence in which the size of the merged window 5150 is reduced and the size of the window 5148 is increased due to dragging the divider 528 in a right-to-left direction toward the middle/opposite edge of the display area It should be understood that the particular order in which the operations in FIGS. 8A-8D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 900) are also applicable in an analogous manner to method 800 described above with respect to FIGS. 8A-8D. For example, the contacts, gestures, and user interface objects described above with reference to method 800 optionally have one or more of the characteristics of the contacts, gestures, and user interface objects described herein with reference to other methods described herein (e.g., the method 900). For brevity, these details are not repeated here.

FIGS. 9A-9C illustrate a flow diagram of a method 900 of opening hyperlinks in split view mode in accordance with some embodiments. The method 900 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 900 are, optionally, combined and/or the order of some operations is, optionally, changed.

As described below, the method 900 provides an intuitive way to open hyperlinks in split view mode. The method reduces the cognitive burden on a user when opening hyperlinks in split view mode, thereby creating a more efficient human-machine interface. For battery-operated electronic devices, enabling a user to open hyperlinks in split view mode faster and more efficiently conserves power and increases the time between battery charges.

In some embodiments, while displaying, on the display, the first content including a second hyperlink in a full screen window, the device detects (902) a second gesture input by the input device. For example, FIGS. 7A, 7C, 7F, 7I, and 7L show a window 702 in full screen mode displaying content 710 (e.g., the first content) for a web page associated with the tab 706-A, where the content 710 includes hyperlinks 712-A, 712-B, and 712-C. As one example, FIG. 7A shows a one finger tap gesture on the hyperlink 712-C (e.g., the second hyperlink). As another example, FIG. 7C shows a one finger long press gesture on the hyperlink 712-C (e.g., the second hyperlink). As yet another example, FIGS. 7F-7G show a dragging gesture associated with the hyperlink 712-C (e.g., the second hyperlink). As yet another example, FIGS. 7I-7K show a deep press gesture on the hyperlink 712-C (e.g., the second hyperlink). As yet another example, FIG. 7L shows a two finger tap gesture on the hyperlink 712-C (e.g., the second hyperlink).

In response to detecting the second gesture input, and in accordance with a determination that the second gesture input corresponds to the first gesture type on the second hyperlink (e.g., a one finger tap gesture on the second hyperlink), the device replaces display of the first content in the full screen window with the second content associated with the second hyperlink. For example, in response to the one finger tap gesture (e.g., a gesture corresponding to the first gesture type) in FIG. 7A, the content 736 for the web page associated with the hyperlink 712-C replaces the content 710 in the window 702 in full screen mode in FIG. 7B. In this example, the device 100 stays in full screen mode.

In response to detecting the second gesture input, and in accordance with a determination that the second gesture input corresponds to the second gesture type on the second hyperlink (e.g., a two finger deep press gesture on the second hyperlink, select a split view option from a menu displayed in response to a long press on the second hyperlink, flick the second hyperlink towards an edge of the display, or drag the second hyperlink to a hot region of the display), the device replaces display of the full screen window with the first window including the first content concurrently displayed with the second window including the second content associated with the second hyperlink. In some embodiments, replace display of the full screen window including the first content with two partial screen tiled windows displaying first and second content in response to the second gesture type on the second link. In one example, in response to the one finger long press gesture in FIG. 7C, the menu 716 is overlaid on the window 702. Continuing with this example, in response to selection of the affordance 718-A in FIG. 7D, the window 702 in full screen mode is replaced with a first window 746 displaying the content 710 and a second window 748 displaying the content 736 for the web page associated with the hyperlink 712-C in split screen mode in FIG. 7E. In this example, the device 100 changes from full screen mode to split screen mode.

In another example, in response to the dragging gesture which drops the hyperlink 712-C in the predefined region associated with the area between the threshold line 722 and the right edge of the display area in FIGS. 7F-7G, the window 702 in full screen mode is replaced with a first window 746 displaying the content 710 and a second window 748 displaying the content 736 for the web page associated with the hyperlink 712-C in split screen mode in FIG. 7H. In yet another example, in response to the one finger press gesture on the hyperlink 712-C in FIGS. 7I-7K with intensity 731*c* greater than $I_D$, the window 702 in full screen mode is replaced with a first window 746 displaying the content 710 and a second window 748 displaying the content 736 for the web page associated with the hyperlink 712-C in split screen mode in FIG. 7K. In yet another example, in response to the two finger tap gesture on the hyperlink 712-C in FIG. 7L, the window 702 in full screen mode is replaced with a first window 746 displaying the content 710 and a second window 748 displaying the content 736 for the web page associated with the hyperlink 712-C in split screen mode in FIG. 7M. In these examples, the device 100 changes from full screen mode to split screen mode.

While displaying, on the display, first content including a first hyperlink in a first window and a second window that includes second content (e.g., the second content includes a second hyperlink), the device detects (904) a gesture input by the input device (e.g., a select and flick gesture, a one finger deep press gesture, a dragging gesture to a predefined region, a two finger tap gesture, etc.). As one example, FIG. 7M shows a first window 746 displaying the content 710 for a web page associated with the tab 706-A and a second window 748 displaying the content 736 for a web page associated with the tab 706-D in split screen mode. In FIG. 7M, for example, the first content 710 includes hyperlinks 712-A, 712-B, and 712-C, and the second content 736 includes a hyperlink 738-A, a text box 737, and an image 739.

In some embodiments, the first window is associated with an instance of a web browser application, an email application, a messaging application, a document viewing application, a document processing application, or the like. In some embodiments, the first content is associated with an electronic document such as a web page, a text file, an electronic mail message, an SMS, or the like. In some embodiments, the second window is associated with an instance of a web browser application, an email application, a messaging application, a document viewing application, a document processing application, or the like. In some embodiments, the second content is associated with an electronic document such as a web page, a text file, an electronic mail message, an SMS, or the like.

As such, according to some embodiments, the content associated with the full screen window is displayed in a first split screen window and the content associated with a hyperlink is displayed in a second split screen window. For example, this allows a user to quickly transition from viewing one web page in full screen mode to viewing two web pages in split screen mode.

In some embodiments, the first and second windows are arranged (906) in a side by side arrangement. In some embodiments, the first and second windows are parallel to one another. For example, in FIG. 7M, the first window 746 and the second window 748 are arranged side-by-side, where a right edge of the first window 746 is adjacent to a left edge of the second window 748. In another example, the first and second windows are stacked, where a bottom edge of the first window 746 is adjacent to a top edge of the second window 748 (not shown).

In some embodiments, the first and second windows are (908) partial screen tiled windows. For example, in FIG. 7M, the first window 746 and the second window 748 are partial screen tiled windows (e.g., each occupying approximately 50% of the display area). For example, the display or touchscreen of the device 100 defines the dimensions of the display area. In some embodiments, a divider separating the first and second windows enables the user of the device 100 to resize the first and second windows. For example, with reference to FIG. 7M, a left-to-right dragging gesture on the divider 740 (not shown) would reduce the size of the second window 748 and increase the size of the first window 746. In another example, with reference to FIG. 7M, a right-to-left dragging gesture on the divider 740 (not shown) would reduce the size of the first window 746 and increase the size of the second window 748.

In response to detecting the gesture input, and in accordance with a determination that the gesture input corresponds to a first gesture type on the first hyperlink (e.g., a one finger tap gesture on the first hyperlink), the device replaces (910) display of the first content in the first window with display of third content that is associated with the first hyperlink. In some embodiments, the device displays third content associated with the first hyperlink in a new foreground tab in the first window. In some embodiments, the device displays third content associated with the first hyperlink replaces display pf the first content in the current foreground tab in the first window. As one example, in response to the one finger tap gesture on hyperlink 770-C in the first window 746 in FIG. 7AA, the content 768 in the first window 746 is replaced with the content 7110 for the web page associated with the hyperlink 770-C in FIG. 7BB.

In some embodiments, in response to the gesture input, and in accordance with a determination that the gesture input corresponds to the first gesture type on the first hyperlink, the device maintains (912) display of the second content in the second window. As one example, in response to the one finger tap gesture on hyperlink 770-C in the first window 746 in FIG. 7AA, the content 736 displayed in the second window 748 is maintained in FIG. 7BB.

In response to detecting the gesture input, and in accordance with a determination that the gesture input corresponds to a second gesture type on the first hyperlink (e.g., a two finger tap on the first hyperlink, a one or two finger deep press gesture on the first hyperlink, selection of a split view option from a menu displayed in response to a long press on the hyperlink, flick the first hyperlink toward an edge of the display, drag the first hyperlink into the second window, or drag the first hyperlink to a predefined region of the display area), the device replaces (914) display of the second content in the second window with display of the third content that is associated with the first hyperlink. In some embodiments, the device displays the third content associated with the first hyperlink in a new tab in the second window in the foreground. In some embodiments, the device displays the third content associated with the first hyperlink in a new tab in the second window in the background. In some embodiments, the other tabs in the second window retain the content that they had prior to detecting the gesture input. In some embodiments, the device replaces display of the second content in the foreground tab in the second window with the third content associated with the first hyperlink. As one example, in response to the two finger tap gesture on hyperlink 770-A in the first window 746 in FIG. 7T, the content 736 in the second window 748 is replaced with the content 793 for a web page associated with the hyperlink 770-A in FIG. 7U. As such, according to some embodiments, the content associated with a hyperlink replaces display of the content currently displayed in the opposite split screen window. For example, this allows a user to continue viewing the current web page alongside a new web page associated with a selected hyperlink.

In some embodiments, in response to the gesture input, and in accordance with a determination that the gesture input corresponds to the second gesture type on the first hyperlink, the device maintains (916) display of the first content in the first window. As one example, in response to the two finger tap gesture on hyperlink 770-A in the first window 746 in FIG. 7T, the content 768 displayed in the first window 746 is maintained in FIG. 7U.

In some embodiments, the second gesture type includes (918) a tap gesture associated with concurrently displaying the first content in the first window and the third content associated with the first hyperlink in the second window. In some embodiments, the second gesture type corresponds to a two-finger tap gesture on the first hyperlink to view the third content associated with the first hyperlink in a new tab in the opposite window in split screen mode. In some embodiments, the second gesture type corresponds to a two-finger tap gesture on the first hyperlink to replace the content of the current foreground tab in the opposite window in split screen mode with the third content associated with the first hyperlink. As one example, in response to the two finger tap gesture on hyperlink 770-A in the first window 746 in FIG. 7T, the content 736 in the second window 748 is replaced with the content 793 for a web page associated with the hyperlink 770-A in FIG. 7U. As another example, in response to the two finger tap gesture on hyperlink 738-A in the second window 748 in FIG. 7S, the content 710 in the first window 746 is replaced with the content 768 for a web page associated with the hyperlink 738-A in FIG. 7T.

In some embodiments, the second gesture type includes (920) selecting an option from a menu associated with the first hyperlink (e.g., split view option in a right click/two finger click menu or a menu that is displayed after detecting a long press gesture on the hyperlink), where the option corresponds to concurrently displaying the first content in the first window and the third content associated with the first hyperlink in the second window. In some embodiments, the second gesture type corresponds to a one finger long press gesture on the hyperlink to display a pop-menu with an option to view the third content associated with the first hyperlink in a new tab in the opposite window in split screen mode. In some embodiments, the second gesture type corresponds to a one finger long press gesture on the hyperlink to display a pop-menu with an option to replace the content of the current foreground tab in the opposite window in split screen mode with the third content associated with the first hyperlink.

For example, the menu (e.g., the menu 716 in FIG. 7N) includes a first affordance to view the third content associated with the first hyperlink in a new foreground tab in the opposite window in split screen mode (e.g., the first affordance 718-A in FIG. 7N). In another example, the menu includes a first affordance to open the third content associated with the first hyperlink replace in a new background tab in the opposite window in split screen mode. In yet another example, the menu includes a first affordance to replace the content in the current foreground tab with the third content associated with the first hyperlink in the opposite window in split screen mode.

As one example, in response to the one finger long press gesture on hyperlink 738-A in FIG. 7M, the menu 716 is overlaid on the second window in FIG. 7N. Continuing with this example, in response to selection of the first affordance 718-A in FIG. 7N, the content 710 in the first window 746 is replaced with the content 768 for a web page associated with the hyperlink 738-A in FIG. 7O.

In some embodiments, the second gesture type includes (922) dragging the first hyperlink from within the first window to the second window. In some embodiments, the second gesture type corresponds to dragging a graphical representation of the first hyperlink to the opposite window to view the third content associated with the first hyperlink in a new tab in the opposite window in split screen mode. In some embodiments, the second gesture type corresponds to dragging a graphical representation of the first hyperlink to the opposite window to replace the content of the current foreground tab in the opposite window in split screen mode with the third content associated with the first hyperlink. As one example, in response to dragging the graphical representation 7114 of the hyperlink 770-C from the first window 746 to the second window 748 and dropping the graphical representation 7114 of the hyperlink 770-C in the second window 748 in FIG. 7FF-7GG, the content 736 in the second window 748 is replaced with the content 7100 for a web page associated with the hyperlink 770-C in FIG. 7HH.

In some embodiments, a graphical representation of the third content associated with the first hyperlink corresponds to (924) a view mode (e.g., a tab view mode or browser view mode) of the first window while being dragged to a divider between the first and second windows, and where the graphical representation of the third content associated with the first hyperlink corresponds a view mode of the second window when dragged over the divider between the first and second windows. For example, the first and second windows are some combination of browser view mode and tab view mode. As one example, in FIGS. 7FF-7HH, the first window 746 and the second window 748 are both displayed in browser view. As another example, in FIG. 7V-7Y, the first window 746 is displayed in tab view and the second window 748 is displayed in browser view. In the sequence shown in FIGS. 7V-7Y, as the graphical representation 788 of the hyperlink 778-A is dragged from the second window 748 into the first window 746, the graphical representation 788 of the hyperlink 778-A is transformed into the tab 706-G with a snapshot 782-G of the content for the web page associated with the hyperlink 778-A. As such, for example, the graphical representation of the content associated with the hyperlink provides a visual queue as to the view mode of the window over which the graphical representation is currently positioned.

In some embodiments, the second gesture type includes (926) dragging the first hyperlink from within the first window to a predefined region of the display. In some embodiments, the second gesture type corresponds dragging the first hyperlink to a predefined region (e.g., a "hot" region or drop zone) associated with an edge of the display area to view the third content associated with the first hyperlink in a new tab in the opposite window in split screen mode. In some embodiments, the second gesture type corresponds dragging the first hyperlink to a predefined region (e.g., a "hot" region or drop zone) between an edge of the display area to a threshold line replace the content of the current foreground tab in the opposite window in split screen mode with the third content associated with the first hyperlink. For example, after the graphical representation 762 of the hyperlink 738-A dragged and dropped a drop zone associated with the predefined region between the right edge of the display area and the threshold line 756 in FIGS. 7P-7Q, the content 710 in the first window 746 is replaced with the content 768 for a web page associated with the hyperlink 738-A in FIG. 7R. As such, according to some embodiments, the user is able to view the content associated with a hyperlink in the opposite split screen window by performing a gesture on the hyperlink, which saves the user time when scrolling through a website.

In some embodiments, a graphical representation (e.g., snapshot or preview image) of the third content associated with the first hyperlink is overlaid (928) on the first window while dragging the first hyperlink from within the first window to a predefined region of the display. As one example, in FIG. 7Q, a graphical representation 762 of the hyperlink 738-A is overlaid on the second window 748 in response to dragging the hyperlink 738-A to the predefined region between the right edge of the display area and the threshold line 756. For example, the graphical representation 762 is a thumbnail or snapshot of the content 768 for the web page associated with the hyperlink 738-A. In another example, the graphical representation 762 is an icon representing the hyperlink 738-A.

In some embodiments, the second gesture type includes (930) flicking the first hyperlink from within the first window toward a predefined region of the display. In some embodiments, the second gesture type corresponds to selecting the first hyperlink and flicking/throwing the first hyperlink to a predefined edge of the display area (e.g., an edge adjacent to the opposite window) to view the third content associated with the first hyperlink in a new tab in the opposite window in split screen mode. In some embodiments, the second gesture type corresponds to selecting the first hyperlink and flicking/throwing the first hyperlink to a predefined edge of the display area (e.g., an edge adjacent to the opposite window) to replace the content of the current foreground tab in the opposite window in split screen mode with the third content associated with the first hyperlink. For example, in response to dragging the hyperlink 770-D in the first window 746 and flicking/throwing it toward the right edge of the display area (e.g., toward the second window 748) in FIG. 7T (not shown), the content 736 in the second window 748 is replaced with the content 793 for a web page associated with the hyperlink 770-A in FIG. 7U. As such, according to some embodiments, the user is able to view the content associated with a hyperlink in the opposite split screen window by performing a gesture on the hyperlink, which saves the user time when scrolling through a website.

In some embodiments, the first window is displayed in a full screen mode prior to flicking the hyperlink to the predefined region. In some embodiments, the flick gesture is detected in accordance with a determination that the touch input was moving with more than a predetermined amount of speed within a predetermined time period prior to detecting liftoff of the contact, and for a gesture that does not have the predetermined amount of speed within the predetermined time period prior to detecting liftoff of the contact, the second content in the second window is not replaced with display of the third content that is associated with the first hyperlink.

For example, the flick gesture is similar to a scrolling gesture: The most common method of initiating the scrolling of a scroll view is a direct manipulation by the user touching the screen and dragging with his or her finger. The scroll content then scrolls in response to the action. This gesture is referred to as a drag gesture. A variation of the drag gesture is the flick gesture. A flick gesture is a quick movement of a user's finger that makes initial contact with the screen, drags in the direction of the desired scroll, and then lifts from the screen. This gesture not only causes scrolling, it imparts a momentum, based on the speed of the user's dragging action, that causes scrolling to continue even after the gesture is completed. The scrolling then decelerates over a specified period of time. The flick gesture allows users to move large distances with a single action. At any time during the deceleration, the user can touch the screen to stop the scrolling in place.

In some embodiments, the second content includes (932) a second hyperlink, and in response to the gesture input, and, in accordance with a determination that the gesture input corresponds to the first gesture type (e.g., a one finger tap gesture) on the second hyperlink, the device replaces display of the second content in the second window with display of the fourth content that is associated with the second hyperlink while maintaining display of the first content in the first window. In some embodiments, the device displays fourth content associated with the second hyperlink in a new foreground tab in the second window. In some embodiments, the device displays the fourth content associated with the second hyperlink in the current foreground tab in the second window.

As one example, in response to the one finger tap gesture on hyperlink 778-C in the second window 748 in FIG. 7Y, the content 793 in the second window 748 is replaced with the content 794 for the web page associated with the hyperlink 778-C in FIG. 7Z. Continuing with this example, in response to the one finger tap gesture on hyperlink 778-C in the second window 748 in FIG. 7Y, the content in the second region 785-A of the first window 746 is maintained in FIG. 7Z.

In some embodiments, the second content includes (934) a second hyperlink, and in response to the gesture input, and, in accordance with a determination that the gesture input corresponds to the second gesture type (e.g., a two finger tap gesture) on the second hyperlink, the device replaces display of the first content in the first window with display of the fourth content that is associated with the second hyperlink while maintaining display of the second content in the second window. In some embodiments, the device displays the fourth content associated with the second hyperlink in a new tab in the first window in the foreground. In some embodiments, the device displays the fourth content associated with the second hyperlink in a new tab in the first window in the background. In some embodiments, the other tabs in the first window retain the content that they had prior to detecting the gesture input. In some embodiments, the device replaces display of the first content in the current foreground tab in the first window with the fourth content associated with the second hyperlink. As such, according to some embodiments, the content associated with a hyperlink replaces display of the content currently displayed in the opposite split screen window. For example, this allows a user to continue viewing the current web page alongside a new web page associated with a selected hyperlink.

As one example, in response to the two finger tap gesture on hyperlink 738-A in the second window 748 in FIG. 7S, the content 710 in the first window 746 is replaced with the content 768 for a web page associated with the hyperlink 738-A in FIG. 7T. Continuing with this example, in response to the two finger tap gesture on hyperlink 738-A in the second window 748 in FIG. 7S, the content 736 in the second window 748 is maintained in FIG. 7T.

In some embodiments, in response to the gesture input, and in accordance with a determination that the gesture input corresponds to a third gesture type (e.g., a one finger or two finger light press with intensity greater than $I_L$ and less than $I_D$) on the first hyperlink, the device displays (936), on the display, a preview of the third content that is associated with the first hyperlink, where the preview is overlaid on the second window. In some embodiments, the preview is a snapshot or thumbnail of the third content associated with the first hyperlink. As one example, in FIG. 7DD, in response to the one finger press gesture with intensity 7131*b* greater than $I_L$ and less than $I_D$, the preview 7104 corresponding to the content for a web page associated with the hyperlink 770-F is overlaid on the first window.

In some embodiments, the third gesture type includes (938) a press gesture on the first hyperlink with an intensity that breaches a first predefined intensity threshold (e.g., a one finger or two finger light press with intensity greater than $I_L$ and less than $I_D$) associated with displaying the preview of the third content, and the second gesture type includes a press gesture on the first hyperlink with an intensity that breaches a second predefined intensity threshold (e.g., a one finger or two finger deep press with intensity greater than $I_D$) associated with concurrently displaying the first content in the first window and the third content associated with the first hyperlink in the second window.

In some embodiments, the third gesture type corresponds to a one finger press gesture on the first hyperlink that satisfies a first intensity threshold (e.g., a light press with intensity greater than $I_L$ and less than $I_D$) to display a preview of the third content associated with the first hyperlink overlaid on the first window (e.g., the preview 7104 in FIG. 7DD). For example, the preview allows the user to determine whether he/she should view the content in a split screen window.

In some embodiments, the second gesture type corresponds to a one finger press gesture on the first hyperlink that satisfies a second intensity threshold (e.g., a deep press with intensity greater than $I_D$) to view the third content associated with the first hyperlink in a new tab in the opposite window in split screen mode. In some embodiments, the second gesture type corresponds to a one finger press gesture on the first hyperlink that satisfies a second intensity threshold (e.g., a deep press with intensity greater than $I_D$) to replace the content of the current foreground tab in the opposite window in split screen mode with the third content associated with the first hyperlink. As one example, in FIG. 7EE, in response to the one finger press gesture with intensity 7131*c* greater than $I_D$, the content 736 in the second window 748 is replaced with the content 7108 for a web page associated with the hyperlink 770-F. As such, according to some embodiments, the user is able to view the content associated with a hyperlink in the opposite split screen window by performing a gesture on the hyperlink, which saves the user time when scrolling through a website.

It should be understood that the particular order in which the operations in FIGS. 9A-9C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 800) are also applicable in an analogous manner to method 900 described above with respect to FIGS. 9A-9C. For example, the contacts, gestures, and user interface objects described above with reference to method 900 optionally have one or more of the characteristics of the contacts, gestures, and user interface objects described herein with reference to other methods described herein (e.g., the method 800). For brevity, these details are not repeated here.

Figure 10:
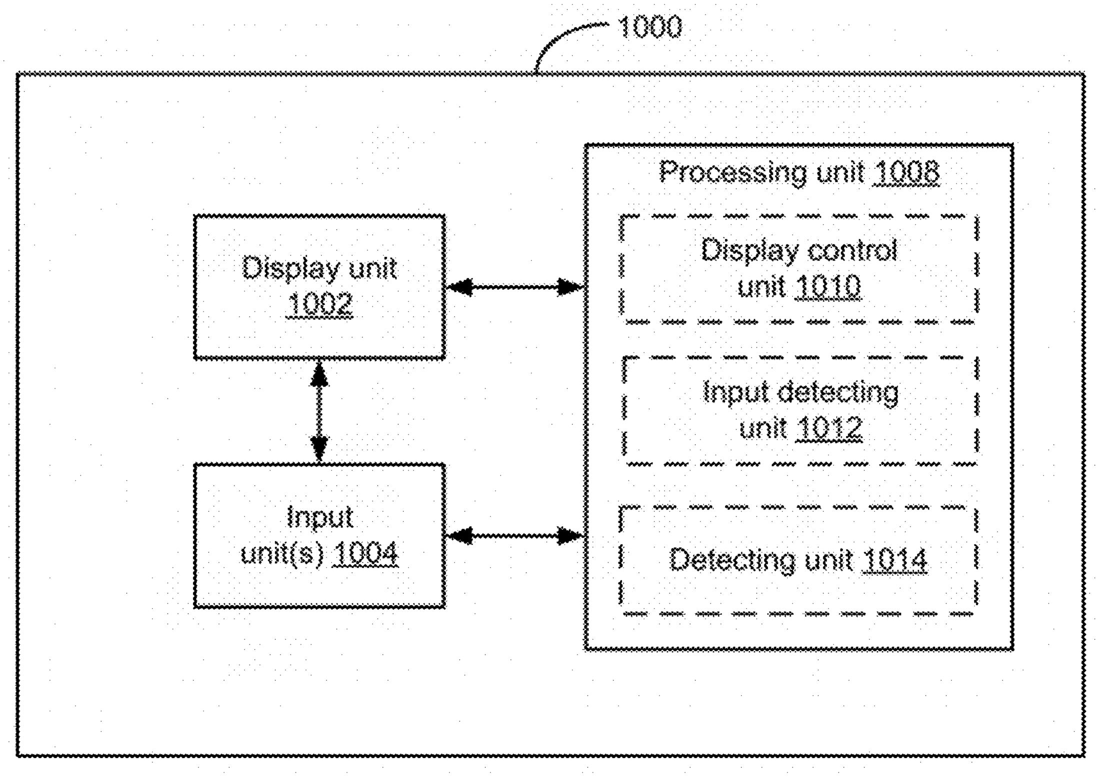
FIGS. 10-11 are functional block diagrams of an electronic device in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface, one or more input units 1004 configured to receive user inputs, and a processing unit 1008 coupled to the display unit 1002 and the one or more input units 1004. In some embodiments, the processing unit 1008 includes: a display control unit 1010, an input detecting unit 1012, and a detecting unit 1014.

The processing unit 1008 is configured to: enable concurrent display of (e.g., with the display control unit 1010), in a display area on the display unit 1002, a first window with a first set of tabs and a first content region displaying content associated with one of the tabs in the first set of tabs, and a second window with a second set of tabs and a second content region displaying content associated with one of the tabs in the second set of tabs; while concurrently displaying the first window and the second window within the display area, detect (e.g., with the detecting unit 1014) a change in a size of at least one dimension of the display area; and, in response to detecting the change in the size of the at least one dimension of the display area, enable display of (e.g., with the display control unit 1010) a merged window within the display area that includes a combined set of selectable tabs and a content region, where the combined set of tabs includes the first and second sets of tabs, and the content region of the merged window includes content that corresponds to one of the tabs in the first set of tabs and the second set of tabs.

In some embodiments, the combined set of tabs are ordered according to an order of the first set of tabs in the first window and an order second set of tabs in the second window.

In some embodiments, the tabs associated with the first and second sets of tabs are separated within the combined set of tabs by a virtual divider that separates the first set of tabs associated the first window from the second set of tabs associated with the second window.

In some embodiments, the processing unit 1008 is further configured to detect (e.g., with the input detecting unit 1012) a sequence of one or more user inputs via the one or more input units 1004 that adjust an order of the combined set of tabs by moving a respective tab in the combined set of tabs from a first location within the combined set of tabs to a second location within the combined set of tabs.

In some embodiments, the processing unit 1008 is further configured to: while displaying the merged window within the display area, detect (e.g., with the detecting unit 1014) a subsequent change in a size of at least one dimension of the display area; and, in response to detecting the subsequent change in a size of at least one dimension of the display area, replace display of (e.g., with the display control unit 1010) the merged window within the display area with a third window including a third set of tabs and a third content region that displays content associated with one of the tabs in the third set of tabs concurrently displayed with a fourth window including a fourth set of tabs and a fourth content region that displays content associated with one of the tabs in the fourth set of tabs.

In some embodiments, the first and the third sets of tabs include the same tabs, and the second and fourth of tabs include the same tabs according to a determination that moving the respective tab from the first to the second location did not cross the virtual divider.

In some embodiments, the third set of tabs includes a tab from the second set of tabs according to a determination that moving the respective tab from the first to the second location crossed the virtual divider in a first direction.

In some embodiments, the fourth set of tabs includes a tab from the first set of tabs according to a determination that moving the respective tab from the first to the second location crossed the virtual divider in a second direction.

In some embodiments, the processing unit 1008 is further configured to: while displaying the merged window within the display area, detect (e.g., with the detecting unit 1014) a subsequent change in a size of at least one dimension of the display area; and, in response to detecting the subsequent change in the size of the at least one dimension of the display area, replace display of (e.g., with the display control unit 1010) the merged window within the display area with the first window including the first set of tabs and the first content region that displays content associated with one of the tabs in the first set of tabs concurrently displayed with the second window including the second set of tabs and the second content region that displays content associated with one of the tabs in the second set of tabs.

In some embodiments, prior to concurrently displaying the first and second window, the processing unit 1008 is further configured to: enable display of (e.g., with the display control unit 1010) the first window in a full screen mode within the display area on the display unit 1002, where the first window includes the first set of tabs and the first content region that displays content associated with one of the tabs in the first set of tabs; while displaying the first window in the full screen mode within the display area without displaying the second window, detect (e.g., with the input detecting unit 1012) a gesture input by the one or more unit units 1004 dragging a first tab among the first set of tabs to a predefined region of the display area; and, in response to detecting the gesture input dragging the first tab, enable display of (e.g., with the display control unit 1010) the second window concurrently with the first window, where the second content displayed in the second window corresponds to content associated with the first tab that was dragged into the predefined region of the display area while the first window was displayed without displaying the second window.

In some embodiments, the processing unit 1008 is further configured to reduce (e.g., with the display control unit 1010) a size of at least one dimension of the first window and enable concurrent display of (e.g., with the display control unit 1010) a drop region for the first tab adjacent to the first window in response to dragging the first tab to the predefined region of the display, where the drop region corresponds a location of the second window.

In some embodiments, the first window and the second windows are constrained within the display area.

In some embodiments, the first and second windows correspond to a same application.

In some embodiments, the processing unit 1008 is further configured to: detect (e.g., with the input detecting unit 1012) a user gesture by the one or more input units 1004 dragging a divider between the first and second windows; and, in response to detecting the user gesture dragging the divider, and in accordance with a determination that the user gesture satisfies a first criterion, enable display of (e.g., with the display control unit 1010) the merged window that includes the combined set of tabs and the content region, where the combined set of tabs includes the first and second sets of tabs, and the content region of the merged window includes content that corresponds to one of the tabs in the first set of tabs and the second set of tabs.

In some embodiments, the processing unit 1008 is further configured to: detect (e.g., with the input detecting unit 1012) a sequence of one or more user gestures by the one or more input units 1004 dragging the tabs in the first and second sets of tabs into one of the first or second windows; and, in response to the sequence of one or more user gestures, enable display of (e.g., with the display control unit 1010) the merged window that includes the combined set of tabs and the content region, where the combined set of tabs includes the first and second sets of tabs, and the content region of the merged window includes content that corresponds to one of the tabs in the first set of tabs and the second set of tabs.

In some embodiments, the processing unit 1008 is further configured to: detect (e.g., with the input detecting unit 1012) a user gesture by the one or more input units 1004 to add another window associated with a second application; and, in response to the user gesture, enable display of (e.g., with the display control unit 1010) the merged window that includes the combined set of tabs and the content region, where the combined set of tabs includes the first and second sets of tabs, and the content region of the merged window includes content that corresponds to one of the tabs in the first set of tabs and the second set of tabs.

In some embodiments, the processing unit 1008 is further configured to: detect (e.g., with the input detecting unit 1012) a user gesture by the one or more input units 1004 dragging a divider between the first and second windows; and, in response to detecting the user gesture dragging the divider, and in accordance with a determination that the user gesture satisfies a second criterion, resize (e.g., with the display control unit 1010) the first and second windows according to a magnitude that the divider was dragged.

Figure 11:
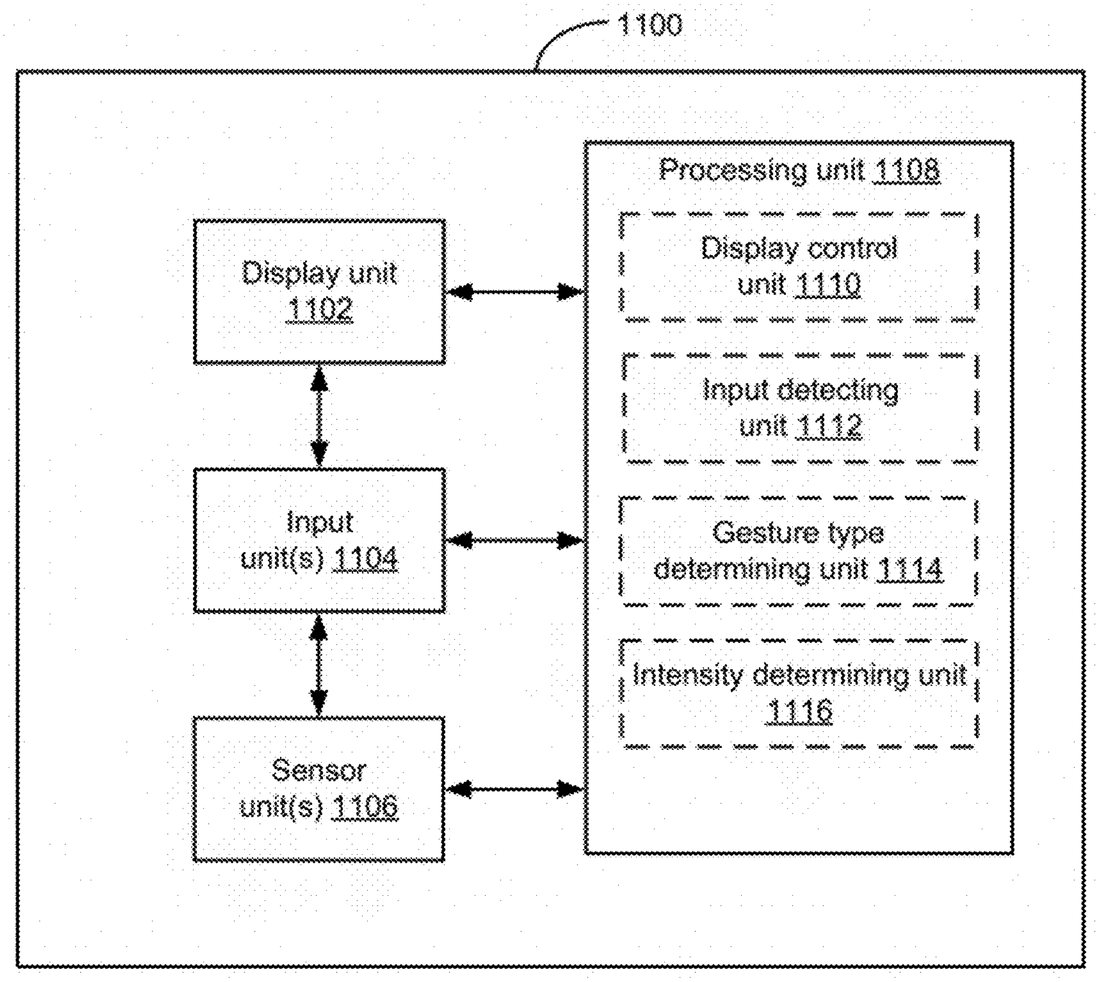

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface, one or more input units 1104 configured to receive user inputs, one or more sensor units 1106 configured to detect intensity of contacts received by the one or more input units 1104, and a processing unit 1108 coupled to the display unit 1102, the one or more input units 1104, and the one or more sensor units 1106. In some embodiments, the processing unit 1108 includes: a display control unit 1110, an input detecting unit 1112, a gesture type determining unit 1114, and an intensity determining unit 1116.

The processing unit 1108 is configured to: while displaying, on the display unit 1102, first content including a first hyperlink in a first window and a second window that includes second content, detect (e.g., with the input detecting unit 1112) a gesture input by the one or more input units 1104; in response to detecting the gesture input, and in accordance with a determination (e.g., with the gesture type determining unit 1114) that the gesture input corresponds to a first gesture type on the first hyperlink, replace display of (e.g., with the display control unit 1110) the first content in the first window with display of third content that is associated with the first hyperlink; and, in response to detecting the gesture input, and in accordance with a determination (e.g., with the gesture type determining unit 1114) that the gesture input corresponds to a second gesture type on the first hyperlink, replace display of (e.g., with the display control unit 1110) the second content in the second window with display of the third content that is associated with the first hyperlink.

In some embodiments, in response to the gesture input, and in accordance with a determination (e.g., with the gesture type determining unit 1114) that the gesture input corresponds to the first gesture type on the first hyperlink, the processing unit 1108 is further configured to maintain display of (e.g., with the display control unit 1110) the second content in the second window.

In some embodiments, in response to the gesture input, and in accordance with a determination (e.g., with the gesture type determining unit 1114) that the gesture input corresponds to the second gesture type on the first hyperlink, the processing unit 1108 is further configured to maintain display of (e.g., with the display control unit 1110) the first content in the first window.

In some embodiments, the second content includes a second hyperlink, and, in response to the gesture input, and in accordance with a determination (e.g., with the gesture type determining unit 1114) that the gesture input corresponds to the first gesture type on the second hyperlink, the processing unit 1108 is further configured to replace display of (e.g., with the display control unit 1110) the second content in the second window with display of the fourth content that is associated with the second hyperlink while maintaining display of (e.g., with the display control unit 1110) the first content in the first window.

In some embodiments, the second content includes a second hyperlink, and, in response to the gesture input, and in accordance with a determination (e.g., with the gesture type determining unit 1114) that the gesture input corresponds to the second gesture type on the second hyperlink, the processing unit 1108 is further configured to replace display of (e.g., with the display control unit 1110) the first content in the first window with display of the fourth content that is associated with the second hyperlink while maintaining display of (e.g., with the display control unit 1110) the second content in the second window.

In some embodiments, in response to the gesture input, and in accordance with a determination (e.g., with the gesture type determining unit 1114) that the gesture input corresponds to a third gesture type on the first hyperlink, the processing unit 1108 is further configured to enable display of (e.g., with the display control unit 1110), on the display unit 1102, a preview of the third content that is associated with the first hyperlink, where the preview is overlaid on the second window.

In some embodiments, the third gesture type includes a press gesture on the first hyperlink with an intensity that breaches a first predefined intensity threshold (e.g., with the intensity determining unit 1116) associated with displaying the preview of the third content, and the second gesture type includes a press gesture on the first hyperlink with an intensity that breaches a second predefined intensity threshold (e.g., with the intensity determining unit 1116) associated with concurrently displaying the first content in the first window and the third content associated with the first hyperlink in the second window.

In some embodiments, the second gesture type includes a tap gesture associated with concurrently displaying the first content in the first window and the third content associated with the first hyperlink in the second window.

In some embodiments, the second gesture type includes selecting an option from a menu associated with the first hyperlink, where the option corresponds to concurrently displaying the first content in the first window and the third content associated with the first hyperlink in the second window.

In some embodiments, the second gesture type includes dragging the first hyperlink from within the first window to the second window.

In some embodiments, a graphical representation of the third content associated with the first hyperlink corresponds to a view mode of the first window while being dragged to a divider between the first and second windows, and the graphical representation of the third content associated with the first hyperlink corresponds a view mode of the second window when dragged over the divider between the first and second windows.

In some embodiments, the second gesture type includes dragging the first hyperlink from within the first window to a predefined region of the display unit 1102.

In some embodiments, a graphical representation of the third content associated with the first hyperlink is overlaid on the first window while dragging the link from to the predefined region of the display unit 1102.

In some embodiments, the second gesture type includes flicking the first hyperlink from within the first window toward a predefined region of the display unit 1102.

In some embodiments, the first and second windows are arranged in a side by side arrangement.

In some embodiments, the first and second windows are partial screen tiled windows.

In some embodiments, the processing unit 1108 is further configured to: while displaying, on the display unit 1102, the first content including a second hyperlink in a full screen window, detect (e.g., with the input detecting unit 1112) a second gesture input by the one or more input devices 1104; in response to detecting the second gesture input, and in accordance with a determination (e.g., with the gesture type determining unit 1114) that the second gesture input corresponds to the first gesture type on the second hyperlink, replace display of (e.g., with the display control unit 1110) the first content in the full screen window with the second content associated with the second hyperlink; and, in response to detecting the second gesture input, and in accordance with a determination (e.g., with the gesture type determining unit 1114) that the second gesture input corresponds to the second gesture type on the second hyperlink, replace display of (e.g., with the display control unit 1110) the full screen window with the first window including the first content concurrently displayed with the second window including the second content associated with the second hyperlink.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8D and 9A-9C are, optionally, implemented by components depicted in FIGS. 1A-1B, 3, or FIGS. 10-11. For example, detection operation 808, detection operation 818, and detection operations 904 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device with one or more processors; non-transitory memory, a display, and an input device:
while displaying, on the display, first content including a first hyperlink in a first window and a second window that includes second content, detecting a gesture input by the input device; and
in response to detecting the gesture input:
in accordance with a determination that the gesture input corresponds to a first gesture type on the first hyperlink, replacing display of the first content in the first window with display of third content that is associated with the first hyperlink; and
in accordance with a determination that the gesture input corresponds to a second gesture type that includes dragging of the first hyperlink from within the first window to the second window:
displaying a movement of a graphical representation of the first hyperlink from within the first window to the second window; and
in response to detecting a dropping of the graphical representation of the first hyperlink within the second window, replacing display of the second content in the second window with display of the third content that is associated with the first hyperlink while maintaining respective positions of the first window and the second window.

2. The method of claim 1, further comprising:
in response to the gesture input, and in accordance with a determination that the gesture input corresponds to the first gesture type on the first hyperlink, maintaining display of the second content in the second window.

3. The method of claim 1, further comprising:
in response to the gesture input, and in accordance with a determination that the gesture input corresponds to the second gesture type on the first hyperlink, maintaining display of the first content in the first window.

4. The method of claim 1, wherein the second content includes a second hyperlink; and
the method further comprises, in response to the gesture input, and in accordance with a determination that the gesture input corresponds to the first gesture type on the second hyperlink, replacing display of the second content in the second window with display of fourth content that is associated with the second hyperlink while maintaining display of the first content in the first window.

5. The method of claim 1, wherein the second content includes a second hyperlink; and
the method further comprises, in response to the gesture input, and in accordance with a determination that the gesture input corresponds to the second gesture type on the second hyperlink, replacing display of the first content in the first window with display of fourth content that is associated with the second hyperlink while maintaining display of the second content in the second window.

6. The method of claim 1, further comprising:
in response to the gesture input, and in accordance with a determination that the gesture input corresponds to a third gesture type on the first hyperlink, displaying, on the display, a preview of the third content that is associated with the first hyperlink, wherein the preview is overlaid on the second window.

7. The method of claim 6, wherein the third gesture type includes a press gesture on the first hyperlink with an intensity that breaches a first predefined intensity threshold associated with displaying the preview of the third content.

8. The method of claim 1, wherein a graphical representation of the third content associated with the first hyperlink corresponds to a view mode of the first window while being dragged to a divider between the first and second windows, and wherein the graphical representation of the third content associated with the first hyperlink corresponds to a view mode of the second window when dragged over the divider between the first and second windows.

9. The method of claim 1, wherein the second gesture type includes dragging the first hyperlink from within the first window to a predefined region of the display.

10. The method of claim 9, wherein a graphical representation of the third content associated with the first hyperlink is overlaid on the first window while dragging the first hyperlink from within the first window to a predefined region of the display.

11. The method of claim 1, wherein the second gesture type includes flicking the first hyperlink from within the first window toward a predefined region of the display.

12. The method of claim 1, wherein the first and second windows are arranged in a side by side arrangement.

13. The method of claim 1, wherein the first and second windows are partial screen tiled windows.

14. The method of claim 1, further comprising:

while displaying, on the display, the first content including a second hyperlink in a full screen window, detecting a second gesture input by the input device; and in response to detecting the second gesture input:

in accordance with a determination that the second gesture input corresponds to the first gesture type on the second hyperlink, replacing display of the first content in the full screen window with the second content associated with the second hyperlink; and in accordance with a determination that the second gesture input corresponds to the second gesture type on the second hyperlink, replacing display of the full screen window with the first window including the first content concurrently displayed with the second window including the second content associated with the second hyperlink.

15. A non-transitory computer readable storage medium storing one or more programs, the one or more programs comprising instructions, which, when executed by an electronic device with a display, and an input device, cause the electronic device to:

while displaying, on the display, first content including a first hyperlink in a first window and a second window that includes second content, detect a gesture input by the input device; and in response to detecting the gesture input:

in accordance with a determination that the gesture input corresponds to a first gesture type on the first hyperlink, replace display of the first content in the first window with display of third content that is associated with the first hyperlink; and in accordance with a determination that the gesture input corresponds to a second gesture type that includes dragging of the first hyperlink from within the first window to the second window:

display a movement of a graphical representation of the first hyperlink from within the first window to the second window; and in response to detecting a dropping of the graphical representation of the first hyperlink within the second window, replace display of the second content in the second window with display of the third content that is associated with the first hyperlink while maintaining respective positions of the first window and the second window.

16. An electronic device comprising:

a display unit configured to display a user interface;

one or more input units configured to receive inputs;

one or more sensor units configured to determine an intensity of contacts received by the one or more input units; and a processing unit coupled with the display unit, the one or more input units, and the one or more sensor units, the processing unit configured to:

while displaying, on the display unit, first content including a first hyperlink in a first window and a second window that includes second content, detect a gesture input by the one or more input units; and in response to detecting the gesture input:

in accordance with a determination that the gesture input corresponds to a first gesture type on the first hyperlink, replace display of the first content in the first window with display of third content that is associated with the first hyperlink; and in accordance with a determination that the gesture input corresponds to a second gesture type that includes dragging of the first hyperlink from within the first window to the second window:

display a movement of a graphical representation of the first hyperlink from within the first window to the second window; and in response to detecting a dropping of the graphical representation of the first hyperlink within the second window, replace display of the second content in the second window with display of the third content that is associated with the first hyperlink while maintaining respective positions of the first window and the second window.

17. The electronic device of claim 16, wherein the processing unit is further configured to:

in response to the gesture input, and in accordance with a determination that the gesture input corresponds to the first gesture type on the first hyperlink, maintain display of the second content in the second window.

18. The electronic device of claim 16, wherein the processing unit is further configured to:

in response to the gesture input, and in accordance with a determination that the gesture input corresponds to the second gesture type on the first hyperlink, maintain display of the first content in the first window.

19. The electronic device of claim 16, wherein the second content includes a second hyperlink; and wherein the processing unit is further configured to, in response to the gesture input, and in accordance with a determination that the gesture input corresponds to the first gesture type on the second hyperlink, replace display of the second content in the second window with display of fourth content that is associated with the second hyperlink while maintaining display of the first content in the first window.

20. The electronic device of claim 16, wherein the second content includes a second hyperlink; and wherein the processing unit is further configured to, in response to the gesture input, and in accordance with a determination that the gesture input corresponds to the second gesture type on the second hyperlink, replace display of the first content in the first window with display of fourth content that is associated with the second hyperlink while maintaining display of the second content in the second window.

21. The electronic device of claim 16, wherein the processing unit is further configured to:

in response to the gesture input, and in accordance with a determination that the gesture input corresponds to a third gesture type on the first hyperlink, enable display of, on the display unit, a preview of the third content that is associated with the first hyperlink, wherein the preview is overlaid on the second window.

22. The electronic device of claim 21, wherein the third gesture type includes a press gesture on the first hyperlink with an intensity that breaches a first predefined intensity threshold associated with displaying the preview of the third content.

23. The electronic device of claim 16, wherein a graphical representation of the third content associated with the first hyperlink corresponds to a view mode of the first window while being dragged to a divider between the first and second windows, and wherein the graphical representation of the third content associated with the first hyperlink corresponds to a view mode of the second window when dragged over the divider between the first and second windows.

24. The electronic device of claim 16, wherein the second gesture type includes dragging the first hyperlink from within the first window to a predefined region of the display unit.

* * * * *